US012527883B2

(12) United States Patent
Chadderton et al.

(10) Patent No.: US 12,527,883 B2
(45) Date of Patent: Jan. 20, 2026

(54) RETINAL PROMOTER AND USES THEREOF

(71) Applicant: The Provost, Fellows and Scholars of the College of the Holy and Undivided Trinity of Queen Elizabeth, NEAR DUBLIN, Dublin (IE)

(72) Inventors: Naomi Chadderton, Dublin (IE); Gwenyth Jane Farrar, Dublin (IE); Killian Hanlon, Dublin (IE); Paul F. Kenna, Dublin (IE); Arpad Palfi, Dublin (IE); Sophia Millington Ward, Dublin (IE)

(73) Assignee: The Provost, Fellows and Scholars of the College of the Holy and Undivided Trinity of Queen Elizabeth, Near Dublin, Dublin (IE)

( * ) Notice: Subject to any disclaimer, the term of this patent is extended or adjusted under 35 U.S.C. 154(b) by 174 days.

(21) Appl. No.: 16/643,534

(22) PCT Filed: Sep. 3, 2018

(86) PCT No.: PCT/EP2018/073643
§ 371 (c)(1),
(2) Date: Feb. 29, 2020

(87) PCT Pub. No.: WO2019/043234
PCT Pub. Date: Mar. 7, 2019

(65) Prior Publication Data
US 2021/0052742 A1    Feb. 25, 2021

(30) Foreign Application Priority Data
Sep. 1, 2017 (GB) ..................... 1714066

(51) Int. Cl.
*C12N 15/11* (2006.01)
*A61K 48/00* (2006.01)
*A61P 27/02* (2006.01)
*C12N 15/86* (2006.01)

(52) U.S. Cl.
CPC ...... *A61K 48/0058* (2013.01); *A61K 48/0075* (2013.01); *A61P 27/02* (2018.01); *C12N 15/86* (2013.01); *C12N 2750/14143* (2013.01); *C12N 2830/008* (2013.01)

(58) Field of Classification Search
CPC ............ C12N 2320/32; C12N 2330/10; C12N 2830/008; A61K 48/0058
See application file for complete search history.

(56) References Cited

FOREIGN PATENT DOCUMENTS

WO    2017/093566 A1    6/2017

OTHER PUBLICATIONS

*Homo sapiens* DNA, chromosome 22, nearly complete genome, GenBank: AP023482.1, accessed and retrieved from ncbi.nlm.nih.gov on Oct. 14, 2022. (Year: 2022).*
Nucleotide sequence alignment between SEQ ID No. 1 of U.S. Appl. No. 16/643,534 and AP023482.1, 2 pages. (Year: 2022).*
*Homo sapiens* DNA, chromosome 22, nearly compelte genome, GenBank: AP023482.1, Jan. 13, 2022, accessed and retrieved from ncbi.nlm.nih.gov on Mar. 25, 2024. (Year: 2022).*
Elder et al., "Novel DNA binding proteins participate in the regulation of human neurofilament H gene expression", Molecular Brain Research, 1992, 15(1-2), 85-98.
Kim et al., "Gene expression profile of the adult human retinal ganglion cell layer", Molecular Vision, 2006, 1640-8.
Schwartz et al., "Brain-specific Enhancement of the Mouse Neurofilament Heavy Gene Promoter in Vitro", The Journal of Biological Chemistry, 1994, 269(18), 13444-13450.
Zhang et al., "A tyrosine hydroxylase-neurofilament chimeric promoter enhances long-term expression in rat forebrain neurons from helper virus-free HSV-1 vectors", Molecular Brain Research, 2000, vol. 84, 17-31.
Gao et al., "Isolation of an enhancer from the rat tyrosine hydroxylase promoter that supports long-term, neuronal-specific expression from a neurofilament promoter, in a helper virus-free HSV-1 vector system", Brain Research, 2007, vol. 1130, 1-16.
Hanlon et al., "A Novel Retinal Ganglion Cell Promoter for Utility in AAV Vectors", Frontiers in Neuroscience, 2017, vol. 11, 12 pages.

* cited by examiner

*Primary Examiner* — Dana H Shin
(74) *Attorney, Agent, or Firm* — McDonnell Boehnen Hulbert & Berghoff LLP

(57) ABSTRACT

Disclosed is a promoter for driving expression in the retina. The promoter sequence comprises at least NEFH promoter conserved region A and optionally one or more of NEFH conserved regions D, F, D1, K, B, C and E. Also disclosed are uses of the promoter for directing expression to retinal ganglion cells and uses for the treatment of ocular diseases.

5 Claims, 33 Drawing Sheets
Specification includes a Sequence Listing.

Nefh

Nefm

Nefl

Vsnl1

Sparcl1

(i) human NEFH conserved regions (ii) mouse NEFH conserved regions (a) Initial scatter (b) Singlet selection 1

(c) Singlet selection 2

(f) *CMV*-EGFP samples merged (g) *Nefh*-EGFP samples merged (h)

| Cell sample | Ct | Cell number | Enrichment |
|---|---|---|---|
| Thy1-positive | 33.477 | 43499 | 3.23479871 |
| Whole retina | 32.618 | 255218 | |

| | SEQ ID NO: 124 AAV.A-EGFP |
|---|---|
| L-ITR | CA GCTGCGCGCT CGCTCGCTCA CTGAGGCCGC CCGGGCAAAG<br>CCCGGGCGTC GGGCGACCTT TGGTCGCCCG GCCTCAGTGA GCGAGCGAGC<br>GCGCAGAGAG GGAGTGGCCAACTCCATCAC TAGGGGTTCC T |
| plasmid | GCGGCCGCA CGCGT |
| spacer | CTCTG ACGCAGCGTC GATTCCCCTT CCCTCCTCGG TC |
| Conserved region A | CCCTGCCC CGCCCCTCTC ACTGCGGCGG AGCCGGTCGG CCGGGGGGCC<br>GCAGGGGAGG AGGCGGAGAG GGCGGGGCCC TCCTCCCCAC CCTCTCACTG<br>CCAAGGGGTT GGACCCGGCC GCGGCGGCTA TAAAAGGGCC GGCGCCCTGG<br>TGCTGCCGCA GTGCCTCCCG CCCCGTCCCG GCCTCGCGCA CCTGCTC |
| Plasmid spacer | AGG CCGATAATTC CCCGGGGATCC TCTAGAGTC GACCTGCAGA<br>AGCTGATCCA CCGGTCGCCA CC |
| EGFP | ATGGTGAG CAAGGGCGAG GAGCTGTTCA CCGGGGTGGT GCCCATCCTG<br>GTCGAGCTGG ACGGCGACGT AAACGGCCAC AAGTTCAGCG TGTCCGGCGA<br>GGGCGAGGGC GATGCCACCT ACGGCAAGCT GACCCTGAAG TTCATCTGCA<br>CCACCGGCAA GCTGCCCGTG CCCTGGCCCA CCCTCGTGAC CACCCTGACC<br>TACGGCGTGC AGTGCTTCAG CCGCTACCCC GACCACATGA AGCAGCACGA<br>CTTCTTCAAG TCCGCCATGC CCGAAGGCTA CGTCCAGGAG CGCACCATCT<br>TCTTCAAGGA CGACGGCAAC TACAAGACCC GCGCCGAGGT GAAGTTCGAG<br>GGCGACACCC TGGTGAACCG CATCGAGCTG AAGGGCATCG ACTTCAAGGA<br>GGACGGCAAC ATCCTGGGGC ACAAGCTGGA GTACAACTAC AACAGCCACA<br>ACGTCTATAT CATGGCCGAC AAGCAGAAGA ACGGCATCAA GGTGAACTTC<br>AAGATCCGCC ACAACATCGA GGACGGCAGC GTGCAGCTCG CCGACCACTA<br>CCAGCAGAAC ACCCCCATCG GCGACGGCCC CGTGCTGCTG CCCGACAACC<br>ACTACCTGAG CACCCAGTCC GCCCTGAGCA AAGACCCCAA CGAGAAGCGC<br>GATCACATGG TCCTGCTGGA GTTCGTGACC GCCGCCGGGA TCACTCTCGG<br>CATGGACGAG CTGTACAAGT |
| plasmid | AAAGCGGCCA GCTTGCCTCG AGCAGCGCTG CTCGAGAGAT CT |
| hGH_PA_terminator | ACGGGTGG CATCCCTGTG ACCCCTCCCC AGTGCCTCTC CTGGCCCTGG<br>AAGTTGCCAC TCCAGTGCCC ACCAGCCTTG TCCTAATAAA ATTAAGTTGC<br>ATCATTTTGT CTGACTAGGT GTCCTTCTAT AATATTATGG GGTGGAGGGG<br>GGTGGTATGG AGCAAGGGGC AAGTTGGGAA GACAACCTGT AGGGCCTGCG<br>GGGTCTATTG GGAACCAAGC TGGAGTGCAG TGGCACAATC TTGGCTCACT<br>GCAATCTCCG CCTCCTGGGT TCAAGCGATT CTCCTGCCTC AGCCTCCCGA<br>GTTGTTGGGA TTCCAGGCAT GCATGACCAG GCTCAGCTAA TTTTTGTTTT<br>TTTGGTAGAG ACGGGGTTTC ACCATATTGG CCAGGCTGGT CTCCAACTCC<br>TAATCTCAGG TGATCTACCC ACCTTGGCCT CCCAAATTGC TGGGATTACA<br>GGCGTGAACC ACTGCTCCCT TCCCTGTCCT T |
| Plasmid | CTGATTTTG TAGGTAACCA CGTGCGGACC GAGCGGCCGC |
| R-ITR | AGGAACCCCT AGTGATGGAG TTGGCCACTC CCTCTCTGCG CGCTCGCTCG<br>CTCACTGAGG CCGGGCGACC AAAGGTCGCC CGACGCCCGG GCTTTGCCCG<br>GGCGGCCTCA GTGAGCGAGC GAGCGCGCAG CTGCCTGAGG |
| Plasmid backbone | GGCGCCTGAT GCGGTATTTT CTCCTTACGC ATCTGTGCGG TATTTCACAC<br>CGCATACGTC AAAGCAACCA TAGTACGCGC CCTGTAGCGG CGCATTAAGC<br>GCGGCGGGTG TGGTGGTTAC GCGCAGCGTG ACCGCTACAC TTGCCAGCGC<br>CCTAGCGCCC GCTCCTTTCG CTTTCTTCCC TTCCTTTCTC GCCACGTTCG<br>CCGGCTTTCC CCGTCAAGCT CTAAATCGGG GCTCCCTTT AGGGTTCCGA<br>TTTAGTGCTT TACGGCACCT CGACCCCAAA AAACTTGATT TGGGTGATGG<br>TTCACGTAGT GGGCCATCGC CCTGATAGAC GGTTTTTCGC CCTTTGACGT<br>TGGAGTCCAC GTTCTTTAAT AGTGGACTCT TGTTCCAAAC TGGAACAACA<br>CTCAACCCTA TCTCGGGCTA TTCTTTTGAT TTATAAGGGA TTTTGCCGAT<br>TTCGGCCTAT TGGTTAAAAA ATGAGCTGAT TTAACAAAAA TTTAACGCGA<br>ATTTTAACAA AATATTAACG TTTACAATTT TATGGTGCAC TCTCAGTACA<br>ATCTGCTCTG ATGCCGCATA GTTAAGCCAG CCCCGACACC CGCCAACACC |

```
CGCTGACGCG CCCTGACGGG CTTGTCTGCT CCCGGCATCC GCTTACAGAC
AAGCTGTGAC CGTCTCCGGG AGCTGCATGT GTCAGAGGTT TTCACCGTCA
TCACCGAAAC GCGCGAGACG AAAGGGCCTC GTGATACGCC TATTTTTATA
GGTTAATGTC ATGATAATAA TGGTTTCTTA GACGTCAGGT GGCACTTTTC
GGGGAAATGT GCGCGGAACC CCTATTTGTT TATTTTTCTA AATACATTCA
AATATGTATC CGCTCATGAG ACAATAACCC TGATAAATGC TTCAATAATA
TTGAAAAAGG AAGAGTATGA GTATTCAACA TTTCCGTGTC GCCCTTATTC
CCTTTTTTGC GGCATTTTGC CTTCCTGTTT TTGCTCACCC AGAAACGCTG
GTGAAAGTAA AAGATGCTGA AGATCAGTTG GGTGCACGAG TGGGTTACAT
CGAACTGGAT CTCAACAGCG GTAAGATCCT TGAGAGTTTT CGCCCCGAAG
AACGTTTTCC AATGATGAGC ACTTTTAAAG TTCTGCTATG TGGCGCGGTA
TTATCCCGTA TTGACGCCGG GCAAGAGCAA CTCGGTCGCC GCATACACTA
TTCTCAGAAT GACTTGGTTG AGTACTCACC AGTCACAGAA AAGCATCTTA
CGGATGGCAT GACAGTAAGA GAATTATGCA GTGCTGCCAT AACCATGAGT
GATAACACTG CGGCCAACTT ACTTCTGACA ACGATCGGAG GACCGAAGGA
GCTAACCGCT TTTTTGCACA ACATGGGGGA TCATGTAACT CGCCTTGATC
GTTGGGAACC GGAGCTGAAT GAAGCCATAC CAAACGACGA GCGTGACACC
ACGATGCCTG TAGCAATGGC AACAACGTTG CGCAAACTAT TAACTGGCGA
ACTACTTACT CTAGCTTCCC GGCAACAATT AATAGACTGG ATGGAGGCGG
ATAAAGTTGC AGGACCACTT CTGCGCTCGG CCCTTCCGGC TGGCTGGTTT
ATTGCTGATA AATCTGGAGC CGGTGAGCGT GGGTCTCGCG GTATCATTGC
AGCACTGGGG CCAGATGGTA AGCCCTCCCG TATCGTAGTT ATCTACACGA
CGGGGAGTCA GGCAACTATG GATGAACGAA ATAGACAGAT CGCTGAGATA
GGTGCCTCAC TGATTAAGCA TTGGTAACTG TCAGACCAAG TTTACTCATA
TATACTTTAG ATTGATTTAA AACTTCATTT TTAATTTAAA AGGATCTAGG
TGAAGATCCT TTTTGATAAT CTCATGACCA AAATCCCTTA ACGTGAGTTT
TCGTTCCACT GAGCGTCAGA CCCCGTAGAA AAGATCAAAG GATCTTCTTG
AGATCCTTTT TTTCTGCGCG TAATCTGCTG CTTGCAAACA AAAAAACCAC
CGCTACCAGC GGTGGTTTGT TTGCCGGATC AAGAGCTACC AACTCTTTTT
CCGAAGGTAA CTGGCTTCAG CAGAGCGCAG ATACCAAATA CTGTCCTTCT
AGTGTAGCCG TAGTTAGGCC ACCACTTCAA GAACTCTGTA GCACCGCCTA
CATACCTCGC TCTGCTAATC CTGTTACCAG TGGCTGCTGC CAGTGGCGAT
AAGTCGTGTC TTACCGGGTT GGACTCAAGA CGATAGTTAC CGGATAAGGC
GCAGCGGTCG GGCTGAACGG GGGGTTCGTG CACACAGCCC AGCTTGGAGC
GAACGACCTA CACCGAACTG AGATACCTAC AGCGTGAGCT ATGAGAAAGC
GCCACGCTTC CCGAAGGGAG AAAGGCGGAC AGGTATCCGG TAAGCGGCAG
GGTCGGAACA GGAGAGCGCA CGAGGGAGCT TCCAGGGGGA AACGCCTGGT
ATCTTTATAG TCCTGTCGGG TTTCGCCACC TCTGACTTGA GCGTCGATTT
TTGTGATGCT CGTCAGGGGG GCGGAGCCTA TGGAAAAACG CCAGCAACGC
GGCCTTTTTA CGGTTCCTGG CCTTTTGCTG GCCTTTTGCT
CACATGTCCTGCAGG
```

| | SEQ ID NO: 125 AAV.A-spacer-F-EGFP |
|---|---|
| L-ITR | CA GCTGCGCGCT CGCTCGCTCA CTGAGGCCGC CCGGGCAAAG CCCGGGCGTC GGGCGACCTT TGGTCGCCCG GCCTCAGTGA GCGAGCGAGC GCGCAGAGAG GGAGTGGCCAACTCCATCAC TAGGGGTTCC T |
| plasmid | GCGGCCGCA CGCGTCTAGT CATCTCAGT |
| Conserved region F | T GCTGTCAGCT GCTTGTGAGC CTTCTCACAT CCAGAGAATG TATCAGCATT GTGCAGACTG AAAAGACCCA GAGGAACAAG GCTCCAATGG CAAAATTCCA AGTAGAATGA CAAATAAATG GGGAGCCATC TGAGAGCAAG GGAGTCCTGC CCAACACCCG CCCCATGCCT TTCTCAGGGA CCTCAGACCA GCCACTCACC TCCATCCTCC CAGCACCACC TGCAACCAGC CCCTTGCCCT CTGCAAACTG GAGCACGACT GGATCTTTAG ATGGGGAAA AATGCTTCAT CATGTTCTGC TGCTTCATGC AAAACCAGAA ACTCCCTCCC CCTCTTCCCT CCTCCCAGCG CACTCTCCT |
| Plasmid | TCCAGT AAGTTTAAAC |
| spacer | AGGCATTTAT ACTCCGCTGG AAGCGCGTGT GTATTGCTCA CAATAATTGC ATGAGTTGCC CATCGATATG GGCAACTCTA TCTGCACTGC TCATTAATAT ACTTCTGGGT TCCTTCCAGT TGTTTTTGCA TAGTGATCAG CCTCTCTCTG AGGGTGAAAT AATCCCGTTC AGCGGTGTCT GCCAGTCGGG GGGAGGCTGC ATTATCCACG CCGGAGGCGG TGGTGGCTTC ACGCACTGAC TGACAGACTG CTTTGATGTG CAACCGACGA CGACCAGCGG CAACATCATC ACGCAGAGCA TCATTTTCAG CTTTAGCATC AGCTAACTCC TTCGTGTATT TTGCATCGAG CGCAGCAACA TCACGCTGAC GCATCTGCAT GTCAGTAATT GCCGCGTTCG CCAGCTTCAG TTCTCTGGCA TTTTTGTCGC GCTGGGCTTT GTAGGTAATG GCGTTATCAC GGTAATGATT AACAGCCCAT GACAGGCAGA CGATGATGCA GATAACCAGA GCGGAGATAA TCGCGGTGAC TCTGCTCATA CATCAATCTC TCTGACCGTT CCGCCCGCTT CTTTGAATTT TGCAATCAGG CTGTCAGCCT TATGCTCGAA CTGACCATAA CCAGCGCCCG GCAGTGAAGC CCAGATATTG CTGCAACGGT CGATTGCCTG ACGGATATCA CCACGATCAA TCATAGGTAA AGCGCCACGC TCCTTAATCT GCTGCAATGC CACAGCGTCC TGACTTTTCG GAGAGAAGTC TTTCAGGCCA AGCTGCTTGC GGTAGGCATC CCACCAACGG GAAAGAAGCT GGTAGCGTCC GGCGCCTGTT GATTTGAGTT TTGGGTTTAG CGTGACAAGT TTGCGAGGGT GATCGGAGTA ATCAGTAAAT AGCTCTCCGC CTACAATGAC GTCATAACCA TGATTTCTGG TTTTCTGACG TCCGTTATCA GTTCCCTCCG ACCACGCCAG CATATCGAGG AACGCCTTAC GTTGATTATT GATTTCTACC ATCTTCTACT CCGGCTTTTT TAGCAGCGAA GCGTTTGATA AGCGAACCAA TCGAGTCAGT ACCGATGTAG CCGATAAACA CGCTCGTTAT ATAAGCGAGA TTGCTACTTA GTCCGGCGAA GTCGAGAAGG TCACGAATGA ACCAGGCGAT AATGGCGCAC ATCGTTGCGT CGATTACTGT TTTTGTAAAC GCACCGCCAT TATATCTGCC GCGAAGGTAC GCCATTGCAA ACGCAAGGAT TGCCCCGATG CCTTGTTCCT TTGCCGCGAG AATGGCGGCC AACAGGTCAT GTTTTTCTGG CATCTTCATG TCTTACCCCC AATAAGGGGA TTTGCTCTAT TTAATTAGGA ATAAGGTCGA TTACTGATAG AACAAATCCA GGCTACTGTG TTTAGTAATC AGATTTGTTC GTGACCGATA TGCACGGGCA AAACGGCAGG AGGTTGTTAG CGCGACCTCC TGCCACCGC TTTCACGAAG GTCATGTGTA AAAGGCCGCA GCGTAACTAT TACTAATGAA TTCAGGACAG ACAGTGGCTA CGGCTCAGTT TGGGTTGTGC TGTTGCTGGG CGGCGATGAC GCCTGTACGC ATTTGGTGAT CCGGTTCTGC TTCCGGTATT CGCTTAATTC AGCACAACGG AAAGAGCACT GGCTAACCAG GCTCGCCGAC TCTTCACGAT TATCGACTCA ATGCTCTTAC CTGTTGTGCA GATATAAAAA ATCCCGAAAC CGTTATGCAG GCTCTAACTA TTACCTGCGA ACTGTTTCGG GATTGCATTT TGCAGACCTC TCTGCCTGCG ATGGTTGGAG TTCCAGACGA TACGTCGAAG TGACCAACTA GGCGGAATCG GTAGTA |
| Plasmid | GTTT AAACTTCCCT CCTCGGTC |

Figure 11B (continued)

| | |
|---|---|
| Conserved region A | CC CTGCCCCGCCCCTCTCACT GCGGCGGAGC CGGTCGGCCG GGGGGCCGCA GGGGAGGAGG CGGAGAGGGC GGGGCCCTCC TCCCCACCCT CTCACTGCCA AGGGGTTGGA CCCGGCCGCG GCGGCTATAA AAGGGCCGGC GCCCTGGTGC TGCCGCAGTG CCTCCCGCCC CGTCCCGGCC TCGCGCACCT GCTC |
| plasmid | TCACGT GATCAGAGAT AATTCCCCGG GGATCCTCTA GAGCGACGT GCAGAAGCTG ATCCACCGGT CGCCACC |
| EGFP | ATGGTGAG CAAGGGCGAG GAGCTGTTCA CCGGGGTGGT GCCCATCCTG GTCGAGCTGG ACGGCGACGT AAACGGCCAC AAGTTCAGCG TGTCCGGCGA GGGCGAGGGC GATGCCACCT ACGGCAAGCT GACCCTGAAG TTCATCTGCA CCACCGGCAA GCTGCCCGTG CCCTGGCCCA CCCTCGTGAC CACCCTGACC TACGGCGTGC AGTGCTTCAG CCGCTACCCC GACCACATGA AGCAGCACGA CTTCTTCAAG TCCGCCATGC CCGAAGGCTA CGTCCAGGAG CGCACCATCT TCTTCAAGGA CGACGGCAAC TACAAGACCC GCGCCGAGGT GAAGTTCGAG GGCGACACCC TGGTGAACCG CATCGAGCTG AAGGGCATCG ACTTCAAGGA GGACGGCAAC ATCCTGGGGC ACAAGCTGGA GTACAACTAC AACAGCCACA ACGTCTATAT CATGGCCGAC AAGCAGAAGA ACGGCATCAA GGTGAACTTC AAGATCCGCC ACAACATCGA GGACGGCAGC GTGCAGCTCG CCGACCACTA CCAGCAGAAC ACCCCCATCG GCGACGGCCC CGTGCTGCTG CCCGACAACC ACTACCTGAG CACCCAGTCC GCCCTGAGCA AAGACCCCAA CGAGAAGCGC GATCACATGG TCCTGCTGGA GTTCGTGACC GCCGCCGGGA TCACTCTCGG CATGGACGAG CTGTACAAGT |
| plasmid | AAAGCGGCCA GCTTGCCTCG AGCAGCGCTG CTCGAGAGAT CT |
| hGH_PA_terminator | ACGGGTGG CATCCCTGTG ACCCCTCCCC AGTGCCTCTC CTGGCCCTGG AAGTTGCCAC TCCAGTGCCC ACCAGCCTTG TCCTAATAAA ATTAAGTTGC ATCATTTTGT CTGACTAGGG GTCCTTCTAT AATATTATGG GGTGGAGGGG GGTGGTATGG AGCAAGGGGC AAGTTGGGAA GACAACCTGT AGGGCCTGCG GGGTCTATTG GGAACCAAGC TGGAGTGCAG TGGCACAATC TTGGCTCACT GCAATCTCCG CCTCCTGGGT TCAAGCGATT CTCCTGCCTC AGCCTCCCGA GTTGTTGGGA TTCCAGGCAT GCATGACCAG GCTCAGCTAA TTTTTGTTTT TTTGGTAGAG ACGGGGTTTC ACCATATTGG CCAGGCTGGT CTCCAACTCC TAATCTCAGG TGATCTACCC ACCTTGGCCT CCCAAATTGC TGGGATTACA GGCGTGAACC ACTGCTCCCT TCCCTGTCCT T |
| Plasmid | CTGATTTTG TAGGTAACCA CGTGCGGACC GAGCGGCCGC |
| R-ITR | AGGAACCCCT AGTGATGGAG TTGGCCACTC CCTCTCTGCG CGCTCGCTCG CTCACTGAGG CCGGGCGACC AAAGGTCGCC CGACGCCCGG GCTTTGCCCG GCGGCCTCA GTGAGCGAGC GAGCGCGCAG CTGCCTGAGG |
| Plasmid backbone | GGCGCCTGAT GCGGTATTTT CTCCTTACGC ATCTGTGCGG TATTTCACAC CGCATACGTC AAAGCAACCA TAGTACGCGC CCTGTAGCGG CGCATTAAGC GCGGCGGGTG TGGTGGTTAC GCGCAGCGTG ACCGCTACAC TTGCCAGCGC CCTAGCGCCC GCTCCTTTCG CTTTCTTCCC TTCCTTTCTC GCCACGTTCG CCGGCTTTCC CCGTCAAGCT CTAAATCGGG GCTCCCTTT AGGGTTCCGA TTTAGTGCTT TACGGCACCT CGACCCCAAA AAACTTGATT TGGGTGATGG TTCACGTAGT GGGCCATCGC CCTGATAGAC GGTTTTTCGC CCTTTGACGT TGGAGTCCAC GTTCTTTAAT AGTGGACTCT TGTTCCAAAC TGGAACAACA CTCAACCCTA TCTCGGGCTA TTCTTTTGAT TTATAAGGGA TTTTGCCGAT TTCGGCCTAT TGGTTAAAAA ATGAGCTGAT TTAACAAAAA TTTAACGCGA ATTTTAACAA AATATTAACG TTTACAATTT TATGGTGCAC TCTCAGTACA ATCTGCTCTG ATGCCGCATA GTTAAGCCAG CCCCGACACC CGCCAACACC CGCTGACGCG CCCTGACGGG CTTGTCTGCT CCCGGCATCC GCTTACAGAC AAGCTGTGAC CGTCTCCGGG AGCTGCATGT GTCAGAGGTT TTCACCGTCA TCACCGAAAC GCGCGAGACG AAAGGGCCTC GTGATACGCC TATTTTTATA GGTTAATGTC ATGATAATAA TGGTTTCTTA GACGTCAGGT GGCACTTTTC GGGGAAATGT GCGCGGAACC CCTATTTGTT TATTTTTCTA AATACATTCA AATATGTATC CGCTCATGAG ACAATAACCC TGATAAATGC TTCAATAATA TTGAAAAAGG AAGAGTATGA GTATTCAACA TTTCCGTGTC GCCCTTATTC CCTTTTTTGC GGCATTTTGC CTTCCTGTTT TTGCTCACCC AGAAACGCTG GTGAAAGTAA AAGATGCTGA AGATCAGTTG GGTGCACGAG TGGGTTACAT CGAACTGGAT CTCAACAGCG GTAAGATCCT TGAGAGTTTT CGCCCCGAAG AACGTTTTCC AATGATGAGC ACTTTTAAAG TTCTGCTATG TGGCGCGGTA |

```
TTATCCCGTA TTGACGCCGG GCAAGAGCAA CTCGGTCGCC GCATACACTA
TTCTCAGAAT GACTTGGTTG AGTACTCACC AGTCACAGAA AAGCATCTTA
CGGATGGCAT GACAGTAAGA GAATTATGCA GTGCTGCCAT AACCATGAGT
GATAACACTG CGGCCAACTT ACTTCTGACA ACGATCGGAG GACCGAAGGA
GCTAACCGCT TTTTTGCACA ACATGGGGGA TCATGTAACT CGCCTTGATC
GTTGGGAACC GGAGCTGAAT GAAGCCATAC CAAACGACGA GCGTGACACC
ACGATGCCTG TAGCAATGGC AACAACGTTG CGCAAACTAT TAACTGGCGA
ACTACTTACT CTAGCTTCCC GGCAACAATT AATAGACTGG ATGGAGGCGG
ATAAAGTTGC AGGACCACTT CTGCGCTCGG CCCTTCCGGC TGGCTGGTTT
ATTGCTGATA AATCTGGAGC CGGTGAGCGT GGGTCTCGCG GTATCATTGC
AGCACTGGGG CCAGATGGTA AGCCCTCCCG TATCGTAGTT ATCTACACGA
CGGGGAGTCA GGCAACTATG GATGAACGAA ATAGACAGAT CGCTGAGATA
GGTGCCTCAC TGATTAAGCA TTGGTAACTG TCAGACCAAG TTTACTCATA
TATACTTTAG ATTGATTTAA AACTTCATTT TTAATTTAAA AGGATCTAGG
TGAAGATCCT TTTTGATAAT CTCATGACCA AAATCCCTTA ACGTGAGTTT
TCGTTCCACT GAGCGTCAGA CCCCGTAGAA AAGATCAAAG GATCTTCTTG
AGATCCTTTT TTTCTGCGCG TAATCTGCTG CTTGCAAACA AAAAAACCAC
CGCTACCAGC GGTGGTTTGT TTGCCGGATC AAGAGCTACC AACTCTTTTT
CCGAAGGTAA CTGGCTTCAG CAGAGCGCAG ATACCAAATA CTGTCCTTCT
AGTGTAGCCG TAGTTAGGCC ACCACTTCAA GAACTCTGTA GCACCGCCTA
CATACCTCGC TCTGCTAATC CTGTTACCAG TGGCTGCTGC CAGTGGCGAT
AAGTCGTGTC TTACCGGGTT GGACTCAAGA CGATAGTTAC CGGATAAGGC
GCAGCGGTCG GGCTGAACGG GGGGTTCGTG CACACAGCCC AGCTTGGAGC
GAACGACCTA CACCGAACTG AGATACCTAC AGCGTGAGCT ATGAGAAAGC
GCCACGCTTC CCGAAGGGAG AAAGGCGGAC AGGTATCCGG TAAGCGGCAG
GGTCGGAACA GGAGAGCGCA CGAGGGAGCT TCCAGGGGGA AACGCCTGGT
ATCTTTATAG TCCTGTCGGG TTTCGCCACC TCTGACTTGA GCGTCGATTT
TTGTGATGCT CGTCAGGGGG GCGGAGCCTA TGGAAAAACG CCAGCAACGC
GGCCTTTTTA CGGTTCCTGG CCTTTTGCTG GCCTTTTGCT
CACATGTCCTGCAGG
```

| SEQ ID NO: 126 | AAV.A+F-EGFP |
|---|---|
| L-ITR | CA GCTGCGCGCT CGCTCGCTCA CTGAGGCCGC CCGGGCAAAG CCCGGGCGTC GGGCGACCTT TGGTCGCCCG GCCTCAGTGA GCGAGCGAGC GCGCAGAGAG GGAGTGGCCAACTCCATCAC TAGGGGTTCC T |
| plasmid | GCGGCCGCA CGCGT |
| Spacer | CTAGT CATCTCAGT |
| Conserved region F | T GCTGTCAGCT GCTTGTGAGC CTTCTCACAT CCAGAGAATG TATCAGCATT GTGCAGACTG AAAAGACCCA GAGGAACAAG GCTCCAATGG CAAAATTCCA AGTAGAATGA CAAATAAATG GGGAGCCATC TGAGAGCAAG GGAGTCCTGC CCAACACCCG CCCCATGCCT TTCTCAGGGA CCTCAGACCA GCCACTCACC TCCATCCTCC CAGCACCACC TGCAACCAGC CCCTTGCCCT CTGCAAACTG GAGCACGACT GGATCTTTAG ATGGGGGAAA AATGCTTCAT CATGTTCTGC TGCTTCATGC AAAACCAGAA ACTCCCTCCC CCTCTTCCCT CCTCCCAGCG CACTCTCCT |
| spacer | T CCAGTAAGTT TAAACTTCCC TCCTCGGTCC CCTGC |
| Conserved region A | CCCTGCCC CGCCCCTCTC ACTGCGGCGG AGCCGGTCGG CCGGGGGGCC GCAGGGGAGG AGGCGGAGAG GGCGGGGCCC TCCTCCCCAC CCTCTCACTG CCAAGGGGTT GGACCCGGCC GCGGCGGCTA TAAAAGGGCC GGCGCCCTGG TGCTGCCGCA GTGCCTCCCG CCCCGTCCCG GCCTCGCGCA CCTGCTC |
| Spacer plasmid | TCACGT GATCAGAGAT AATTCCCCGG GGATCCTCTA GAGTCGACCT GCAGAAGCTG ATCCACCGGT CGCCACC |
| EGFP | ATGGTGAG CAAGGGCGAG GAGCTGTTCA CCGGGGTGGT GCCCATCCTG GTCGAGCTGG ACGGCGACGT AAACGGCCAC AAGTTCAGCG TGTCCGGCGA GGGCGAGGGC GATGCCACCT ACGGCAAGCT GACCCTGAAG TTCATCTGCA CCACCGGCAA GCTGCCCGTG CCCTGGCCCA CCCTCGTGAC CACCCTGACC TACGGCGTGC AGTGCTTCAG CCGCTACCCC GACCACATGA AGCAGCACGA CTTCTTCAAG TCCGCCATGC CCGAAGGCTA CGTCCAGGAG CGCACCATCT TCTTCAAGGA CGACGGCAAC TACAAGACCC GCGCCGAGGT GAAGTTCGAG GGCGACACCC TGGTGAACCG CATCGAGCTG AAGGGCATCG ACTTCAAGGA GGACGGCAAC ATCCTGGGGC ACAAGCTGGA GTACAACTAC AACAGCCACA ACGTCTATAT CATGGCCGAC AAGCAGAAGA ACGGCATCAA GGTGAACTTC AAGATCCGCC ACAACATCGA GGACGGCAGC GTGCAGCTCG CCGACCACTA CCAGCAGAAC ACCCCCATCG GCGACGGCCC CGTGCTGCTG CCCGACAACC ACTACCTGAG CACCCAGTCC GCCCTGAGCA AAGACCCCAA CGAGAAGCGC GATCACATGG TCCTGCTGGA GTTCGTGACC GCCGCCGGGA TCACTCTCGG CATGGACGAG CTGTACAAGT |
| plasmid | AAAGCGGCCA GCTTGCCTCG AGCAGCGCTG CTCGAGAGAT CT |
| hGH_PA_terminator | ACGGGTGG CATCCCTGTG ACCCCTCCCC AGTGCCTCTC CTGGCCCTGG AAGTTGCCAC TCCAGTGCCC ACCAGCCTTG TCCTAATAAA ATTAAGTTGC ATCATTTTGT CTGACTAGGT GTCCTTCTAT AATATTATGG GGTGGAGGGG GGTGGTATGG AGCAAGGGGC AAGTTGGGAA GACAACCTGT AGGGCCTGCG GGGTCTATTG GGAACCAAGC TGGAGTGCAG TGGCACAATC TTGGCTCACT GCAATCTCCG CCTCCTGGGT TCAAGCGATT CTCCTGCCTC AGCCTCCGA GTTGTTGGGA TTCCAGGCAT GCATGACCAG GCTCAGCTAA TTTTTGTTTT TTTGGTAGAG ACGGGGTTTC ACCATATTGG CCAGGCTGGT CTCCAACTCC TAATCTCAGG TGATCTACCC ACCTTGGCCT CCCAAATTGC TGGGATTACA GGCGTGAACC ACTGCTCCCT TCCCTGTCCT T |
| Plasmid | CTGATTTTG TAGGTAACCA CGTGCGGACC GAGCGGCCGC |
| R-ITR | AGGAACCCCT AGTGATGGAG TTGGCCACTC CCTCTCTGCG CGCTCGCTCG CTCACTGAGG CCGGGCGACC AAAGGTCGCC CGACGCCCGG GCTTTGCCCG GGCGGCCTCA GTGAGCGAGC GAGCGCGCAG CTGCCTGAGG |

Figure 11C (continued)

| | |
|---|---|
| Plasmid backbone | GGCGCCTGAT GCGGTATTTT CTCCTTACGC ATCTGTGCGG TATTTCACAC<br>CGCATACGTC AAAGCAACCA TAGTACGCGC CCTGTAGCGG CGCATTAAGC<br>GCGGCGGGTG TGGTGGTTAC GCGCAGCGTG ACCGCTACAC TTGCCAGCGC<br>CCTAGCGCCC GCTCCTTTCG CTTTCTTCCC TTCCTTTCTC GCCACGTTCG<br>CCGGCTTTCC CCGTCAAGCT CTAAATCGGG GCTCCCTTT AGGGTTCCGA<br>TTTAGTGCTT TACGGCACCT CGACCCCAAA AAACTTGATT TGGGTGATGG<br>TTCACGTAGT GGGCCATCGC CCTGATAGAC GGTTTTTCGC CCTTTGACGT<br>TGGAGTCCAC GTTCTTTAAT AGTGGACTCT TGTTCCAAAC TGGAACAACA<br>CTCAACCCTA TCTCGGGCTA TTCTTTTGAT TTATAAGGGA TTTTGCCGAT<br>TTCGGCCTAT TGGTTAAAAA ATGAGCTGAT TTAACAAAAA TTTAACGCGA<br>ATTTTAACAA AATATTAACG TTTACAATTT TATGGTGCAC TCTCAGTACA<br>ATCTGCTCTG ATGCCGCATA GTTAAGCCAG CCCCGACACC CGCCAACACC<br>CGCTGACGCG CCCTGACGGG CTTGTCTGCT CCCGGCATCC GCTTACAGAC<br>AAGCTGTGAC CGTCTCCGGG AGCTGCATGT GTCAGAGGTT TTCACCGTCA<br>TCACCGAAAC GCGCGAGACG AAAGGGCCTC GTGATACGCC TATTTTTATA<br>GGTTAATGTC ATGATAATAA TGGTTTCTTA GACGTCAGGT GGCACTTTTC<br>GGGGAAATGT GCGCGGAACC CCTATTTGTT TATTTTTCTA AATACATTCA<br>AATATGTATC CGCTCATGAG ACAATAACCC TGATAAATGC TTCAATAATA<br>TTGAAAAAGG AAGAGTATGA GTATTCAACA TTTCCGTGTC GCCCTTATTC<br>CCTTTTTTGC GGCATTTTGC CTTCCTGTTT TTGCTCACCC AGAAACGCTG<br>GTGAAAGTAA AAGATGCTGA AGATCAGTTG GGTGCACGAG TGGGTTACAT<br>CGAACTGGAT CTCAACAGCG GTAAGATCCT TGAGAGTTTT CGCCCCGAAG<br>AACGTTTTCC AATGATGAGC ACTTTTAAAG TTCTGCTATG TGGCGCGGTA<br>TTATCCCGTA TTGACGCCGG GCAAGAGCAA CTCGGTCGCC GCATACACTA<br>TTCTCAGAAT GACTTGGTTG AGTACTCACC AGTCACAGAA AAGCATCTTA<br>CGGATGGCAT GACAGTAAGA GAATTATGCA GTGCTGCCAT AACCATGAGT<br>GATAACACTG CGGCCAACTT ACTTCTGACA ACGATCGGAG GACCGAAGGA<br>GCTAACCGCT TTTTTGCACA ACATGGGGGA TCATGTAACT CGCCTTGATC<br>GTTGGGAACC GGAGCTGAAT GAAGCCATAC CAAACGACGA GCGTGACACC<br>ACGATGCCTG TAGCAATGGC AACAACGTTG CGCAAACTAT TAACTGGCGA<br>ACTACTTACT CTAGCTTCCC GGCAACAATT AATAGACTGG ATGGAGGCGG<br>ATAAAGTTGC AGGACCACTT CTGCGCTCGG CCCTTCCGGC TGGCTGGTTT<br>ATTGCTGATA AATCTGGAGC CGGTGAGCGT GGGTCTCGCG GTATCATTGC<br>AGCACTGGGG CCAGATGGTA AGCCCTCCCG TATCGTAGTT ATCTACACGA<br>CGGGGAGTCA GGCAACTATG GATGAACGAA ATAGACAGAT CGCTGAGATA<br>GGTGCCTCAC TGATTAAGCA TTGGTAACTG TCAGACCAAG TTTACTCATA<br>TATACTTTAG ATTGATTTAA AACTTCATTT TTAATTTAAA AGGATCTAGG<br>TGAAGATCCT TTTTGATAAT CTCATGACCA AAATCCCTTA ACGTGAGTTT<br>TCGTTCCACT GAGCGTCAGA CCCCGTAGAA AAGATCAAAG GATCTTCTTG<br>AGATCCTTTT TTTCTGCGCG TAATCTGCTG CTTGCAAACA AAAAAACCAC<br>CGCTACCAGC GGTGGTTTGT TTGCCGGATC AAGAGCTACC AACTCTTTTT<br>CCGAAGGTAA CTGGCTTCAG CAGAGCGCAG ATACCAAATA CTGTCCTTCT<br>AGTGTAGCCG TAGTTAGGCC ACCACTTCAA GAACTCTGTA GCACCGCCTA<br>CATACCTCGC TCTGCTAATC CTGTTACCAG TGGCTGCTGC CAGTGGCGAT<br>AAGTCGTGTC TTACCGGGTT GGACTCAAGA CGATAGTTAC CGGATAAGGC<br>GCAGCGGTCG GGCTGAACGG GGGGTTCGTG CACACAGCCC AGCTTGGAGC<br>GAACGACCTA CACCGAACTG AGATACCTAC AGCGTGAGCT ATGAGAAAGC<br>GCCACGCTTC CCGAAGGGAG AAAGGCGGAC AGGTATCCGG TAAGCGGCAG<br>GGTCGGAACA GGAGAGCGCA CGAGGGAGCT TCCAGGGGGA AACGCCTGGT<br>ATCTTTATAG TCCTGTCGGG TTTCGCCACC TCTGACTTGA GCGTCGATTT<br>TTGTGATGCT CGTCAGGGGG GCGGAGCCTA TGGAAAAACG CCAGCAACGC<br>GGCCTTTTTA CGGTTCCTGG CCTTTTGCTG GCCTTTTGCT<br>CACATGTCCTGCAGG |

Figure 11D

| | SEQ ID NO: 127   AAV.*CMV*-EGFP |
|---|---|
| L-ITR | CA GCTGCGCGCT CGCTCGCTCA CTGAGGCCGC CCGGGCAAAG CCCGGGCGTC GGGCGACCTT TGGTCGCCCG GCCTCAGTGA GCGAGCGAGC GCGCAGAGAG GGAGTGGCCAACTCCATCAC TAGGGGTTCC T |
| plasmid | GCGGCCGCA CGCGT |
| CMV promoter | GGAGCTAGTT ATTAATAGTA ATCAATTACG GGGTCATTAG TTCATAGCCC ATATATGGAG TTCCGCGTTA CATAACTTAC GGTAAATGGC CCGCCTGGCT GACCGCCCAA CGACCCCCGC CCATTGACGT CAATAATGAC GTATGTTCCC ATAGTAACGT CAATAGGGAC TTTCCATTGA CGTCAATGGG TGGAGTATTT ACGGTAAACT GCCCACTTGG CAGTACATCA AGTGTATCAT ATGCCAAGTA CGCCCCCTAT TGACGTCAAT GACGGTAAAT GGCCCGCCTG GCATTATGCC CAGTACATGA CCTTATGGGA CTTTCCTACT TGGCAGTACA TCTACGTATT AGTCATCGCT ATTACCATGG TGATGCGGTT TTGGCAGTAC ATCAATGGGC GTGGATAGCG GTTTGACTCA CGGGGATTTC CAAGTCTCCA CCCCATTGAC GTCAATGGGA GTTTGTTTTG CACCAAAATC AACGGGACTT TCCAAAATGT CGTAACAACT CCGCCCCATT GACGCAAATG GGCGGTAGGC GTGTACGGTG GGAGGTCTAT ATAAGCAGAG CTCGTTTAGT GAACCGTCAG ATCGCCTGGA GACGCCATCC ACGCTGTTTT GACCTCCATA GAAGACACCG GGACCGATCC AGCCTCCGCG GATT |
| β-globin intron | CGAATCCCGG CCGGGAACGG TGCATTGGAA CGCGGATTCC CCGTGCCAAG AGTGACGTAA GTACCGCCTA TAGAGTCTAT AGGCCCACAA AAAATGCTTT CTTCTTTTAA TATACTTTTT TGTTTATCTT ATTTCTAATA CTTTCCCTAA TCTCTTTCTT TCAGGGCAAT AATGATACAA TGTATCATGC CTCTTTGCAC CATTCTAAAG AATAACAGTG ATAATTTCTG GGTTAAGGCA ATAGCAATAT TTCTGCATAT AAATATTTCT GCATATAAAT TGTAACTGAT GTAAGAGGTT TCATATTGCT AATAGCAGCT ACAATCCAGC TACCATTCTG CTTTTATTTT ATGGTTGGGA T AAGGCTGGAT TATTCTGAGT CCAAGCTAGG CCCTTTTGCT AATCATGTTC ATACCTCTTA TCTTCCTCCC ACAGCTCCTG GGCAACGTGC TGGTCTGTGT GCTGGCCCAT CACTTTGGCA AAGAATTGGG ATTCGAAC |
| MCS | ATCGATTGAA TTCCCCGGGG ATCCTCTAGA GTCGACCTGC AAGCTGATCC ACCGGTCGCC ACC |
| EGFP | ATGGTGAG CAAGGGCGAG GAGCTGTTCA CCGGGGTGGT GCCCATCCTG GTCGAGCTGG ACGGCGACGT AAACGGCCAC AAGTTCAGCG TGTCCGGCGA GGGCGAGGGC GATGCCACCT ACGGCAAGCT GACCCTGAAG TTCATCTGCA CCACCGGCAA GCTGCCCGTG CCCTGGCCCA CCCTCGTGAC CACCCTGACC TACGGCGTGC AGTGCTTCAG CCGCTACCCC GACCACATGA AGCAGCACGA CTTCTTCAAG TCCGCCATGC CCGAAGGCTA CGTCCAGGAG CGCACCATCT TCTTCAAGGA CGACGGCAAC TACAAGACCC GCGCCGAGGT GAAGTTCGAG GGCGACACCC TGGTGAACCG CATCGAGCTG AAGGGCATCG ACTTCAAGGA GGACGGCAAC ATCCTGGGGC ACAAGCTGGA GTACAACTAC AACAGCCACA ACGTCTATAT CATGGCCGAC AAGCAGAAGA ACGGCATCAA GGTGAACTTC AAGATCCGCC ACAACATCGA GGACGGCAGC GTGCAGCTCG CCGACCACTA CCAGCAGAAC ACCCCCATCG GCGACGGCCC CGTGCTGCTG CCCGACAACC ACTACCTGAG CACCCAGTCC GCCCTGAGCA AAGACCCCAA CGAGAAGCGC GATCACATGG TCCTGCTGGA GTTCGTGACC GCCGCCGGGA TCACTCTCGG CATGGACGAG CTGTACAAGT |

Figure 11D (Continued)

| | |
|---|---|
| plasmid | AAAGCGGCCA GCTTGCCTCG AGCAGCGCTG CTCGAGAGAT CT |
| hGH_PA_terminator | ACGGGTGG CATCCCTGTG ACCCCTCCCC AGTGCCTCTC CTGGCCCTGG<br>AAGTTGCCAC TCCAGTGCCC ACCAGCCTTG TCCTAATAAA ATTAAGTTGC<br>ATCATTTTGT CTGACTAGGT GTCCTTCTAT AATATTATGG GGTGGAGGGG<br>GGTGGTATGG AGCAAGGGGC AAGTTGGGAA GACAACCTGT AGGGCCTGCG<br>GGGTCTATTG GGAACCAAGC TGGAGTGCAG TGGCACAATC TTGGCTCACT<br>GCAATCTCCG CCTCCTGGGT TCAAGCGATT CTCCTGCCTC AGCCTCCCGA<br>GTTGTTGGGA TTCCAGGCAT GCATGACCAG GCTCAGCTAA TTTTTGTTTT<br>TTTGGTAGAG ACGGGGTTTC ACCATATTGG CCAGGCTGGT CTCCAACTCC<br>TAATCTCAGG TGATCTACCC ACCTTGGCCT CCCAAATTGC TGGGATTACA<br>GGCGTGAACC ACTGCTCCCT TCCCTGTCCT T |
| Plasmid | CTGATTTTG TAGGTAACCA CGTGCGGACC GAGCGGCCGC |
| R-ITR | AGGAACCCCT AGTGATGGAG TTGGCCACTC CCTCTCTGCG CGCTCGCTCG<br>CTCACTGAGG CCGGGCGACC AAAGGTCGCC CGACGCCCGG GCTTTGCCCG<br>GGCGGCCTCA GTGAGCGAGC GAGCGCGCAG CTGCCTGAGG |
| Plasmid backbone | GGCGCCTGAT GCGGTATTTT CTCCTTACGC ATCTGTGCGG TATTTCACAC<br>CGCATACGTC AAAGCAACCA TAGTACGCGC CCTGTAGCGG CGCATTAAGC<br>GCGGCGGGTG TGGTGGTTAC GCGCAGCGTG ACCGCTACAC TTGCCAGCGC<br>CCTAGCGCCC GCTCCTTTCG CTTTCTTCCC TTCCTTTCTC GCCACGTTCG<br>CCGGCTTTCC CCGTCAAGCT CTAAATCGGG GGCTCCCTTT AGGGTTCCGA<br>TTTAGTGCTT TACGGCACCT CGACCCCAAA AAACTTGATT TGGGTGATGG<br>TTCACGTAGT GGGCCATCGC CCTGATAGAC GGTTTTTCGC CCTTTGACGT<br>TGGAGTCCAC GTTCTTTAAT AGTGGACTCT TGTTCCAAAC TGGAACAACA<br>CTCAACCCTA TCTCGGGCTA TTCTTTTGAT TTATAAGGGA TTTTGCCGAT<br>TTCGGCCTAT TGGTTAAAAA ATGAGCTGAT TTAACAAAAA TTTAACGCGA<br>ATTTTAACAA AATATTAACG TTTACAATTT TATGGTGCAC TCTCAGTACA<br>ATCTGCTCTG ATGCCGCATA GTTAAGCCAG CCCCGACACC CGCCAACACC<br>CGCTGACGCG CCCTGACGGG CTTGTCTGCT CCCGGCATCC GCTTACAGAC<br>AAGCTGTGAC CGTCTCCGGG AGCTGCATGT GTCAGAGGTT TTCACCGTCA<br>TCACCGAAAC GCGCGAGACG AAAGGGCCTC GTGATACGCC TATTTTTATA<br>GGTTAATGTC ATGATAATAA TGGTTTCTTA GACGTCAGGT GGCACTTTTC<br>GGGGAAATGT GCGCGGAACC CCTATTTGTT TATTTTTCTA AATACATTCA<br>AATATGTATC CGCTCATGAG ACAATAACCC TGATAAATGC TTCAATAATA<br>TTGAAAAAGG AAGAGTATGA GTATTCAACA TTTCCGTGTC GCCCTTATTC<br>CCTTTTTTGC GGCATTTTGC CTTCCTGTTT TTGCTCACCC AGAAACGCTG<br>GTGAAAGTAA AAGATGCTGA AGATCAGTTG GGTGCACGAG TGGGTTACAT<br>CGAACTGGAT CTCAACAGCG GTAAGATCCT TGAGAGTTTT CGCCCCGAAG<br>AACGTTTTCC AATGATGAGC ACTTTTAAAG TTCTGCTATG TGGCGCGGTA<br>TTATCCCGTA TTGACGCCGG GCAAGAGCAA CTCGGTCGCC GCATACACTA<br>TTCTCAGAAT GACTTGGTTG AGTACTCACC AGTCACAGAA AAGCATCTTA<br>CGGATGGCAT GACAGTAAGA GAATTATGCA GTGCTGCCAT AACCATGAGT<br>GATAACACTG CGGCCAACTT ACTTCTGACA ACGATCGGAG GACCGAAGGA<br>GCTAACCGCT TTTTTGCACA ACATGGGGGA TCATGTAACT CGCCTTGATC<br>GTTGGGAACC GGAGCTGAAT GAAGCCATAC CAAACGACGA GCGTGACACC<br>ACGATGCCTG TAGCAATGGC AACAACGTTG CGCAAACTAT TAACTGGCGA<br>ACTACTTACT CTAGCTTCCC GGCAACAATT AATAGACTGG ATGGAGGCGG<br>ATAAAGTTGC AGGACCACTT CTGCGCTCGG CCCTTCCGGC TGGCTGGTTT<br>ATTGCTGATA AATCTGGAGC CGGTGAGCGT GGGTCTCGCG GTATCATTGC<br>AGCACTGGGG CCAGATGGTA AGCCCTCCCG TATCGTAGTT ATCTACACGA<br>CGGGGAGTCA GGCAACTATG GATGAACGAA ATAGACAGAT CGCTGAGATA<br>GGTGCCTCAC TGATTAAGCA TTGGTAACTG TCAGACCAAG TTTACTCATA<br>TATACTTTAG ATTGATTTAA AACTTCATTT TTAATTTAAA AGGATCTAGG<br>TGAAGATCCT TTTTGATAAT CTCATGACCA AAATCCCTTA ACGTGAGTTT<br>TCGTTCCACT GAGCGTCAGA CCCCGTAGAA AAGATCAAAG GATCTTCTTG<br>AGATCCTTTT TTTCTGCGCG TAATCTGCTG CTTGCAAACA AAAAAACCAC<br>CGCTACCAGC GGTGGTTTGT TTGCCGGATC AAGAGCTACC AACTCTTTTT<br>CCGAAGGTAA CTGGCTTCAG CAGAGCGCAG ATACCAAATA CTGTCCTTCT<br>AGTGTAGCCG TAGTTAGGCC ACCACTTCAA GAACTCTGTA GCACCGCCTA<br>CATACCTCGC TCTGCTAATC CTGTTACCAG TGGCTGCTGC CAGTGGCGAT |

```
AAGTCGTGTC TTACCGGGTT GGACTCAAGA CGATAGTTAC CGGATAAGGC
GCAGCGGTCG GGCTGAACGG GGGGTTCGTG CACACAGCCC AGCTTGGAGC
GAACGACCTA CACCGAACTG AGATACCTAC AGCGTGAGCT ATGAGAAAGC
GCCACGCTTC CCGAAGGGAG AAAGGCGGAC AGGTATCCGG TAAGCGGCAG
GGTCGGAACA GGAGAGCGCA CGAGGGAGCT TCCAGGGGGA AACGCCTGGT
ATCTTTATAG TCCTGTCGGG TTTCGCCACC TCTGACTTGA GCGTCGATTT
TTGTGATGCT CGTCAGGGGG GCGGAGCCTA TGGAAAAACG CCAGCAACGC
GGCCTTTTTA CGGTTCCTGG CCTTTTGCTG GCCTTTTGCT
CACATGTCCTGCAGG
```

| | SEQ ID NO: 128  AAV.huNEFH-EGFP |
|---|---|
| L-ITR | CA GCTGCGCGCT CGCTCGCTCA CTGAGGCCGC CCGGGCAAAG<br>CCCGGGCGTC GGGCGACCTT TGGTCGCCCG GCCTCAGTGA GCGAGCGAGC<br>GCGCAGAGAG GGAGTGGCCA ACTCCATCAC TAGGGGTTCC T |
| Plasmid/spacer | GCGGCCGCA CGCGTTAAGA CGCGT |
| huNEFH with conserved regions F, D and A highlighted | T GCTGTCAGCT GCTTGTGAGC CTTCTCACAT CCAGAGAATG<br>TATCAGCATT GTGCAGACTG AAAAGACCCA GAGGAACAAG GCTCCAATGG<br>CAAAATTCCA AGTAGAATGA CAAATAAATG GGGAGCCATC TGAGAGCAAG<br>GGAGTCCTGC CCAACACCCG CCCCATGCCT TTCTCAGGGA CCTCAGACCA<br>GCCACTCACC TCCATCCTCC CAGCACCACC TGCAACCAGC CCCTTGCCCT<br>CTGCAAACTG<br><br>GAGCACGACT GGATCTTTAG ATGGGGAAA AATGCTTCAT CATGTTCTGC<br>TGCTTCATGC AAAACCAGAA ACTCCCTCCC CCTCTTCCCT CCTCCCAGCG<br>CACTCTCCTT CCAGTAAAAA GTGGTTAAAG GACAGCGCC ATCAATTTCC<br>CAGCTCTGAG GGTCTGCTTA GAACTAGGGG GCTGGAAGGA GACAGAGGGC<br>AAAGAGAAAG GAACTGGCAG AGGTCTTTCC TGGGGGATAT GTCTGTTCTG<br>TCCTGGGGAT CCTGGAGCAG GAAAACCCGC GTAAAGTAGG GGTGTAGTGG<br>GTGTTGAGAT AACTGCCTGG GGGAGGTTCA GAGTGGAAGT ACGAGTCTAC<br>AAACTCTCAA GGGCGTCTCA GGGCTCCCAG CATCCCCAGG GGTCCTTTCG<br>CAGGGGTCCC TAAGCAGGAG GGGAACAGCC CAGAAAACAC GGAACTGGAC<br>CCCCGACAGG AAGTCCAGGG AGGGGTCCCT GGCTCACTAT GTGACCCTGC<br>TGGATCACTT GCCTCCCCTC TCGGGTCCCC TCAGCACAGT GTCCCTCCCT<br>TCCTTCCCCT AAAGTAAAAG CAGAGGGTTA ATCTCTTTCC CCGCCCCACG<br>CCCAACAAAG AGCAGGCCCT GTCCCCGGTG CTGAAGCGCC AGCCGCAGCA<br>CCACCCCCAC TCCCACAGCA TAAAACATGA GCCAAAACCA ATAAAGAGCC<br>AAATGTCACA GCCGTTGCAG GGCCCCTAA ATCCTGGGGA CCCCTTCTTC<br>TACCTGACAT CCTATTGGGG TGAGGGACTT TGGTACTCAG AAAGCATCTC<br>ATCACTTCCC TGTAAGAGAG AAGGGATGCC GACTCAGGCG CCTGCTTGTC<br>TGTTACAGGA GTGGGGGAAG AGAGGACAAG TTGAGGCTGA GAAGATGGGG<br>AGGGGGAGGG AGAAAAGAGG ACTTCCTAGT GTTGACAGAA CGGCAAGATG<br>TGGGTTCCCC ATCCCCAGTT CAGCCAGAGA CCCCTCAAAG TGGAACTTCC<br>TGGGGCAGTC GGGGGTCAGG AGTTGGAGCT TGTCTCTGGG GCAAGACCCC<br>TTCGTTGTAC AGATGGAAAA ACAAGGGTGG GAGGACACAG CTTGTCCAAG<br>GTCATTCGAC CAGCAAACTG CCTAGCTGAC CCCAGTGTGC AGAAGCTGGC<br>TCGGGTGACA CCCATCATTT CCCCCCACCC CACACAGGGG CCAGCTCTCT<br>CAACTTCATG CCCAAGCCCT CCTACGGTAC CCCCACTGTA GGTTCTCTGC<br>CCCTCAAACT CAGCCCAGCT TTCTCCTGCC TGTTCAGGGG ACCTTCTGCC<br>CGCTTCGCTG AGGGTCCGTC CCCTTTACTG GGGCTGGCAG CAGGGTCTCC<br>CATCTCCTCT CTCGGGGGCC ACTGCAGACT TTTTAGAGAA CGCCTTGCCT<br>CCCCCCAACC CCACCCATCC GGGGTTCCCT CTCTCCATCC TCTGCAGTGT<br>CTCCCATACC CCCATTCAGG GTAGCCTTGC TATTCTCCCC AACTCCAGGT<br>CCCCCTTCAT CTATTCCGGG GCTGGCCGCG GAGTTTCCTG AGCGCTCTCC<br>AAGTGGGTCC TCTAGATGTT AGGAGAACAC TGTACCTCCC CCGGTCAGGG<br>GTCTCCTGTC TCCGTTCTAT GGAGCGTCCA TGCTCCCATT CAGGACTGCC<br>TTGCTCCCTC CTCTGTTCCG GGGCTGGCTG CACAGTCTCT GCACCCCCTA<br>TCCTGAAAGC CTCTCTTAAC TATTTGGAAA GCCTCGTGTC CTGTCTCATA<br>CAGGGATCCC CTCATCCTAA TGACTGCAAT CTTCCATTGC TCCATCCCGA<br>GGGCATCCTG CCCCTATTCC CATCAGGTTT CTCCTTGTCC TCTCCCTGTT<br>TCAAGTCCCC TTTCTTATTC CGAACACACT CGCAGGCTCT TCCGACGCGC<br>ACCCGGGGGT CCTCACTGGC CCACTCCGGG AGTCCTCTGC CCGCTTCCCC<br>GACCTCGAGG GTCTCCTCTG ACGCAGCGTC GATTCCCCTT CCCTCCTCGG<br>TCCCCTGCCC CGCCCCTCTC ACTGCGGCGG AGCCGGTCGG CCGGGGGGCC<br>GCAGGGGAGG AGGCGGAGAG GGCGGGGCCC TCCTCCCCAC CCTCTCACTG<br>CCAAGGGGTT GGACCCGGCC GCGGCGGCTA TAAAGGGGCC GGCGCCCTGG<br>TGCTGCCGCA GTGCCTCCCG CCCCGTCCCG GCCTCGCGCA CCTGCTC |

Figure 11E (Continued)

| | |
|---|---|
| Spacer/plasmid | AGCGATATCC TAGGAATTCC CCATCCTCTA GAGTCGACCT GCAGAAGCTA TCCACCGGTC GCCACC |
| EGFP | ATGGTGAG CAAGGGCGAG GAGCTGTTCA CCGGGGTGGT GCCCATCCTG GTCGAGCTGG ACGGCGACGT AAACGGCCAC AAGTTCAGCG TGTCCGGCGA GGGCGAGGGC GATGCCACCT ACGGCAAGCT GACCCTGAAG TTCATCTGCA CCACCGGCAA GCTGCCCGTG CCCTGGCCCA CCCTCGTGAC CACCCTGACC TACGGCGTGC AGTGCTTCAG CCGCTACCCC GACCACATGA AGCAGCACGA CTTCTTCAAG TCCGCCATGC CCGAAGGCTA CGTCCAGGAG CGCACCATCT TCTTCAAGGA CGACGGCAAC TACAAGACCC GCGCCGAGGT GAAGTTCGAG GGCGACACCC TGGTGAACCG CATCGAGCTG AAGGGCATCG ACTTCAAGGA GGACGGCAAC ATCCTGGGGC ACAAGCTGGA GTACAACTAC AACAGCCACA ACGTCTATAT CATGGCCGAC AAGCAGAAGA ACGGCATCAA GGTGAACTTC AAGATCCGCC ACAACATCGA GGACGGCAGC GTGCAGCTCG CCGACCACTA CCAGCAGAAC ACCCCCATCG GCGACGGCCC CGTGCTGCTG CCCGACAACC ACTACCTGAG CACCCAGTCC GCCCTGAGCA AGACCCCAA CGAGAAGCGC GATCACATGG TCCTGCTGGA GTTCGTGACC GCCGCCGGGA TCACTCTCGG CATGGACGAG CTGTACAAGT |
| plasmid | AAAGCGGCCA GCTTGCCTCG AGCAGCGCTG CTCGAGAGAT CT |
| hGH_PA_terminator | ACGGGTGG CATCCCTGTG ACCCCTCCCC AGTGCCTCTC CTGGCCCTGG AAGTTGCCAC TCCAGTGCCC ACCAGCCTTG TCCTAATAAA ATTAAGTTGC ATCATTTTGT CTGACTAGGT GTCCTTCTAT AATATTATGG GGTGGAGGGG GGTGGTATGG AGCAAGGGGC AAGTTGGGAA GACAACCTGT AGGGCCTGCG GGGTCTATTG GGAACCAAGC TGGAGTGCAG TGGCACAATC TTGGCTCACT GCAATCTCCG CCTCCTGGGT TCAAGCGATT CTCCTGCCTC AGCCTCCCGA GTTGTTGGGA TTCCAGGCAT GCATGACCAG GCTCAGCTAA TTTTTGTTTT TTTGGTAGAG ACGGGGTTTC ACCATATTGG CCAGGCTGGT CTCCAACTCC TAATCTCAGG TGATCTACCC ACCTTGGCCT CCCAAATTGC TGGGATTACA GGCGTGAACC ACTGCTCCCT TCCCTGTCCT T |
| Plasmid | CTGATTTTG TAGGTAACCA CGTGCGGACC GAGCGGCCGC |
| R-ITR | AGGAACCCCT AGTGATGGAG TTGGCCACTC CCTCTCTGCG CGCTCGCTCG CTCACTGAGG CCGGGCGACC AAAGGTCGCC CGACGCCCGG GCTTTGCCCG GGCGGCCTCA GTGAGCGAGC GAGCGCGCAG CTGCCTGAGG |
| Plasmid backbone | GGCGCCTGAT GCGGTATTTT CTCCTTACGC ATCTGTGCGG TATTCACAC CGCATACGTC AAAGCAACCA TAGTACGCGC CCTGTAGCGG CGCATTAAGC GCGGCGGGTG TGGTGGTTAC GCGCAGCGTG ACCGCTACAC TTGCCAGCGC CCTAGCGCCC GCTCCTTTCG CTTTCTTCCC TTCCTTTCTC GCCACGTTCG CCGGCTTTCC CCGTCAAGCT CTAAATCGGG GGCTCCCTTT AGGGTTCCGA TTTAGTGCTT TACGGCACCT CGACCCCAAA AAACTTGATT TGGGTGATGG TTCACGTAGT GGGCCATCGC CCTGATAGAC GGTTTTTCGC CCTTTGACGT TGGAGTCCAC GTTCTTTAAT AGTGGACTCT TGTTCCAAAC TGGAACAACA CTCAACCCTA TCTCGGCTA TTCTTTTGAT TTATAAGGGA TTTTGCCGAT TTCGGCCTAT TGGTTAAAAA ATGAGCTGAT TTAACAAAAA TTTAACGCGA ATTTTAACAA AATATTAACG TTTACAATTT TATGGTGCAC TCTCAGTACA ATCTGCTCTG ATGCCGCATA GTTAAGCCAG CCCCGACACC CGCCAACACC CGCTGACGCG CCCTGACGGG CTTGTCTGCT CCCGGCATCC GCTTACAGAC AAGCTGTGAC CGTCTCCGGG AGCTGCATGT GTCAGAGGTT TTCACCGTCA TCACCGAAAC GCGCGAGACG AAAGGGCCTC GTGATACGCC TATTTTTATA GGTTAATGTC ATGATAATAA TGGTTTCTTA GACGTCAGGT GGCACTTTTC GGGGAAATGT GCGCGGAACC CCTATTTGTT TATTTTTCTA AATACATTCA AATATGTATC CGCTCATGAG ACAATAACCC TGATAAATGC TTCAATAATA TTGAAAAAGG AAGAGTATGA GTATTCAACA TTTCCGTGTC GCCCTTATTC CCTTTTTTGC GGCATTTTGC CTTCCTGTTT TTGCTCACCC AGAAACGCTG GTGAAAGTAA AAGATGCTGA AGATCAGTTG GGTGCACGAG TGGGTTACAT CGAACTGGAT CTCAACAGCG GTAAGATCCT TGAGAGTTTT CGCCCCGAAG AACGTTTTCC AATGATGAGC ACTTTTAAAG TTCTGCTATG TGGCGCGGTA TTATCCCGTA TTGACGCCGG GCAAGAGCAA CTCGGTCGCC GCATACACTA TTCTCAGAAT GACTTGGTTG AGTACTCACC AGTCACAGAA AAGCATCTTA |

```
CGGATGGCAT GACAGTAAGA GAATTATGCA GTGCTGCCAT AACCATGAGT
GATAACACTG CGGCCAACTT ACTTCTGACA ACGATCGGAG GACCGAAGGA
GCTAACCGCT TTTTTGCACA ACATGGGGGA TCATGTAACT CGCCTTGATC
GTTGGGAACC GGAGCTGAAT GAAGCCATAC CAAACGACGA GCGTGACACC
ACGATGCCTG TAGCAATGGC AACAACGTTG CGCAAACTAT TAACTGGCGA
ACTACTTACT CTAGCTTCCC GGCAACAATT AATAGACTGG ATGGAGGCGG
ATAAAGTTGC AGGACCACTT CTGCGCTCGG CCCTTCCGGC TGGCTGGTTT
ATTGCTGATA AATCTGGAGC CGGTGAGCGT GGGTCTCGCG GTATCATTGC
AGCACTGGGG CCAGATGGTA AGCCCTCCCG TATCGTAGTT ATCTACACGA
CGGGGAGTCA GGCAACTATG GATGAACGAA ATAGACAGAT CGCTGAGATA
GGTGCCTCAC TGATTAAGCA TTGGTAACTG TCAGACCAAG TTTACTCATA
TATACTTTAG ATTGATTTAA AACTTCATTT TTAATTTAAA AGGATCTAGG
TGAAGATCCT TTTTGATAAT CTCATGACCA AAATCCCTTA ACGTGAGTTT
TCGTTCCACT GAGCGTCAGA CCCCGTAGAA AAGATCAAAG GATCTTCTTG
AGATCCTTTT TTTCTGCGCG TAATCTGCTG CTTGCAAACA AAAAAACCAC
CGCTACCAGC GGTGGTTTGT TTGCCGGATC AAGAGCTACC AACTCTTTTT
CCGAAGGTAA CTGGCTTCAG CAGAGCGCAG ATACCAAATA CTGTCCTTCT
AGTGTAGCCG TAGTTAGGCC ACCACTTCAA GAACTCTGTA GCACCGCCTA
CATACCTCGC TCTGCTAATC CTGTTACCAG TGGCTGCTGC CAGTGGCGAT
AAGTCGTGTC TTACCGGGTT GGACTCAAGA CGATAGTTAC CGGATAAGGC
GCAGCGGTCG GGCTGAACGG GGGGTTCGTG CACACAGCCC AGCTTGGAGC
GAACGACCTA CACCGAACTG AGATACCTAC AGCGTGAGCT ATGAGAAAGC
GCCACGCTTC CCGAAGGGAG AAAGGCGGAC AGGTATCCGG TAAGCGGCAG
GGTCGGAACA GGAGAGCGCA CGAGGGAGCT TCCAGGGGGA AACGCCTGGT
ATCTTTATAG TCCTGTCGGG TTTCGCCACC TCTGACTTGA GCGTCGATTT
TTGTGATGCT CGTCAGGGGG GCGGAGCCTA TGGAAAAACG CCAGCAACGC
GGCCTTTTTA CGGTTCCTGG CCTTTTGCTG GCCTTTTGCT
CACATGTCCTGCAGG
```

| | SEQ ID NO: 129   AAV.muNefh-EGFP |
|---|---|
| L-ITR | CA GCTGCGCGCT CGCTCGCTCA CTGAGGCCGC CGGGCAAAG CCCGGGCGTC GGGCGACCTT TGGTCGCCCG GCCTCAGTGA GCGAGCGAGC GCGCAGAGAG GGAGTGGCCAACTCCATCAC TAGGGGTTCC T |
| Plasmid | GCGGCCGCA CGCGTTAAGA CGCGTgcca caccttta ccttcacac acaccccac tcctatcatt catg |

| muNefh with regions F, D and A highlighted | TGTGCTGTCAACTGCTTGTCAGACTTCTCACCCCCAAGAAGGGCATGTGCATTC<br>TGCAGACAACTGAAGAGACTCGAAGGAACAAGAATCTAATAACAAAAATCCAAG<br>CAGTATGGGAGATAAATGGGGAAGCCATGTGGGCGTAAGGGGGTAGAGGTCTGC<br>ATCCCAGTCCCCTCCCCATGGCATCTGCAGTGCCTCCCAGCCTTTCTGACCCCT<br>GCAAAGAGCAGCATGACTGGACCTTTAAATTGGGAAAATGCTTCATCATGTTCT<br>GCTCCATCATGAAAAACTAGAGTCTCCTCCCCCTCCTCCCTAGTGCACTCTCCT<br>GGCCTGCAGCCAGGGGCTGGGAATGAGACACAGGACAGGAAAGGGATCTCTTTT<br>AGGGAATCTATCAGTTCTCCTCCTAGGGATCCCTCCAAAAGAGAAAACCACAGC<br>AAACTGGGGTGCAGTGAGGCTTGAGGTAACTGCCTGGGAGAAGTTCTGATCTGA<br>AGAAGTCTATACTGGTTTCCAGAGCTTGTCAGTGGGCATTGGAGTGGGGCTCTC<br>TCTGCTCCGGGAAGAGGTTTGCAGGGAGAAAGAACTTCACAGAGAGCCAGGCAC<br>TGGACAGGACATGCAGGGGTGGGTCACTTACATACAACCGTAGGTCGTTTCGAG<br>CCCGTCATATGACTCATCCAATCCTCCCCTGTACCGCACAGAGGGACTGCTTGG<br>AAAAGCTATGGAACCTCCCTACTCCGTTAGGCATAGATTTAACCCTTCCCATCC<br>GAGGAGCGGCTGCTGTCCGTGGTGCTGAAGCGATAGCGGCACGGGCGGCTCCGT<br>CCACTAACACCGCTTTTGACCGGAAAACCAAACCAAGAACGAGCCGTATAATAA<br>AGCAAGAGCTCCAAGTCTAAGCCCCTCCGCCGTCCCCGCCCTTTCACCTGAAGC<br>CTCAGTAGGGCTCATGATGGAGGTCGGTGGACTTTGGTACTGAAAAACCACTCC<br>ACCACTTCCTCGGAGCATGAAAGGGGATGCTTACGGCAGTACTGGTTCATCTAT<br>TCTGGAAAAGGAATGAGATGCCAAGATAAAGCAGAAAAATCGGGCAAGGAAGGG<br>AGAAAGACAAAGTTCTCAGGTGAGAGGAACTGGTTACTATTCCGACTGGCAATA<br>TGTGGGTTCTCCTCCCCAAAATCAGCCAGACATTTCCCAAGTTCGAACCTCCTA<br>GGGGCACATGGGAGCTTGGAGCTGCATCTTGTCTCTTGCACACAAGGGAAAACC<br>AAACATAGGAGAACACAATTTGTACAAGGTCATTCAGCTAGCGAAGCACAGAAG<br>CTAACCCCACCCTGTGGCAGAACTTGGCTTCGGTGTTGAGGCTCTTGCTGCCTA<br>CTGAGGGACCCCCTGTTCTTCGTAGGCAGTTTTCCTTTCCGGGCAAGAGGAGAC<br>TCCACTTTCCAGTCGTGGCCACTGGAATTTTTAGAGAGCACCACGTTCCTCTCA<br>CCCAGCGCTCCCTTTCTCCGTCTGCAGTGTTCTCCTTCTCAGGGTAGCTTTGCG<br>GTCCTTTCAAACTCCACGCCCACCCCAACCCCAACCCCGAAGCCAGCTGTACAG<br>TTCCTTAAGCCCCTTTGGGTGGCCCAGGGCCGCTGTAGTATCTGGGGAACACTG<br>CACCGCCAGCTAGAAGGTCCCCATTTATCATCAGTAGCATCCATCATGCAACCC<br>CATACAGAATCCCTTCGTGGGTGACTGCAGTCTGCACTCCTCATCTCAAGGTCC<br>TCTCTAACTATCAGGGAACCAACCCTGTGCTGCTTCTCAAGTGGGGGTGTCCTC<br>TCATAGTAATCACTGCAGTCTCCCACTGCTTCAACCCGAAGGCGCCCTGACCCA<br>TCAGTTCTGCAATCCTCTCCCTATTTCCAGTGCCCTCTCTTATTCTGAGGGTCT<br>TATTCTGACTAATAGGGTCTTCCGACATGCACCTGGAGGTCTGCACTTGTCCGC<br>TCCGGAAGTCCTTTACTCCTTGGTCTGACCTCGGGAGGCTCTACTGACGATGCG<br>TCGATTCCCCTTCACTCCTGGGTCGTCCCCCCAGCCCCGCCCCTCTCACTGCG<br>GAGAAGCCGGTCGGCCCGGGCCGCGGGGAGGAGGTGGAGAGGGTGGGGCCCT<br>CCTCCCCAGCCCCCACTGCCGAGGGGCCGGACCGGGCACCGCGGATATAAAA<br>GAGCCGGAGTCCCAGAGCTGCCGCAGTGCTGCCTGCCCCGTCCCAGCCCCGCAC<br>TCCCGCTCCGCTGGCGGCCGCACCTGCTCCGGCCATG |
| plasmid | CCCGTCCCAG CCCCGCACTC CCGCTCCGCT GGCGGCCGCA CCTGCTCCGG CCATTCTAGA GTCGACCTGC AGAAGCTATC CACCGGTCGC CACC |

Figure 11F (continued)

| | |
|---|---|
| EGFP | ATGGTGAG CAAGGGCGAG GAGCTGTTCA CCGGGGTGGT GCCCATCCTG<br>GTCGAGCTGG ACGGCGACGT AAACGGCCAC AAGTTCAGCG TGTCCGGCGA<br>GGGCGAGGGC GATGCCACCT ACGGCAAGCT GACCCTGAAG TTCATCTGCA<br>CCACCGGCAA GCTGCCCGTG CCCTGGCCCA CCCTCGTGAC CACCCTGACC<br>TACGGCGTGC AGTGCTTCAG CCGCTACCCC GACCACATGA AGCAGCACGA<br>CTTCTTCAAG TCCGCCATGC CCGAAGGCTA CGTCCAGGAG CGCACCATCT<br>TCTTCAAGGA CGACGGCAAC TACAAGACCC GCGCCGAGGT GAAGTTCGAG<br>GGCGACACCC TGGTGAACCG CATCGAGCTG AAGGGCATCG ACTTCAAGGA<br>GGACGGCAAC ATCCTGGGGC ACAAGCTGGA GTACAACTAC AACAGCCACA<br>ACGTCTATAT CATGGCCGAC AAGCAGAAGA ACGGCATCAA GGTGAACTTC<br>AAGATCCGCC ACAACATCGA GGACGGCAGC GTGCAGCTCG CCGACCACTA<br>CCAGCAGAAC ACCCCCATCG GCGACGGCCC CGTGCTGCTG CCCGACAACC<br>ACTACCTGAG CACCCAGTCC GCCCTGAGCA AAGACCCCAA CGAGAAGCGC<br>GATCACATGG TCCTGCTGGA GTTCGTGACC GCCGCCGGGA TCACTCTCGG<br>CATGGACGAG CTGTACAAGT |
| plasmid | AAAGCGGCCA GCTTGCCTCG AGCAGCGCTG CTCGAGAGAT CT |
| hGH_PA_terminator | ACGGGTGG CATCCCTGTG ACCCCTCCCC AGTGCCTCTC CTGGCCCTGG<br>AAGTTGCCAC TCCAGTGCCC ACCAGCCTTG TCCTAATAAA ATTAAGTTGC<br>ATCATTTTGT CTGACTAGGT GTCCTTCTAT AATATTATGG GGTGGAGGGG<br>GGTGGTATGG AGCAAGGGGC AAGTTGGGAA GACAACCTGT AGGGCCTGCG<br>GGGTCTATTG GGAACCAAGC TGGAGTGCAG TGGCACAATC TTGGCTCACT<br>GCAATCTCCG CCTCCTGGGT TCAAGCGATT CTCCTGCCTC AGCCTCCCGA<br>GTTGTTGGGA TTCCAGGCAT GCATGACCAG GCTCAGCTAA TTTTTGTTTT<br>TTTGGTAGAG ACGGGGTTTC ACCATATTGG CCAGGCTGGT CTCCAACTCC<br>TAATCTCAGG TGATCTACCC ACCTTGGCCT CCCAAATTGC TGGGATTACA<br>GGCGTGAACC ACTGCTCCCT TCCCTGTCCT T |
| Plasmid | CTGATTTTG TAGGTAACCA CGTGCGGACC GAGCGGCCGC |
| R-ITR | AGGAACCCCT AGTGATGGAG TTGGCCACTC CCTCTCTGCG CGCTCGCTCG<br>CTCACTGAGG CCGGGCGACC AAAGGTCGCC CGACGCCCGG GCTTTGCCCG<br>GGCGGCCTCA GTGAGCGAGC GAGCGCGCAG CTGCCTGAGG |
| Plasmid backbone | GGCGCCTGAT GCGGTATTTT CTCCTTACGC ATCTGTGCGG TATTTCACAC<br>CGCATACGTC AAAGCAACCA TAGTACGCGC CCTGTAGCGG CGCATTAAGC<br>GCGGCGGGTG TGGTGGTTAC GCGCAGCGTG ACCGCTACAC TTGCCAGCGC<br>CCTAGCGCCC GCTCCTTTCG CTTTCTTCCC TTCCTTTCTC GCCACGTTCG<br>CCGGCTTTCC CCGTCAAGCT CTAAATCGGG GGCTCCCTTT AGGGTTCCGA<br>TTTAGTGCTT TACGGCACCT CGACCCCAAA AAACTTGATT TGGGTGATGG<br>TTCACGTAGT GGGCCATCGC CCTGATAGAC GGTTTTTCGC CCTTTGACGT<br>TGGAGTCCAC GTTCTTTAAT AGTGGACTCT TGTTCCAAAC TGGAACAACA<br>CTCAACCCTA TCTCGGGCTA TTCTTTTGAT TTATAAGGGA TTTTGCCGAT<br>TTCGGCCTAT TGGTTAAAAA ATGAGCTGAT TTAACAAAAA TTTAACGCGA<br>ATTTTAACAA AATATTAACG TTTACAATTT TATGGTGCAC TCTCAGTACA<br>ATCTGCTCTG ATGCCGCATA GTTAAGCCAG CCCCGACACC CGCCAACACC<br>CGCTGACGCG CCCTGACGGG CTTGTCTGCT CCCGGCATCC GCTTACAGAC<br>AAGCTGTGAC CGTCTCCGGG AGCTGCATGT GTCAGAGGTT TTCACCGTCA<br>TCACCGAAAC GCGCGAGACG AAAGGGCCTC GTGATACGCC TATTTTTATA<br>GGTTAATGTC ATGATAATAA TGGTTTCTTA GACGTCAGGT GGCACTTTTC<br>GGGGAAATGT GCGCGGAACC CCTATTTGTT TATTTTTCTA AATACATTCA<br>AATATGTATC CGCTCATGAG ACAATAACCC TGATAAATGC TTCAATAATA<br>TTGAAAAAGG AAGAGTATGA GTATTCAACA TTTCCGTGTC GCCCTTATTC<br>CCTTTTTTGC GGCATTTTGC CTTCCTGTTT TTGCTCACCC AGAAACGCTG<br>GTGAAAGTAA AAGATGCTGA AGATCAGTTG GGTGCACGAG TGGGTTACAT<br>CGAACTGGAT CTCAACAGCG GTAAGATCCT TGAGAGTTTT CGCCCCGAAG<br>AACGTTTTCC AATGATGAGC ACTTTTAAAG TTCTGCTATG TGGCGCGGTA<br>TTATCCCGTA TTGACGCCGG GCAAGAGCAA CTCGGTCGCC GCATACACTA<br>TTCTCAGAAT GACTTGGTTG AGTACTCACC AGTCACAGAA AAGCATCTTA<br>CGGATGGCAT GACAGTAAGA GAATTATGCA GTGCTGCCAT AACCATGAGT<br>GATAACACTG CGGCCAACTT ACTTCTGACA ACGATCGGAG GACCGAAGGA<br>GCTAACCGCT TTTTTGCACA ACATGGGGGA TCATGTAACT CGCCTTGATC |

```
GTTGGGAACC GGAGCTGAAT GAAGCCATAC CAAACGACGA GCGTGACACC
ACGATGCCTG TAGCAATGGC AACAACGTTG CGCAAACTAT TAACTGGCGA
ACTACTTACT CTAGCTTCCC GGCAACAATT AATAGACTGG ATGGAGGCGG
ATAAAGTTGC AGGACCACTT CTGCGCTCGG CCCTTCCGGC TGGCTGGTTT
ATTGCTGATA AATCTGGAGC CGGTGAGCGT GGGTCTCGCG GTATCATTGC
AGCACTGGGG CCAGATGGTA AGCCCTCCCG TATCGTAGTT ATCTACACGA
CGGGGAGTCA GGCAACTATG GATGAACGAA ATAGACAGAT CGCTGAGATA
GGTGCCTCAC TGATTAAGCA TTGGTAACTG TCAGACCAAG TTTACTCATA
TATACTTTAG ATTGATTTAA AACTTCATTT TTAATTTAAA AGGATCTAGG
TGAAGATCCT TTTTGATAAT CTCATGACCA AAATCCCTTA ACGTGAGTTT
TCGTTCCACT GAGCGTCAGA CCCCGTAGAA AAGATCAAAG GATCTTCTTG
AGATCCTTTT TTTCTGCGCG TAATCTGCTG CTTGCAAACA AAAAAACCAC
CGCTACCAGC GGTGGTTTGT TTGCCGGATC AAGAGCTACC AACTCTTTTT
CCGAAGGTAA CTGGCTTCAG CAGAGCGCAG ATACCAAATA CTGTCCTTCT
AGTGTAGCCG TAGTTAGGCC ACCACTTCAA GAACTCTGTA GCACCGCCTA
CATACCTCGC TCTGCTAATC CTGTTACCAG TGGCTGCTGC CAGTGGCGAT
AAGTCGTGTC TTACCGGGTT GGACTCAAGA CGATAGTTAC CGGATAAGGC
GCAGCGGTCG GGCTGAACGG GGGGTTCGTG CACACAGCCC AGCTTGGAGC
GAACGACCTA CACCGAACTG AGATACCTAC AGCGTGAGCT ATGAGAAAGC
GCCACGCTTC CCGAAGGGAG AAAGGCGGAC AGGTATCCGG TAAGCGGCAG
GGTCGGAACA GGAGAGCGCA CGAGGGAGCT TCCAGGGGGA AACGCCTGGT
ATCTTTATAG TCCTGTCGGG TTTCGCCACC TCTGACTTGA GCGTCGATTT
TTGTGATGCT CGTCAGGGGG GCGGAGCCTA TGGAAAAACG CCAGCAACGC
GGCCTTTTTA CGGTTCCTGG CCTTTTGCTG GCCTTTTGCT
CACATGTCCTGCAGG
```

Figure 11F (continued)

SEQUENCE LISTING

<160> NUMBER OF SEQ ID NOS: 129

<210> SEQ ID NO 1
<211> LENGTH: 189
<212> TYPE: DNA
<213> ORGANISM: Homo sapiens

<400> SEQUENCE: 1

```
cccgccccte tcactgcggc ggagccggtc ggccgggggg ccgcagggga ggaggcggag      60 agggcgggc cctcctcccc accctctcac tgccaagggg ttggacccgg ccgcggcggc     120 tataaaggg ccggcgccct ggtgctgccg cagtgcctcc cgccccgtcc cggcctcgcg     180
cacctgctc                                                             189
```

<210> SEQ ID NO 2
<211> LENGTH: 43
<212> TYPE: DNA
<213> ORGANISM: Homo sapiens

<400> SEQUENCE: 2

```
ggaaaaacaa gggtgggagg acacagcttg tccaaggtca ttc                        43
```

<210> SEQ ID NO 3
<211> LENGTH: 360
<212> TYPE: DNA
<213> ORGANISM: Homo sapiens

<400> SEQUENCE: 3

```
tgctgtcagc tgcttgtgag ccttctcaca tccagagaat gtatcagcat tgtgcagact       60
gaaaagaccc agaggaacaa ggctccaatg gcaaaattcc aagtagaatg acaaataaat      120
ggggagccat ctgagagcaa gggagtcctg cccaacaccc gccccatgcc tttctcaggg     180
```

-continued

```
acctcagacc agccactcac ctccatcctc ccagcaccac ctgcaaccag cccctttgccc    240 tctgcaaact ggagcacgac tggatcttta gatggggggaa aaatgcttca tcatgttctg    300
ctgcttcatg caaaaccaga aactcccctcc ccctcttccc tcctcccagc gcactctcct    360
```

<210> SEQ ID NO 4
<211> LENGTH: 27
<212> TYPE: DNA
<213> ORGANISM: Homo sapiens

<400> SEQUENCE: 4

```
gaccagcaaa ctgcctagct gacccca                                         27
```

<210> SEQ ID NO 5
<211> LENGTH: 28
<212> TYPE: DNA
<213> ORGANISM: Homo sapiens

<400> SEQUENCE: 5

```
ggccctgtcc ccggtgctga agcgccag                                        28
```

<210> SEQ ID NO 6
<211> LENGTH: 5
<212> TYPE: DNA
<213> ORGANISM: Mus musculus

<400> SEQUENCE: 6

```
taact                                                                 5
```

<210> SEQ ID NO 7
<211> LENGTH: 13
<212> TYPE: DNA
<213> ORGANISM: Mus musculus

<400> SEQUENCE: 7

```
ctttcaaact cca                                                        13
```

<210> SEQ ID NO 8
<211> LENGTH: 74
<212> TYPE: DNA
<213> ORGANISM: Mus musculus

<400> SEQUENCE: 8

```
ttaacccttc ccatccgagg agcggctgct gtccgtggtg ctgaagcgat agcggcacgg    60
gcggctccgt ccac                                                       74
```

<210> SEQ ID NO 9
<211> LENGTH: 193
<212> TYPE: DNA
<213> ORGANISM: Mus musculus

<400> SEQUENCE: 9

```
ccagccccgc ccctctcact gcggagaagc cggtcggccc ggggccgcgg gggaggaggt    60
ggagagggtg gggccctcct ccccagcccc ccactgccga ggggccggac cgggccaccg   120
cggatataaa agagccggag tcccagagct gccgcagtgc tgcctgcccc gtcccagccc   180
cgcactcccg ctc                                                       193
```

<210> SEQ ID NO 10
<211> LENGTH: 194
<212> TYPE: DNA
<213> ORGANISM: Mus musculus

<400> SEQUENCE: 10

```
cccagccccg cccctctcac tgcggagaag ccggtcggcc cggggccgcg ggggaggagg    60
tggagagggt ggggccctcc tccccagccc ccactgccg aggggccgga ccgggccacc    120
gcggatataa aagagccgga gtcccagagc tgccgcagtg ctgcctgccc cgtcccagcc    180
ccgcactccc gctc                                                      194
```

<210> SEQ ID NO 11
<211> LENGTH: 194
<212> TYPE: DNA
<213> ORGANISM: Macaca mulatta

<400> SEQUENCE: 11

```
ccctaccccg cccctctcac tgcggctgag ccggtcagcc ggggccgca ggggaggagg    60 cggagagggc ggggccctcc tccccacccc ctcactgaca aggggttgga cccggccgcg    120
gcggctataa aagggccggc gccctggtgc tgccgcagtg cctccagccc cgtcccggcc    180
ccgcgcacct gctc                                                      194
```

<210> SEQ ID NO 12
<211> LENGTH: 43
<212> TYPE: DNA
<213> ORGANISM: Mus musculus

<400> SEQUENCE: 12

```
ggaaaaccaa acataggaga acacaatttg tacaaggtca ttc                      43
```

<210> SEQ ID NO 13
<211> LENGTH: 94
<212> TYPE: DNA
<213> ORGANISM: Mus musculus

<400> SEQUENCE: 13

```
tgcatcttgt ctcttgcaca caagggaaaa ccaaacatag gagaacacaa tttgtacaag    60
gtcattcagc tagcgaagca cagaagctaa cccc                                94
```

<210> SEQ ID NO 14
<211> LENGTH: 43
<212> TYPE: DNA
<213> ORGANISM: Macaca mulatta

<400> SEQUENCE: 14

```
ggaaaaacaa gggtgggaga atacagctcg tccaaggtca ttc                      43
```

<210> SEQ ID NO 15
<211> LENGTH: 200
<212> TYPE: DNA
<213> ORGANISM: Mus musculus

<400> SEQUENCE: 15

```
aaatccaagc agtatgggag ataaatgggg aagccatgtg ggcgtaaggg ggtagaggtc    60
tgcatcccag tccctccccc atggcatctg cagtgcctcc cagcctttct gaccctgca    120 aagagcagca tgactggacc tttaaattgg gaaaatgctt catcatgttc tgctccatca    180
tgaaaaacta gagtctcctc                                                200
```

<210> SEQ ID NO 16
<211> LENGTH: 322
<212> TYPE: DNA

<213> ORGANISM: Mus musculus

<400> SEQUENCE: 16

| | | | | | |
|---|---|---|---|---|---|
| tgctgtcaac | tgcttgtcag | acttctcacc | cccaagaagg | gcatgtgcat | tctgcagaca | 60 |
| actgaagaga | ctcgaaggaa | caagaatcta | ataacaaaaa | tccaagcagt | atgggagata | 120 |
| aatggggaag | ccatgtgggc | gtaagggggt | agaggtctgc | atcccagtcc | cctccccatg | 180 |
| gcatctgcag | tgcctcccag | cctttctgac | ccctgcaaag | agcagcatga | ctggaccttt | 240 |
| aaattgggaa | aatgcttcat | catgttctgc | tccatcatga | aaaactagag | tctcctcccc | 300 |
| ctcctcccta | gtgcactctc | ct | | | | 322 |

<210> SEQ ID NO 17
<211> LENGTH: 362
<212> TYPE: DNA
<213> ORGANISM: Macaca mulatta

<400> SEQUENCE: 17

| | | | | | |
|---|---|---|---|---|---|
| tgctgtcagc | tgcttgtgag | ccttctcaca | tccagagaat | atatcagcat | tctgcagacc | 60 |
| gaaaagaccc | agaggaacaa | ggctccaatg | gcaaaattcc | aagtagaatg | acaaataaat | 120 |
| ggggagccat | ttgagagcaa | gggagtcctg | cccaacaccc | cctccccatg | cctttctcag | 180 |
| ggacctcaga | ccagccactc | acctccatcc | tcccagaacc | acctgcaacc | agcccgttgc | 240 |
| cccttgcaaa | ctggagcatg | actggatctt | tagatggggg | aaaaatgctt | catcatgttc | 300 |
| tgcttcttca | tgcaaaacca | gaaactccct | ccccctcttc | cctcctccca | gcgcactctc | 360 |
| ct | | | | | | 362 |

<210> SEQ ID NO 18
<211> LENGTH: 7
<212> TYPE: DNA
<213> ORGANISM: Mus musculus

<400> SEQUENCE: 18

| | |
|---|---|
| tctaact | 7 |

<210> SEQ ID NO 19
<211> LENGTH: 71
<212> TYPE: DNA
<213> ORGANISM: Mus musculus

<400> SEQUENCE: 19

| | | | | | |
|---|---|---|---|---|---|
| gcgctccctt | tctccgtctg | cagtgttctc | cttctcaggg | tagctttgcg | gtcctttcaa | 60 |
| actccacgcc | c | | | | | 71 |

<210> SEQ ID NO 20
<211> LENGTH: 80
<212> TYPE: DNA
<213> ORGANISM: Mus musculus

<400> SEQUENCE: 20

| | | | | | |
|---|---|---|---|---|---|
| atttaaccct | tccatccga | ggagcggctg | ctgtccgtgg | tgctgaagcg | atagcggcac | 60 |
| gggcggctcc | gtccactaac | | | | | 80 |

<210> SEQ ID NO 21
<211> LENGTH: 2501
<212> TYPE: DNA
<213> ORGANISM: Homo sapiens

<400> SEQUENCE: 21

```
cagaatacat cttggagccc ccttttacc ccaaaccccc attcctcctt gctgtcagct      60
gcttgtgagc cttctcacat ccagagaatg tatcagcatt gtgcagactg aaaagaccca    120
gaggaacaag gctccaatgg caaaattcca agtagaatga caaataaatg gggagccatc    180
tgagagcaag ggagtcctgc ccaacacccg ccccatgcct ttctcaggga cctcagacca    240
gccactcacc tccatcctcc cagcaccacc tgcaaccagc cccttgccct ctgcaaactg    300
gagcacgact ggatctttag atgggggaaa aatgcttcat catgttctgc tgcttcatgc    360
aaaaccagaa actccctccc cctcttccct cctcccagcg cactctcctt ccagtaaaaa    420
gtggttaaag ggacagcgcc atcaatttcc cagctctgag ggtctgctta gaactagggg    480
gctggaagga gacagagggc aaagagaaag gaactggcag aggtctttcc tgggggatat    540
gtctgttctg tcctggggat cctggagcag gaaaacccgc gtaaagtagg ggtgtagtgg    600
gtgttgagat aactgcctgg ggaggttca gagtggaagt acgagtctac aaactctcaa    660
gggcgtctca gggctcccag catccccagg ggtcctttcg caggggtccc taagcaggag    720
gggaacagcc cagaaaacac ggaactggac ccccgacagg aagtccaggg aggggtccct    780
ggctcactat gtgaccctgc tggatcactt gcctcccctc tcgggtcccc tcagcacagt    840
gtccctccct tccttcccct aaagtaaaag cagagggtta atctctttcc ccgccccacg    900
cccaacaaag agcaggccct gtccccggtg ctgaagcgcc agccgcagca ccaccccac    960 tcccacagca taaaacatga gccaaaacca ataaagagcc aaatgtcaca gccgttgcag   1020
ggccccctaa atcctgggga ccccttcttc tacctgacat cctattgggg tgagggactt   1080
tggtactcag aaagcatctc atcacttccc tgtaagagag aagggatgcc gactcaggcg   1140
cctgcttgtc tgttacagga gtgggggaag agaggacaag ttgaggctga aagatgggg   1200 agggggaggg agaaaagagg acttcctagt gttgacagaa cggcaagatg tgggttcccc   1260
atccccagtt cagccagaga cccctcaaag tggaacttcc tggggcagtc ggggtcagg   1320 agttggagct tgtctctggg gcaagacccc ttcgttgtac agatggaaaa acaagggtgg   1380
gaggacacag cttgtccaag gtcattcgac cagcaaactg cctagctgac ccagtgtgc   1440 agaagctggc tcgggtgaca cccatcattt cccccccaccc cacacagggg ccagctctct   1500
caacttcatg cccaagccct cctacggtac ccccactgta ggttctctgc ccctcaaact   1560
cagcccagct ttctcctgcc tgttcagggg accttctgcc cgcttcgctg agggtccgtc   1620 cccttactg gggctggcag cagggtctcc catctcctct ctcgggggcc actgcagact   1680
ttttagagaa cgccttgcct cccccaacc ccacccatcc ggggttccct ctctccatcc   1740
tctgcagtgt ctcccatacc cccattcagg gtagccttgc tattctcccc aactccaggt   1800
cccccttcat ctattccggg gctggccgcg gagtttcctg agcgctctcc aagtgggtcc   1860
tctagatgtt aggagaacac tgtacctccc ccggtcaggg gtctcctgtc tccgttctat   1920
ggagcgtcca tgctcccatt caggactgcc ttgctccctc tctgttccg gggctggctg   1980 cacagtctct gcaccccta tcctgaaagc ctctcttaac tatttggaaa gcctcgtgtc   2040
ctgtctcata cagggatccc ctcatcctaa tgactgcaat cttccattgc tccatcccga   2100
gggcatcctg cccctattcc catcaggttt ctccttgtcc tctccctgtt tcaagtcccc   2160
tttcttattc cgaacacact cgcaggctct tccgacgcgc acccgggggt cctcactggc   2220
ccactccggg agtcctctgc ccgcttcccc gacctgagg gtctcctctg acgcagcgtc   2280
gattcccctt ccctcctcgg tccctgccc cgcccctctc actgcggcgg agccggtcgg   2340
```

-continued

| | |
|---|---|
| ccgggggggcc gcaggggagg aggcggagag ggcggggccc tcctccccac cctctcactg | 2400 |
| ccaagggggtt ggacccggcc gcggcggcta taaaagggcc ggcgccctgg tgctgccgca | 2460 |
| gtgcctcccg ccccgtcccg gcctcgcgca cctgctcagg c | 2501 |

<210> SEQ ID NO 22
<211> LENGTH: 2251
<212> TYPE: DNA
<213> ORGANISM: Mus musculus

<400> SEQUENCE: 22

| | |
|---|---|
| tgtgctgtca actgcttgtc agacttctca cccccaagaa gggcatgtgc attctgcaga | 60 |
| caactgaaga gactcgaagg aacaagaatc taataacaaa atccaagca gtatgggaga | 120 |
| taaatgggga agccatgtgg gcgtaagggg gtagaggtct gcatcccagt cccctcccca | 180 |
| tggcatctgc agtgcctccc agcctttctg accctgcaa agagcagcat gactggacct | 240 |
| ttaaattggg aaaatgcttc atcatgttct gctccatcat gaaaaactag agtctcctcc | 300 |
| ccctcctccc tagtgcactc tcctggcctg cagccagggg ctgggaatga gacacaggac | 360 |
| aggaaaggga tctcttttag ggaatctatc agttctcctc ctaggggatcc ctccaaaaga | 420 |
| gaaaaccaca gcaaactggg gtgcagtgag gcttgaggta actgcctggg agaagttctg | 480 |
| atctgaagaa gtctatactg gttttccagag cttgtcagtg ggcattggag tggggctctc | 540 |
| tctgctccgg gaagagggttt gcaggagaa agaacttcac agagagccag gcactggaca | 600 |
| ggacatgcag gggtgggtca cttacataca accgtaggtc gtttcgagcc cgtcatatga | 660 |
| ctcatccaat cctcccctgt accgcacaga gggactgctt ggaaaagcta tggaacctcc | 720 |
| ctactccgtt aggcatagat ttaacccttc ccatccgagg agcggctgct gtccgtggtg | 780 |
| ctgaagcgat agcggcacgg gcggctccgt ccactaacac cgcttttgac cggaaaacca | 840 |
| aaccaagaac gagccgtata ataaagcaag agctccaagt ctaagcccct ccgccgtccc | 900 |
| cgcccttttca cctgaagcct cagtagggct catgatggag gtcggtggac tttggtactg | 960 |
| aaaaaccact ccaccacttc ctcggagcat gaaagggggat gcttacggca gtactggttc | 1020 |
| atctattctg gaaaaggaat gagatgccaa gataaagcag aaaaatcggg caaggaaggg | 1080 |
| agaaagacaa agttctcagg tgagaggaac tggttactat tccgactggc aatatgtggg | 1140 |
| ttcttcctcccc caaaatcagc cagacatttc ccaagttcga acctcctagg ggcacatggg | 1200 |
| agcttggagc tgcatcttgt ctcttgcaca caagggaaaa ccaaacatag gagaacacaa | 1260 |
| tttgtacaag gtcattcagc tagcgaagca cagaagctaa ccccaccctg tggcagaact | 1320 |
| tggcttcggt gttgaggctc ttgctgccta ctgagggacc cctgttcctt cgtaggcagt | 1380 |
| tttccttttcc gggcaagagg agactccact ttccagtcgt ggccactgga atttttagag | 1440 |
| agcaccacgt tcctctcacc cagcgctccc tttctccgtc tgcagtgttc tccttctcag | 1500 |
| ggtagctttg cggtccttttc aaactccacg cccaccccaa ccccaacccc gaagccagct | 1560 |
| gtacagttcc ttaagcccct ttgggtggcc cagggccgct gtagtatctg gggaacactg | 1620 |
| caccgccagc tagaaggtcc ccatttatca tcagtagcat ccatcatgca acccatacaa | 1680 |
| gaatcccttc gtgggtgact gcagtctgca ctcctcatct caaggtcctc tctaactatc | 1740 |
| agggaaccaa ccctgtgctg cttctcaagt gggggtgtcc tctcatagta atcactgcag | 1800 |
| tctcccactg cttcaacccg aaggcgcccc gacccatcag ttctgcaatc ctctcccctat | 1860 |
| ttccagtgcc ctctcttatt ctgagggtct tattctgact aatagggtct tccgacatgc | 1920 |
| acctggaggt ctgcacttgt ccgctccgga agtcctttac tccttggtct gacctcggga | 1980 |

```
ggctctactg acgatgcgtc gattcccctt cactcctggg tcgtccccccc cagccccgcc    2040 cctctcactg cggagaagcc ggtcggcccg gggccgcggg ggaggaggtg gagagggtgg    2100
ggccctcctc cccagccccc cactgccgag gggccggacc gggccaccgc ggatataaaa    2160
gagccggagt cccagagctg ccgcagtgct gcctgccccg tcccagcccc gcactcccgc    2220
tccgctggcg gccgcacctg ctccggccat g                                    2251

<210> SEQ ID NO 23
<211> LENGTH: 2501
<212> TYPE: DNA
<213> ORGANISM: Macaca mulatta

<400> SEQUENCE: 23
cagtccctct tggagccccc ttttaccccc aaatccctag tcctctttgc tgtcagctgc       60
ttgtgagcct tctcacatcc agagaatata tcagcattct gcagaccgaa aagacccaga     120
ggaacaaggc tccaatggca aaattccaag tagaatgaca aataaatggg agccatctg      180 agagcaaggg agtcctgccc aacaccccct ccccatgcct ttctcaggga cctcagacca     240
gccactcacc tccatcctcc cagaaccacc tgcaaccagc ccgttgcccc ttgcaaactg     300
gagcatgact ggatctttag atgggggaaa aatgcttcat catgttctgc ttcttcatgc     360
aaaaccagaa actccctccc cctcttccct cctcccagcg cactctcctt ccagtaaaac     420
atggttaaag ggacagcgcc atcactttcc cagctctgag ggtctgctta gaaccagggg     480
ccttggaagg agacagaggg caaagagaaa ggaactggca gaggtctttc ctgggggatc     540
tgtctgttct gtcctgggaa tcctggagca ggaaaactcg ggtaaagtgg gggtgtagtg     600
ggggttgaga taaccgcctg ggggagattc agagtgcaag taggagtcta caaactctca     660 aggggggtctc agggctcccg gcatccccag gggtccttc gcaggggtcc ctatgcagga    720
ggagaacagc ccagaaaaca gggaactaga cccttgacag gaagtccaag gaggggtccc    780
tggctcactg tgtgaccctg ctggatcact cgcctccgct ctcgggtccc ctgagcactc    840
cgtgcctccc ttccctcccc taaagtaaaa gcagaagtta atcgctttcc cctccccacg    900
cccaacaaag agcaggccct gtccccggtg ctgaagcgcg agccgcagcg cctccccac    960 tcccaaggca taaacatga gccaaaacca ataagaacc aaatgtcaca gctgttgcag    1020
ggccccctaa gtcccgggga cccctttttc tacctgacat cctagtgggg tgagggactt    1080
ttgtacctgg aaagcatccc atcacttccc tggaagcgag aagggatgcc gactcaggcg    1140
cctgcttgtc tgttatgggg gtaggggacc agagaacaag ttgaggctga aagatgggg    1200 aggggagggg agaaaagagg acttcatagt ggcgagagaa cggcaagatg tgggttcccc    1260
atccccaatt cagccagaga cccctcaaag tggaacttcc tggggcagtc gggggtcaga    1320
agttggagct tgtctctggg gcaagacctc ttcgttgtac agatggaaaa acaagggtgg    1380
gagaatacag ctcgtccaag gtcattcgac tagcaaactg cttagctgac cctagtgtgc    1440
agaacctggc tcgggtgaca cccatcattt ccccccaccc cacacaggcg ccagctctct    1500
caatttcatg ctcaagcccc gctacggtac cccactgtg ggttatctgc ccctcaaact    1560
cagcccagct tcctcctgcc tattcgggga accctctgcc cgcttcgctg agggtccgtc    1620 cccttactg gggatggcag cagggtctcc tgtctcctct ctcgggggggc cactgccgac    1680 ttttcataga acgctttgcc ccctcccaac cccaccccatc cggggttccc tctctccatc    1740
ctctgcagcg tctcccatac ccccattgag ggtagtcttg gtattctccc caactccagg    1800
```

```
tcccccttca tctattccag ggctggccgc ggagtttcct gagcgctctc caagtgggtc    1860
ctctagatgt taggagaaca ctgtacttcc ccccgtcagg ggtctcctgt ctccgttcta    1920
tggagcgtcc atgctcccat tcaggactgt cttgctccct cctctattcc ggggctggct    1980
gcacagtctc tgtaccccct atcctgaggg cctctcttaa ctatttggaa agcctcgtgt    2040
cctctctcat acggggatcc cttcatccta atgactgcaa tcttccattg ctccatccct    2100
agggcatcct gccccctattc ccatcaggtt tctccttgtc ctctccctgt ttcaagtccc    2160 cttttcttatt ccgaacacac tctcaggctc ttccgacgca tacccggggg tcctcactgg    2220
cccactccgg gagtcctctg cccgctaccc cgaactcggg ggtctcctct gacgcagcgt    2280
cgattcccct tccctcctcg gtcccctacc ccgcccctct cactgcggct gagccggtca    2340
gccgggggcc gcaggggagg aggcggagag ggcggggccc tcctcccccac cccctcactg    2400 acaagggggtt ggacccggcc gcggcggcta taaaagggcc ggcgccctgg tgctgccgca    2460
gtgcctccag ccccgtcccg gccccgcgca cctgctccgg c                        2501

<210> SEQ ID NO 24
<211> LENGTH: 1866
<212> TYPE: DNA
<213> ORGANISM: Enterobacteria phage lambda

<400> SEQUENCE: 24
aggcatttat actccgctgg aagcgcgtgt gtattgctca caataattgc atgagttgcc      60
catcgatatg ggcaactcta tctgcactgc tcattaatat acttctgggt tccttccagt     120 tgttttttgca tagtgatcag cctctctctg agggtgaaat aatcccgttc agcggtgtct     180
gccagtcggg gggaggctgc attatccacg ccggaggcgg tggtggcttc acgcactgac     240
tgacagactg ctttgatgtg caaccgacga cgaccagcgg caacatcatc acgcagagca     300
tcattttcag ctttagcatc agctaactcc ttcgtgtatt ttgcatcgag cgcagcaaca     360
tcacgctgac gcatctgcat gtcagtaatt gccgcgttcg ccagcttcag ttctctggca     420
tttttgtcgc gctgggcttt gtaggtaatg gcgttatcac ggtaatgatt aacagcccat     480
gacaggcaga cgatgatgca gataaccaga gcggagataa tcgcggtgac tctgctcata     540
catcaatctc tctgaccgtt ccgcccgctt ctttgaattt tgcaatcagg ctgtcagcct     600
tatgctcgaa ctgaccataa ccagcgcccg gcagtgaagc ccagatattg ctgcaacggt     660
cgattgcctg acggatatca ccacgatcaa tcataggtaa agcgccacgc tccttaatct     720
gctgcaatgc cacagcgtcc tgacttttcg gagagaagtc tttcaggcca agctgcttgc     780
ggtaggcatc ccaccaacgg gaaagaagct ggtagcgtcc ggcgcctgtt gatttgagtt     840
ttgggtttag cgtgacaagt ttgcgagggt gatcggagta atcagtaaat agctctccgc     900
ctacaatgac gtcataacca tgatttctgg ttttctgacg tccgttatca gttccctccg     960
accacgccag catatcgagg aacgccttac gttgattatt gatttctacc atcttctact    1020
ccggcttttt tagcagcgaa gcgtttgata agcgaaccaa tcgagtcagt accgatgtag    1080
ccgataaaca cgctcgttat ataagcgaga ttgctactta gtccggcgaa gtcgagaagg    1140
tcacgaatga accaggcgat aatgcgcgac atcgttgcgt cgattactgt ttttgtaaac    1200
gcaccgccat tatatctgcc gcgaaggtac gccattgcaa acgcaaggat tgccccgatg    1260
ccttgttcct ttgccgcgag aatggcggcc aacaggtcat gttttttctgg catcttcatg    1320 tcttaccccc aataagggga tttgctctat ttaattagga ataaggtcga ttactgatag    1380
aacaaatcca ggctactgtg tttagtaatc agatttgttc gtgaccgata tgcacgggca    1440
```

```
aaacggcagg aggttgttag cgcgacctcc tgccacccgc tttcacgaag gtcatgtgta    1500
aaaggccgca gcgtaactat tactaatgaa ttcaggacac acagtggcta cggctcagtt    1560
tgggttgtgc tgttgctggg cggcgatgac gcctgtacgc atttggtgat ccggttctgc    1620
ttccggtatt cgcttaattc agcacaacgg aaagagcact ggctaaccag gctcgccgac    1680
tcttcacgat tatcgactca atgctcttac ctgttgtgca gatataaaaa atcccgaaac    1740
cgttatgcag gctctaacta ttacctgcga actgtttcgg gattgcattt tgcagacctc    1800
tctgcctgcg atggttggag ttccagacga tacgtcgaag tgaccaacta ggcggaatcg    1860
gtagta                                                              1866

<210> SEQ ID NO 25
<211> LENGTH: 20
<212> TYPE: DNA
<213> ORGANISM: Artificial Sequence
<220> FEATURE:
<223> OTHER INFORMATION: RHO forward primer

<400> SEQUENCE: 25
ctttcctgat ctgctgggtg                                                  20

<210> SEQ ID NO 26
<211> LENGTH: 19
<212> TYPE: DNA
<213> ORGANISM: Artificial Sequence
<220> FEATURE:
<223> OTHER INFORMATION: RHO reverse primer

<400> SEQUENCE: 26
ggcaaagaac gctgggatg                                                   19

<210> SEQ ID NO 27
<211> LENGTH: 21
<212> TYPE: DNA
<213> ORGANISM: Artificial Sequence
<220> FEATURE:
<223> OTHER INFORMATION: EGFP forward primer

<400> SEQUENCE: 27
ttcaagagga cggcaacatc c                                                21

<210> SEQ ID NO 28
<211> LENGTH: 22
<212> TYPE: DNA
<213> ORGANISM: Artificial Sequence
<220> FEATURE:
<223> OTHER INFORMATION: EGFP reverse primer

<400> SEQUENCE: 28
caccttgatg ccgttctttc gc                                               22

<210> SEQ ID NO 29
<211> LENGTH: 25
<212> TYPE: DNA
<213> ORGANISM: Artificial Sequence
<220> FEATURE:
<223> OTHER INFORMATION: BETA-actin forward primer

<400> SEQUENCE: 29
tcacccacac tgtgcccatc tacga                                            25

<210> SEQ ID NO 30
```

```
<211> LENGTH: 25
<212> TYPE: DNA
<213> ORGANISM: Artificial Sequence
<220> FEATURE:
<223> OTHER INFORMATION: BETA-actin reverse primer

<400> SEQUENCE: 30
cagcggaacc gctcattgcc aatgg                                         25

<210> SEQ ID NO 31
<211> LENGTH: 20
<212> TYPE: DNA
<213> ORGANISM: Artificial Sequence
<220> FEATURE:
<223> OTHER INFORMATION: GAPDH forward primer:

<400> SEQUENCE: 31
cagcctcaag atcatcagca                                               20

<210> SEQ ID NO 32
<211> LENGTH: 20
<212> TYPE: DNA
<213> ORGANISM: Artificial Sequence
<220> FEATURE:
<223> OTHER INFORMATION: GAPDH reverse primer:

<400> SEQUENCE: 32
catgagtcct tccacgatac                                               20

<210> SEQ ID NO 33
<211> LENGTH: 20
<212> TYPE: DNA
<213> ORGANISM: Artificial Sequence
<220> FEATURE:
<223> OTHER INFORMATION: Nefh forward primer 1

<400> SEQUENCE: 33
tggccctgga cattgagatt                                               20

<210> SEQ ID NO 34
<211> LENGTH: 20
<212> TYPE: DNA
<213> ORGANISM: Artificial Sequence
<220> FEATURE:
<223> OTHER INFORMATION: Nefh reverse primer 1

<400> SEQUENCE: 34
tgcgtggata tggagggaat                                               20

<210> SEQ ID NO 35
<211> LENGTH: 20
<212> TYPE: DNA
<213> ORGANISM: Artificial Sequence
<220> FEATURE:
<223> OTHER INFORMATION: Nefh forward primer 2

<400> SEQUENCE: 35
accgtcatca ggcagacatt                                               20

<210> SEQ ID NO 36
<211> LENGTH: 20
<212> TYPE: DNA
<213> ORGANISM: Artificial Sequence
<220> FEATURE:
<223> OTHER INFORMATION: Nefh reverse primer 2

<400> SEQUENCE: 36
```

```
aatgtccagg gccatcttga                                         20
```

<210> SEQ ID NO 37
<211> LENGTH: 20
<212> TYPE: DNA
<213> ORGANISM: Artificial Sequence
<220> FEATURE:
<223> OTHER INFORMATION: Gamma synuclein forward primer

<400> SEQUENCE: 37

```
tctccattgc caaggaaggt                                         20
```

<210> SEQ ID NO 38
<211> LENGTH: 20
<212> TYPE: DNA
<213> ORGANISM: Artificial Sequence
<220> FEATURE:
<223> OTHER INFORMATION: Gamma synuclein reverse primer

<400> SEQUENCE: 38

```
cttgttggcc actgtgttga                                         20
```

<210> SEQ ID NO 39
<211> LENGTH: 20
<212> TYPE: DNA
<213> ORGANISM: Artificial Sequence
<220> FEATURE:
<223> OTHER INFORMATION: Brn3a forward primer

<400> SEQUENCE: 39

```
cgcagcgtga gaaaatgaac                                         20
```

<210> SEQ ID NO 40
<211> LENGTH: 20
<212> TYPE: DNA
<213> ORGANISM: Artificial Sequence
<220> FEATURE:
<223> OTHER INFORMATION: Brn3a reverse primer

<400> SEQUENCE: 40

```
tggcagagaa tttcatccgc                                         20
```

<210> SEQ ID NO 41
<211> LENGTH: 20
<212> TYPE: DNA
<213> ORGANISM: Artificial Sequence
<220> FEATURE:
<223> OTHER INFORMATION: Thy1 forward primer

<400> SEQUENCE: 41

```
tgaaccaaaa ccttcgcctg                                         20
```

<210> SEQ ID NO 42
<211> LENGTH: 20
<212> TYPE: DNA
<213> ORGANISM: Artificial Sequence
<220> FEATURE:
<223> OTHER INFORMATION: Thy1 reverse primer

<400> SEQUENCE: 42

```
agctcacaaa agtagtcgcc                                         20
```

<210> SEQ ID NO 43
<211> LENGTH: 20
<212> TYPE: DNA

```
<213> ORGANISM: Artificial Sequence
<220> FEATURE:
<223> OTHER INFORMATION: Melanopsin forward primer

<400> SEQUENCE: 43
gggttctgag agtgaagtgg                                                    20

<210> SEQ ID NO 44
<211> LENGTH: 19
<212> TYPE: DNA
<213> ORGANISM: Artificial Sequence
<220> FEATURE:
<223> OTHER INFORMATION: Melanopsin reverse primer

<400> SEQUENCE: 44
aagaggcctt gagttctcc                                                     19

<210> SEQ ID NO 45
<211> LENGTH: 38
<212> TYPE: DNA
<213> ORGANISM: Artificial Sequence
<220> FEATURE:
<223> OTHER INFORMATION: pAAV.NEFH-EGFP forward primer

<400> SEQUENCE: 45
agatcatctt aagacgcgtt gctgtcagct gcttgtga                                38

<210> SEQ ID NO 46
<211> LENGTH: 21
<212> TYPE: DNA
<213> ORGANISM: Artificial Sequence
<220> FEATURE:
<223> OTHER INFORMATION: pAAV.NEFH-EGFP reverse primer

<400> SEQUENCE: 46
gaggtacagt gttctcctaa c                                                  21

<210> SEQ ID NO 47
<211> LENGTH: 695
<212> TYPE: DNA
<213> ORGANISM: Artificial Sequence
<220> FEATURE:
<223> OTHER INFORMATION: NEFH

<400> SEQUENCE: 47
agtttcctga gcgctctcca agtgggtcct ctagatgtta ggagaacact gtacctcccc        60
cggtcagggg tctcctgtct ccgttctatg gagcgtccat gctcccattc aggactgcct       120
tgctccctcc tctgttccgg ggctggctgc acagtctctg cacccccatat cctgaaagcc     180 tctcttaact atttggaaag cctcgtgtcc tgtctcatac agggatcccc tcatcctaat       240
gactgcaatc ttccattgct ccatcccgag ggcatcctgc cctattccc atcaggtttc       300 tccttgtcct ctccctgttt caagtcccct ttcttattcc gaacacactc gcaggctctt      360
ccgacgcgca cccgggggtc ctcactggcc cactccggga gtcctctgcc cgcttccccg       420
acctcgaggg tctcctctga cgcagcgtcg attccccttc cctcctcggt ccctgccc         480 gcccctctca ctgcgcggga gccggtcggc cggggggccg caggggagga ggcggagagg        540
gcggggccct cctcccacc ctctcactgc caaggggttg gacccggccg cggcggctat         600
aaaagggccg gcgcccctggt gctgccgcag tgcctcccgc ccgtccggg cctcgcgcac       660 ctgctcagcg atatcctagg aattcagctt ctaga                                  695
```

```
<210> SEQ ID NO 48
<211> LENGTH: 32
<212> TYPE: DNA
<213> ORGANISM: Artificial Sequence
<220> FEATURE:
<223> OTHER INFORMATION: pAAV.A-EGFP forward primer

<400> SEQUENCE: 48
atcgatgacg cgtctctgac gcagcgtcga tt                                32

<210> SEQ ID NO 49
<211> LENGTH: 32
<212> TYPE: DNA
<213> ORGANISM: Artificial Sequence
<220> FEATURE:
<223> OTHER INFORMATION: pAAV.A-EGFP reverse primer

<400> SEQUENCE: 49
agatcatgat atcggcctga gcaggtgcgc ga                                32

<210> SEQ ID NO 50
<211> LENGTH: 640
<212> TYPE: DNA
<213> ORGANISM: Artificial Sequence
<220> FEATURE:
<223> OTHER INFORMATION: Conserved Region A+F

<400> SEQUENCE: 50
agagatcata cgcgtctagt catctcagtt gctgtcagct gcttgtgagc cttctcacat    60
ccagagaatg tatcagcatt gtgcagactg aaaagaccca gaggaacaag gctccaatgg   120
caaaattcca agtagaatga caaataaatg gggagccatc tgagagcaag ggagtcctgc   180
ccaacacccg ccccatgcct ttctcaggga cctcagacca gccactcacc tccatcctcc   240
cagcaccacc tgcaaccagc cccttgccct ctgcaaactg gagcacgact ggatctttag   300
atgggggaaa aatgcttcat catgttctgc tgcttcatgc aaaaccagaa actccctccc   360
cctcttccct cctcccagcg cactctcctt ccagtaagtt taaacttccc tcctcggtcc   420
cctgccccgc ccctctcact gcggcggagc cggtcggccg ggggccgca ggggaggagg    480 cggagagggc ggggcccctcc tccccaccct ctcactgcca aggggttgga cccggccgcg   540
gcggctataa aagggccggc gccctggtgc tgccgcagtg cctcccgccc cgtcccggcc   600
tcgcgcacct gctctcacgt gatcagagat atctcagaca                        640

<210> SEQ ID NO 51
<211> LENGTH: 34
<212> TYPE: DNA
<213> ORGANISM: Artificial Sequence
<220> FEATURE:
<223> OTHER INFORMATION: pAAV.A-spacer-F-EGFP forward primer

<400> SEQUENCE: 51
atcgatgttt aaactactac cgattccgcc tagt                              34

<210> SEQ ID NO 52
<211> LENGTH: 34
<212> TYPE: DNA
<213> ORGANISM: Artificial Sequence
<220> FEATURE:
<223> OTHER INFORMATION: pAAV.A-spacer-F-EGFP reverse primer

<400> SEQUENCE: 52
atgcatgttt aaacaggcat ttatactccg ctgg                              34
```

<210> SEQ ID NO 53
<211> LENGTH: 133
<212> TYPE: DNA
<213> ORGANISM: Artificial Sequence
<220> FEATURE:
<223> OTHER INFORMATION: AAV.A+F-EGFP L-ITR

<400> SEQUENCE: 53

```
cagctgcgcg ctcgctcgct cactgaggcc gcccgggcaa agcccgggcg tcgggcgacc    60
tttggtcgcc cggcctcagt gagcgagcga gcgcgcagag agggagtggc caactccatc   120 actagggggtt cct                                                      133
```

<210> SEQ ID NO 54
<211> LENGTH: 14
<212> TYPE: DNA
<213> ORGANISM: Artificial Sequence
<220> FEATURE:
<223> OTHER INFORMATION: AAV.A+F-EGFP plasmid

<400> SEQUENCE: 54

```
gcggccgcac gcgt                                                       14
```

<210> SEQ ID NO 55
<211> LENGTH: 14
<212> TYPE: DNA
<213> ORGANISM: Artificial Sequence
<220> FEATURE:
<223> OTHER INFORMATION: AAV.A+F-EGFP spacer

<400> SEQUENCE: 55

```
ctagtcatct cagt                                                       14
```

<210> SEQ ID NO 56
<211> LENGTH: 360
<212> TYPE: DNA
<213> ORGANISM: Artificial Sequence
<220> FEATURE:
<223> OTHER INFORMATION: AAV.A+F-EGFP Conserved region F

<400> SEQUENCE: 56

```
tgctgtcagc tgcttgtgag ccttctcaca tccagagaat gtatcagcat tgtgcagact    60
gaaaagaccc agaggaacaa ggctccaatg gcaaaattcc aagtagaatg acaaataaat   120
ggggagccat ctgagagcaa gggagtcctg cccaacaccc gccccatgcc tttctcaggg   180
acctcagacc agccactcac ctccatcctc ccagcaccac ctgcaaccag ccccttgccc   240
tctgcaaact ggagcacgac tggatcttta gatgggggaa aaatgcttca tcatgttctg   300
ctgcttcatg caaaaccaga aactccctcc ccctcttccc tcctcccagc gcactctcct   360
```

<210> SEQ ID NO 57
<211> LENGTH: 36
<212> TYPE: DNA
<213> ORGANISM: Artificial Sequence
<220> FEATURE:
<223> OTHER INFORMATION: AAV.A+F-EGFP spacer

<400> SEQUENCE: 57

```
tccagtaagt ttaaacttcc ctcctcggtc ccctgc                               36
```

<210> SEQ ID NO 58
<211> LENGTH: 195
<212> TYPE: DNA
<213> ORGANISM: Artificial Sequence

```
<220> FEATURE:
<223> OTHER INFORMATION: AAV.A+F-EGFP Conserved region A

<400> SEQUENCE: 58
ccctgccccg ccctctcac tgcggcggag ccggtcggcc gggggccgc aggggaggag      60 gcggagaggg cggggccctc ctccccaccc tctcactgcc aaggggttgg acccggccgc    120
ggcggctata aagggccgg cgccctggtg ctgccgcagt gcctcccgcc ccgtcccggc    180
ctcgcgcacc tgctc                                                    195

<210> SEQ ID NO 59
<211> LENGTH: 73
<212> TYPE: DNA
<213> ORGANISM: Artificial Sequence
<220> FEATURE:
<223> OTHER INFORMATION: AAV.A+F-EGFP spacer plasmid

<400> SEQUENCE: 59
tcacgtgatc agagataatt ccccggggat cctctagagt cgacctgcag aagctgatcc    60
accggtcgcc acc                                                      73

<210> SEQ ID NO 60
<211> LENGTH: 718
<212> TYPE: DNA
<213> ORGANISM: Artificial Sequence
<220> FEATURE:
<223> OTHER INFORMATION: AAV.A+F-EGFP EGFP

<400> SEQUENCE: 60
atggtgagca agggcgagga gctgttcacc ggggtggtgc ccatcctggt cgagctggac    60
ggcgacgtaa acggccacaa gttcagcgtg tccggcgagg gcgagggcga tgccacctac   120
ggcaagctga ccctgaagtt catctgcacc accggcaagc tgcccgtgcc ctggcccacc   180
ctcgtgacca ccctgaccta cggcgtgcag tgcttcagcc gctacccga ccacatgaag    240 cagcacgact tcttcaagtc cgccatgccc gaaggctacg tccaggagcg caccatcttc   300
ttcaaggacg acggcaacta caagacccgc gccgaggtga agttcgaggg cgacaccctg   360
gtgaaccgca tcgagctgaa gggcatcgac ttcaaggagg acggcaacat cctggggcac   420
aagctggagt acaactacaa cagccacaac gtctatatca tggccgacaa gcagaagaac   480
ggcatcaagg tgaacttcaa gatccgccac aacatcgagg acggcagcgt gcagctcgcc   540
gaccactacc agcagaacac ccccatcggc gacggccccg tgctgctgcc cgacaaccac   600
tacctgagca cccagtccgc cctgagcaaa gaccccaacg agaagcgcga tcacatggtc   660
ctgctggagt tcgtgaccgc cgccgggatc actctcggca tggacgagct gtacaagt     718

<210> SEQ ID NO 61
<211> LENGTH: 42
<212> TYPE: DNA
<213> ORGANISM: Artificial Sequence
<220> FEATURE:
<223> OTHER INFORMATION: AAV.A+F-EGFP plasmid

<400> SEQUENCE: 61
aaagcggcca gcttgcctcg agcagcgctg ctcgagagat ct                       42

<210> SEQ ID NO 62
<211> LENGTH: 479
<212> TYPE: DNA
<213> ORGANISM: Artificial Sequence
<220> FEATURE:
```

<223> OTHER INFORMATION: AAV.A+F-EGFP hGH_PA_terminator

<400> SEQUENCE: 62

```
acgggtggca tccctgtgac ccctccccag tgcctctcct ggccctggaa gttgccactc    60
cagtgcccac cagccttgtc ctaataaaat taagttgcat cattttgtct gactaggtgt   120
ccttctataa tattatgggg tggaggggggg tggtatggag caaggggcaa gttgggaaga   180
caacctgtag ggcctgcggg gtctattggg aaccaagctg gagtgcagtg gcacaatctt   240
ggctcactgc aatctccgcc tcctgggttc aagcgattct cctgcctcag cctcccgagt   300
tgttgggatt ccaggcatgc atgaccaggc tcagctaatt tttgtttttt tggtagagac   360
ggggtttcac catattggcc aggctggtct ccaactccta atctcaggtg atctacccac   420
cttggcctcc caaattgctg ggattacagg cgtgaaccac tgctcccttc cctgtcctt    479
```

<210> SEQ ID NO 63
<211> LENGTH: 39
<212> TYPE: DNA
<213> ORGANISM: Artificial Sequence
<220> FEATURE:
<223> OTHER INFORMATION: AAV.A+F-EGFP plasmid

<400> SEQUENCE: 63

```
ctgattttgt aggtaaccac gtgcggaccg agcggccgc                            39
```

<210> SEQ ID NO 64
<211> LENGTH: 140
<212> TYPE: DNA
<213> ORGANISM: Artificial Sequence
<220> FEATURE:
<223> OTHER INFORMATION: AAV.A+F-EGFP R-ITR

<400> SEQUENCE: 64

```
aggaacccct agtgatggag ttggccactc cctctctgcg cgctcgctcg ctcactgagg    60
ccgggcgacc aaaggtcgcc cgacgcccgg gctttgcccg gcggcctca gtgagcgagc    120
gagcgcgcag ctgcctgagg                                                140
```

<210> SEQ ID NO 65
<211> LENGTH: 2605
<212> TYPE: DNA
<213> ORGANISM: Artificial Sequence
<220> FEATURE:
<223> OTHER INFORMATION: AAV.A+F-EGFP plasmid backbone

<400> SEQUENCE: 65

```
ggcgcctgat gcggtatttt ctccttacgc atctgtgcgg tatttcacac cgcatacgtc    60
aaagcaacca tagtacgcgc cctgtagcgg cgcattaagc gcggcgggtg tggtggttac   120
gcgcagcgtg accgctacac ttgccagcgc cctagcgccc gctcctttcg ctttcttccc   180
ttcctttctc gccacgttcg ccggctttcc ccgtcaagct ctaaatcggg gctcccttt    240
agggttccga tttagtgctt tacggcacct cgaccccaaa aaacttgatt tgggtgatgg   300
ttcacgtagt gggccatcgc cctgatagac ggttttttcgc cctttgacgt tggagtccac   360
gttctttaat agtggactct tgttccaaac tggaacaaca ctcaacccta tctcgggcta   420
ttcttttgat ttataaggga ttttgccgat ttcggcctat tggttaaaaa atgagctgat   480
ttaacaaaaa tttaacgcga attttaacaa aatattaacg tttacaattt tatggtgcac   540
tctcagtaca atctgctctg atgccgcata gttaagccag ccccgacacc cgccaacacc   600
cgctgacgcg ccctgacggg cttgtctgct cccggcatcc gcttacagac aagctgtgac   660
```

```
cgtctccggg agctgcatgt gtcagaggtt ttcaccgtca tcaccgaaac gcgcgagacg      720
aaagggcctc gtgatacgcc tatttttata ggttaatgtc atgataataa tggtttctta      780
gacgtcaggt ggcacttttc ggggaaatgt gcgcggaacc cctatttgtt tattttctta      840
aatacattca aatatgtatc cgctcatgag acaataaccc tgataaatgc ttcaataata      900
ttgaaaaagg aagagtatga gtattcaaca tttccgtgtc gcccttattc ccttttttgc      960
ggcattttgc cttcctgttt ttgctcaccc agaaacgctg gtgaaagtaa aagatgctga     1020
agatcagttg ggtgcacgag tgggttacat cgaactggat ctcaacagcg gtaagatcct     1080
tgagagtttt cgccccgaag aacgttttcc aatgatgagc acttttaaag ttctgctatg     1140
tggcgcggta ttatcccgta ttgacgccgg gcaagagcaa ctcggtcgcc gcatacacta     1200
ttctcagaat gacttggttg agtactcacc agtcacagaa aagcatctta cggatggcat     1260
gacagtaaga gaattatgca gtgctgccat aaccatgagt gataacactg cggccaactt     1320
acttctgaca acgatcggag gaccgaagga gctaaccgct ttttgcaca acatgggga      1380 tcatgtaact cgccttgatc gttgggaacc ggagctgaat gaagccatac caaacgacga     1440
gcgtgacacc acgatgcctg tagcaatggc aacaacgttg cgcaaactat taactggcga     1500
actacttact ctagcttccc ggcaacaatt aatagactgg atggaggcgg ataaagttgc     1560
aggaccactt ctgcgctcgg cccttccggc tggctggttt attgctgata atctggagc     1620 cggtgagcgt gggtctcgcg gtatcattgc agcactgggg ccagatggta agccctcccg     1680
tatcgtagtt atctcacacga cggggagtca ggcaactatg gatgaacgaa atagacagat     1740
cgctgagata ggtgcctcac tgattaagca ttggtaactg tcagaccaag tttactcata     1800
tatactttag attgatttaa aacttcattt ttaatttaaa aggatctagg tgaagatcct     1860
ttttgataat ctcatgacca aaatccctta acgtgagttt tcgttccact gagcgtcaga     1920
ccccgtagaa aagatcaaag gatcttcttg agatcctttt tttctgcgcg taatctgctg     1980
cttgcaaaca aaaaaaccac cgctaccagc ggtggtttgt ttgccggatc aagagctacc     2040
aactcttttt ccgaaggtaa ctggcttcag cagagcgcag ataccaaata ctgtccttct     2100
agtgtagccg tagttaggcc accacttcaa gaactctgta gcaccgccta catacctcgc     2160
tctgctaatc ctgttaccag tggctgctgc cagtggcgat aagtcgtgtc ttaccgggtt     2220
ggactcaaga cgatagttac cggataaggc gcagcggtcg ggctgaacgg ggggttcgtg     2280
cacacagccc agcttggagc gaacgaccta caccgaactg agatacctac agcgtgagct     2340
atgagaaagc gccacgcttc ccgaagggag aaaggcggac aggtatccgg taagcggcag     2400
ggtcggaaca ggagagcgca cgagggagct tccaggggga aacgcctggt atctttatag     2460
tcctgtcggg tttcgccacc tctgacttga gcgtcgattt ttgtgatgct cgtcaggggg     2520
gcggagccta tggaaaaacg ccagcaacgc ggccttttta cggttcctgg ccttttgctg     2580
gccttttgct cacatgtcct gcagg                                           2605
```

<210> SEQ ID NO 66
<211> LENGTH: 133
<212> TYPE: DNA
<213> ORGANISM: Artificial Sequence
<220> FEATURE:
<223> OTHER INFORMATION: AAV.CMV-EGFP L-ITR

<400> SEQUENCE: 66

```
cagctgcgcg ctcgctcgct cactgaggcc gcccgggcaa agcccgggcg tcgggcgacc       60
```

```
tttggtcgcc cggcctcagt gagcgagcga gcgcgcagag agggagtggc caactccatc    120
actaggggtt cct                                                      133

<210> SEQ ID NO 67
<211> LENGTH: 14
<212> TYPE: DNA
<213> ORGANISM: Artificial Sequence
<220> FEATURE:
<223> OTHER INFORMATION: AAV.CMV-EGFP plasmid

<400> SEQUENCE: 67
gcggccgcac gcgt                                                      14

<210> SEQ ID NO 68
<211> LENGTH: 664
<212> TYPE: DNA
<213> ORGANISM: Artificial Sequence
<220> FEATURE:
<223> OTHER INFORMATION: AAV.CMV-EGFP CMV promoter

<400> SEQUENCE: 68
ggagctagtt attaatagta atcaattacg gggtcattag ttcatagccc atatatggag     60
ttccgcgtta cataacttac ggtaaatggc ccgcctggct gaccgcccaa cgacccccgc    120
ccattgacgt caataatgac gtatgttccc atagtaacgt caatagggac tttccattga    180
cgtcaatggg tggagtattt acggtaaact gcccacttgg cagtacatca agtgtatcat    240
atgccaagta cgccccctat tgacgtcaat gacggtaaat ggcccgcctg gcattatgcc    300
cagtacatga ccttatggga ctttcctact tggcagtaca tctacgtatt agtcatcgct    360
attaccatgg tgatgcggtt ttggcagtac atcaatgggc gtggatagcg gtttgactca    420
cggggatttc caagtctcca ccccattgac gtcaatggga gtttgttttg gcaccaaaatc   480 aacgggactt tccaaaatgt cgtaacaact ccgccccatt gacgcaaatg ggcggtaggc    540
gtgtacggtg ggaggtctat ataagcagag ctcgtttagt gaaccgtcag atcgcctgga    600
gacgccatcc acgctgtttt gacctccata aaagacaccg ggaccgatcc agcctccgcg    660
gatt                                                                664

<210> SEQ ID NO 69
<211> LENGTH: 499
<212> TYPE: DNA
<213> ORGANISM: Artificial Sequence
<220> FEATURE:
<223> OTHER INFORMATION: AAV.CMV-EGFP beta-globin intron

<400> SEQUENCE: 69
cgaatcccgg ccgggaacgg tgcattggaa cgcggattcc ccgtgccaag agtgacgtaa     60
gtaccgccta tagagtctat aggcccacaa aaaatgcttt cttcttttaa tatactttttt   120 tgtttatctt atttctaata cttttcccta atctctttct tcagggcaat aatgatacaa    180
tgtatcatgc ctctttgcac cattctaaag aataacagtg ataatttctg ggttaaggca    240
atagcaatat ttctgcatat aaatatttct gcatataaat tgtaactgat gtaagaggtt    300
tcatattgct aatagcagct acaatccagc taccattctg cttttatttt atggttggga    360
taaggctgga ttattctgag tccaagctag gcccttttgc taatcatgtt catacctctt    420
atcttcctcc cacagctcct gggcaacgtg ctggtctgtg tgctggccca tcactttggc    480
aaagaattgg gattcgaac                                                499
```

```
<210> SEQ ID NO 70
<211> LENGTH: 63
<212> TYPE: DNA
<213> ORGANISM: Artificial Sequence
<220> FEATURE:
<223> OTHER INFORMATION: AAV.CMV-EGFP MCS

<400> SEQUENCE: 70
atcgattgaa ttccccgggg atcctctaga gtcgacctgc aagctgatcc accggtcgcc      60
acc                                                                   63

<210> SEQ ID NO 71
<211> LENGTH: 718
<212> TYPE: DNA
<213> ORGANISM: Artificial Sequence
<220> FEATURE:
<223> OTHER INFORMATION: AAV.CMV-EGFP EGFP

<400> SEQUENCE: 71
atggtgagca agggcgagga gctgttcacc ggggtggtgc ccatcctggt cgagctggac      60
ggcgacgtaa acggccacaa gttcagcgtg tccggcgagg gcgagggcga tgccacctac     120
ggcaagctga ccctgaagtt catctgcacc accggcaagc tgcccgtgcc ctggcccacc     180
ctcgtgacca ccctgaccta cggcgtgcag tgcttcagcc gctaccccga ccacatgaag     240
cagcacgact tcttcaagtc cgccatgccc gaaggctacg tccaggagcg caccatcttc     300
ttcaaggacg acggcaacta caagacccgc gccgaggtga agttcgaggg cgacaccctg     360
gtgaaccgca tcgagctgaa gggcatcgac ttcaaggagg acggcaacat cctggggcac     420
aagctggagt acaactacaa cagccacaac gtctatatca tggccgacaa gcagaagaac     480
ggcatcaagg tgaacttcaa gatccgccac aacatcgagg acggcagcgt gcagctcgcc     540
gaccactacc agcagaacac ccccatcggc gacggccccg tgctgctgcc cgacaaccac     600
tacctgagca cccagtccgc cctgagcaaa gaccccaacg agaagcgcga tcacatggtc     660
ctgctggagt tcgtgaccgc cgccgggatc actctcggca tggacgagct gtacaagt      718

<210> SEQ ID NO 72
<211> LENGTH: 42
<212> TYPE: DNA
<213> ORGANISM: Artificial Sequence
<220> FEATURE:
<223> OTHER INFORMATION: AAV.CMV-EGFP plasmid

<400> SEQUENCE: 72
aaagcggcca gcttgcctcg agcagcgctg ctcgagagat ct                         42

<210> SEQ ID NO 73
<211> LENGTH: 479
<212> TYPE: DNA
<213> ORGANISM: Artificial Sequence
<220> FEATURE:
<223> OTHER INFORMATION: AAV.CMV-EGFP hGH_PA_terminator

<400> SEQUENCE: 73
acgggtggca tccctgtgac ccctccccag tgcctctcct ggccctggaa gttgccactc      60
cagtgcccac cagccttgtc ctaataaaat taagttgcat cattttgtct gactaggtgt     120
ccttctataa tattatgggg tgagggggggg tggtatggag caaggggcaa gttgggaaga     180
caacctgtag ggcctgcggg gtctattggg aaccaagctg gagtgcagtg gcacaatctt     240
ggctcactgc aatctccgcc tcctgggttc aagcgattct cctgcctcag cctcccgagt     300
```

```
tgttgggatt ccaggcatgc atgaccaggc tcagctaatt tttgtttttt tggtagagac    360
ggggtttcac catattggcc aggctggtct ccaactccta atctcaggtg atctacccac    420
cttggcctcc caaattgctg ggattacagg cgtgaaccac tgctcccttc cctgtccctt    479
```

```
<210> SEQ ID NO 74
<211> LENGTH: 39
<212> TYPE: DNA
<213> ORGANISM: Artificial Sequence
<220> FEATURE:
<223> OTHER INFORMATION: AAV.CMV-EGFP plasmid

<400> SEQUENCE: 74
ctgattttgt aggtaaccac gtgcggaccg agcggccgc                            39
```

```
<210> SEQ ID NO 75
<211> LENGTH: 140
<212> TYPE: DNA
<213> ORGANISM: Artificial Sequence
<220> FEATURE:
<223> OTHER INFORMATION: AAV.CMV-EGFP R-ITR

<400> SEQUENCE: 75
aggaacccct agtgatggag ttggccactc cctctctgcg cgctcgctcg ctcactgagg     60
ccgggcgacc aaaggtcgcc cgacgcccgg gctttgcccg gcggcctca gtgagcgagc    120 gagcgcgcag ctgcctgagg                                                140
```

```
<210> SEQ ID NO 76
<211> LENGTH: 2605
<212> TYPE: DNA
<213> ORGANISM: Artificial Sequence
<220> FEATURE:
<223> OTHER INFORMATION: AAV.CMV-EGFP Plasmid backbone

<400> SEQUENCE: 76
ggcgcctgat gcggtatttt ctccttacgc atctgtgcgg tatttcacac cgcatacgtc     60
aaagcaacca tagtacgcgc cctgtagcgg cgcattaagc gcggcgggtg tggtggttac    120
gcgcagcgtg accgctacac ttgccagcgc cctagcgccc gctcctttcg ctttcttccc    180
ttcctttctc gccacgttcg ccggctttcc ccgtcaagct ctaaatcggg gctcccttt    240 agggttccga tttagtgctt tacggcacct cgaccccaaa aaacttgatt tgggtgatgg    300
ttcacgtagt gggccatcgc cctgatagac ggttttcgc cctttgacgt tggagtccac    360
gttctttaat agtggactct tgttccaaac tggaacaaca ctcaaccta tctcgggcta    420 ttcttttgat ttataaggga ttttgccgat ttcggcctat tggttaaaaa atgagctgat    480
ttaacaaaaa tttaacgcga attttaacaa aatattaacg tttacaattt tatggtgcac    540
tctcagtaca atctgctctg atgccgcata gttaagccag ccccgacacc cgccaacacc    600
cgctgacgcg ccctgacggg cttgtctgct cccggcatcc gcttacagac aagctgtgac    660
cgtctccggg agctgcatgt gtcagaggtt ttcaccgtca tcaccgaaac gcgcgagacg    720
aaagggcctc gtgatacgcc tatttttata ggttaatgtc atgataataa tggtttctta    780
gacgtcaggt ggcactttc ggggaaatgt gcgcggaacc cctatttgtt tatttttcta    840
aatacattca aatatgtatc cgctcatgag acaataaccc tgataaatgc ttcaataata    900
ttgaaaaagg aagagtatga gtattcaaca tttccgtgtc gcccttattc ccttttttgc    960 ggcatttgc cttcctgttt ttgctcaccc agaaacgctg gtgaaagtaa aagatgctga   1020
agatcagttg ggtgcacgag tgggttacat cgaactggat ctcaacagcg gtaagatcct   1080
```

```
tgagagtttt cgccccgaag aacgttttcc aatgatgagc acttttaaag ttctgctatg   1140
tggcgcggta ttatcccgta ttgacgccgg gcaagagcaa ctcggtcgcc gcatacacta   1200
ttctcagaat gacttggttg agtactcacc agtcacagaa aagcatctta cggatggcat   1260
gacagtaaga gaattatgca gtgctgccat aaccatgagt gataacactg cggccaactt   1320
acttctgaca acgatcggag gaccgaagga gctaaccgct tttttgcaca acatgggga    1380 tcatgtaact cgccttgatc gttgggaacc ggagctgaat gaagccatac caaacgacga   1440
gcgtgacacc acgatgcctg tagcaatggc aacaacgttg cgcaaactat taactggcga   1500
actacttact ctagcttccc ggcaacaatt aatagactgg atggaggcgg ataaagttgc   1560
aggaccactt ctgcgctcgg cccttccggc tggctggttt attgctgata atctggagc    1620 cggtgagcgt gggtctcgcg gtatcattgc agcactgggg ccagatggta agccctcccg   1680
tatcgtagtt atctacacga cggggagtca ggcaactatg gatgaacgaa atagacagat   1740
cgctgagata ggtgcctcac tgattaagca ttggtaactg tcagaccaag tttactcata   1800
tatactttag attgatttaa aacttcattt ttaatttaaa aggatctagg tgaagatcct   1860
ttttgataat ctcatgacca aaatccctta acgtgagttt cgttccact gagcgtcaga    1920 ccccgtagaa aagatcaaag gatcttcttg agatcctttt tttctgcgcg taatctgctg   1980
cttgcaaaca aaaaaaccac cgctaccagc ggtggtttgt ttgccggatc aagagctacc   2040
aactcttttt ccgaaggtaa ctggcttcag cagagcgcag ataccaaata ctgtccttct   2100
agtgtagccg tagttaggcc accacttcaa gaactctgta gcaccgccta catacctcgc   2160
tctgctaatc ctgttaccag tggctgctgc cagtggcgat aagtcgtgtc ttaccgggtt   2220
ggactcaaga cgatagttac cggataaggc gcagcggtcg ggctgaacgg ggggttcgtg   2280
cacacagccc agcttggagc gaacgaccta caccgaactg agatacctac agcgtgagct   2340
atgagaaagc gccacgcttc ccgaagggag aaaggcggac aggtatccgg taagcggcag   2400
ggtcggaaca ggagagcgca cgagggagct tccagggga aacgcctggt atctttatag   2460
tcctgtcggg tttcgccacc tctgacttga gcgtcgattt ttgtgatgct cgtcaggggg   2520
gcggagccta tggaaaaacg ccagcaacgc ggcctttta cggttcctgg ccttttgctg    2580
gccttttgct cacatgtcct gcagg                                         2605
```

<210> SEQ ID NO 77
<211> LENGTH: 133
<212> TYPE: DNA
<213> ORGANISM: Artificial Sequence
<220> FEATURE:
<223> OTHER INFORMATION: AAV.A-EGFP L-ITR

<400> SEQUENCE: 77

```
cagctgcgcg ctcgctcgct cactgaggcc gcccgggcaa agcccgggcg tcgggcgacc     60
tttggtcgcc cggcctcagt gagcgagcga gcgcgcagag agggagtggc caactccatc    120
actaggggtt cct                                                       133
```

<210> SEQ ID NO 78
<211> LENGTH: 14
<212> TYPE: DNA
<213> ORGANISM: Artificial Sequence
<220> FEATURE:
<223> OTHER INFORMATION: AAV.A-EGFP plasmid

<400> SEQUENCE: 78
gcggccgcac gcgt 14

<210> SEQ ID NO 79
<211> LENGTH: 37
<212> TYPE: DNA
<213> ORGANISM: Artificial Sequence
<220> FEATURE:
<223> OTHER INFORMATION: AAV.A-EGFP spacer

<400> SEQUENCE: 79
ctctgacgca gcgtcgattc cccttccctc ctcggtc 37

<210> SEQ ID NO 80
<211> LENGTH: 195
<212> TYPE: DNA
<213> ORGANISM: Artificial Sequence
<220> FEATURE:
<223> OTHER INFORMATION: AAV.A-EGFP Conserved region A

<400> SEQUENCE: 80
ccctgccccg ccctctcac tgcggcggag ccggtcggcc gggggggccgc aggggaggag 60 gcggagaggg cggggccctc ctccccaccc tctcactgcc aaggggttgg acccggccgc 120
ggcggctata aaagggccgg cgccctggtg ctgccgcagt gcctcccgcc ccgtcccggc 180
ctcgcgcacc tgctc 195

<210> SEQ ID NO 81
<211> LENGTH: 65
<212> TYPE: DNA
<213> ORGANISM: Artificial Sequence
<220> FEATURE:
<223> OTHER INFORMATION: AAV.A-EGFP plasmid spacer

<400> SEQUENCE: 81
aggccgataa ttccccgggg atcctctaga gtcgacctgc agaagctgat ccaccggtcg 60
ccacc 65

<210> SEQ ID NO 82
<211> LENGTH: 718
<212> TYPE: DNA
<213> ORGANISM: Artificial Sequence
<220> FEATURE:
<223> OTHER INFORMATION: AAV.A-EGFP EGFP

<400> SEQUENCE: 82
atggtgagca agggcgagga gctgttcacc ggggtggtgc ccatcctggt cgagctggac 60
ggcgacgtaa acggccacaa gttcagcgtg tccggcgagg gcgagggcga tgccacctac 120
ggcaagctga ccctgaagtt catctgcacc accggcaagc tgcccgtgcc ctggcccacc 180
ctcgtgacca ccctgaccta cggcgtgcag tgcttcagcc gctaccccga ccacatgaag 240
cagcacgact tcttcaagtc cgccatgccc gaaggctacg tccaggagcg caccatcttc 300
ttcaaggacg acggcaacta caagacccgc gccgaggtga agttcgaggg cgacaccctg 360
gtgaaccgca tcgagctgaa gggcatcgac ttcaaggagg acggcaacat cctggggcac 420
aagctggagt acaactacaa cagccacaac gtctatatca tggccgacaa gcagaagaac 480
ggcatcaagg tgaacttcaa gatccgccac aacatcgagg acggcagcgt gcagctcgcc 540
gaccactacc agcagaacac ccccatcggc gacggccccg tgctgctgcc cgacaaccac 600
tacctgagca cccagtccgc cctgagcaaa gaccccaacg agaagcgcga tcacatggtc 660
ctgctggagt tcgtgaccgc cgccgggatc actctcggca tggacgagct gtacaagt 718

<210> SEQ ID NO 83
<211> LENGTH: 42
<212> TYPE: DNA
<213> ORGANISM: Artificial Sequence
<220> FEATURE:
<223> OTHER INFORMATION: AAV.A-EGFP plasmid

<400> SEQUENCE: 83
aaagcggcca gcttgcctcg agcagcgctg ctcgagagat ct        42

<210> SEQ ID NO 84
<211> LENGTH: 479
<212> TYPE: DNA
<213> ORGANISM: Artificial Sequence
<220> FEATURE:
<223> OTHER INFORMATION: AAV.A-EGFP hGH_PA_terminator

<400> SEQUENCE: 84
acgggtggca tccctgtgac ccctccccag tgcctctcct ggccctggaa gttgccactc    60
cagtgcccac cagccttgtc ctaataaaat taagttgcat cattttgtct gactaggtgt   120
ccttctataa tattatgggg tggagggggg tggtatggag caaggggcaa gttgggaaga   180
caacctgtag ggcctgcggg gtctattggg aaccaagctg gagtgcagtg cacaatctt    240 ggctcactgc aatctccgcc tcctgggttc aagcgattct cctgcctcag cctcccgagt   300
tgttgggatt ccaggcatgc atgaccaggc tcagctaatt tttgtttttt tggtagagac   360 ggggttttcac catattggcc aggctggtct ccaactccta atctcaggtg atctaccccac   420 cttggcctcc caaattgctg ggattacagg cgtgaaccac tgctcccttc cctgtcctt    479

<210> SEQ ID NO 85
<211> LENGTH: 39
<212> TYPE: DNA
<213> ORGANISM: Artificial Sequence
<220> FEATURE:
<223> OTHER INFORMATION: AAV.A-EGFP plasmid

<400> SEQUENCE: 85
ctgattttgt aggtaaccac gtgcggaccg agcggccgc        39

<210> SEQ ID NO 86
<211> LENGTH: 140
<212> TYPE: DNA
<213> ORGANISM: Artificial Sequence
<220> FEATURE:
<223> OTHER INFORMATION: AAV.A-EGFP R-ITR

<400> SEQUENCE: 86
aggaacccct agtgatggag ttggccactc cctctctgcg cgctcgctcg ctcactgagg    60
ccgggcgacc aaaggtcgcc cgacgcccgg gctttgcccg gcggcctca gtgagcgagc    120 gagcgcgcag ctgcctgagg                                                140

<210> SEQ ID NO 87
<211> LENGTH: 2605
<212> TYPE: DNA
<213> ORGANISM: Artificial Sequence
<220> FEATURE:
<223> OTHER INFORMATION: AAV.A-EGFP Plasmid backbone

<400> SEQUENCE: 87
ggcgcctgat gcggtatttt ctccttacgc atctgtgcgg tatttcacac cgcatacgtc    60

```
aaagcaacca tagtacgcgc cctgtagcgg cgcattaagc gcggcgggtg tggtggttac    120
gcgcagcgtg accgctacac ttgccagcgc cctagcgccc gctcctttcg ctttcttccc    180
ttcctttctc gccacgttcg ccggctttcc ccgtcaagct ctaaatcggg ggctcccttt    240
agggttccga tttagtgctt tacggcacct cgaccccaaa aaacttgatt tgggtgatgg    300
ttcacgtagt gggccatcgc cctgatagac ggttttcgc cctttgacgt tggagtccac     360
gttctttaat agtggactct tgttccaaac tggaacaaca ctcaacccta tctcgggcta    420
ttcttttgat ttataaggga ttttgccgat ttcggcctat tggttaaaaa atgagctgat    480
ttaacaaaaa tttaacgcga attttaacaa aatattaacg tttacaattt tatggtgcac    540
tctcagtaca atctgctctg atgccgcata gttaagccag ccccgacacc cgccaacacc    600
cgctgacgcg ccctgacggg cttgtctgct cccggcatcc gcttacagac aagctgtgac    660
cgtctccggg agctgcatgt gtcagaggtt ttcaccgtca tcaccgaaac gcgcgagacg    720
aaagggcctc gtgatacgcc tatttttata ggttaatgtc atgataataa tggtttctta    780
gacgtcaggt ggcacttttc ggggaaatgt gcgcggaacc cctatttgtt tattttttcta   840 aatacattca aatatgtatc cgctcatgag acaataaccc tgataaatgc ttcaataata    900
ttgaaaaagg aagagtatga gtattcaaca tttccgtgtc gcccttattc ccttttttgc    960
ggcattttgc cttcctgttt ttgctcaccc agaaacgctg gtgaaagtaa aagatgctga    1020
agatcagttg ggtgcacgag tgggttacat cgaactggat ctcaacagcg gtaagatcct    1080
tgagagtttt cgccccgaag aacgttttcc aatgatgagc acttttaaag ttctgctatg    1140
tggcgcggta ttatcccgta ttgacgccgg gcaagagcaa ctcggtcgcc gcatacacta    1200
ttctcagaat gacttggttg agtactcacc agtcacagaa aagcatctta cggatggcat    1260
gacagtaaga gaattatgca gtgctgccat aaccatgagt gataacactg cggccaactt    1320
acttctgaca acgatcggag gaccgaagga gctaaccgct ttttgcaca acatggggga    1380 tcatgtaact cgccttgatc gttgggaacc ggagctgaat gaagccatac caaacgacga    1440
gcgtgacacc acgatgcctg tagcaatggc aacaacgttg cgcaaactat taactggcga    1500
actacttact ctagcttccc ggcaacaatt aatagactgg atggaggcgg ataaagttgc    1560
aggaccactt ctgcgctcgg cccttccggc tggctggttt attgctgata aatctggagc    1620
cggtgagcgt gggtctcgcg gtatcattgc agcactgggg ccagatggta agccctcccg    1680
tatcgtagtt atctacacga cggggagtca ggcaactatg gatgaacgaa atagacagat    1740
cgctgagata ggtgcctcac tgattaagca ttggtaactg tcagaccaag tttactcata    1800
tatactttag attgatttaa aacttcattt ttaatttaaa aggatctagg tgaagatcct    1860
ttttgataat ctcatgacca aaatccctta acgtgagttt tcgttccact gagcgtcaga    1920
ccccgtagaa aagatcaaag gatcttcttg agatcctttt tttctgcgcg taatctgctg    1980
cttgcaaaca aaaaaaccac cgctaccagc ggtggtttgt ttgccggatc aagagctacc    2040
aactcttttt ccgaaggtaa ctggcttcag cagagcgcag ataccaaata ctgtccttct    2100
agtgtagccg tagttaggcc accacttcaa gaactctgta gcaccgccta catacctcgc    2160
tctgctaatc ctgttaccag tggctgctgc cagtggcgat aagtcgtgtc ttaccgggtt    2220
ggactcaaga cgatagttac cggataaggc gcagcggtcg ggctgaacgg ggggttcgtg    2280
cacacagccc agcttggagc gaacgaccta caccgaactg agatacctac agcgtgagct    2340
atgagaaagc gccacgcttc ccgaagggag aaaggcggac aggtatccgg taagcggcag    2400
ggtcggaaca ggagagcgca cgagggagct tccaggggga aacgcctggt atctttatag    2460
```

```
tcctgtcggg tttcgccacc tctgacttga gcgtcgattt ttgtgatgct cgtcaggggg    2520
gcggagccta tggaaaaacg ccagcaacgc ggccttttta cggttcctgg ccttttgctg    2580
gccttttgct cacatgtcct gcagg                                          2605
```

<210> SEQ ID NO 88
<211> LENGTH: 133
<212> TYPE: DNA
<213> ORGANISM: Artificial Sequence
<220> FEATURE:
<223> OTHER INFORMATION: AAV.A-spacer-F-EGFP L-ITR

<400> SEQUENCE: 88

```
cagctgcgcg ctcgctcgct cactgaggcc gcccgggcaa agcccggcg tcgggcgacc     60 tttggtcgcc cggcctcagt gagcgagcga gcgcgcagag agggagtggc caactccatc   120 actagggtt cct                                                       133
```

<210> SEQ ID NO 89
<211> LENGTH: 28
<212> TYPE: DNA
<213> ORGANISM: Artificial Sequence
<220> FEATURE:
<223> OTHER INFORMATION: AAV.A-spacer-F-EGFP plasmid

<400> SEQUENCE: 89

```
gcggccgcac gcgtctagtc atctcagt                                       28
```

<210> SEQ ID NO 90
<211> LENGTH: 360
<212> TYPE: DNA
<213> ORGANISM: Artificial Sequence
<220> FEATURE:
<223> OTHER INFORMATION: AAV.A-spacer-F-EGFP Conserved region F

<400> SEQUENCE: 90

```
tgctgtcagc tgcttgtgag ccttctcaca tccagagaat gtatcagcat tgtgcagact    60
gaaaagaccc agaggaacaa ggctccaatg gcaaaattcc aagtagaatg acaaataaat   120
ggggagccat ctgagagcaa gggagtcctg cccaacaccc gccccatgcc tttctcaggg   180
acctcagacc agccactcac ctccatcctc ccagcaccac ctgcaaccag ccccttgccc   240 tctgcaaaact ggagcacgac tggatcttta gatgggggaa aaatgcttca tcatgttctg   300
ctgcttcatg caaaaccaga aactccctcc ccctcttccc tcctcccagc gcactctcct    360
```

<210> SEQ ID NO 91
<211> LENGTH: 16
<212> TYPE: DNA
<213> ORGANISM: Artificial Sequence
<220> FEATURE:
<223> OTHER INFORMATION: AAV.A-spacer-F-EGFP plasmid

<400> SEQUENCE: 91

```
tccagtaagt ttaaac                                                    16
```

<210> SEQ ID NO 92
<211> LENGTH: 1866
<212> TYPE: DNA
<213> ORGANISM: Artificial Sequence
<220> FEATURE:
<223> OTHER INFORMATION: AAV.A-spacer-F-EGFP spacer

<400> SEQUENCE: 92

```
aggcatttat actccgctgg aagcgcgtgt gtattgctca caataattgc atgagttgcc        60
catcgatatg ggcaactcta tctgcactgc tcattaatat acttctgggt tccttccagt       120
tgttttttgca tagtgatcag cctctctctg agggtgaaat aatcccgttc agcggtgtct      180
gccagtcggg gggaggctgc attatccacg ccggaggcgg tggtggcttc acgcactgac      240
tgacagactg ctttgatgtg caaccgacga cgaccagcgg caacatcatc acgcagagca     300
tcattttcag ctttagcatc agctaactcc ttcgtgtatt ttgcatcgag cgcagcaaca       360
tcacgctgac gcatctgcat gtcagtaatt gccgcgttcg ccagcttcag ttctctggca      420
tttttgtcgc gctgggcttt gtaggtaatg gcgttatcac ggtaatgatt aacagcccat      480
gacaggcaga cgatgatgca gataaccaga gcggagataa tcgcggtgac tctgctcata    540
catcaatctc tctgaccgtt ccgcccgctt ctttgaattt tgcaatcagg ctgtcagcct      600
tatgctcgaa ctgaccataa ccagcgcccg gcagtgaagc ccagatattg ctgcaacggt     660
cgattgcctg acggatatca ccacgatcaa tcataggtaa agcgccacgc tccttaatct     720
gctgcaatgc cacagcgtcc tgacttttcg gagagaagtc tttcaggcca agctgcttgc    780
ggtaggcatc ccaccaacgg gaaagaagct ggtagcgtcc ggcgcctgtt gatttgagtt     840
ttgggtttag cgtgacaagt ttgcgagggt gatcggagta atcagtaaat agctctccgc     900
ctacaatgac gtcataacca tgatttctgg ttttctgacg tccgttatca gttccctccg     960
accacgccag catatcgagg aacgcctac gttgattatt gatttctacc atcttctact      1020
ccggcttttt tagcagcgaa gcgtttgata agcgaaccaa tcgagtcagt accgatgtag    1080
ccgataaaca cgctcgttat ataagcgaga ttgctactta gtccggcgaa gtcgagaagg    1140
tcacgaatga accaggcgat aatggcgcac atcgttgcgt cgattactgt ttttgtaaac    1200
gcaccgccat tatatctgcc gcgaaggtac gccattgcaa acgcaaggat tgccccgatg    1260
ccttgttcct ttgccgcgag aatggcggcc aacaggtcat gttttctgg catcttcatg     1320
tcttacccc aataagggga tttgctctat ttaattagga ataaggtcga ttactgatag     1380
aacaaatcca ggctactgtg tttagtaatc agatttgttc gtgaccgata tgcacgggca     1440
aaacggcagg aggttgttag cgcgaccttc tgccacccgc tttcacgaag gtcatgtgta   1500
aaaggccgca gcgtaactat tactaatgaa ttcaggacag acagtggcta cggctcagtt    1560
tgggttgtgc tgttgctggg cggcgatgac gcctgtacgc atttggtgat ccggttctgc    1620
ttccggtatt cgcttaattc agcacaacgg aaagagcact ggctaaccag gctcgccgac    1680
tcttcacgat tatcgactca atgctcttac ctgttgtgca gatataaaaa atcccgaaac    1740
cgttatgcag gctctaacta ttacctgcga actgtttcgg gattgcattt tgcagacctc    1800
tctgcctgcg atggttggag ttccagacga tacgtcgaag tgaccaacta ggcggaatcg    1860
gtagta                                                              1866
```

```
<210> SEQ ID NO 93
<211> LENGTH: 22
<212> TYPE: DNA
<213> ORGANISM: Artificial Sequence
<220> FEATURE:
<223> OTHER INFORMATION: AAV.A-spacer-F-EGFP plasmid

<400> SEQUENCE: 93
gtttaaactt ccctcctcgg tc                                               22

<210> SEQ ID NO 94
<211> LENGTH: 195
```

```
<212> TYPE: DNA
<213> ORGANISM: Artificial Sequence
<220> FEATURE:
<223> OTHER INFORMATION: AAV.A-spacer-F-EGFP Conserved region A

<400> SEQUENCE: 94
ccctgccccg cccctctcac tgcggcggag ccggtcggcc gggggggccgc aggggaggag    60 gcggagaggg cggggccctc ctccccaccc tctcactgcc aaggggttgg acccggccgc   120
ggcggctata aaagggccgg cgccctggtg ctgccgcagt gcctcccgcc ccgtcccggc   180
ctcgcgcacc tgctc                                                    195

<210> SEQ ID NO 95
<211> LENGTH: 72
<212> TYPE: DNA
<213> ORGANISM: Artificial Sequence
<220> FEATURE:
<223> OTHER INFORMATION: AAV.A-spacer-F-EGFP plasmid

<400> SEQUENCE: 95
tcacgtgatc agagataatt ccccggggat cctctagagc gacgtgcaga agctgatcca    60
ccggtcgcca cc                                                       72

<210> SEQ ID NO 96
<211> LENGTH: 718
<212> TYPE: DNA
<213> ORGANISM: Artificial Sequence
<220> FEATURE:
<223> OTHER INFORMATION: AAV.A-spacer-F-EGFP EGFP

<400> SEQUENCE: 96
atggtgagca agggcgagga gctgttcacc ggggtggtgc ccatcctggt cgagctggac    60
ggcgacgtaa acggccacaa gttcagcgtg tccggcgagg gcgagggcga tgccacctac   120
ggcaagctga ccctgaagtt catctgcacc accggcaagc tgcccgtgcc ctggcccacc   180
ctcgtgacca ccctgaccta cggcgtgcag tgcttcagcc gctaccccga ccacatgaag   240
cagcacgact tcttcaagtc cgccatgccc gaaggctacg tccaggagcg caccatcttc   300
ttcaaggacg acggcaacta caagacccgc gccgaggtga agttcgaggg cgacaccctg   360
gtgaaccgca tcgagctgaa gggcatcgac ttcaaggagg acggcaacat cctggggcac   420
aagctggagt acaactacaa cagccacaac gtctatatca tggccgacaa gcagaagaac   480
ggcatcaagg tgaacttcaa gatccgccac aacatcgagg acggcagcgt gcagctcgcc   540
gaccactacc agcagaacac ccccatcggc gacggccccg tgctgctgcc cgacaaccac   600
tacctgagca cccagtccgc cctgagcaaa gaccccaacg agaagcgcga tcacatggtc   660
ctgctggagt tcgtgaccgc cgccgggatc actctcggca tggacgagct gtacaagt    718

<210> SEQ ID NO 97
<211> LENGTH: 42
<212> TYPE: DNA
<213> ORGANISM: Artificial Sequence
<220> FEATURE:
<223> OTHER INFORMATION: AAV.A-spacer-F-EGFP plasmid

<400> SEQUENCE: 97
aaagcggcca gcttgcctcg agcagcgctg ctcgagagat ct                      42

<210> SEQ ID NO 98
<211> LENGTH: 479
<212> TYPE: DNA
```

<213> ORGANISM: Artificial Sequence
<220> FEATURE:
<223> OTHER INFORMATION: AAV.A-spacer-F-EGFP hGH_PA_terminator

<400> SEQUENCE: 98

```
acgggtggca tccctgtgac ccctccccag tgcctctcct ggccctggaa gttgccactc    60
cagtgcccac cagccttgtc ctaataaaat taagttgcat cattttgtct gactaggtgt   120
ccttctataa tattatgggg tggaggggg tggtatggag caaggggcaa gttgggaaga   180
caacctgtag ggcctgcggg gtctattggg aaccaagctg gagtgcagtg cacaatctt   240
ggctcactgc aatctccgcc tcctgggttc aagcgattct cctgcctcag cctcccgagt   300
tgttgggatt ccaggcatgc atgaccaggc tcagctaatt tttgtttttt tggtagagac   360
ggggtttcac catattggcc aggctggtct ccaactccta atctcaggtg atctacccac   420
cttggcctcc caaattgctg ggattacagg cgtgaaccac tgctcccttc cctgtccctt   479
```

<210> SEQ ID NO 99
<211> LENGTH: 39
<212> TYPE: DNA
<213> ORGANISM: Artificial Sequence
<220> FEATURE:
<223> OTHER INFORMATION: AAV.A-spacer-F-EGFP Plasmid

<400> SEQUENCE: 99

```
ctgattttgt aggtaaccac gtgcggaccg agcggccgc                           39
```

<210> SEQ ID NO 100
<211> LENGTH: 140
<212> TYPE: DNA
<213> ORGANISM: Artificial Sequence
<220> FEATURE:
<223> OTHER INFORMATION: AAV.A-spacer-F-EGFP R-ITR

<400> SEQUENCE: 100

```
aggaacccct agtgatggag ttggccactc cctctctgcg cgctcgctcg ctcactgagg    60
ccgggcgacc aaaggtcgcc cgacgcccgg gctttgcccg ggcggcctca gtgagcgagc   120
gagcgcgcag ctgcctgagg                                              140
```

<210> SEQ ID NO 101
<211> LENGTH: 2605
<212> TYPE: DNA
<213> ORGANISM: Artificial Sequence
<220> FEATURE:
<223> OTHER INFORMATION: AAV.A-spacer-F-EGFP Plasmid backbone

<400> SEQUENCE: 101

```
ggcgcctgat gcggtatttt ctccttacgc atctgtgcgg tatttcacac cgcatacgtc    60
aaagcaacca tagtacgcgc cctgtagcgg cgcattaagc gcggcgggtg tggtggttac   120
gcgcagcgtg accgctacac ttgccagcgc cctagcgccc gctccttcg ctttcttccc   180
ttcctttctc gccacgttcg ccggctttcc ccgtcaagct ctaaatcggg gctccctt    240
agggttccga tttagtgctt tacggcacct cgaccccaaa aaacttgatt tgggtgatgg   300
ttcacgtagt gggccatcgc cctgatagac ggttttcgc cctttgacgt tggagtccac   360
gttctttaat agtggactct tgttccaaac tggaacaaca ctcaacccta tctcgggcta   420
ttcttttgat ttataaggga ttttgccgat ttcggcctat tggttaaaaa atgagctgat   480
ttaacaaaaa tttaacgcga attttaacaa aatattaacg tttacaattt tatggtgcac   540
tctcagtaca atctgctctg atgccgcata gttaagccag ccccgacacc cgccaacacc   600
```

```
cgctgacgcg ccctgacggg cttgtctgct cccggcatcc gcttacagac aagctgtgac    660
cgtctccggg agctgcatgt gtcagaggtt ttcaccgtca tcaccgaaac gcgcgagacg    720
aaagggcctc gtgatacgcc tattttata ggttaatgtc atgataataa tggtttctta    780
gacgtcaggt ggcactttc ggggaaatgt gcgcggaacc cctatttgtt tatttttcta    840
aatacattca aatatgtatc cgctcatgag acaataaccc tgataaatgc ttcaataata    900
ttgaaaaagg aagagtatga gtattcaaca tttccgtgtc gcccttattc cttttttgc    960 ggcattttgc cttcctgttt ttgctcaccc agaaacgctg gtgaaagtaa aagatgctga   1020
agatcagttg ggtgcacgag tgggttacat cgaactggat ctcaacagcg gtaagatcct   1080
tgagagtttt cgccccgaag aacgttttcc aatgatgagc acttttaaag ttctgctatg   1140
tggcgcggta ttatcccgta ttgacgccgg gcaagagcaa ctcggtcgcc gcatacacta   1200
ttctcagaat gacttggttg agtactcacc agtcacagaa aagcatctta cggatggcat   1260
gacagtaaga gaattatgca gtgctgccat aaccatgagt gataacactg cggccaactt   1320
acttctgaca acgatcggag gaccgaagga gctaaccgct tttttgcaca acatggggga   1380
tcatgtaact cgccttgatc gttgggaacc ggagctgaat gaagccatac caaacgacga   1440
gcgtgacacc acgatgcctg tagcaatggc aacaacgttg cgcaaactat taactggcga   1500
actacttact ctagcttccc ggcaacaatt aatagactgg atggaggcgg ataaagttgc   1560
aggaccactt ctgcgctcgg cccttccggc tggctggttt attgctgata atctggagc    1620 cggtgagcgt gggtctcgcg gtatcattgc agcactgggg ccagatggta agccctcccg   1680
tatcgtagtt atctacacga cggggagtca ggcaactatg gatgaacgaa atagacagat   1740
cgctgagata ggtgcctcac tgattaagca ttggtaactg tcagaccaag tttactcata   1800
tatactttag attgatttaa aacttcattt ttaatttaaa aggatctagg tgaagatcct   1860
ttttgataat ctcatgacca aaatccctta acgtgagttt tcgttccact gagcgtcaga   1920
ccccgtagaa aagatcaaag gatcttcttg agatcctttt tttctgcgcg taatctgctg   1980
cttgcaaaca aaaaaaccac cgctaccagc ggtggtttgt ttgccggatc aagagctacc   2040
aactcttttt ccgaaggtaa ctggcttcag cagagcgcag ataccaaata ctgtccttct   2100
agtgtagccg tagttaggcc accacttcaa gaactctgta gcaccgccta catacctcgc   2160
tctgctaatc ctgttaccag tggctgctgc cagtggcgat aagtcgtgtc ttaccgggtt   2220
ggactcaaga cgatagttac cggataaggc gcagcggtcg ggctgaacgg ggggttcgtg   2280
cacacagccc agcttggagc gaacgaccta caccgaactg agatacctac agcgtgagct   2340
atgagaaagc gccacgcttc ccgaagggag aaaggcggac aggtatccgg taagcggcag   2400
ggtcggaaca ggagagcgca cgagggagct tccaggggga aacgcctggt atctttatag   2460
tcctgtcggg tttcgccacc tctgacttga gcgtcgattt ttgtgatgct cgtcaggggg   2520
gcggagccta tggaaaaacg ccagcaacgc ggccttttta cggttcctgg ccttttgctg   2580
gccttttgct cacatgtcct gcagg                                         2605
```

<210> SEQ ID NO 102
<211> LENGTH: 133
<212> TYPE: DNA
<213> ORGANISM: Artificial Sequence
<220> FEATURE:
<223> OTHER INFORMATION: AAV.huNEFH-EGFP L-ITR

<400> SEQUENCE: 102

-continued

```
cagctgcgcg ctcgctcgct cactgaggcc gcccgggcaa agcccgggcg tcggcgacc      60 tttggtcgcc cggcctcagt gagcgagcga gcgcgcagag agggagtggc caactccatc     120
actaggggtt cct                                                        133

<210> SEQ ID NO 103
<211> LENGTH: 24
<212> TYPE: DNA
<213> ORGANISM: Artificial Sequence
<220> FEATURE:
<223> OTHER INFORMATION: AAV.huNEFH-EGFP Plasmid/spacer

<400> SEQUENCE: 103
gcggccgcac gcgttaagac gcgt                                             24

<210> SEQ ID NO 104
<211> LENGTH: 2448
<212> TYPE: DNA
<213> ORGANISM: Artificial Sequence
<220> FEATURE:
<223> OTHER INFORMATION: AAV.huNEFH-EGFP huNEFH with conserved regions
      F, D and A highlighted

<400> SEQUENCE: 104
tgctgtcagc tgcttgtgag ccttctcaca tccagagaat gtatcagcat tgtgcagact      60
gaaaagaccc agaggaacaa ggctccaatg gcaaaattcc aagtagaatg acaaataaat     120
ggggagccat ctgagagcaa gggagtcctg cccaacaccc gccccatgcc tttctcaggg     180
acctcagacc agccactcac ctccatcctc ccagcaccac ctgcaaccag ccccttgccc     240
tctgcaaact ggagcacgac tggatcttta gatgggggaa aaatgcttca tcatgttctg     300
ctgcttcatg caaaaccaga aactccctcc ccctcttccc tcctcccagc gcactctcct     360
tccagtaaaa agtggttaaa gggacagcgc catcaatttc ccagctctga gggtctgctt     420
agaactaggg ggctggaagg agacagaggg caaagagaaa ggaactggca gaggtctttc     480
ctgggggata tgtctgttct gtcctgggga tcctggagca ggaaaacccg cgtaaagtag     540
gggtgtagtg ggtgttgaga taactgcctg ggggaggttc agagtggaag tacgagtcta     600
caaactctca agggcgtctc agggctccca gcatcccag gggtcctttc gcaggggtcc     660
ctaagcagga ggggaacagc ccagaaaaca cggaactgga cccccgacag gaagtccagg     720
gaggggtccc tggctcacta tgtgaccctg ctggatcact tgcctcccct ctcgggtccc     780
ctcagcacag tgtccctccc ttccttcccc taaagtaaaa gcagagggtt aatctctttc     840
cccgccccac gcccaacaaa gagcaggccc tgtccccggt gctgaagcgc cagccgcagc     900
accaccccca ctcccacagc ataaaacatg agccaaaacc aataaagagc caaatgtcac     960
agccgttgca gggcccccta aatcctgggg accccttctt ctacctgaca tcctattggg    1020
gtgagggact ttggtactca gaaagcatct catcacttcc ctgtaagaga aagggatgc     1080 cgactcaggc gcctgcttgt ctgttacagg agtgggggaa gagaggacaa gttgaggctg    1140
agaagatggg gaggggagg gagaaaagag gacttcctag tgttgacaga acggcaagat    1200
gtgggttccc catccccagt tcagccagag acccctcaaa gtggaacttc ctggggcagt    1260 cggggggtcag gagttggagc ttgtctctgg ggcaagaccc cttcgttgta cagatggaaa    1320
aacaagggtg ggaggacaca gcttgtccaa ggtcattcga ccagcaaact gcctagctga    1380
ccccagtgtg cagaagctgg ctcgggtgac acccatcatt tccccccacc ccacacaggg    1440
gccagctctc tcaacttcat gcccaagccc tcctacggta cccccactgt aggttctctg    1500
```

```
cccctcaaac tcagcccagc tttctcctgc ctgttcaggg gaccttctgc ccgcttcgct    1560
gagggtccgt cccctttact ggggctggca gcagggtctc ccatctcctc tctcggggc     1620 cactgcagac tttttagaga acgccttgcc tcccccaac  cccacccatc cggggttccc    1680
tctctccatc ctctgcagtg tctcccatac ccccattcag ggtagccttg ctattctccc    1740
caactccagg tccccttca  tctattccgg ggctggccgc ggagtttcct gagcgctctc    1800
caagtgggtc ctctagatgt taggagaaca ctgtacctcc cccggtcagg ggtctcctgt    1860
ctccgttcta tggagcgtcc atgctcccat tcaggactgc cttgctccct cctctgttcc    1920
ggggctggct gcacagtctc tgcacccct  atcctgaaag cctctcttaa ctatttggaa    1980
agcctcgtgt cctgtctcat acagggatcc cctcatccta atgactgcaa tcttccattg    2040
ctccatcccg agggcatcct gcccctattc ccatcaggtt tctccttgtc ctctccctgt    2100
ttcaagtccc ctttcttatt ccgaacacac tcgcaggctc ttccgacgcg cacccggggg    2160
tcctcactgg cccactccgg gagtcctctg cccgcttccc cgacctcgag ggtctcctct    2220
gacgcagcgt cgattcccct tccctcctcg gtccctgcc  ccgcccctct cactgcggcg    2280
gagccggtcg gccggggggc cgcaggggag gaggcggaga gggcggggcc ctcctcccca    2340 cccctctcact gccaagggt  tggacccggc cgcggcggct ataaagggc  cggcgccctg    2400 gtgctgccgc agtgcctccc gccccgtccc ggcctcgcgc acctgctc               2448

<210> SEQ ID NO 105
<211> LENGTH: 66
<212> TYPE: DNA
<213> ORGANISM: Artificial Sequence
<220> FEATURE:
<223> OTHER INFORMATION: AAV.huNEFH-EGFP Spacer/plasmid

<400> SEQUENCE: 105
agcgatatcc taggaattcc ccatcctcta gagtcgacct gcagaagcta tccaccggtc    60
gccacc                                                              66

<210> SEQ ID NO 106
<211> LENGTH: 718
<212> TYPE: DNA
<213> ORGANISM: Artificial Sequence
<220> FEATURE:
<223> OTHER INFORMATION: AAV.huNEFH-EGFP EGFP

<400> SEQUENCE: 106
atggtgagca agggcgagga gctgttcacc ggggtggtgc ccatcctggt cgagctggac    60
ggcgacgtaa acggccacaa gttcagcgtg tccggcgagg gcgagggcga tgccacctac    120
ggcaagctga ccctgaagtt catctgcacc accggcaagc tgcccgtgcc ctggcccacc    180
ctcgtgacca ccctgaccta cggcgtgcag tgcttcagcc gctaccccga ccacatgaag    240
cagcacgact tcttcaagtc cgccatgccc gaaggctacg tccaggagcg caccatcttc    300
ttcaaggacg acggcaacta caagacccgc gccgaggtga agttcgaggg cgacaccctg    360
gtgaaccgca tcgagctgaa gggcatcgac ttcaaggagg acggcaacat cctggggcac    420
aagctggagt acaactacaa cagccacaac gtctatatca tggccgacaa gcagaagaac    480
ggcatcaagg tgaacttcaa gatccgccac aacatcgagg acggcagcgt gcagctcgcc    540
gaccactacc agcagaacac ccccatcggc gacggccccg tgctgctgcc cgacaaccac    600
tacctgagca cccagtccgc cctgagcaaa gaccccaacg agaagcgcga tcacatggtc    660
ctgctggagt tcgtgaccgc cgccgggatc actctcggca tggacgagct gtacaagt     718
```

<210> SEQ ID NO 107
<211> LENGTH: 42
<212> TYPE: DNA
<213> ORGANISM: Artificial Sequence
<220> FEATURE:
<223> OTHER INFORMATION: AAV.huNEFH-EGFP plasmid

<400> SEQUENCE: 107
aaagcggcca gcttgcctcg agcagcgctg ctcgagagat ct                42

<210> SEQ ID NO 108
<211> LENGTH: 479
<212> TYPE: DNA
<213> ORGANISM: Artificial Sequence
<220> FEATURE:
<223> OTHER INFORMATION: AAV.huNEFH-EGFP hGH_PA_terminator

<400> SEQUENCE: 108
acgggtggca tccctgtgac ccctccccag tgcctctcct ggccctggaa gttgccactc    60
cagtgcccac cagccttgtc ctaataaaat aagttgcat cattttgtct gactaggtgt   120
ccttctataa tattatgggg tggagggggg tggtatggag caaggggcaa gttgggaaga   180
caacctgtag ggcctgcggg gtctattggg aaccaagctg gagtgcagtg cacaatctt   240 ggctcactgc aatctccgcc tcctgggttc aagcgattct cctgcctcag cctcccgagt   300
tgttgggatt ccaggcatgc atgaccaggc tcagctaatt tttgtttttt tggtagagac   360
ggggtttcac catattggcc aggctggtct ccaactccta atctcaggtg atctacccac   420
cttggcctcc caaattgctg ggattacagg cgtgaaccac tgctcccttc cctgtcctt   479

<210> SEQ ID NO 109
<211> LENGTH: 39
<212> TYPE: DNA
<213> ORGANISM: Artificial Sequence
<220> FEATURE:
<223> OTHER INFORMATION: AAV.huNEFH-EGFP Plasmid

<400> SEQUENCE: 109
ctgattttgt aggtaaccac gtgcggaccg agcggccgc                    39

<210> SEQ ID NO 110
<211> LENGTH: 140
<212> TYPE: DNA
<213> ORGANISM: Artificial Sequence
<220> FEATURE:
<223> OTHER INFORMATION: AAV.huNEFH-EGFP R-ITR

<400> SEQUENCE: 110
aggaacccct agtgatggag ttggccactc cctctctgcg cgctcgctcg ctcactgagg    60
ccgggcgacc aaaggtcgcc cgacgcccgg gctttgcccg gcggcctca gtgagcgagc   120 gagcgcgcag ctgcctgagg                                              140

<210> SEQ ID NO 111
<211> LENGTH: 2605
<212> TYPE: DNA
<213> ORGANISM: Artificial Sequence
<220> FEATURE:
<223> OTHER INFORMATION: AAV.huNEFH-EGFP Plasmid backbone

<400> SEQUENCE: 111
ggcgcctgat gcggtatttt ctccttacgc atctgtgcgg tatttcacac cgcatacgtc    60

-continued

| | | | | | |
|---|---|---|---|---|---|
| aaagcaacca | tagtacgcgc | cctgtagcgg | cgcattaagc | gcggcgggtg | tggtggttac | 120 |
| gcgcagcgtg | accgctacac | ttgccagcgc | cctagcgccc | gctcctttcg | ctttcttccc | 180 |
| ttcctttctc | gccacgttcg | ccggctttcc | ccgtcaagct | ctaaatcggg | gctcccttt | 240 |
| agggttccga | tttagtgctt | tacggcacct | cgaccccaaa | aaacttgatt | tgggtgatgg | 300 |
| ttcacgtagt | gggccatcgc | cctgatagac | ggttttttcgc | cctttgacgt | tggagtccac | 360 |
| gttctttaat | agtggactct | tgttccaaac | tggaacaaca | ctcaacccta | tctcgggcta | 420 |
| ttcttttgat | ttataaggga | ttttgccgat | ttcggcctat | tggttaaaaa | atgagctgat | 480 |
| ttaacaaaaa | tttaacgcga | attttaacaa | aatattaacg | tttacaattt | tatggtgcac | 540 |
| tctcagtaca | atctgctctg | atgccgcata | gttaagccag | ccccgacacc | cgccaacacc | 600 |
| cgctgacgcg | ccctgacggg | cttgtctgct | cccggcatcc | gcttacagac | aagctgtgac | 660 |
| cgtctccggg | agctgcatgt | gtcagaggtt | ttcaccgtca | tcaccgaaac | gcgcgagacg | 720 |
| aaagggcctc | gtgatacgcc | tatttttata | ggttaatgtc | atgataataa | tggtttctta | 780 |
| gacgtcaggt | ggcactttc | ggggaaatgt | gcgcggaacc | cctatttgtt | tattttttcta | 840 |
| aatacattca | aatatgtatc | cgctcatgag | acaataaccc | tgataaatgc | ttcaataata | 900 |
| ttgaaaaagg | aagagtatga | gtattcaaca | tttccgtgtc | gcccttattc | cctttttgc | 960 |
| ggcattttgc | cttcctgttt | ttgctcaccc | agaaacgctg | gtgaaagtaa | aagatgctga | 1020 |
| agatcagttg | ggtgcacgag | tgggttacat | cgaactggat | ctcaacagcg | gtaagatcct | 1080 |
| tgagagtttt | cgccccgaag | aacgttttcc | aatgatgagc | acttttaaag | ttctgctatg | 1140 |
| tggcgcggta | ttatcccgta | ttgacgccgg | gcaagagcaa | ctcggtcgcc | gcatacacta | 1200 |
| ttctcagaat | gacttggttg | agtactcacc | agtcacagaa | aagcatctta | cggatggcat | 1260 |
| gacagtaaga | gaattatgca | gtgctgccat | aaccatgagt | gataacactg | cggccaactt | 1320 |
| acttctgaca | acgatcggag | gaccgaagga | gctaaccgct | tttttgcaca | acatggggga | 1380 |
| tcatgtaact | cgccttgatc | gttgggaacc | ggagctgaat | gaagccatac | caaacgacga | 1440 |
| gcgtgacacc | acgatgcctg | tagcaatggc | aacaacgttg | cgcaaactat | taactggcga | 1500 |
| actacttact | ctagcttccc | ggcaacaatt | aatagactgg | atggaggcgg | ataaagttgc | 1560 |
| aggaccactt | ctgcgctcgg | cccttccggc | tggctggttt | attgctgata | aatctggagc | 1620 |
| cggtgagcgt | gggtctcgcg | gtatcattgc | agcactgggg | ccagatggta | agccctcccg | 1680 |
| tatcgtagtt | atctacacga | cggggagtca | ggcaactatg | gatgaacgaa | atagacagat | 1740 |
| cgctgagata | ggtgcctcac | tgattaagca | ttggtaactg | tcagaccaag | tttactcata | 1800 |
| tatactttag | attgatttaa | aacttcattt | ttaatttaaa | aggatctagg | tgaagatcct | 1860 |
| ttttgataat | ctcatgacca | aaatccctta | acgtgagttt | tcgttccact | gagcgtcaga | 1920 |
| ccccgtagaa | aagatcaaag | gatcttcttg | agatcctttt | tttctgcgcg | taatctgctg | 1980 |
| cttgcaaaca | aaaaaaccac | cgctaccagc | ggtggtttgt | ttgccggatc | aagagctacc | 2040 |
| aactcttttt | ccgaaggtaa | ctggcttcag | cagagcgcag | ataccaaata | ctgtccttct | 2100 |
| agtgtagccg | tagttaggcc | accacttcaa | gaactctgta | gcaccgccta | catacctcgc | 2160 |
| tctgctaatc | ctgttaccag | tggctgctgc | cagtggcgat | aagtcgtgtc | ttaccgggtt | 2220 |
| ggactcaaga | cgatagttac | cggataaggc | gcagcggtcg | ggctgaacgg | ggggttcgtg | 2280 |
| cacacagccc | agcttggagc | gaacgaccta | caccgaactg | agatacctac | agcgtgagct | 2340 |
| atgagaaagc | gccacgcttc | ccgaagggag | aaaggcggac | aggtatccgg | taagcggcag | 2400 |
| ggtcggaaca | ggagagcgca | cgagggagct | tccaggggga | aacgcctggt | atctttatag | 2460 |

```
tcctgtcggg tttcgccacc tctgacttga gcgtcgattt ttgtgatgct cgtcagggg     2520 gcggagccta tggaaaaacg ccagcaacgc ggccttttta cggttcctgg ccttttgctg    2580
gccttttgct cacatgtcct gcagg                                          2605

<210> SEQ ID NO 112
<211> LENGTH: 133
<212> TYPE: DNA
<213> ORGANISM: Artificial Sequence
<220> FEATURE:
<223> OTHER INFORMATION: AAV.muNefh-EGFP L-ITR

<400> SEQUENCE: 112
cagctgcgcg ctcgctcgct cactgaggcc gcccgggcaa agcccggcg tcgggcgacc      60 tttggtcgcc cggcctcagt gagcgagcga gcgcgcagag agggagtggc caactccatc    120 actagggtt cct                                                        133

<210> SEQ ID NO 113
<211> LENGTH: 69
<212> TYPE: DNA
<213> ORGANISM: Artificial Sequence
<220> FEATURE:
<223> OTHER INFORMATION: AAV.muNefh-EGFP plasmid

<400> SEQUENCE: 113
gcggccgcac gcgttaagac gcgtgccaca ccttttacct tcacacacac cccactccta     60
tcattcatg                                                             69

<210> SEQ ID NO 114
<211> LENGTH: 2251
<212> TYPE: DNA
<213> ORGANISM: Artificial Sequence
<220> FEATURE:
<223> OTHER INFORMATION: AAV.muNefh-EGFP muNefh

<400> SEQUENCE: 114
tgtgctgtca actgcttgtc agacttctca cccccaagaa gggcatgtgc attctgcaga     60
caactgaaga gactcgaagg aacaagaatc taataacaaa aatccaagca gtatgggaga    120
taaatgggga agccatgtgg gcgtaagggg gtagaggtct gcatcccagt cccctcccca    180
tggcatctgc agtgcctccc agcctttctg accctgcaa agagcagcat gactggacct    240
ttaaattggg aaaatgcttc atcatgttct gctccatcat gaaaaactag agtctcctcc    300
ccctcctccc tagtgcactc tcctggcctg cagccagggg ctgggaatga cacacaggac    360
aggaaaggga tctctttag ggaatctatc agttctcctc ctagggatcc ctccaaaaga    420
gaaaaccaca gcaaactggg gtgcagtgag gcttgaggta actgcctggg agaagttctg    480
atctgaagaa gtctatactg gtttccagag cttgtcagtg ggcattggag tggggctctc    540
tctgctccgg gaagaggttt gcaggagaaa agaacttcac agagagccag gcactggaca    600
ggacatgcag gggtgggtca cttacataca accgtaggtc gtttcgagcc cgtcatatga    660
ctcatccaat cctcccctgt accgcacaga gggactgctt ggaaaagcta tggaaccctcc   720 ctactccgtt aggcatagat ttaacccttc ccatccgagg agcggctgct gtccgtggtg    780
ctgaagcgat agcggcacgg gcggctccgt ccactaacac cgcttttgac cggaaaacca    840
aaccaagaac gagccgtata ataaagcaag agctccaagt ctaagcccct ccgccgtccc    900 cgcccttca cctgaagcct cagtagggct catgatggag gtcggtggac tttggtactg    960
```

-continued

```
aaaaaccact ccaccacttc ctcggagcat gaaaggggat gcttacggca gtactggttc    1020
atctattctg gaaaaggaat gagatgccaa gataaagcag aaaaatcggg caaggaaggg    1080
agaaagacaa agttctcagg tgagaggaac tggttactat tccgactggc aatatgtggg    1140
ttctcctccc caaaatcagc cagacatttc ccaagttcga acctcctagg ggcacatggg    1200
agcttggagc tgcatcttgt ctcttgcaca aagggaaaa ccaaacatag gagaacacaa     1260
tttgtacaag gtcattcagc tagcgaagca cagaagctaa ccccaccctg tggcagaact    1320
tggcttcggt gttgaggctc ttgctgccta ctgagggacc ccctgttctt cgtaggcagt    1380
tttcctttcc gggcaagagg agactccact ttccagtcgt ggccactgga atttttagag    1440
agcaccacgt tcctctcacc cagcgctccc tttctccgtc tgcagtgttc tccttctcag    1500
ggtagctttg cggtcctttc aaactccacg cccaccccaa ccccaacccc gaagccagct    1560
gtacagttcc ttaagcccct ttgggtggcc cagggccgct gtagtatctg gggaacactg    1620
caccgccagc tagaaggtcc ccatttatca tcagtagcat ccatcatgca accccataca    1680
gaatcccttc gtgggtgact gcagtctgca ctcctcatct caaggtcctc tctaactatc    1740
agggaaccaa ccctgtgctg cttctcaagt gggggtgtcc tctcatagta atcactgcag    1800
tctcccactg cttcaacccg aaggcgccct gacccatcag ttctgcaatc ctctccctat    1860
ttccagtgcc ctctcttatt ctgagggtct tattctgact aatagggtct tccgacatgc    1920
acctggaggt ctgcacttgt ccgctccgga agtcctttac tccttggtct gacctcggga    1980
ggctctactg acgatgcgtc gattcccctt cactcctggg tcgtcccccc cagccccgcc    2040
cctctcactg cggagaagcc ggtcggcccg gggccgcggg ggaggaggtg gagagggtgg    2100
ggccctcctc cccagccccc cactgccgag gggccggacc gggccaccgc ggatataaaa    2160
gagccggagt cccagagctg ccgcagtgct gcctgccccg tcccagcccc gcactcccgc    2220
tccgctggcg gccgcacctg ctccggccat g                                    2251
```

<210> SEQ ID NO 115
<211> LENGTH: 94
<212> TYPE: DNA
<213> ORGANISM: Artificial Sequence
<220> FEATURE:
<223> OTHER INFORMATION: AAV.muNefh-EGFP muNefh plasmid

<400> SEQUENCE: 115

```
cccgtcccag ccccgcactc ccgctccgct ggcggccgca cctgctccgg ccattctaga    60
gtcgacctgc agaagctatc caccggtcgc cacc                                 94
```

<210> SEQ ID NO 116
<211> LENGTH: 718
<212> TYPE: DNA
<213> ORGANISM: Artificial Sequence
<220> FEATURE:
<223> OTHER INFORMATION: AAV.muNefh-EGFP EGFP

<400> SEQUENCE: 116

```
atggtgagca agggcgagga gctgttcacc ggggtggtgc ccatcctggt cgagctggac    60
ggcgacgtaa acggccacaa gttcagcgtg tccggcgagg gcgagggcga tgccacctac    120
ggcaagctga ccctgaagtt catctgcacc accggcaagc tgcccgtgcc ctggcccacc    180
ctcgtgacca ccctgaccta cggcgtgcag tgcttcagcc gctaccccga ccacatgaag    240
cagcacgact tcttcaagtc cgccatgccc gaaggctacg tccaggagcg caccatcttc    300
ttcaaggacg acggcaacta caagacccgc gccgaggtga agttcgaggg cgacaccctg    360
```

| | |
|---|---|
| gtgaaccgca tcgagctgaa gggcatcgac ttcaaggagg acggcaacat cctgggcac | 420 |
| aagctggagt acaactacaa cagccacaac gtctatatca tggccgacaa gcagaagaac | 480 |
| ggcatcaagg tgaacttcaa gatccgccac aacatcgagg acggcagcgt gcagctcgcc | 540 |
| gaccactacc agcagaacac ccccatcggc gacggccccg tgctgctgcc cgacaaccac | 600 |
| tacctgagca cccagtccgc cctgagcaaa gaccccaacg agaagcgcga tcacatggtc | 660 |
| ctgctggagt tcgtgaccgc cgccgggatc actctcggca tggacgagct gtacaagt | 718 |

<210> SEQ ID NO 117
<211> LENGTH: 42
<212> TYPE: DNA
<213> ORGANISM: Artificial Sequence
<220> FEATURE:
<223> OTHER INFORMATION: AAV.muNefh-EGFP EGFP plasmid

<400> SEQUENCE: 117

| | |
|---|---|
| aaagcggcca gcttgcctcg agcagcgctg ctcgagagat ct | 42 |

<210> SEQ ID NO 118
<211> LENGTH: 479
<212> TYPE: DNA
<213> ORGANISM: Artificial Sequence
<220> FEATURE:
<223> OTHER INFORMATION: AAV.muNefh-EGFP hGH_PA_terminator

<400> SEQUENCE: 118

| | |
|---|---|
| acgggtggca tccctgtgac ccctccccag tgcctctcct ggccctggaa gttgccactc | 60 |
| cagtgcccac cagccttgtc ctaataaaat taagttgcat cattttgtct gactaggtgt | 120 |
| ccttctataa tattatgggg tggaggggggg tggtatggag caaggggcaa gttgggaaga | 180 |
| caacctgtag ggcctgcggg gtctattggg aaccaagctg gagtgcagtg gcacaatctt | 240 |
| ggctcactgc aatctccgcc tcctgggttc aagcgattct cctgcctcag cctcccgagt | 300 |
| tgttgggatt ccaggcatgc atgaccaggc tcagctaatt tttgtttttt tggtagagac | 360 |
| ggggtttcac catattggcc aggctggtct ccaactccta atctcaggtg atctacccac | 420 |
| cttggcctcc caaattgctg ggattacagg cgtgaaccac tgctcccttc cctgtcctt | 479 |

<210> SEQ ID NO 119
<211> LENGTH: 39
<212> TYPE: DNA
<213> ORGANISM: Artificial Sequence
<220> FEATURE:
<223> OTHER INFORMATION: AAV.muNefh-EGFP hGH_PA_terminator plasmid

<400> SEQUENCE: 119

| | |
|---|---|
| ctgattttgt aggtaaccac gtgcggaccg agcggccgc | 39 |

<210> SEQ ID NO 120
<211> LENGTH: 140
<212> TYPE: DNA
<213> ORGANISM: Artificial Sequence
<220> FEATURE:
<223> OTHER INFORMATION: AAV.muNefh-EGFP R-ITR

<400> SEQUENCE: 120

| | |
|---|---|
| aggaacccct agtgatggag ttggccactc cctctctgcg cgctcgctcg ctcactgagg | 60 |
| ccgggcgacc aaaggtcgcc cgacgcccgg gctttgcccg ggcggcctca gtgagcgagc | 120 |
| gagcgcgcag ctgcctgagg | 140 |

<210> SEQ ID NO 121
<211> LENGTH: 2605
<212> TYPE: DNA
<213> ORGANISM: Artificial Sequence
<220> FEATURE:
<223> OTHER INFORMATION: AAV.muNefh-EGFP Plasmid backbone

<400> SEQUENCE: 121

| | | | | | |
|---|---|---|---|---|---|
| ggcgcctgat | gcggtatttt | ctccttacgc | atctgtgcgg | tatttcacac | cgcatacgtc | 60 |
| aaagcaacca | tagtacgcgc | cctgtagcgg | cgcattaagc | gcggcgggtg | tggtggttac | 120 |
| gcgcagcgtg | accgctacac | ttgccagcgc | cctagcgccc | gctcctttcg | ctttcttccc | 180 |
| ttcctttctc | gccacgttcg | ccggctttcc | ccgtcaagct | ctaaatcggg | ggctcccttt | 240 |
| agggttccga | tttagtgctt | tacggcacct | cgaccccaaa | aaacttgatt | tgggtgatgg | 300 |
| ttcacgtagt | gggccatcgc | cctgatagac | ggtttttcgc | cctttgacgt | tggagtccac | 360 |
| gttctttaat | agtggactct | tgttccaaac | tggaacaaca | ctcaacccta | tctcgggcta | 420 |
| ttcttttgat | ttataaggga | ttttgccgat | ttcggcctat | tggttaaaaa | atgagctgat | 480 |
| ttaacaaaaa | tttaacgcga | attttaacaa | aatattaacg | tttacaattt | tatggtgcac | 540 |
| tctcagtaca | atctgctctg | atgccgcata | gttaagccag | ccccgacacc | cgccaacacc | 600 |
| cgctgacgcg | ccctgacggg | cttgtctgct | cccggcatcc | gcttacagac | aagctgtgac | 660 |
| cgtctccggg | agctgcatgt | gtcagaggtt | ttcaccgtca | tcaccgaaac | gcgcgagacg | 720 |
| aaagggcctc | gtgatacgcc | tatttttata | ggttaatgtc | atgataataa | tggtttctta | 780 |
| gacgtcaggt | ggcactttc | ggggaaatgt | gcgcggaacc | cctatttgtt | tatttttcta | 840 |
| aatacattca | aatatgtatc | cgctcatgag | acaataaccc | tgataaatgc | ttcaataata | 900 |
| ttgaaaaagg | aagagtatga | gtattcaaca | tttccgtgtc | gcccttattc | ccttttttgc | 960 |
| ggcattttgc | cttcctgttt | ttgctcaccc | agaaacgctg | gtgaaagtaa | aagatgctga | 1020 |
| agatcagttg | ggtgcacgag | tgggttacat | cgaactggat | ctcaacagcg | gtaagatcct | 1080 |
| tgagagtttt | cgccccgaag | aacgttttcc | aatgatgagc | acttttaaag | ttctgctatg | 1140 |
| tggcgcggta | ttatcccgta | ttgacgccgg | gcaagagcaa | ctcggtcgcc | gcatacacta | 1200 |
| ttctcagaat | gacttggttg | agtactcacc | agtcacagaa | aagcatctta | cggatggcat | 1260 |
| gacagtaaga | gaattatgca | gtgctgccat | aaccatgagt | gataacactg | cggccaactt | 1320 |
| acttctgaca | acgatcggag | gaccgaagga | gctaaccgct | tttttgcaca | acatggggga | 1380 |
| tcatgtaact | cgccttgatc | gttgggaacc | ggagctgaat | gaagccatac | caaacgacga | 1440 |
| gcgtgacacc | acgatgcctg | tagcaatggc | aacaacgttg | cgcaaactat | taactggcga | 1500 |
| actacttact | ctagcttccc | ggcaacaatt | aatagactgg | atggaggcgg | ataaagttgc | 1560 |
| aggaccactt | ctgcgctcgg | cccttccggc | tggctggttt | attgctgata | aatctggagc | 1620 |
| cggtgagcgt | gggtctcgcg | gtatcattgc | agcactgggg | ccagatggta | agccctcccg | 1680 |
| tatcgtagtt | atctacacga | cggggagtca | ggcaactatg | gatgaacgaa | atagacagat | 1740 |
| cgctgagata | ggtgcctcac | tgattaagca | ttggtaactg | tcagaccaag | tttactcata | 1800 |
| tatactttag | attgatttaa | aacttcattt | ttaatttaaa | aggatctagg | tgaagatcct | 1860 |
| ttttgataat | ctcatgacca | aaatccctta | acgtgagttt | tcgttccact | gagcgtcaga | 1920 |
| ccccgtagaa | aagatcaaag | gatcttcttg | agatcctttt | tttctgcgcg | taatctgctg | 1980 |
| cttgcaaaca | aaaaaaccac | cgctaccagc | ggtggtttgt | ttgccggatc | aagagctacc | 2040 |
| aactcttttt | ccgaaggtaa | ctggcttcag | cagagcgcag | ataccaaata | ctgtccttct | 2100 |

```
agtgtagccg tagttaggcc accacttcaa gaactctgta gcaccgccta catacctcgc    2160
tctgctaatc ctgttaccag tggctgctgc cagtggcgat aagtcgtgtc ttaccgggtt    2220
ggactcaaga cgatagttac cggataaggc gcagcggtcg ggctgaacgg ggggttcgtg    2280
cacacagccc agcttggagc gaacgaccta caccgaactg agatacctac agcgtgagct    2340
atgagaaagc gccacgcttc ccgaagggag aaaggcggac aggtatccgg taagcggcag    2400
ggtcggaaca ggagagcgca cgagggagct tccaggggga aacgcctggt atctttatag    2460
tcctgtcggg tttcgccacc tctgacttga gcgtcgattt ttgtgatgct cgtcaggggg    2520
gcggagccta tggaaaaacg ccagcaacgc ggccttttta cggttcctgg ccttttgctg    2580
gccttttgct cacatgtcct gcagg                                          2605

<210> SEQ ID NO 122
<211> LENGTH: 20
<212> TYPE: DNA
<213> ORGANISM: Artificial Sequence
<220> FEATURE:
<223> OTHER INFORMATION: Thy1 Forward primer

<400> SEQUENCE: 122
tgaaccaaaa ccttcgcctg                                                  20

<210> SEQ ID NO 123
<211> LENGTH: 20
<212> TYPE: DNA
<213> ORGANISM: Artificial Sequence
<220> FEATURE:
<223> OTHER INFORMATION: Thy1 reverse primer

<400> SEQUENCE: 123
agctcacaaa agtagtcgcc                                                  20

<210> SEQ ID NO 124
<211> LENGTH: 4467
<212> TYPE: DNA
<213> ORGANISM: Artificial Sequence
<220> FEATURE:
<223> OTHER INFORMATION: AAV.A-EGFP

<400> SEQUENCE: 124
cagctgcgcg ctcgctcgct cactgaggcc gcccgggcaa agcccgggcg tcgggcgacc      60
tttggtcgcc cggcctcagt gagcgagcga gcgcgcagag agggagtggc caactccatc     120
actaggggtt cctgcggccg cacgcgtctc tgacgcagcg tcgattcccc ttccctcctc     180
ggtcccctgc cccgcccctc tcactgcggc ggagccggtc ggccgggggg ccgcagggga     240
ggaggcggag agggcgggc cctcctcccc accctctcac tgccaagggg ttggacccgg     300
ccgcggcggc tataaaaggg ccggcgccct ggtgctgccg cagtgcctcc cgccccgtcc     360
cggcctcgcg cacctgctca ggccgataat tccccgggga tcctctagag tcgacctgca     420
gaagctgatc caccggtcgc caccatggtg agcaagggcg aggagctgtt caccggggtg     480
gtgcccatcc tggtcgagct ggacggcgac gtaaacggcc acaagttcag cgtgtccggc     540
gagggcgagg gcgatgccac ctacggcaag ctgaccctga agttcatctg caccaccggc     600
aagctgcccg tgccctggcc caccctcgtg accaccctga cctacggcgt gcagtgcttc     660
agccgctacc ccgaccacat gaagcagcac gacttcttca gtccgccat gcccgaaggc     720 tacgtccagg agcgcaccat cttcttcaag gacgacggca actacaagac ccgcgccgag     780
```

```
gtgaagttcg agggcgacac cctggtgaac cgcatcgagc tgaagggcat cgacttcaag      840
gaggacggca acatcctggg gcacaagctg gagtacaact acaacagcca caacgtctat      900
atcatggccg acaagcagaa gaacggcatc aaggtgaact tcaagatccg ccacaacatc      960
gaggacggca gcgtgcagct cgccgaccac taccagcaga acacccccat cggcgacggc     1020
cccgtgctgc tgcccgacaa ccactacctg agcacccagt ccgccctgag caaagacccc     1080
aacgagaagc gcgatcacat ggtcctgctg gagttcgtga ccgccgccgg gatcactctc     1140
ggcatggacg agctgtacaa gtaaagcggc cagcttgcct cgagcagcgc tgctcgagag     1200
atctacgggt ggcatccctg tgaccccctcc ccagtgcctc tcctggccct ggaagttgcc     1260
actccagtgc ccaccagcct tgtcctaata aaattaagtt gcatcatttt gtctgactag     1320
gtgtccttct ataatattat ggggtggagg gggtggtat ggagcaaggg gcaagttggg       1380
aagacaacct gtagggcctg cggggtctat tgggaaccaa gctggagtgc agtggcacaa     1440
tcttggctca ctgcaatctc cgcctcctgg gttcaagcga ttctcctgcc tcagcctccc     1500
gagttgttgg gattccaggc atgcatgacc aggctcagct aattttgtt ttttggtag        1560 agacggggtt tcaccatatt ggccaggctg gtctccaact cctaatctca ggtgatctac     1620
ccaccttggc ctcccaaatt gctgggatta caggcgtgaa ccactgctcc cttccctgtc     1680
cttctgattt tgtaggtaac cacgtgcgga ccgagcggcc gcaggaaccc ctagtgatgg     1740
agttggccac tccctctctg cgcgctcgct cgctcactga ggccgggcga ccaaaggtcg     1800
cccgacgccc gggctttgcc cgggcggcct cagtgagcga gcgagcgcgc agctgcctga     1860
ggggcgcctg atgcggtatt ttctccttac gcatctgtgc ggtatttcac accgcatacg     1920
tcaaagcaac catagtacgc gccctgtagc ggcgcattaa gcgcggcggg tgtggtggtt     1980
acgcgcagcg tgaccgctac acttgccagc gccctagcgc ccgctccttt cgctttcttc     2040
ccttcctttc tcgccacgtt cgccggcttt ccccgtcaag ctctaaatcg gggctccct     2100 ttagggttcc gatttagtgc tttacggcac ctcgacccca aaaaacttga tttgggtgat     2160
ggttcacgta gtgggccatc gccctgatag acggttttc gcccttgac gttggagtcc       2220 acgttcttta atagtggact cttgttccaa actggaacaa cactcaaccc tatctcgggc     2280 tattctttg atttataagg gattttgccg atttcggcct attggttaaa aaatgagctg      2340
atttaacaaa aatttaacgc gaatttaac aaaatattaa cgtttacaat tttatggtgc       2400
actctcagta caatctgctc tgatgccgca tagttaagcc agccccgaca cccgccaaca     2460
cccgctgacg cgccctgacg ggcttgtctg ctcccggcat ccgcttacag acaagctgtg     2520
accgtctccg ggagctgcat gtgtcagagg ttttcaccgt catcaccgaa acgcgcgaga     2580
cgaaagggcc tcgtgatacg cctattttta taggttaatg tcatgataat aatggtttct     2640
tagacgtcag gtggcacttt tcggggaaat gtgcgcggaa cccctatttg tttatttttc     2700
taaatacatt caaatatgta tccgctcatg agacaataac cctgataaat gcttcaataa     2760
tattgaaaaa ggaagagtat gagtattcaa catttccgtg tcgcccttat cccttttttt     2820
gcggcatttt gccttcctgt ttttgctcac ccagaaacgc tggtgaaagt aaaagatgct     2880
gaagatcagt tgggtgcacg agtgggttac atcgaactgg atctcaacag cggtaagatc     2940
cttgagagtt ttcgccccga agaacgtttt ccaatgatga gcacttttaa agttctgcta     3000
tgtggcgcgg tattatcccg tattgacgcc gggcaagagc aactcggtcg ccgcatacac     3060
tattctcaga atgacttggt tgagtactca ccagtcacag aaaagcatct tacggatggc     3120
atgacagtaa gagaattatg cagtgctgcc ataaccatga gtgataacac tgcggccaac     3180
```

```
ttacttctga caacgatcgg aggaccgaag gagctaaccg ctttttttgca caacatgggg    3240 gatcatgtaa ctcgccttga tcgttgggaa ccggagctga atgaagccat accaaacgac    3300
gagcgtgaca ccacgatgcc tgtagcaatg gcaacaacgt tgcgcaaact attaactggc    3360
gaactactta ctctagcttc ccggcaacaa ttaatagact ggatggaggc ggataaagtt    3420
gcaggaccac ttctgcgctc ggcccttccg gctggctggt ttattgctga taaatctgga    3480
gccggtgagc gtgggtctcg cggtatcatt gcagcactgg ggccagatgg taagccctcc    3540
cgtatcgtag ttatctacac gacggggagt caggcaacta tggatgaacg aaatagacag    3600
atcgctgaga taggtgcctc actgattaag cattggtaac tgtcagacca gtttactca    3660 tatatacttt agattgattt aaaacttcat ttttaattta aaaggatcta ggtgaagatc    3720 cttttgata atctcatgac caaaatccct aacgtgagt tttcgttcca ctgagcgtca    3780
gaccccgtag aaaagatcaa aggatcttct tgagatcctt ttttctgcg cgtaatctgc    3840 tgcttgcaaa caaaaaaacc accgctacca gcggtggttt gtttgccgga tcaagagcta    3900
ccaactcttt ttccgaaggt aactggcttc agcagagcgc agataccaaa tactgtcctt    3960
ctagtgtagc cgtagttagg ccaccacttc aagaactctg tagcaccgcc tacatacctc    4020
gctctgctaa tcctgttacc agtggctgct gccagtggcg ataagtcgtg tcttaccggg    4080
ttggactcaa gacgatagtt accggataag gcgcagcggt cgggctgaac ggggggttcg    4140
tgcacacagc ccagcttgga gcgaacgacc tacaccgaac tgagatacct acagcgtgag    4200
ctatgagaaa gcgccacgct tcccgaaggg agaaaggcgg acaggtatcc ggtaagcggc    4260
agggtcggaa caggagagcg cacgagggag cttccagggg gaaacgcctg gtatctttat    4320
agtcctgtcg ggtttcgcca cctctgactt gagcgtcgat ttttgtgatg ctcgtcaggg    4380
gggcggagcc tatggaaaaa cgccagcaac gcggcctttt tacggttcct ggccttttgc    4440
tggccttttg ctcacatgtc ctgcagg                                        4467
```

<210> SEQ ID NO 125
<211> LENGTH: 6715
<212> TYPE: DNA
<213> ORGANISM: Artificial Sequence
<220> FEATURE:
<223> OTHER INFORMATION: AAV.A-spacer-F-EGFP

<400> SEQUENCE: 125

```
cagctgcgcg ctcgctcgct cactgaggcc gcccgggcaa agcccgggcg tcgggcgacc      60
tttggtcgcc cggcctcagt gagcgagcga gcgcgcagag agggagtggc caactccatc     120
actaggggtt cctgcggccg cacgcgtcta gtcatctcag ttgctgtcag ctgcttgtga     180
gccttctcac atccagagaa tgtatcagca ttgtgcagac tgaaaagacc cagaggaaca     240
aggctccaat ggcaaaattc caagtagaat gacaaataaa tggggagcca tctgagagca     300
agggagtcct gccaacaccc gcccccatgc ctttctcagg gacctcagac cagccactca     360
cctccatcct cccagcacca cctgcaacca gccccttgcc ctctgcaaac tggagcacga     420
ctggatcttt agatggggga aaaatgcttc atcatgttct gctgcttcat gcaaaaccag     480
aaactccctc cccctcttcc ctcctcccag cgcactctcc ttccagtaag tttaaacagg     540
catttatact ccgctggaag cgcgtgtgta ttgctcacaa taattgcatg agttgcccat     600
cgatatgggc aactctatct gcactgctca ttaatatact tctgggttcc ttccagttgt     660
ttttgcatag tgatcagcct ctctctgagg gtgaaataat cccgttcagc ggtgtctgcc     720
```

| | | | | |
|---|---|---|---|---|
| agtcgggggg | aggctgcatt | atccacgccg | gaggcggtgg | tggcttcacg cactgactga | 780 |
| cagactgctt | tgatgtgcaa | ccgacgacga | ccagcggcaa | catcatcacg cagagcatca | 840 |
| ttttcagctt | tagcatcagc | taactccttc | gtgtattttg | catcgagcgc agcaacatca | 900 |
| cgctgacgca | tctgcatgtc | agtaattgcc | gcgttcgcca | gcttcagttc tctggcattt | 960 |
| ttgtcgcgct | gggctttgta | ggtaatggcg | ttatcacggt | aatgattaac agcccatgac | 1020 |
| aggcagacga | tgatgcagat | aaccagagcg | gagataatcg | cggtgactct gctcatacat | 1080 |
| caatctctct | gaccgttccg | cccgcttctt | tgaattttgc | aatcaggctg tcagccttat | 1140 |
| gctcgaactg | accataacca | gcgcccgca | gtgaagccca | gatattgctg caacggtcga | 1200 |
| ttgcctgacg | gatatcacca | cgatcaatca | taggtaaagc | gccacgctcc ttaatctgct | 1260 |
| gcaatgccac | agcgtcctga | cttttcggag | agaagtcttt | caggccaagc tgcttgcggt | 1320 |
| aggcatccca | ccaacgggaa | agaagctggt | agcgtccggc | gcctgttgat ttgagttttg | 1380 |
| ggtttagcgt | gacaagtttg | cgagggtgat | cggagtaatc | agtaaatagc tctccgccta | 1440 |
| caatgacgtc | ataaccatga | tttctggttt | tctgacgtcc | gttatcagtt ccctccgacc | 1500 |
| acgccagcat | atcgaggaac | gccttacgtt | gattattgat | ttctaccatc ttctactccg | 1560 |
| gcttttttag | cagcgaagcg | tttgataagc | gaaccaatcg | agtcagtacc gatgtagccg | 1620 |
| ataaacacgc | tcgttatata | agcgagattg | ctacttagtc | cggcgaagtc gagaaggtca | 1680 |
| cgaatgaacc | aggcgataat | ggcgcacatc | gttgcgtcga | ttactgtttt tgtaaacgca | 1740 |
| ccgccattat | atctgccgcg | aaggtacgcc | attgcaaacg | caaggattgc cccgatgcct | 1800 |
| tgttcctttg | ccgcgagaat | ggcggccaac | aggtcatgtt | tttctggcat cttcatgtct | 1860 |
| tacccccaat | aagggattt | gctctattta | attaggaata | aggtcgatta ctgatagaac | 1920 |
| aaatccaggc | tactgtgttt | agtaatcaga | tttgttcgtg | accgatatgc acgggcaaaa | 1980 |
| cggcaggagg | ttgttagcgc | gacctcctgc | cacccgcttt | cacgaaggtc atgtgtaaaa | 2040 |
| ggccgcagcg | taactattac | taatgaattc | aggacagaca | gtggctacgg ctcagtttgg | 2100 |
| gttgtgctgt | tgctgggcgg | cgatgacgcc | tgtacgcatt | tggtgatccg gttctgcttc | 2160 |
| cggtattcgc | ttaattcagc | acaacggaaa | gagcactggc | taaccaggct cgccgactct | 2220 |
| tcacgattat | cgactcaatg | ctcttacctg | ttgtgcagat | ataaaaaatc ccgaaaccgt | 2280 |
| tatgcaggct | ctaactatta | cctgcgaact | gtttcgggat | tgcattttgc agacctctct | 2340 |
| gcctgcgatg | gttggagttc | cagacgatac | gtcgaagtga | ccaactaggc ggaatcggta | 2400 |
| gtagtttaaa | cttccctcct | cggtcccctg | ccccgcccct | ctcactgcgg cggagccggt | 2460 |
| cggccggggg | gccgcagggg | aggaggcgga | gagggcgggg | ccctcctccc caccctctca | 2520 |
| ctgccaaggg | gttggacccg | gccgcggcgg | ctataaaagg | gccggcgccc tggtgctgcc | 2580 |
| gcagtgcctc | ccgccccgtc | ccggcctcgc | gcacctgctc | tcacgtgatc agagataatt | 2640 |
| ccccggggat | cctctagagc | gacgtgcaga | agctgatcca | ccggtcgcca ccatggtgag | 2700 |
| caagggcgag | gagctgttca | ccggggtggt | gcccatcctg | gtcgagctgg acggcgacgt | 2760 |
| aaacggccac | aagttcagcg | tgtccggcga | gggcgagggc | gatgccacct acggcaagct | 2820 |
| gaccctgaag | ttcatctgca | ccaccggcaa | gctgcccgtg | ccctggccca ccctcgtgac | 2880 |
| caccctgacc | tacggcgtgc | agtgcttcag | ccgctacccc | gaccacatga agcagcacga | 2940 |
| cttcttcaag | tccgccatgc | ccgaaggcta | cgtccaggag | cgcaccatct tcttcaagga | 3000 |
| cgacggcaac | tacaagaccc | gcgccgaggt | gaagttcgag | ggcgacaccc tggtgaaccg | 3060 |
| catcgagctg | aagggcatcg | acttcaagga | ggacggcaac | atcctggggc acaagctgga | 3120 |

```
gtacaactac aacagccaca acgtctatat catggccgac aagcagaaga acggcatcaa    3180
ggtgaacttc aagatccgcc acaacatcga ggacggcagc gtgcagctcg ccgaccacta    3240
ccagcagaac accccatcg gcgacggccc cgtgctgctg cccgacaacc actacctgag     3300
cacccagtcc gccctgagca aagacccaa cgagaagcgc gatcacatgg tcctgctgga    3360
gttcgtgacc gccgccggga tcactctcgg catggacgag ctgtacaagt aaagcggcca    3420
gcttgcctcg agcagcgctg ctcgagagat ctacgggtgg catccctgtg acccctcccc    3480
agtgcctctc ctggccctgg aagttgccac tccagtgccc accagccttg tcctaataaa    3540
attaagttgc atcattttgt ctgactaggt gtccttctat aatattatgg ggtggagggg    3600
ggtggtatgg agcaaggggc aagttggaa acaacctgt agggcctgcg gggtctattg      3660
ggaaccaagc tggagtgcag tggcacaatc ttggctcact gcaatctccg cctcctgggt    3720
tcaagcgatt ctcctgcctc agcctcccga gttgttggga ttccaggcat gcatgaccag    3780
gctcagctaa tttttgtttt tttggtagag acggggtttc accatattgg ccaggctggt    3840
ctccaactcc taatctcagg tgatctaccc accttggcct cccaaattgc tgggattaca    3900
ggcgtgaacc actgctccct tccctgtcct tctgattttg taggtaacca cgtgcggacc    3960
gagcggccgc aggaacccct agtgatggag ttggccactc cctctctgcg cgctcgctcg    4020
ctcactgagg ccgggcgacc aaaggtcgcc cgacgcccgg gctttgcccg gcggcctca    4080
gtgagcgagc gagcgcgcag ctgcctgagg ggcgcctgat gcggtatttt ctccttacgc    4140
atctgtgcgg tatttcacac cgcatacgtc aaagcaacca tagtacgcgc cctgtagcgg    4200
cgcattaagc gcggcgggtg tggtggttac gcgcagcgtg accgctacac ttgccagcgc    4260
cctagcgccc gctcctttcg ctttcttccc ttcctttctc gccacgttcg ccggctttcc    4320
ccgtcaagct ctaaatcggg ggctcccttt agggttccga tttagtgctt tacggcacct    4380
cgaccccaaa aaacttgatt tgggtgatgg ttcacgtagt gggccatcgc cctgatagac    4440
ggttttcgc cctttgacgt tggagtccac gttctttaat agtggactct tgttccaaac     4500
tggaacaaca ctcaaccta tctcgggcta ttcttttgat ttataaggga ttttgccgat     4560
ttcggcctat tggttaaaaa atgagctgat ttaacaaaaa tttaacgcga attttaacaa    4620
aatattaacg tttacaattt tatggtgcac tctcagtaca atctgctctg atgccgcata    4680
gttaagccag ccccgacacc cgccaacacc cgctgacgcg ccctgacggg cttgtctgct    4740
cccggcatcc gcttacagac aagctgtgac cgtctccggg agctgcatgt gtcagaggtt    4800
ttcaccgtca tcaccgaaac gcgcgagacg aaagggcctc gtgatacgcc tatttttata    4860
ggttaatgtc atgataataa tggtttctta cgtcaggt ggcacttttc ggggaaatgt      4920
gcgcggaacc cctatttgtt tatttttcta aatacattca aatatgtatc cgctcatgag    4980
acaataaccc tgataaatgc ttcaataata ttgaaaaagg aagagtatga gtattcaaca    5040
tttccgtgtc gcccttattc ccttttttgc ggcattttgc cttcctgttt ttgctcaccc    5100
agaaacgctg gtgaaagtaa agatgctga agatcagttg ggtgcacgag tgggttacat     5160
cgaactggat ctcaacagcg gtaagatcct tgagagtttt cgccccgaag aacgttttcc    5220
aatgatgagc acttttaaag ttctgctatg tggcgcggta ttatcccgta ttgacgccgg    5280
gcaagagcaa ctcggtcgcc gcatacacta ttctcagaat gacttggttg agtactcacc    5340
agtcacagaa aagcatctta cggatggcat gacagtaaga gaattatgca gtgctgccat    5400
aaccatgagt gataacactg cggccaactt acttctgaca acgatcggag gaccgaagga    5460
```

```
gctaaccgct tttttgcaca acatggggga tcatgtaact cgccttgatc gttgggaacc    5520
ggagctgaat gaagccatac caaacgacga gcgtgacacc acgatgcctg tagcaatggc    5580
aacaacgttg cgcaaactat taactggcga actacttact ctagcttccc ggcaacaatt    5640
aatagactgg atggaggcgg ataaagttgc aggaccactt ctgcgctcgg cccttccggc    5700
tggctggttt attgctgata atctggagcc cggtgagcgt gggtctcgcg gtatcattgc    5760
agcactgggg ccagatggta agccctcccg tatcgtagtt atctacacga cggggagtca    5820
ggcaactatg gatgaacgaa atagacagat cgctgagata ggtgcctcac tgattaagca    5880
ttggtaactg tcagaccaag tttactcata tatactttag attgatttaa aacttcattt    5940
ttaatttaaa aggatctagg tgaagatcct ttttgataat ctcatgacca aaatccctta    6000
acgtgagttt tcgttccact gagcgtcaga ccccgtagaa aagatcaaag gatcttcttg    6060
agatcctttt tttctgcgcg taatctgctg cttgcaaaca aaaaaaccac cgctaccagc    6120
ggtggtttgt ttgccggatc aagagctacc aactcttttt ccgaaggtaa ctggcttcag    6180
cagagcgcag ataccaaata ctgtccttct agtgtagccg tagttaggcc accacttcaa    6240
gaactctgta gcaccgccta catacctcgc tctgctaatc ctgttaccag tggctgctgc    6300
cagtggcgat aagtcgtgtc ttaccgggtt ggactcaaga cgatagttac cggataaggc    6360
gcagcggtcg ggctgaacgg ggggttcgtg cacacagccc agcttggagc gaacgaccta    6420
caccgaactg agatacctac agcgtgagct atgagaaagc gccacgcttc ccgaagggag    6480
aaaggcggac aggtatccgg taagcggcag ggtcggaaca ggagagcgca cgagggagct    6540 tccagggga aacgcctggt atctttatag tcctgtcggg tttcgccacc tctgacttga    6600
gcgtcgattt ttgtgatgct cgtcaggggg gcggagccta tggaaaaacg ccagcaacgc    6660
ggccttttta cggttcctgg ccttttgctg gccttttgct cacatgtcct gcagg          6715
```

<210> SEQ ID NO 126
<211> LENGTH: 4848
<212> TYPE: DNA
<213> ORGANISM: Artificial Sequence
<220> FEATURE:
<223> OTHER INFORMATION: AAV.A+F-EGFP

<400> SEQUENCE: 126

```
cagctgcgcg ctcgctcgct cactgaggcc gcccgggcaa agcccgggcg tcgggcgacc      60
tttggtcgcc cggcctcagt gagcgagcga gcgcgcagag agggagtggc caactccatc     120
actaggggtt cctgcggccg cacgcgtcta gtcatctcag ttgctgtcag ctgcttgtga     180
gccttctcac atccagagaa tgtatcagca ttgtgcagac tgaaaagacc cagaggaaca     240
aggctccaat ggcaaaattc caagtagaat gacaaataaa tggggagcca tctgagagca     300
agggagtcct gcccaacacc cgccccatgc ctttctcagg gacctcagac cagccactca     360
cctccatcct cccagcacca cctgcaacca gcccccttgcc ctctgcaaac tggagcacga     420
ctggatcttt agatgggggga aaaatgcttc atcatgttct gctgcttcat gcaaaaccag     480
aaactccctc cccctcttcc ctcctcccag cgcactctcc ttccagtaag tttaaacttc     540
cctcctcggt ccctgccccc tgccccgccc tctcactgc ggcggagccg tcggccggg     600 gggccgcagg ggaggaggcg gagagggcgg ggccctcctc cccaccctct cactgccaag     660
gggttggacc cggccgcggc ggctataaaa gggccggcgc cctggtgctg ccgcagtgcc     720
tcccgccccg tccggcctc gcgcacctgc tctcacgtga tcagagataa ttccccgggg     780
atcctctaga gtcgacctgc agaagctgat ccaccggtcg ccaccatggt gagcaagggc     840
```

```
gaggagctgt tcaccggggt ggtgcccatc ctggtcgagc tggacggcga cgtaaacggc      900
cacaagttca gcgtgtccgg cgagggcgag ggcgatgcca cctacggcaa gctgaccctg      960
aagttcatct gcaccaccgg caagctgccc gtgccctggc ccaccctcgt gaccaccctg     1020
acctacggcg tgcagtgctt cagccgctac cccgaccaca tgaagcagca cgacttcttc     1080
aagtccgcca tgcccgaagg ctacgtccag gagcgcacca tcttcttcaa ggacgacggc     1140
aactacaaga cccgcgccga ggtgaagttc gagggcgaca ccctggtgaa ccgcatcgag     1200
ctgaagggca tcgacttcaa ggaggacggc aacatcctgg ggcacaagct ggagtacaac     1260
tacaacagcc acaacgtcta tatcatggcc gacaagcaga agaacggcat caaggtgaac     1320
ttcaagatcc gccacaacat cgaggacggc agcgtgcagc tcgccgacca ctaccagcag     1380 aacacccccca tcggcgacgg ccccgtgctg ctgcccgaca accactacct gagcacccag     1440
tccgccctga gcaaagaccc caacgagaag cgcgatcaca tggtcctgct ggagttcgtg     1500
accgccgccg ggatcactct cggcatggac gagctgtaca gtaaagcgg ccagcttgcc     1560 tcgagcagcg ctgctcgaga gatctacggg tggcatccct gtgacccctc cccagtgcct     1620
ctcctggccc tggaagttgc cactccagtg cccaccagcc ttgtcctaat aaaattaagt     1680
tgcatcattt tgtctgacta ggtgtccttc tataatatta tggggtggag gggggtggta     1740
tggagcaagg gcaagttgg gaagacaacc tgtagggcct gcggggtcta ttggaaccca     1800
agctggagtg cagtggcaca atcttggctc actgcaatct ccgcctcctg ggttcaagcg     1860
attctcctgc ctcagcctcc cgagttgttg ggattccagg catgcatgac caggctcagc     1920 taattttttgt tttttggta gagacggggt ttcaccatat tggccaggct ggtctccaac     1980
tcctaatctc aggtgatcta cccaccttgg cctcccaaat tgctgggatt acaggcgtga     2040
accactgctc ccttccctgt ccttctgatt ttgtaggtaa ccacgtgcgg accgagcggc     2100
cgcaggaacc cctagtgatg gagttggcca ctccctctct gcgcgctcgc tcgctcactg     2160
aggccgggcg accaaaggtc gcccgacgcc cgggctttgc ccgggcggcc tcagtgagcg     2220
agcgagcgcg cagctgcctg aggggcgcct gatgcggtat tttctcctta cgcatctgtg     2280
cggtatttca caccgcatac gtcaaagcaa ccatagtacg cgcccgtag cggcgcatta     2340 agcgcggcgg gtgtggtggt tacgcgcagc gtgaccgcta cacttgccag cgccctagcg     2400
cccgctcctt tcgctttctt cccttccttt ctcgccacgt tcgccggctt tccccgtcaa     2460
gctctaaatc gggggctccc tttagggttc cgatttagtg ctttacggca cctcgacccc     2520
aaaaaacttg atttgggtga tggttcacgt agtgggccat cgccctgata cggttttt      2580 cgcccttga cgttggagtc cacgttcttt aatagtggac tcttgttcca actggaaca      2640 acactcaacc ctatctcggg ctattctttt gatttataag gattttgcc gattcggcc      2700 tattggttaa aaaatgagct gatttaacaa aaatttaacg cgaattttaa caaaatatta     2760
acgtttacaa ttttatggtg cactctcagt acaatctgct ctgatgccgc atagttaagc     2820
cagccccgac acccgccaac acccgctgac gcgccctgac gggcttgtct gctcccggca     2880
tccgcttaca caagctgt gaccgtctcc gggagctgca tgtgtcagag gttttcaccg     2940
tcatcaccga aacgcgcgag acgaaagggc ctcgtgatac gcctattttt ataggttaat     3000
gtcatgataa taatggtttc ttagacgtca ggtggcactt ttcggggaaa tgtgcgcgga     3060
acccctattt gtttattttt ctaaatacat tcaaatatgt atccgctcat gagacaataa     3120
ccctgataaa tgcttcaata atattgaaaa aggaagagta tgagtattca acatttccgt     3180
```

```
gtcgcccttataccctttttttgcggcattttgccttcctgttttttgctcacccagaaacg    3240 ctggtgaaagtaaaagatgctgaagatcagttgggtgcacgagtgggttacatcgaactg     3300 gatctcaacagcggtaagatccttgagagttttcgccccgaagaacgttttccaatgatg     3360 agcacttttaaagttctgctatgtggcgcggtattatcccgtattgacgccgggcaagag     3420 caactcggtcgccgcatacactattctcagaatgacttggttgagtactcaccagtcaca    3480 gaaaagcatcttacggatggcatgacagtaagagaattatgcagtgctgccataaccatg    3540 agtgataacactgcggccaacttacttctgacaacgatcgaggaccgaaggagctaacc    3600 gcttttttgcacaacatgggggatcatgtaactcgccttgatcgttgggaaccggagctg    3660 aatgaagccataccaaacgacgagcgtgacaccacgatgcctgtagcaatggcaacaacg    3720 ttgcgcaaactattaactggcgaactacttactctagcttcccggcaacaattaatagac    3780 tggatggaggcggataaagttgcaggaccacttctgcgctcggcccttccggctggctgg    3840 tttattgctgataaatctggagccggtgagcgtgggtctcgcggtatcattgcagcactg    3900 gggccagatggtaagccctcccgtatcgtagttatctacacgacggggagtcaggcaact    3960 atggatgaacgaaatagacagatcgctgagataggtgcctcactgattaagcattggtaa    4020 ctgtcagaccaagtttactcatatatactttagattgatttaaaacttcattttaatttt    4080 aaaaggatctaggtgaagatcctttttgataatctcatgaccaaaatcccttaacgtgag    4140 ttttcgttccactgagcgtcagaccccgtagaaaagatcaaaggatcttcttgagatcct    4200 ttttttctgcgcgtaatctgctgcttgcaaacaaaaaaaccaccgctaccagcggtggtt    4260 tgtttgccggatcaagagctaccaactctttttccgaaggtaactggcttcagcagagcg    4320 cagataccaaatactgtccttctagtgtagccgtagttaggccaccacttcaagaactct    4380 gtagcaccgcctacatacctcgctctgctaatcctgttaccagtggctgctgccagtggc    4440 gataagtcgtgtcttaccgggttggactcaagacgatagttaccggataaggcgcagcgg    4500 tcgggctgaacggggggttcgtgcacacagcccagcttggagcgaacgacctacaccgaa    4560 ctgagataccacagcgtgagctatgagaaagcgccacgcttcccgaagggagaaaggcg    4620 gacaggtatccggtaagcggcagggtcggaacaggagagcgcacgagggagcttccaggg    4680 ggaaacgcctggtatctttatagtcctgtcgggtttcgccacctctgacttgagcgtcga    4740 tttttgtgatgctcgtcaggggggcggagcctatggaaaaacgccagcaacgcggcctttt    4800 ttacggttcctggccttttgctggccttttgctcacatgtcctgcagg    4848
```

<210> SEQ ID NO 127
<211> LENGTH: 5396
<212> TYPE: DNA
<213> ORGANISM: Artificial Sequence
<220> FEATURE:
<223> OTHER INFORMATION: AAV.CMV-EGFP

<400> SEQUENCE: 127

```
cagctgcgcgctcgctcgctcactgaggccgcccgggcaaagcccgggcgtcgggcgacc    60 tttggtcgcccggcctcagtgagcgagcgagcgcgcagagagggagtggccaactccatc    120 actaggggttcctgcggccgcacgcgtggagctagttattaatagtaatcaattacgggg    180 tcattagttcatagcccatatatggagttccgcgttacataacttacggtaaatggcccg    240 cctggctgaccgcccaacgacccccgcccattgacgtcaataatgacgtatgttcccata    300 gtaacgtcaatagggactttccattgacgtcaatgggtggagtatttacggtaaactgcc    360 cacttggcagtacatcaagtgtatcatatgccaagtacgccccctattgacgtcaatgac    420
```

-continued

```
ggtaaatggc ccgcctggca ttatgcccag tacatgacct tatgggactt tcctacttgg      480
cagtacatct acgtattagt catcgctatt accatggtga tgcggttttg gcagtacatc      540
aatgggcgtg gatagcggtt tgactcacgg ggatttccaa gtctccaccc cattgacgtc      600
aatgggagtt tgttttgcac caaaatcaac gggactttcc aaaatgtcgt aacaactccg      660
ccccattgac gcaaatgggc ggtaggcgtg tacggtggga ggtctatata agcagagctc      720
gtttagtgaa ccgtcagatc gcctggagac gccatccacg ctgttttgac ctccatagaa      780
gacaccggga ccgatccagc ctccgcggat tcgaatcccg gccgggaacg gtgcattgga      840
acgcggattc cccgtgccaa gagtgacgta agtaccgcct atagagtcta taggcccaca      900
aaaaatgctt tcttctttta atatacttttt ttgtttatct tatttctaat actttcccta      960
atctctttct ttcagggcaa taatgataca atgtatcatg cctctttgca ccattctaaa     1020
gaataacagt gataatttct gggttaaggc aatagcaata tttctgcata taaatatttc     1080
tgcatataaa ttgtaactga tgtaagaggt ttcatattgc taatagcagc tacaatccag     1140
ctaccattct gcttttattt tatggttggg ataaggctgg attattctga gtccaagcta     1200 ggccctttg ctaatcatgt tcatacctct tatcttcctc ccacagctcc tgggcaacgt     1260
gctggtctgt gtgctggccc atcactttgg caaagaattg ggattcgaac atcgattgaa     1320
ttccccgggg atcctctaga gtcgacctgc aagctgatcc accggtcgcc accatggtga     1380
gcaagggcga ggagctgttc accggggtgg tgcccatcct ggtcgagctg gacggcgacg     1440
taaacggcca caagttcagc gtgtccggcg agggcgaggg cgatgccacc tacggcaagc     1500
tgaccctgaa gttcatctgc accaccggca agctgcccgt gccctggccc accctcgtga     1560
ccaccctgac ctacggcgtg cagtgcttca gccgctaccc cgaccacatg aagcagcacg     1620
acttcttcaa gtccgccatg cccgaaggct acgtccagga gcgcaccatc ttcttcaagg     1680
acgacggcaa ctacaagacc cgcgccgagg tgaagttcga gggcgacacc ctggtgaacc     1740
gcatcgagct gaagggcatc gacttcaagg aggacggcaa catcctgggg cacaagctgg     1800
agtacaacta caacagccac aacgtctata tcatggccga caagcagaag aacggcatca     1860
aggtgaactt caagatccgc cacaacatcg aggacggcag cgtgcagctc gccgaccact     1920
accagcagaa cacccccatc ggcgacggcc ccgtgctgct gcccgacaac cactacctga     1980
gcacccagtc cgccctgagc aaagacccca acgagaagcg cgatcacatg gtcctgctgg     2040
agttcgtgac cgccgccggg atcactctcg gcatggacga gctgtacaag taaagcggcc     2100
agcttgcctc gagcagcgct gctcgagaga tctacgggtg gcatccctgt gacccctccc     2160
cagtgcctct cctggccctg gaagttgcca ctccagtgcc caccagcctt gtcctaataa     2220
aattaagttg catcattttg tctgactagg tgtccttcta taatattatg gggtggaggg     2280
gggtggtatg gagcaagggg caagttggga agacaacctg tagggcctgc ggggtctatt     2340
gggaaccaag ctggagtgca gtggcacaat cttggctcac tgcaatctcc gcctcctggg     2400
ttcaagcgat tctcctgcct cagcctcccg agttgttggg attccaggca tgcatgacca     2460
ggctcagcta ttttttgttt ttttggtaga cggggttt caccatattg gccaggctgg     2520
tctccaactc ctaatctcag gtgatctacc caccttggcc tcccaaattg ctgggattac     2580
aggcgtgaac cactgctccc ttccctgtcc ttctgatttt gtaggtaacc acgtgcggac     2640
cgagcggccg caggaacccc tagtgatgga gttggccact ccctctctgc gcgctcgctc     2700
gctcactgag gccgggcgac caaaggtcgc ccgacgcccg ggctttgccc gggcggcctc     2760
```

```
agtgagcgag cgagcgcgca gctgcctgag gggcgcctga tgcggtattt tctccttacg    2820
catctgtgcg gtatttcaca ccgcatacgt caaagcaacc atagtacgcg ccctgtagcg    2880
gcgcattaag cgcggcgggt gtggtggtta cgcgcagcgt gaccgctaca cttgccagcg    2940
ccctagcgcc cgctcctttc gctttcttcc cttcctttct cgccacgttc gccggctttc    3000
cccgtcaagc tctaaatcgg gggctcccttt tagggttccg atttagtgct ttacggcacc   3060
tcgaccccaa aaaacttgat ttgggtgatg gttcacgtag tgggccatcg ccctgataga    3120
cggttttcg ccctttgacg ttggagtcca cgttctttaa tagtggactc ttgttccaaa     3180
ctggaacaac actcaaccct atctcgggct attcttttga tttataaggg attttgccga    3240
tttcggccta ttggttaaaa aatgagctga tttaacaaaa atttaacgcg aattttaaca    3300
aaatattaac gtttacaatt ttatggtgca ctctcagtac aatctgctct gatgccgcat    3360
agttaagcca gccccgacac ccgccaacac ccgctgacgc gccctgacgg gcttgtctgc    3420
tcccggcatc cgcttacaga caagctgtga ccgtctccgg gagctgcatg tgtcagaggt    3480
tttcaccgtc atcaccgaaa cgcgcgagac gaaagggcct cgtgatacgc ctattttat    3540
aggttaatgt catgataata atggtttctt agacgtcagg tggcactttt cggggaaatg    3600
tgcgcggaac ccctatttgt ttatttttct aaatacattc aaatatgtat ccgctcatga    3660
gacaataacc ctgataaatg cttcaataat attgaaaaag gaagagtatg agtattcaac    3720
atttccgtgt cgcccttatt ccctttttg cggcattttg ccttcctgtt tttgctcacc     3780
cagaaacgct ggtgaaagta aaagatgctg aagatcagtt gggtgcacga gtgggttaca    3840
tcgaactgga tctcaacagc ggtaagatcc ttgagagttt cgccccgaa gaacgttttc      3900
caatgatgag cacttttaaa gttctgctat gtggcgcggt attatcccgt attgacgccg     3960
ggcaagagca actcggtcgc cgcatacact attctcagaa tgacttggtt gagtactcac    4020
cagtcacaga aaagcatctt acggatggca tgacagtaag agaattatgc agtgctgcca    4080
taaccatgag tgataacact gcggccaact tacttctgac aacgatcgga ggaccgaagg    4140
agctaaccgc ttttttgcac aacatggggg atcatgtaac tcgccttgat cgttgggaac    4200
cggagctgaa tgaagccata ccaaacgacg agcgtgacac cacgatgcct gtagcaatgg    4260
caacaacgtt gcgcaaacta ttaactggcg aactacttac tctagcttcc cggcaacaat    4320
taatagactg gatggaggcg gataaagttg caggaccact tctgcgctcg gcccttccgg    4380
ctggctggtt tattgctgat aaatctggag ccggtgagcg tgggtctcgc ggtatcattg    4440
cagcactggg gccagatggt aagccctccc gtatcgtagt tatctacacg acggggagtc    4500
aggcaactat ggatgaacga aatagacaga tcgctgagat aggtgcctca ctgattaagc    4560
attggtaact gtcagaccaa gtttactcat atatacttta gattgattta aaacttcatt    4620
tttaatttaa aaggatctag gtgaagatcc tttttgataa tctcatgacc aaaatccctt    4680
aacgtgagtt ttcgttccac tgagcgtcag accccgtaga aaagatcaaa ggatcttctt    4740
gagatccttt ttttctgcgc gtaatctgct gcttgcaaac aaaaaaacca ccgctaccag    4800
cggtggtttg tttgccggat caagagctac caactctttt tccgaaggta actggcttca    4860
gcagagcgca gataccaaat actgtccttc tagtgtagcc gtagttaggc caccacttca    4920
agaactctgt agcaccgcct acatacctcg ctctgctaat cctgttacca gtggctgctg    4980
ccagtggcga taagtcgtgt cttaccgggt tggactcaag acgatagtta ccggataagg    5040
cgcagcggtc gggctgaacg gggggttcgt gcacacagcc cagcttggag cgaacgacct    5100
acaccgaact gagataccta cagcgtgagc tatgagaaag cgccacgctt cccgaaggga    5160
```

| | |
|---|---|
| gaaaggcgga caggtatccg gtaagcggca gggtcggaac aggagagcgc acgagggagc | 5220 |
| ttccaggggg aaacgcctgg tatctttata gtcctgtcgg gtttcgccac ctctgacttg | 5280 |
| agcgtcgatt tttgtgatgc tcgtcagggg ggcggagcct atggaaaaac gccagcaacg | 5340 |
| cggccttttt acggttcctg gccttttgct ggccttttgc tcacatgtcc tgcagg | 5396 |

<210> SEQ ID NO 128
<211> LENGTH: 6694
<212> TYPE: DNA
<213> ORGANISM: Artificial Sequence
<220> FEATURE:
<223> OTHER INFORMATION: AAV.huNEFH-EGFP

<400> SEQUENCE: 128

| | |
|---|---|
| cagctgcgcg ctcgctcgct cactgaggcc gcccgggcaa agcccgggcg tcgggcgacc | 60 |
| tttggtcgcc cggcctcagt gagcgagcga gcgcgcagag agggagtggc caactccatc | 120 |
| actaggggtt cctgcggccg cacgcgttaa gacgcgttgc tgtcagctgc ttgtgagcct | 180 |
| tctcacatcc agagaatgta tcagcattgt gcagactgaa agacccaga ggaacaaggc | 240 |
| tccaatggca aaattccaag tagaatgaca aataaatggg gagccatctg agagcaaggg | 300 |
| agtcctgccc aacacccgcc ccatgccttt ctcagggacc tcagaccagc cactcacctc | 360 |
| catcctccca gcaccacctg caaccagccc cttgccctct gcaaactgga gcacgactgg | 420 |
| atctttagat gggggaaaaa tgcttcatca tgttctgctg cttcatgcaa aaccagaaac | 480 |
| tccctccccc tcttccctcc tcccagcgca ctctccttcc agtaaaaagt ggttaaaggg | 540 |
| acagcgccat caatttccca gctctgaggg tctgcttaga actaggggc tggaaggaga | 600 |
| cagagggcaa agagaaagga actggcgagg gtctttcctg ggggatatgt ctgttctgtc | 660 |
| ctggggatcc tggagcagga aaacccgcgt aaagtagggg tgtagtgggt gttgagataa | 720 |
| ctgcctgggg gaggttcaga gtggaagtac gagtctacaa actctcaagg gcgtctcagg | 780 |
| gctcccagca tccccagggg tcctttcgca ggggtcccta agcaggaggg gaacagccca | 840 |
| gaaaacacgg aactggaccc ccgacaggaa gtccagggag gggtccctgg ctcactatgt | 900 |
| gaccctgctg gatcacttgc ctcccctctc gggtcccctc agcacagtgt ccctcccttc | 960 |
| cttcccctaa agtaaaagca gagggttaat ctctttcccc gccccacgcc caacaaagag | 1020 |
| caggccctgt cccggtgct gaagcgccag ccgcagcacc accccactc ccacagcata | 1080 |
| aaacatgagc caaaccaat aaagagccaa atgtcacagc cgttgcaggg ccccctaaat | 1140 |
| cctggggacc ccttcttcta cctgacatcc tattggggtg agggactttg gtactcagaa | 1200 |
| agcatctcat cacttccctg taagagagaa gggatgccga ctcaggcgcc tgcttgtctg | 1260 |
| ttacaggagt ggggggaagag aggacaagtt gaggctgaga agatggggag ggggagggag | 1320 |
| aaaagaggac ttcctagtgt tgacagaacg gcaagatgtg ggttccccat ccccagttca | 1380 |
| gccagagacc cctcaaagtg gaacttcctg gggcagtcgg gggtcaggag ttggagcttg | 1440 |
| tctctggggc aagacccctt cgttgtacag atggaaaaac aagggtggga ggacacagct | 1500 |
| tgtccaaggt cattcgacca gcaaactgcc tagctgaccc cagtgtgcag aagctggctc | 1560 |
| gggtgacacc catcatttcc ccccaccca cacagggggc agctctctca acttcatgcc | 1620 |
| caagccctcc tacggtaccc ccactgtagg ttctctgccc ctcaaactca gcccagcttt | 1680 |
| ctcctgcctg ttcaggggac cttctgcccg cttcgctgag ggtccgtccc ctttactggg | 1740 |
| gctggcagca gggtctccca tctcctctct cgggggccac tgcagacttt ttagagaacg | 1800 |

```
ccttgcctcc ccccaacccc acccatccgg ggttccctct ctccatcctc tgcagtgtct   1860
cccatacccc cattcagggt agccttgcta ttctccccaa ctccaggtcc cccttcatct   1920 attccgggc tggccgcgga gtttcctgag cgctctccaa gtgggtcctc tagatgttag   1980
gagaacactg tacctccccc ggtcaggggt ctcctgtctc cgttctatgg agcgtccatg   2040
ctcccattca ggactgcctt gctccctcct ctgttccggg gctggctgca cagtctctgc   2100 acccctatc ctgaaagcct ctcttaacta tttggaaagc ctcgtgtcct gtctcataca   2160
gggatcccct catcctaatg actgcaatct tccattgctc catcccgagg gcatcctgcc   2220
cctattccca tcaggtttct ccttgtcctc tccctgtttc aagtcccctt tcttattccg   2280
aacacactcg caggctcttc cgacgcgcac ccgggggtcc tcactggccc actccgggag   2340
tcctctgccc gcttcccga cctcgagggt ctcctctgac gcagcgtcga ttccccttcc   2400
ctcctcggtc ccctgccccg ccctctcac tgcggcggag ccggtcggcc ggggggccgc   2460
aggggaggag gcgagaggg cggggccctc ctccccaccc tctcactgcc aaggggttgg   2520
acccggccgc ggcggctata aaagggccgg cgccctggtg ctgccgcagt gcctcccgcc   2580
ccgtcccggc ctcgcgcacc tgctcagcga tatcctagga attccccatc ctctagagtc   2640
gacctgcaga agctatccac cggtcgccac catggtgagc aagggcgagg agctgttcac   2700
cggggtggtg cccatcctgg tcgagctgga cggcgacgta aacggccaca agttcagcgt   2760
gtccggcgag ggcgagggcg atgccaccta cggcaagctg accctgaagt tcatctgcac   2820
caccggcaag ctgcccgtgc cctggcccac cctcgtgacc accctgacct acggcgtgca   2880
gtgcttcagc cgctacccg accacatgaa gcagcacgac ttcttcaagt ccgccatgcc   2940
cgaaggctac gtccaggagc gcaccatctt cttcaaggac gacggcaact acaagacccg   3000
cgccgaggtg aagttcgagg gcgacaccct ggtgaaccgc atcgagctga agggcatcga   3060
cttcaaggag gacggcaaca tcctggggca caagctggag tacaactaca acagccacaa   3120
cgtctatatc atggccgaca gcagaagaa cggcatcaag gtgaacttca agatccgcca   3180
caacatcgag gacggcagcg tgcagctcgc cgaccactac cagcagaaca cccccatcgg   3240
cgacggcccc gtgctgctgc ccgacaacca ctacctgagc acccagtccg ccctgagcaa   3300
agaccccaac gagaagcgcg atcacatggt cctgctggag ttcgtgaccg ccgccgggat   3360
cactctcggc atggacgagc tgtacaagta aagcggccag cttgcctcga gcagcgctgc   3420
tcgagagatc tacgggtggc atccctgtga ccctccca gtgcctctcc tggccctgga   3480
agttgccact ccagtgccca ccagccttgt cctaataaaa ttaagttgca tcatttgtc   3540 tgactaggtg tccttctata atattatggg gtggagggg gtggtatgga gcaaggggca   3600
agttgggaag acaacctgta gggcctgcgg ggtctattgg gaaccaagct ggagtgcagt   3660
ggcacaatct tggctcactg caatctccgc ctcctgggtt caagcgattc tcctgcctca   3720
gcctcccgag ttgttgggat tccaggcatg catgaccagg ctcagctaat ttttgttttt   3780
ttggtagaga cggggtttca ccatattggc caggctggtc tccaactcct aatctcaggt   3840
gatctaccca ccttggcctc ccaaattgct gggattacag gcgtgaacca ctgctccctt   3900
ccctgtcctt ctgattttgt aggtaaccac gtgcggaccg agcggccgca ggaacccta   3960 gtgatggagt tggccactcc ctctctgcgc gctcgctcgc tcactgaggc cgggcgacca   4020
aaggtcgccc gacgcccggg ctttgcccgg gcggcctcag tgagcgagcg agcgcgcagc   4080
tgcctgaggg gcgcctgatg cggtatttc tccttacgca tctgtgcggt atttcacacc   4140
gcatacgtca aagcaaccat agtacgcgcc ctgtagcggc gcattaagcg cggcgggtgt   4200
```

```
ggtggttacg cgcagcgtga ccgctacact tgccagcgcc ctagcgcccg ctcctttcgc   4260
tttcttccct tcctttctcg ccacgttcgc cggctttccc cgtcaagctc taaatcgggg   4320
gctcccttta gggttccgat ttagtgcttt acggcacctc gaccccaaaa aacttgattt   4380
gggtgatggt tcacgtagtg ggccatcgcc ctgatagacg ttttttcgcc ctttgacgtt   4440
ggagtccacg ttctttaata gtggactctt gttccaaact ggaacaacac tcaaccctat   4500
ctcgggctat tcttttgatt tataagggat tttgccgatt tcggcctatt ggttaaaaaa   4560
tgagctgatt taacaaaaat ttaacgcgaa ttttaacaaa atattaacgt ttacaatttt   4620
atggtgcact ctcagtacaa tctgctctga tgccgcatag ttaagccagc cccgacaccc   4680
gccaacaccc gctgacgcgc cctgacgggc ttgtctgctc ccggcatccg cttacagaca   4740
agctgtgacc gtctccggga gctgcatgtg tcagaggttt tcaccgtcat caccgaaacg   4800
cgcgagacga aagggcctcg tgatacgcct atttttatag gttaatgtca tgataataat   4860
ggtttcttag acgtcaggtg gcacttttcg gggaaatgtg cgcggaaccc ctatttgttt   4920 attttttctaa atacattcaa atatgtatcc gctcatgaga caataaccct gataaatgct   4980
tcaataatat tgaaaaagga agagtatgag tattcaacat ttccgtgtcg cccttattcc   5040
cttttttgcg gcattttgcc ttcctgtttt tgctcaccca gaaacgctgg tgaaagtaaa   5100
agatgctgaa gatcagttgg gtgcacgagt gggttacatc gaactggatc tcaacagcgg   5160
taagatcctt gagagttttc gccccgaaga acgttttcca atgatgagca cttttaaagt   5220
tctgctatgt ggcgcggtat tatcccgtat tgacgccggg caagagcaac tcggtcgccg   5280
catacactat tctcagaatg acttggttga gtactcacca gtcacagaaa agcatcttac   5340
ggatggcatg acagtaagag aattatgcag tgctgccata accatgagtg ataacactgc   5400
ggccaactta cttctgacaa cgatcggagg accgaaggag ctaaccgctt ttttgcacaa   5460
catgggggat catgtaactc gccttgatcg ttgggaaccg gagctgaatg aagccatacc   5520
aaacgacgag cgtgacacca cgatgcctgt agcaatggca acaacgttgc gcaaactatt   5580
aactggcgaa ctacttactc tagcttcccg gcaacaatta atagactgga tggaggcgga   5640
taaagttgca ggaccacttc tgcgctcggc ccttccggct ggctggttta ttgctgataa   5700
atctggagcc ggtgagcgtg ggtctcgcgg tatcattgca gcactggggc cagatggtaa   5760
gccctcccgt atcgtagtta tctacacgac ggggagtcag gcaactatgg atgaacgaaa   5820
tagacagatc gctgagatag gtgcctcact gattaagcat tggtaactgt cagaccaagt   5880
ttactcatat atactttaga ttgatttaaa acttcatttt taatttaaaa ggatctaggt   5940
gaagatcctt tttgataatc tcatgaccaa atcccttaa cgtgagtttt cgttccactg   6000
agcgtcagac cccgtagaaa agatcaaagg atcttcttga tccttttt ttctgcgcgt   6060 aatctgctgc ttgcaaacaa aaaaaccacc gctaccagcg tggtttgtt tgccggatca   6120 agagctacca actcttttc cgaaggtaac tggcttcagc agagcgcaga taccaaatac   6180
tgtccttcta gtgtagccgt agttaggcca ccacttcaag aactctgtag caccgcctac   6240
atacctcgct ctgctaatcc tgttaccagt ggctgctgcc agtggcgata agtcgtgtct   6300
taccgggttg gactcaagac gatagttacc ggataaggcg cagcggtcgg gctgaacggg   6360
gggttcgtgc acacagccca gcttggagcg aacgacctac accgaactga gatacctaca   6420
gcgtgagcta tgagaaagcg ccacgcttcc cgaagggaga aaggcggaca ggtatccggt   6480
aagcggcagg gtcggaacag gagagcgcac gagggagctt ccaggggaa acgcctggta   6540
```

-continued

```
tctttatagt cctgtcgggt ttcgccacct ctgacttgag cgtcgatttt tgtgatgctc    6600 gtcaggggg cggagcctat ggaaaaacgc cagcaacgcg gccttttttac ggttcctggc    6660 cttttgctgg ccttttgctc acatgtcctg cagg                                6694
```

<210> SEQ ID NO 129
<211> LENGTH: 6570
<212> TYPE: DNA
<213> ORGANISM: Artificial Sequence
<220> FEATURE:
<223> OTHER INFORMATION: AAV.muNefh-EGFP

<400> SEQUENCE: 129

```
cagctgcgcg ctcgctcgct cactgaggcc gcccgggcaa agcccgggcg tcgggcgacc      60
tttggtcgcc cggcctcagt gagcgagcga gcgcgcagag agggagtggc caactccatc     120 actagggggtt cctgcggccg cacgcgttaa gacgcgtgcc acaccttta ccttcacaca     180 caccccactc ctatcattca tgtgtgctgt caactgcttg tcagacttct cacccccaag     240
aagggcatgt gcattctgca gacaactgaa gagactcgaa ggaacaagaa tctaataaca     300
aaaatccaag cagtatggga gataaatggg gaagccatgt gggcgtaagg gggtagaggt     360
ctgcatccca gtcccctccc catggcatct gcagtgcctc ccagcctttc tgaccccctgc    420 aaagagcagc atgactggac ctttaaattg ggaaaatgct tcatcatgtt ctgctccatc     480
atgaaaaact agagtctcct ccccctcctc cctagtgcac tctcctggcc tgcagccagg     540
ggctgggaat gagacacagg acaggaaagg gatctctttt agggaatcta tcagttctcc     600
tcctagggat ccctccaaaa gagaaaacca cagcaaactg gggtgcagtg aggcttgagg     660
taactgcctg ggagaagttc tgatctgaag aagtctatac tggtttccag agcttgtcag     720
tgggcattgg agtggggctc tctctgctcc gggaagaggt ttgcagggag aaagaacttc     780
acagagagcc aggcactgga caggacatgc agggtgggt cacttacata caaccgtagg     840
tcgtttcgag cccgtcatat gactcatcca atcctcccct gtaccgcaca gagggactgc    900
ttggaaaagc tatggaacct ccctactccg ttaggcatag atttaaccct tcccatccga     960
ggagcggctg ctgtccgtgg tgctgaagcg atagcggcac gggcggctcc gtccactaac    1020
accgcttttg accggaaaac caaaccaaga acgagccgta taataaagca agagctccaa    1080
gtctaagccc ctccgccgtc cccgcccttt cacctgaagc ctcagtaggg ctcatgatgg    1140
aggtcggtgg actttggtac tgaaaaacca ctccaccact tcctcggagc atgaaagggg    1200
atgcttacgg cagtactggt tcatctattc tggaaaagga atgagatgcc aagataaagc    1260
agaaaaatcg ggcaaggaag ggagaaagac aaagttctca ggtgagagga actggttact    1320
attccgactg gcaatatgtg ggttctcctc cccaaaatca gccagacatt tcccaagttc    1380
gaacctccta ggggcacatg ggagcttgga gctgcatctt gtctcttgca cacaagggaa    1440
aaccaaacat aggagaacac aatttgtaca aggtcattca gctagcgaag cacagaagct    1500
aaccccaccc tgtggcagaa cttggcttcg gtgttgaggc tcttgctgcc tactgaggga    1560
ccccctgttc ttcgtaggca gttttccttt ccgggcaaga ggagactcca ctttccagtc    1620
gtggccactg gaattttttag agagcaccac gttcctctca cccagcgctc cctttctccg    1680
tctgcagtgt tctccttctc agggtagctt tgcggtcctt tcaaactcca cgcccacccc    1740
aaccccaacc ccgaagccag ctgtacagtt ccttaagccc cttttgggtgg cccagggccg    1800 ctgtagtatc tggggaacac tgcaccgcca gctagaaggt ccccatttat catcagtagc    1860
atccatcatg caaccccata cagaatccct tcgtgggtga ctgcagtctg cactcctcat    1920
```

```
ctcaaggtcc tctctaacta tcagggaacc aaccctgtgc tgcttctcaa gtggggtgt    1980 cctctcatag taatcactgc agtctcccac tgcttcaacc cgaaggcgcc ctgacccatc   2040
agttctgcaa tcctctccct atttccagtg ccctctctta ttctgagggt cttattctga   2100
ctaatagggt cttccgacat gcacctggag gtctgcactt gtccgctccg gaagtccttt   2160
actccttggt ctgacctcgg gaggctctac tgacgatgcg tcgattcccc ttcactcctg   2220
ggtcgtcccc cccagccccg cccctctcac tgcggagaag ccggtcggcc ggggccgcg    2280 ggggaggagg tggagagggt ggggccctcc tccccagccc cccactgccg aggggccgga   2340
ccgggccacc gcggatataa aagagccgga gtcccgagac tgccgcagtg ctgcctgccc   2400
cgtcccagcc ccgcactccc gctccgctgg cggccgcacc tgctccggcc atgcccgtcc   2460
cagccccgca ctcccgctcc gctggcggcc gcacctgctc cggccattct agagtcgacc   2520
tgcagaagct atccaccggt cgccaccatg gtgagcaagg gcgaggagct gttcaccggg   2580
gtggtgccca tcctggtcga gctggacggc gacgtaaacg gccacaagtt cagcgtgtcc   2640
ggcgagggcg agggcgatgc cacctacggc aagctgaccc tgaagttcat ctgcaccacc   2700
ggcaagctgc ccgtgccctg gcccaccctc gtgaccaccc tgacctacgg cgtgcagtgc   2760
ttcagccgct accccgacca catgaagcag cacgacttct tcaagtccgc catgcccgaa   2820
ggctacgtcc aggagcgcac catcttcttc aaggacgacg gcaactacaa gacccgcgcc   2880
gaggtgaagt tcgagggcga caccctggtg aaccgcatcg agctgaaggg catcgacttc   2940
aaggaggacg gcaacatcct ggggcacaag ctggagtaca actacaacag ccacaacgtc   3000
tatatcatgg ccgacaagca agaacggca atcaaggtga acttcaagat ccgccacaac   3060
atcgaggacg gcagcgtgca gctcgccgac cactaccagc agaacacccc catcggcgac   3120
ggccccgtgc tgctgcccga caaccactac ctgagcaccc agtccgccct gagcaaagac   3180
cccaacgaga agcgcgatca catggtcctg ctggagttcg tgaccgccgc cgggatcact   3240
ctcggcatgg acgagctgta caagtaaagc ggccagcttg cctcgagcag cgctgctcga   3300
gagatctacg ggtggcatcc ctgtgacccc tccccagtgc ctctcctggc cctggaagtt   3360
gccactccag tgcccaccag ccttgtccta ataaaattaa gttgcatcat tttgtctgac   3420
taggtgtcct tctataatat tatggggtgg aggggggtgg tatggagcaa ggggcaagtt   3480
gggaagacaa cctgtagggc ctgcgggggtc tattgggaac caagctggag tgcagtggca   3540
caatcttggc tcactgcaat ctccgcctcc tgggttcaag cgattctcct gcctcagcct   3600
cccgagttgt tgggattcca ggcatgcatg accaggctca gctaattttt gttttttttgg   3660 tagagacggg gtttcaccat attggccagg ctggtctcca actcctaatc tcaggtgatc   3720
tacccacctt ggcctcccaa attgctggga ttacaggcgt gaaccactgc tcccttccct   3780
gtccttctga ttttgtaggt aaccacgtgc ggaccgagcg gccgcaggaa ccctagtga   3840 tggagttggc cactccctct ctgcgcgctc gctcgctcac tgaggccggg cgaccaaagg   3900
tcgcccgacg cccgggcttt gccgggcgg cctcagtgag cgagcgagcg cgcagctgcc   3960
tgaggggcgc ctgatgcggt attttctcct tacgcatctg tgcggtattt cacaccgcat   4020
acgtcaaagc aaccatagta cgcgcccgtg cgccggcgcat taagcgcggc gggtgtggtg   4080
gttacgcgca gcgtgaccgc tacacttgcc agcgccctag cgcccgctcc tttcgctttc   4140
ttcccttcct ttctcgccac gttcgccggc tttccccgtc aagctctaaa tcggggctc    4200 cctttagggt tccgatttag tgctttacgg cacctcgacc ccaaaaaact tgatttgggt   4260
```

```
gatggttcac gtagtgggcc atcgccctga tagacggttt ttcgcccttt gacgttggag    4320
tccacgttct ttaatagtgg actcttgttc caaactggaa caacactcaa ccctatctcg    4380
ggctattctt ttgatttata agggattttg ccgatttcgg cctattggtt aaaaaatgag    4440
ctgatttaac aaaaatttaa cgcgaatttt aacaaaatat taacgtttac aattttatgg    4500
tgcactctca gtacaatctg ctctgatgcc gcatagttaa gccagccccg acacccgcca    4560
acacccgctg acgcgccctg acgggcttgt ctgctcccgg catccgctta cagacaagct    4620
gtgaccgtct ccgggagctg catgtgtcag aggttttcac cgtcatcacc gaaacgcgcg    4680
agacgaaagg cctcgtgat acgcctattt ttataggtta atgtcatgat aataatggtt    4740
tcttagacgt caggtggcac ttttcgggga atgtgcgcg gaacccctat ttgtttattt    4800
ttctaaatac attcaaatat gtatccgctc atgagacaat aaccctgata aatgcttcaa    4860
taatattgaa aaaggaagag tatgagtatt caacatttcc gtgtcgccct tattcccttt    4920
tttgcggcat tttgccttcc tgttttttgct cacccagaaa cgctggtgaa agtaaaagat    4980
gctgaagatc agttgggtgc acgagtgggt tacatcgaac tggatctcaa cagcggtaag    5040
atccttgaga gttttcgccc cgaagaacgt tttccaatga tgagcacttt taaagttctg    5100
ctatgtggcg cggtattatc ccgtattgac gccgggcaag agcaactcgg tcgccgcata    5160
cactattctc agaatgactt ggttgagtac tcaccagtca cagaaaagca tcttacggat    5220
ggcatgacag taagagaatt atgcagtgct gccataacca tgagtgataa cactgcggcc    5280
aacttacttc tgacaacgat cggaggaccg aaggagctaa ccgcttttttt gcacaacatg    5340 ggggatcatg taactcgcct tgatcgttgg gaaccggagc tgaatgaagc cataccaaac    5400
gacgagcgtg acaccacgat gcctgtagca atggcaacaa cgttgcgcaa actattaact    5460
ggcgaactac ttactctagc ttcccggcaa caattaatag actggatgga ggcggataaa    5520
gttgcaggac cacttctgcg ctcggccctt ccggctggct ggtttattgc tgataaatct    5580
ggagccggtg agcgtgggtc tcgcggtatc attgcagcac tggggccaga tggtaagccc    5640
tcccgtatcg tagttatcta cacgacgggg agtcaggcaa ctatggatga acgaaataga    5700
cagatcgctg agataggtgc ctcactgatt aagcattggt aactgtcaga ccaagtttac    5760
tcatatatac tttagattga tttaaaactt catttttaat ttaaaaggat ctaggtgaag    5820
atcctttttg ataatctcat gaccaaaatc ccttaacgtg agttttcgtt ccactgagcg    5880
tcagacccgt agaaaagat caaaggatct tcttgagatc cttttttttct gcgcgtaatc    5940 tgctgcttgc aaacaaaaaa accaccgcta ccagcggtgg tttgtttgcc ggatcaagag    6000
ctaccaactc tttttccgaa ggtaactggc ttcagcagag cgcagatacc aaatactgtc    6060
cttctagtgt agccgtagtt aggccaccac ttcaagaact ctgtagcacc gcctacatac    6120
ctcgctctgc taatcctgtt accagtggct gctgccagtg gcgataagtc gtgtcttacc    6180
gggttggact caagacgata gttaccggat aaggcgcagc ggtcgggctg aacggggggt    6240
tcgtgcacac agcccagctt ggagcgaacg acctacaccg aactgagata cctacagcgt    6300
gagctatgag aaagcgccac gcttcccgaa gggagaaagg cggacaggta tccggtaagc    6360
ggcagggtcg gaacaggaga gcgcacgagg gagcttccag ggggaaacgc ctggtatctt    6420
tatagtcctg tcgggtttcg ccacctctga cttgagcgtc gatttttgtg atgctcgtca    6480
ggggggcgga gcctatggaa aaacgccagc aacgcggcct ttttacggtt cctggccttt    6540
tgctggcctt ttgctcacat gttcctgcagg                                    6570
```

RETINAL PROMOTER AND USES THEREOF

CROSS REFERENCE TO RELATED APPLICATIONS

This application is a US national phase of International Application No. PCT/FR2017/052476, filed on Sep. 15, 2017, which claims benefit from FR Patent Application No. 1658666, filed on Sep. 15, 2016, the entire contents of each of which are incorporated herein by reference.

FIELD OF THE INVENTION

The invention relates to promoters, in particular promoters for driving expression of genes in the retina. The invention further relates to vectors comprising such promoters and the use of said promoters and vectors in medical treatments, in particular in the treatment of conditions and diseases of the eye. In addition the invention relates to the use of said promoters and vectors in methods such as to drive the expression of marker genes, e.g., EGFP in retina.

BACKGROUND OF THE INVENTION

In recent years significant progress has been made in gene therapy with the market authorisation of therapies such as Glybera®, T-VEC (Imlygic™) and Strimvelis™ Many more potential gene therapies are currently in later phase clinical trials (clinicaltrials.gov) and it is likely that the rate of clinical development will continue to increase. Advances in our understanding of viral vectors has allowed for the generation of a range of delivery vehicles that can collectively target a wide array of cell types.

The retina in particular has been the focus of many gene therapy studies. The retina is a confined but readily accessible target, and retinal neurons are non-dividing in mammals—thus a gene therapy can in theory provide long-term benefit. Furthermore the retina is immune privileged and therefore, in principle, may be more tolerant of treatments. Indeed, many gene therapy clinical trials have been completed or are ongoing in the retina (clinicaltrials.gov). Adeno-associated virus (AAV) has been the vehicle of choice for the majority of retinal gene therapy studies as it achieves efficient neuronal transduction, provides long-term expression in terminally differentiated cells and has demonstrated a good safety profile in humans (Bainbridge et al., 2015; Bennett et al., 2016; Feuer et al., 2015; Ghazi et al., 2016; Hauswirth et al., 2008; MacLaren et al., 2014; Russell et al., 2017; clinicaltrials.gov). The successful completion of a Phase III trial to treat RPE65-linked inherited retinal degenerations, such as Leber congenital amaurosis (LCA; sparktx.com; Russell et al., 2017) represents a significant milestone in the field.

Many therapeutic studies to date targeting the retina have been directed towards photoreceptor cells and the retinal pigment epithelium (RPE). Approximately 1/3000 people worldwide suffer from an inherited retinal degeneration (IRD); many of these are caused by mutations directly or indirectly affecting photoreceptors (Bessant et al., 2001). However, retinal disorders involving the ganglion cell layer (GCL) should in theory also be readily amenable to gene therapy, given efficient cell targeting. Intravitreal injection of AAV for delivery to GCL typically involves less surgical trauma than subretinal injection. Notably, anti-VEGF treatments, such as Lucentis, are routinely administered intravitreally to age related macular degeneration (AMD) patients.

Limiting expression of a gene therapy to a target cell type is often preferable, and in principle represents a valuable safety feature. Although AAV-mediated ocular gene therapy has been shown to be well-tolerated (Bainbridge et al., 2015; Bennett et al., 2016; Feuer et al., 2015; Ghazi et al., 2016; Hauswirth et al., 2008; MacLaren et al., 2014; Russell et al., 2017) directing transgene expression to the target cells of interest may reduce the chance of immune response(s) or other unwanted off-target effects, thus providing a more efficacious therapy. There are approximately 1.5 million retinal ganglion cells (RGCs) in the human retina, comprising approximately 1% of retinal neurons, (Callaway, 2005) and composed of over thirty different classes of cells (Baden et al., 2016; Masland, 2012). However, knowledge regarding the different types of RGCs populating the GCL is still emerging. A number of gene therapies have been directed towards RGCs, with several ongoing or completed clinical trials (Feuer et al., 2016; Yang et al., 2016; clinicaltrials.gov).

Such therapies have typically utilised ubiquitous promoters such as cytomegalovirus (CMV) or chicken-β-actin (CBA; Bennett et al., 2016; Boye et al., 2010; Feuer et al., 2016; Koilkonda et al., 2010). These promoters typically offer high levels of expression, and tend to be small in size, which is valuable as the packaging capacity of AAV is limited to approximately 2-5 kb, with an optimum at 4.7 kb (Dong et al., 1996; Grieger and Samulski, 2005). However, a significant disadvantage of generic promoters is that, they may drive gene expression in cell types other than the target cells.

Cell-type specific promoters such as rhodopsin (Bennett et al., 1998; Flannery et al., 1997; O'Reilly et al., 2007; Palfi et al., 2010; Wert et al., 2013), rhodopsin kinase (Boye et al., 2010; Kay et al., 2013; Khani et al., 2007; Molday et al., 2013; Sun et al., 2010), RPE65 (Bainbridge et al., 2008, 2015) and retinaldehyde binding protein 1 (RLBP1; Choi et al., 2015), among others, have successfully been used in retinal gene therapy approaches. Preferential RGC expression in transgenic animal models has been achieved using the Thy1 promoter, which confers expression that is thought to be limited to RGCs. It has been shown that an enhancer element contained in the first intron of Thy1 is necessary for both high level and specific gene expression (Aliç et al., 2016; Spanopoulou et al., 1991). However, while the core promoter and enhancer element are both small (~100-200 bp each), approximately 6 kb of spacing between the two elements is believed to be necessary for specific promoter function, making the Thy1 promoter unsuitable for use in AAV vectors. A 0.48 kb promoter derived from the human synapsin-1 gene (hSYN) can provide pan-neuronal expression in rodent and primate brains when utilised in adenoviral or AAV vectors (Diester et al., 2011; Kügler et al., 2003a, 2003b; Lopez et al., 2016). In the rodent retina, intravitreal injection of an AAV gene construct driven by hSYN resulted in expression in the GCL (Gaub et al., 2014). However, in the context of the primate retina, hSYN promoter-mediated expression only appears to occur in damaged retinas or vitreolysed eyes (Yin et al., 2011). The therapeutic relevance of the hSYN promoter therefore remains to be fully established. Hence, the characterisation of a promoter that exhibits preferential RGC expression and may be used reliably in gene therapy of the eye would represent a significant refinement for RGC gene therapies. Such a promoter would be of particular value if it were sufficiently small for use in AAV vectors.

SUMMARY OF THE INVENTION

The present invention addresses some of the problems of the prior art. The inventors have performed extensive studies to identify suitable promoters for use in gene therapy of the eye. They have developed and refined a number of criteria to identify suitable candidate promoters to drive preferential gene expression in RGCs for use in gene therapy of the eye or for use to drive marker gene expression in RGCs. Having identified a candidate promoter sequence the inventors established its suitability experimentally in vivo. Initially, GCL-specific microarray expression data from post-mortem human retinas was used (Kim et al., 2006). In this paper, Kim et al. describe the isolation of GCL populations consisting of 1,000 RGCs using laser-capture microdissection (LCM) and cell populations consisting of 1,000 cells from the remainder of the retina (termed outer retina, OR) and the comparison of gene expression between the two populations. Using these data, the present inventors have assessed promoter conservation between mammalian species for genes that were highly expressed and enriched in RGCs, using data drawn from the UCSC database (mm10; Kent et al., 2002). Conservation of non-coding DNA sequence across species was used as an indicator of potential function, and a number of highly conserved promoter upstream sequences were identified from genes shown to be both highly expressed and enriched in RGCs (Choudhury et al., 2016; Kim et al., 2006; Struebing et al., 2016). Candidate promoters were evaluated and compared to CMV-driven gene expression in RGCs in vivo.

One of the candidate sequences identified was an upstream sequence of the Neurofilament heavy gene (Nefh). Prior to the present study, promoter sequence for this gene had not been characterised. As described in the examples, an approximately 2.5 kb upstream fragment of the murine Nefh gene was shown to efficiently direct expression preferentially to RGCs when administered intravitreally to adult wild type mice using AAV2, in contrast to the broad expression pattern observed with the CMV promoter. Moreover, the inventors have further identified sequence regions within the murine, human and other mammalian Nefh promoter areas that are conserved between species, indicating their importance to its promoter function and moreover have demonstrated that such a promoter sequence can advantageously be used in AAV-mediated ocular gene delivery.

Accordingly, in a first aspect of the invention, there is provided method of treatment of ocular disease, wherein said method comprises administering to an eye an isolated nucleic acid molecule having promoter activity, wherein said nucleic acid molecule comprises at least Neurofilament heavy gene promoter conserved region A and optionally one or more of Neurofilament heavy gene promoter conserved regions D, F, D1, K, B, C and E;

wherein Neurofilament heavy gene promoter conserved region A is a nucleotide sequence having the nucleotide sequence shown as SEQ ID NO: 1, or a functional variant thereof; Neurofilament heavy gene promoter conserved region D is a nucleotide sequence having the nucleotide sequence shown as SEQ ID NO: 2, or a functional variant thereof; Neurofilament heavy gene promoter conserved region F is a nucleotide sequence having the nucleotide sequence shown as SEQ ID NO: 3, or a functional variant thereof; Neurofilament heavy gene promoter conserved region D1 is a nucleotide sequence having the nucleotide sequence shown as SEQ ID NO: 4, or a functional variant thereof; Neurofilament heavy gene promoter conserved region K is a nucleotide sequence having the nucleotide sequence shown as SEQ ID NO: 5, or a functional variant thereof; Neurofilament heavy gene promoter conserved region B is a nucleotide sequence having the nucleotide sequence shown as SEQ ID NO: 6, or a functional variant thereof; Neurofilament heavy gene promoter conserved region C is a nucleotide sequence having the nucleotide sequence shown as SEQ ID NO: 7, or a functional variant thereof; and Neurofilament heavy gene promoter conserved region E is a nucleotide sequence having the nucleotide sequence shown as SEQ ID NO: 8, or a functional variant thereof.

A second aspect of the invention, provides an isolated nucleic acid molecule having promoter activity for use in the treatment of ocular disease, wherein said nucleic acid molecule comprises at least Neurofilament heavy gene promoter conserved region A; and optionally one or more of Neurofilament heavy gene promoter conserved regions D, F, D1, K, B, C and E;

wherein Neurofilament heavy gene promoter conserved region A is a nucleotide sequence having the nucleotide sequence shown as SEQ ID NO: 1, or a functional variant thereof; Neurofilament heavy gene promoter conserved region D is a nucleotide sequence having the nucleotide sequence shown as SEQ ID NO: 2, or a functional variant thereof; Neurofilament heavy gene promoter conserved region F is a nucleotide sequence having the nucleotide sequence shown as SEQ ID NO: 3, or a functional variant thereof; Neurofilament heavy gene promoter conserved region D1 is a nucleotide sequence having the nucleotide sequence shown as SEQ ID NO: 4, or a functional variant thereof; Neurofilament heavy gene promoter conserved region K is a nucleotide sequence having the nucleotide sequence shown as SEQ ID NO: 5, or a functional variant thereof; Neurofilament heavy gene promoter conserved region B is a nucleotide sequence having the nucleotide sequence shown as SEQ ID NO: 6, or a functional variant thereof; Neurofilament heavy gene promoter conserved region C is a nucleotide sequence having the nucleotide sequence shown as SEQ ID NO: 7, or a functional variant thereof; and Neurofilament heavy gene promoter conserved region E is a nucleotide sequence having the nucleotide sequence shown as SEQ ID NO: 8, or a functional variant thereof.

A third aspect provides an isolated nucleic acid molecule having promoter activity, wherein said nucleic acid molecule comprises Neurofilament heavy gene promoter conserved region A and optionally one or more of Neurofilament heavy gene promoter conserved regions D, F, D1, K, B, C and E, wherein said nucleic acid molecule comprises no more than three of the group of Neurofilament heavy gene promoter conserved regions consisting of Neurofilament heavy gene promoter conserved regions D, F, D1, and K and no more than four of the group of Neurofilament heavy gene promoter conserved regions consisting of Neurofilament heavy gene promoter conserved regions D, F, B, C, and E;

wherein Neurofilament heavy gene promoter conserved region A is a nucleotide sequence having the nucleotide sequence shown as SEQ ID NO: 1, or a functional variant thereof; Neurofilament heavy gene promoter conserved region D is a nucleotide sequence having the nucleotide sequence shown as SEQ ID NO: 2, or a functional variant thereof; Neurofilament heavy gene promoter conserved region F is a nucleotide sequence having the nucleotide sequence shown as SEQ ID NO: 3, or a functional variant thereof; Neurofilament heavy gene promoter conserved region D1 is a nucleotide sequence having the nucleotide sequence shown as SEQ ID NO: 4, or a functional variant thereof; Neurofilament heavy gene promoter conserved region K is a nucleotide sequence having the nucleotide sequence shown as SEQ ID NO: 5, or a functional variant thereof; Neurofilament heavy gene promoter conserved region B is a nucleotide sequence having the nucleotide sequence shown as SEQ ID NO: 6, or a functional variant thereof; Neurofilament heavy gene promoter conserved region C is a nucleotide sequence having the nucleotide sequence shown as SEQ ID NO: 7, or a functional variant thereof; and Neurofilament heavy gene promoter conserved region E is a nucleotide sequence having the nucleotide sequence shown as SEQ ID NO: 8, or a functional variant thereof.

In one embodiment of the first, second, or third aspect of the invention, said nucleic acid molecule comprises Neurofilament heavy gene promoter conserved region A and Neurofilament heavy gene promoter conserved region D, or Neurofilament heavy gene promoter conserved region A and Neurofilament heavy gene promoter conserved region F. In one embodiment of the first, second, or third aspect of the invention, said nucleic acid molecule comprises each of Neurofilament heavy gene promoter conserved region A, Neurofilament heavy gene promoter conserved region D, and Neurofilament heavy gene promoter conserved region F.

In the context of the present application, the term "Neurofilament heavy gene promoter conserved region(s)" may be abbreviated to "NEFH promoter conserved region" or "Nefh promoter conserved region". Unless the context demands otherwise, the terms should be considered interchangeable, with neither NEFH promoter nor Nefh promoter implying species specificity. Thus reference to a "NEFH promoter conserved region" should not be considered to be limited to a human Neurofilament heavy gene promoter conserved region but may encompass a corresponding murine Neurofilament heavy gene promoter conserved region or indeed a corresponding Neurofilament heavy gene promoter conserved region of another species. Likewise, unless the context demands otherwise, reference to a "Nefh promoter conserved region" should not be considered to be limited to a murine Neurofilament heavy gene promoter conserved region but may encompass a corresponding human Neurofilament heavy gene promoter conserved region or indeed a corresponding Neurofilament heavy gene promoter conserved region of another species.

In the context of the present invention, NEFH promoter conserved region A is a nucleotide sequence having the nucleotide sequence shown as SEQ ID NO: 1, or a functional variant thereof; NEFH promoter conserved region D is a nucleotide sequence having the nucleotide sequence shown as SEQ ID NO: 2, or a functional variant thereof; and NEFH promoter conserved region F is a nucleotide sequence having the nucleotide sequence shown as SEQ ID NO: 3, or a functional variant thereof.

| SEQ ID NO: 1 |
|---|
| CCCTGCCCCGCCCCTCTCACTGCGGCGGAGCCGGTCGGCCGGGGGGCCGC<br>AGGGGAGGAGGCGGAGAGGGCGGGGCCCTCCTCCCCACCCTCTCACTGCC<br>AAGGGGTTGGACCCGGCCGCGGCGGCTATAAAAGGGCCGGCGCCCTGGTG<br>CTGCCGCAGTGCCTCCCGCCCCGTCCCGGCCTCGCGCACCTGCTC |

| SEQ ID NO: 2 |
|---|
| GGAAAAACAAGGGTGGGAGGACACAGCTTGTCCAAGGTCATTC |

| SEQ ID NO: 3 |
|---|
| TGCTGTCAGCTGCTTGTGAGCCTTCTCACATCCAGAGAATGTAT<br>CAGCATTGTGCAGACTGAAAAGACCCAGAGGAACAAGGCTCCAA<br>TGGCAAAATTCCAAGTAGAATGACAAATAAATGGGGAGCCATCT |

| -continued |
|---|
| GAGAGCAAGGGAGTCCTGCCCAACACCCGCCCCATGCCTTTCTC<br>AGGGACCTCAGACCAGCCACTCACCTCCATCCTCCCAGCACCAC<br>CTGCAACCAGCCCCTTGCCCTCTGCAAACTGGAGCACGACTGGA<br>TCTTTAGATGGGGGAAAAATGCTTCATCATGTTCTGCTGCTTCA<br>TGCAAAACCAGAAACTCCCTCCCCCTCTTCCCTCCTCCCAGCGC<br>ACTCTCCT |

In addition, further regions of the promoter have been identified as showing high levels of conservation across placental mammals. For example, the inventors have shown that in many placental mammals, including humans and other primates, the regions identified herein as D1 and K are also highly conserved.

Optionally, the isolated nucleic acid of the first, second or third aspect of the invention further comprises at least one of the conserved regions selected from: NEFH promoter conserved region D1, and K. In one embodiment, said nucleic acid molecule comprises each of NEFH promoter conserved regions D1 and NEFH promoter conserved region K. In an embodiment of the first or second aspect of the invention, said nucleic acid molecule comprises each of NEFH promoter conserved regions A, D, D1, K, and F.

In the context of the present invention, NEFH promoter conserved region D1 is a nucleotide sequence having the nucleotide sequence shown as SEQ ID NO: 4, or a functional variant thereof; and NEFH promoter conserved region K is a nucleotide sequence having the nucleotide sequence shown as SEQ ID NO: 5, or a functional variant thereof.

| SEQ ID NO: 4 |
|---|
| GACCAGCAAACTGCCTAGCTGACCCCA (SEQ ID NO: 4) |

| SEQ ID NO: 5 |
|---|
| GGCCCTGTCCCCGGTGCTGAAGCGCCAG (SEQ ID NO: 5) |

The inventors have also shown that in mice and many other non-primate placental mammals, the regions identified herein as B, C and E are also highly conserved.

Thus, optionally, the isolated nucleic acid molecule of the first, second or third aspect of the invention further comprises at least one of the conserved murine regions selected from: Nefh promoter conserved region B, Nefh promoter conserved region C, and Nefh promoter conserved region E. For example, said nucleic acid molecule may comprise at least two of Nefh promoter conserved region B, Nefh promoter conserved region C, and Nefh promoter conserved region E, for example, Nefh promoter conserved region B and Nefh promoter conserved region C, Nefh promoter conserved region B and Nefh promoter conserved region E, or Nefh promoter conserved region C and Nefh promoter conserved region E. In one embodiment, said nucleic acid molecule comprises each of Nefh promoter conserved regions B, Nefh promoter conserved region C, and Nefh promoter conserved region E.

In a particular embodiment of the first or second aspect of the invention, said nucleic acid molecule comprises each of Nefh promoter conserved regions A, D, F, D1, K, B, C, and E.

In the context of the present invention, Nefh promoter conserved region B is a nucleotide sequence having the nucleotide sequence shown as SEQ ID NO: 6, or a functional variant thereof; Nefh promoter conserved region C is a nucleotide sequence having the nucleotide sequence shown as SEQ ID NO: 7, or a functional variant thereof; and Nefh promoter conserved region E is a nucleotide sequence having the nucleotide sequence shown as SEQ ID NO: 8, or a functional variant thereof.

SEQ ID NO: 6

SEQ ID NO: 6

TAACT

SEQ ID NO: 7

SEQ ID NO: 7

CTTTCAAACTCCA

SEQ ID NO: 8

SEQ ID NO: 8

TTAACCCTTCCCATCCGAGGAGCGGCTGCTGTCCGTGGTGCTGAAGCGAT
AGCGGCACGGGCGGCTCCGTCCAC

As described in the examples, the inventors have shown that the upstream promoter region including Nefh promoter conserved regions A, B, C, D, E, and F in the mouse and NEFH promoter conserved regions A, D1, D, F, and K in the human sequence are comprised within the 2500 to −1 upstream sequence and that utilising a promoter sequence comprising this portion of the upstream region of the gene confers cell-specificity on expression. Accordingly, in one embodiment, the isolated nucleic acid molecule of the first or second aspect of the invention comprises 2501 bp of human NEFH upstream nucleic acid sequence shown as SEQ ID NO:21. Optionally, the isolated nucleic acid molecule of the first, second or third aspect comprises less than 3000 base pairs, for example less than 2700 base pairs, such as less than 2500 base pairs, for example less than 2300, such as less than 2000, such as less than 1500, such as less than 1000 base pairs. In one embodiment of the first or second aspects of the invention, the isolated nucleic acid molecule of the first aspect of the invention consists of the nucleic acid sequence shown as SEQ ID NO: 21.

SEQ ID NO: 21

CAGAATACATCTTGGAGCCCCCTTTTTACCCCAAACCCCCATTCCTCCTT
GCTGTCAGCTGCTTGTGAGCCTTCTCACATCCAGAGAATGTATCAGCATT
GTGCAGACTGAAAAGACCCAGAGGAACAAGGCTCCAATGGCAAAATTCCA
AGTAGAATGACAAATAAATGGGGAGCCATCTGAGAGCAAGGGAGTCCTGC
CCAACACCCGCCCCATGCCTTTCTCAGGGACCTCAGACCAGCCACTCACC
TCCATCCTCCCAGCACCACCTGCAACCAGCCCCTTGCCCTCTGCAAACTG
GAGCACGACTGGATCTTTAGATGGGGGAAAAATGCTTCATCATGTTCTGC
TGCTTCATGCAAAACCAGAAACTCCCTCCCCCTCTTCCCTCCTCCCAGCG
CACTCTCCTTCCAGTAAAAAGTGGTTAAAGGGACAGCGCCATCAATTTCC
CAGCTCTGAGGGTCTGCTTAGAACTAGGGGGCTGGAAGGAGACAGAGGGC
AAAGAGAAAGGAACTGGCAGAGGTCTTTCCTGGGGGATATGTCTGTTCTG
TCCTGGGGATCCTGGAGCAGGAAAACCCGCGTAAAGTAGGGGTGTAGTGG
GTGTTGAGATAACTGCCTGGGGGAGGTTCAGAGTGGAAGTACGAGTCTAC
AAACTCTCAAGGGCGTCTCAGGGCTCCCAGCATCCCCAGGGGTCCTTTCG
CAGGGGTCCCTAAGCAGGAGGGGAACAGCCCAGAAAACACGGAACTGGAC
CCCCGACAGGAAGTCCAGGGAGGGGTCCCTGGCTCACTATGTGACCCTGC
TGGATCACTTGCCTCCCCTCTGGGGTCCCCTCAGCACAGTGTCCCTCCCT
TCCTTCCCCTAAAGTAAAAGCAGAGGGTTAATCTCTTTCCCCGCCCCACG
CCCAACAAAGAGCAGGCCCTGTCCCCGGTGCTGAAGCGCCAGCCGCAGCA
CCACCCCCACTCCCACAGCATAAAACATGAGCCAAAACCAATAAAGAGCC
AAATGTCACAGCCGTTGCAGGGCCCCCTAAATCCTGGGGACCCCTTCTTC
TACCTGACATCCTATTGGGGTGAGGGACTTTGGTACTCAGAAAGCATCTC
ATCACTTCCCTGTAAGAGAGAAGGGATGCCGACTCAGGCGCCTGCTTGTC
TGTTACAGGAGTGGGGAAGAGAGGACAAGTTGAGGCTGAGAAGATGGGG
AGGGGGAGGGAGAAAAGAGGACTTCCTAGTGTTGACAGAACGGCAAGATG

-continued

SEQ ID NO: 21

TGGGTTCCCCATCCCCAGTTCAGCCAGAGACCCCTCAAAGTGGAACTTCC
TGGGGCAGTCGGGGGTCAGGAGTTGGAGCTTGTCTCTGGGGCAAGACCCC
TTCGTTGTACAGATGGAAAAACAAGGGTGGGAGGACACAGCTTGTCCAAG
GTCATTCGACCAGCAAACTGCCTAGCTGACCCCAGTGTGCAGAAGCTGGC
TCGGGTGACACCCATCATTTCGCCCCACCCCACACAGGGGCCAGCTCTCT
CAACTTCATGCCCAAGCCCTCGTACGGTACCCCCACTGTAGGTTCTCTGC
CCCTCAAACTCAGCCCAGCTTTCTCCTGCCTGTTCAGGGGACCTTCTGCC
CGCTTCGCTGAGGGTCCGTCCCCTTTACTGGGGCTGGCAGCAGGGTCTCC
CATCTCCTCTCTCGGGGGCCACTGCAGACTTTTTAGAGAACGCCTTGCCT
CCCCCCAACCCCACCCATCCGGGGTTCCCTCTCTCCATCCTCTGCAGTGT
CTCCCATACCCCCATTCAGGGTAGCCTTGCTATTCTCCCCAACTCCAGGT
CCCCCTTCATCTATTCCGGGGCTGGCCGCGGAGTTTCCTGAGCGCTCTCC
AAGTGGGTCCTCTAGATGTTAGGAGAACACTGTACCTCCCCCGGTCAGGG
GTCTCCTGTCTCCGTTCTATGGAGCGTCCATGCTCCCATTCAGGACTGCC
TTGCTCCCTCCTCTGTTCCGGGGCTGGCTGCACAGTCTCTGCACCCCCTA
TCCTGAAAGCCTCTCTTAACTATTTGGAAAGCCTCGTGTCCTGTCTCATA
CAGGGATCCCCTCATCCTAATGACTGCAATCTTCCATTGCTCCATCCCGA
GGGCATCCTGCCCCTATTCCCATCAGGTTTCTCCTTGTCCTCTCCCTGTT
TCAAGTCCCCTTTCTTATTCCGAACACACTCGCAGGCTCTTCCGACGCGC
ACCCGGGGGTCCTCACTGGCCCACTCCGGGAGTCCTCTGCCCGCTTCCCC
GACCTCGAGGGTCTCCTCTGACGCAGCGTCGATTCCCCTTCCCTCCTCGG
TCCCCTGCCCCGCCCCTCTCAGTGCGGCGGAGCCGGTCGGCCGGGGGCC
GCAGGGGAGGAGGCGGAGAGGGCGGGCCCTCCTCCCCACCCTCTCACTG
CCAAGGGGTTGGACCCGGCCGGGGCGGCTATAAAAGGGCCGGCGCCCTGG
TGCTGCCGCAGTGCCTCCCGCGCCGTCCCGGCCTCGCGCACCTGCTCAGG
C

As described in the examples, the inventors have shown that, for retinal ganglion cell specificity, the full length NEFH promoter is not required. Moreover, all of the conserved regions are not required. For example, as shown herein, promoters having only one of the recited conserved regions, conserved region A, in the absence of the other conserved regions, provides efficient targeting to retinal ganglion cells.

Accordingly, in one embodiment of the invention, the isolated nucleic acid molecule of or for use in the invention comprises fewer than three of NEFH promoter conserved regions D, F, D1, K, B, C and E. For example, in one embodiment, said isolated nucleic acid molecule comprises conserved regions A and F in the absence of NEFH promoter conserved regions D, D1, K, B, C and E. In another embodiment, said isolated nucleic acid molecule comprises conserved region A in the absence of NEFH promoter conserved regions D, D1, K, B, C and E.

Where the isolated nucleic acid molecule of or for use in the invention comprises two or more of conserved regions A, D, F, D1 and K, the isolated nucleic acid may comprise between two recited conserved regions a spacer sequence of a length in the range 20-180%, for example 50-150%, such as 70-130%, for example 80-120%, such as 90-110%, such as 95-100% of the sequence separating said recited conserved regions in the nucleic acid sequence shown as SEQ ID NO: 21. In one such embodiment, the isolated nucleic acid molecule may comprise between each recited conserved region and its adjacent recited conserved region in said isolated nucleic acid molecule a spacer sequence of a length in the range 20-180%, for example 50-150%, such as 70-130%, for example 80-120%, such as 90-110%, such as 95-100% of the sequence separating said recited conserved regions in the nucleic acid sequence shown as SEQ ID NO: 21. In an alternative embodiment, where the isolated nucleic acid molecule of or for use in the invention comprises two or more of conserved regions A, D, F, D1 and K, the isolated nucleic acid molecule may comprise between two recited conserved regions a spacer sequence of a length in the range 20-180%, for example 50-150%, such as 70-130%, for example 80-120%, such as 90-110%, such as 95-100% of the sequence separating one of said recited conserved regions from one of its adjacent conserved regions in the nucleic acid sequence shown as SEQ ID NO: 21.

In some embodiments, the spacer between a recited conserved region and its adjacent recited conserved region has at least 90% homology, for example at least 95%, 98% or 100% homology to the corresponding spacer sequence separating said conserved region and its adjacent recited conserved region in the nucleic acid sequence shown as SEQ ID NO: 21

In an embodiment of the first or the second aspect of the invention, the isolated nucleic acid molecule the isolated nucleic acid molecule comprises or consists of the nucleic acid sequence shown as SEQ ID NO: 21.

As described herein, in some embodiments of the invention, the isolated nucleic acid molecule comprises at least one of the conserved regions selected from: Nefh promoter conserved region B, Nefh promoter conserved region C, and Nefh promoter conserved region E. In one embodiment of the first or second aspects of the invention, the isolated nucleic acid molecule comprises each of Nefh promoter conserved regions A, D, F, B, C, and E. In one such embodiment, the isolated nucleic acid molecule comprises each of Nefh promoter conserved regions A, D, F, B, C, and E having the nucleic acid sequences shown as SEQ ID NOS: 9, 12, 15, 6, 7, and 8 respectively. In another embodiment, the isolated nucleic acid molecule may comprise each of Nefh promoter conserved regions A, D, F, B, C, and E having the nucleic acid sequences shown as SEQ ID NOS: 10, 13, 16, 18, 19, and 20 respectively.

Where the isolated nucleic acid molecule of or for use in the invention comprises two or more of conserved regions A, D, F, B, C, and E, the isolated nucleic acid molecule may comprise between two recited conserved regions a spacer sequence of a length in the range 20-180%, for example 50-150%, such as 70-130%, for example 80-120%, such as 90-110%, such as 95-100% of the sequence separating said recited conserved regions in the nucleic acid sequence shown as SEQ ID NO: 22. In one such an embodiment, the isolated nucleic acid molecule may comprise between each recited conserved region and its adjacent recited conserved region in said isolated nucleic acid molecule a spacer sequence of a length in the range 70-130%, for example 80-120%, such as 90-110%, such as 95-100% of the sequence separating said recited conserved regions in the nucleic acid sequence shown as SEQ ID NO: 22. In an alternative embodiment, the isolated nucleic acid molecule comprises between two recited conserved regions a spacer sequence of a length in the range 20-180%, for example 50-150%, such as 70-130%, for example 80-120%, such as 90-110%, such as 95-100% of the sequence separating one of said recited conserved regions from one of its adjacent conserved regions in the nucleic acid sequence shown as SEQ ID NO: 22. In an embodiment of the first or second aspects of the invention, the isolated nucleic acid molecule may consist of the nucleic acid sequence shown as SEQ ID NO: 22.

In a fourth aspect of the invention, there is provided an expression cassette comprising the isolated nucleic acid molecule according to the third aspect of the invention and one or more heterologous polynucleotide sequences with which the nucleic acid molecule is operably linked.

As described in the examples, the promoter sequence of the invention may advantageously provide preferential gene expression to the ganglion cell layer (GCL). Accordingly, in the expression cassette of the fourth aspect of the invention, said nucleic acid molecule having promoter activity may provide preferential expression of said one or more heterologous polynucleotide sequences in the ganglion cell layer of the eye.

The promoter molecule and the expression cassette may be provided in a vector. Accordingly, in a fifth aspect of the invention there is provided a vector comprising the isolated nucleic acid of the first aspect or the expression cassette of the second aspect. Any suitable vector may be used. Vectors may be, for example, viral vectors, non-viral vectors, or naked DNA.

As described herein, the inventors have demonstrated that the promoter sequence of the invention is advantageously small enough to be used with adenoassociated viral vectors (AAVs). Accordingly in the fifth aspect of the invention, the vector may optionally be an AAV vector. Any suitable AAV vector may be used in the invention. Vectors of the invention may include additional elements other than the promoter sequence and heterologous polynucleotide sequences with which the nucleic acid molecule is operably linked. In an embodiment, the vector comprises at least one regulatory element selected from the group consisting of enhancer sequence, a stuffer, an insulator, a silencer, an intron sequence, a post translational regulatory element, a polyadenylation site, and a transcription factor binding site. The vector may comprise a sequence encoding a neurotrophic or neuroprotective factor. In another aspect the vector comprises more than one expression cassette. In another embodiment two vectors, one containing at least one of the conserved murine or human sequences from the Nefh upstream region and a second containing a marker gene, neurotrophic or neuroprotective factor may be co-administered or administered successively.

In a sixth aspect of the invention, there is provided a cell comprising the isolated nucleic acid molecule according to the third aspect of the invention, the expression cassette according to the fourth aspect of the invention, or the vector according to the fifth aspect of the invention.

The invention is contemplated for use in therapeutic treatments, for example in gene therapy treatments for eye diseases or conditions.

Accordingly, a sixth aspect of the invention provides a therapeutic composition comprising the isolated nucleic acid molecule according to the third aspect of the invention, the expression cassette according to the fourth aspect of the invention, the vector according to the fifth aspect of the invention, or the cell according the sixth aspect of the invention.

A seventh aspect provides the isolated nucleic acid molecule according to the third aspect of the invention, the expression cassette according to the fourth aspect of the invention, the vector according to the fifth aspect of the invention, or the cell according the sixth aspect of the invention for use in medicine.

In one embodiment of the invention, the ocular disease is Leber Hereditary Optic Neuropathy (LHON). In another embodiment, the ocular disease is dominant optic atrophy (DOA). In another embodiment, the ocular disease is glaucoma. In another embodiment, the ocular disease involves an optic neuropathy. In another embodiment, the disease may be syndromic with a RGC layer and or optic nerve involvement. RGCs connect to the optic nerve and thus RGC death commonly results in optic nerve deterioration. Accordingly, directing treatment to the RGCs or delivering an entity to the RGCs to benefit the optic nerve is considered a valuable approach in treatment of diseases affecting the optic nerve.

In another aspect, the invention provides transgenic animals comprising the isolated nucleic acid molecule according to the third aspect of the invention, the expression cassette according to the fourth aspect of the invention, the vector according to the fifth aspect of the invention, or the cell according to the sixth aspect of the invention.

In another aspect of the invention, there is provided a kit for the identification of RGCs, wherein the kit comprises the isolated nucleic acid molecule according to the third aspect of the invention, the expression cassette according to the fourth aspect of the invention, the vector according to the fifth aspect of the invention.

BRIEF DESCRIPTION OF THE DRAWINGS

The foregoing and other objects, features and advantages of the present invention, as well as the invention itself, will be more fully understood from the following description of preferred embodiments when read together with the accompanying drawings, in which:

FIGS. 11A-F illustrates in tabulated form the sequence of the AAV.A-EGFP, AAV.A-spacer-F-EGFP, AAV.A+F-EGFP, AAV.CMV-EGFP, huNEFH-EGFP and AAV.muNefh-EGFP constructs used in the examples.

DETAILED DESCRIPTION OF THE INVENTION

Figure 1:
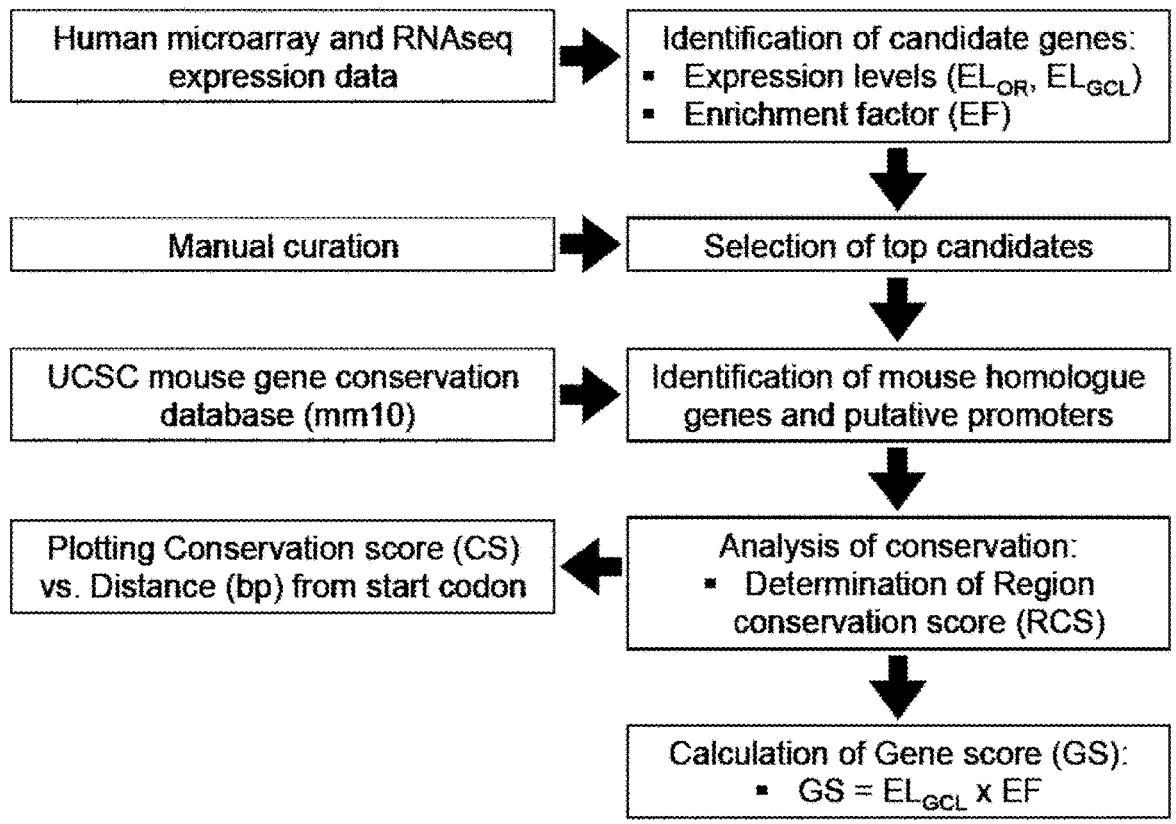
FIG. 1 illustrates schematically putative promoter identification methodology. Transcriptomic data (Kim et al. 2006) was used to identify candidate genes, based on expression levels in the retina ($EL_{OR}$) and the GCL ($EL_{GCL}$). Enrichment factor (EF) for the GCL was calculated as $EF=EL_{GCL}/EL_{OR}$; top candidates were identified based on EF. A gene score (GS) was calculated as a means of discerning between candidates.

The invention relates to use of conserved sequences from the upstream sequence of the Nefh gene to enhance expression of genes. In a particular aspect the invention relates to use of such conserved sequences to enhance expression of genes from adeno associated virus (AAV) vectors.

Specifically, the invention utilises the nucleic acid molecule comprising at least one of the conserved regions selected from: Nefh promoter conserved region A; Nefh promoter conserved region D, and Nefh promoter conserved region F.

Additionally, the isolated nucleic acid molecule of the first aspect of the invention optionally may further comprise at least one of the conserved regions selected from: NEFH promoter conserved region D1, and NEFH promoter conserved region K.

Furthermore, the isolated nucleic acid molecule of the first aspect of the invention optionally may further comprise at least one of the conserved regions selected from: Nefh promoter conserved region B, Nefh promoter conserved region C, and Nefh promoter conserved region E.

NEFH promoter conserved region A is a nucleotide sequence having the nucleotide sequence shown as SEQ ID NO: 1, or a functional variant thereof, NEFH promoter conserved region D is a nucleotide sequence having the nucleotide sequence shown as SEQ ID NO: 2, or a functional variant thereof; and NEFH promoter conserved region F is a nucleotide sequence having the nucleotide sequence shown as SEQ ID NO: 3, or a functional variant thereof. NEFH promoter conserved region D1 is a nucleotide sequence having the nucleotide sequence shown as SEQ ID NO: 4, or a functional variant thereof; NEFH promoter conserved region K is a nucleotide sequence having the nucleotide sequence shown as SEQ ID NO: 5, or a functional variant thereof. Nefh promoter conserved region B is a nucleotide sequence having the nucleotide sequence shown as SEQ ID NO: 6, or a functional variant thereof, Nefh promoter conserved region C is a nucleotide sequence having the nucleotide sequence shown as SEQ ID NO: 7, or a functional variant thereof; and Nefh promoter conserved region E is a nucleotide sequence having the nucleotide sequence shown as SEQ ID NO: 8, or a functional variant thereof.

In the context of the present invention, a "functional variant" includes any variant nucleic acid or that may have one or more nucleic acid substitutions but that does not have a materially different function than, or that can still hybridize under stringent hybridization conditions (0.2×SSC, 0.1% SDS) to, or that shares at least 60% identity, for example at least 65% identity, such as at least 70% identity, for example at least 80% identity, such as at least 90% identity or at least 95% sequence identity with the nucleotide sequence or nucleic acid indicated. A functional variant preferably retains at least 10%, for example 20%, 35%, 50%, 70%, 80%, 90% or greater of the functional activity of the sequence indicated. Thus, for example, where said sequence is a promoter said functional activity is promoter activity.

Particular examples of Nefh promoter conserved region A which are functional variants of the human nucleotide sequence shown as SEQ ID NO: 1 include the nucleotide sequences shown as murine SEQ ID NO:9, murine SEQ ID NO:10, and rhesus macaque SEQ ID NO:11.

SEQ ID NO: 9

SEQ ID NO: 9

CCAGCCCCGCCCCTCTCACTGCGGAGAAGCCGGTCGGCCCGGGGCCGCGG
GGGAGGAGGTGGAGAGGGTGGGGCCCTCCTCCCCAGCCCCCCACTGCCGA
GGGGCCGGACCGGGCCACCGCGGATATAAAAGAGCCGGAGTCCCAGAGCT
GCCGCAGTGCTGCCTGCCCCGTCCCAGCCCCGCACTCCCGCTC

SEQ ID NO: 10

```
CCCAGCCCCGCCCCTCTCACTGCGGAGAA
GCCGGTCGGCCCGGGGCCGCGGGGGAGGAGGTGGAGAGGGTGGGGCCCTC
CTCCCCAGCCCCCCACTGCCGAGGGGCCGGACCGGGCCACCGCGGATATA
AAAGAGCCGGAGTCCCAGAGCTGCCGCAGTGCTGCCTGCCCCGTCCCAGC
CCCGCACTCCCGCTC
```

SEQ ID NO: 11

```
CCCTACCCCGCCCCTCTCACTGCGGCTGAGCCGGTCAGCCGGGGGCCGCA
GGGGAGGAG
GCGGAGAGGGCGGGGCCCTCCTCCCCACCCCCTCACTGACAAGGGGTTGG
ACCCGGCCGC
GGCGGCTATAAAAGGGCCGGCGCCCTGGTGCTGCCGCAGTGCCTCCAGCC
CCGTCCCGGC
CCCGCGCACCTGCTC
```

Particular examples of human NEFH promoter conserved region D which are functional variants of the nucleotide sequence shown as SEQ ID NO: 2 include the nucleotide sequences shown as murine SEQ ID NO:12, murine SEQ ID NO:13, and rhesus macaque SEQ ID NO:14.

SEQ ID NO: 12

```
GGAAAACCAAACATAGGAGAACACAATTTGTACAAGGTCATTC
```

SEQ ID NO: 13

```
TGCATCTTGTCTCTTGCACACAAGGGAAAACCAAACATAGGAGAACACAA
TTTGTACAAGGTCATTCAGCTAGCGAAGCACAGAAGCTAACCCC
```

SEQ ID NO: 14

```
GGAAAAACAAGGGTGGGAGAATACAGCTCGTCCAAGGTCATTC
```

Particular examples of human NEFH promoter conserved region F which are functional variants of the nucleotide sequence shown as SEQ ID NO: 3 include the nucleotide sequences shown as murine SEQ ID NO:15, murine SEQ ID NO:16, and rhesus macaque SEQ ID NO:17.

SEQ ID NO: 15

```
AAATCCAAGCAGTATGGGAGATAAATGGGGAAGCCATGTGGGCGTAAGGG
GGTAGAGGTCTGCATCCCAGTCCCCTCCCCATGGCATCTGCAGTGCCTCC
CAGCCTTTCTGACCCCTGCAAAGAGCAGCATGACTGGACCTTTAAATTGG
GAAAATGCTTCATCATGTTCTGCTCCATCATGAAAAACTAGAGTCTCCTC
```

SEQ ID NO: 16

```
TGCTGTCAACTGCTTGTCAGACTTCTCACCCCCAAGAAGGGCATGTGC
ATTCTGCAGACAACTGAAGAGACTCGAAGGAACAAGAATCTAATAACAAA
AATCCAAGCAGTATGGGAGATAAATGGGGAAGCCATGTGGCGTAAGGGG
GTAGAGGTCTGCATCCCAGTCCCCTCCCCATGGCATCTGCAGTGCCTCCC
AGCCTTTCTGACCCCTGCAAAGAGCAGCATGACTGGACCTTTAAATTGGG
AAAATGCTTCATCATGTTCTGCTCCATCATGAAAAACTAGAGTCTCCTCC
CCCTCCTCCCTAGTGCACTCTCCT
```

SEQ ID NO: 17

```
TGCTGTCAGCTGCTTGTGAGCCTTCTCACATCCAGAGAATATATCAGCAT
TCTGCAGACCGAAAAGACCCAGAGGAACAAGGCTCCAATGGCAAAATTCC
AAGTAGAATGACAAATAAATGGGGAGCCATTTGAGAGCAAGGGAGTCCTG
CCCAACACCCCCTCCCCATGCCTTTCTCAGGGACCTCAGACCAGCCACTC
ACCTCCATCCTCCCAGAACCACCTGCAACCAGCCCGTTGCCCCTTGCAAA
CTGGAGCATGACTGGATCTTTAGATGGGGGAAAAATGCTTCATCATGTTC
TGCTTCTTCATGCAAAACCAGAAACTCCCTCCCCCTCTTCCCTCCTCCCA
GCGCACTCTCCT
```

A particular example of murine Nefh promoter conserved region B which is a functional variant of the nucleotide sequence shown as SEQ ID NO: 6 is the nucleotide sequence shown as SEQ ID NO:18.

SEQ ID NO: 18

```
TCTAACT
```

A particular example of murine Nefh promoter conserved region C which is a functional variant of the nucleotide sequence shown as SEQ ID NO:7 is the nucleotide sequence shown as SEQ ID NO: 19.

SEQ ID NO: 19

```
GCGCTCCCTTTCTCCGTCTGCAGTGTTCTCCTTCTCAGGGTAGCTTTGCG
GTCCTTTCAAACTCCACGCCC
```

A particular example of murine Nefh promoter conserved region E which is a functional variant of the nucleotide sequence shown as SEQ ID NO: 8 is the nucleotide sequence shown as SEQ ID NO:20.

SEQ ID NO: 20

```
ATTTAACCCTTCCCATCCGAGGAGCGGCTGCTGTCCGTGGTGCTGAAGCG
ATAGCGGCACGGGCGGCTCCGTCCACTAAC
```

As described above, in certain embodiments of the invention, the isolated nucleic acid molecule of the first aspect of the invention comprises each of conserved regions A, D1, D, F, and K. In one such embodiment, the isolated nucleic acid molecule comprises a full length NEFH promoter sequence such as that shown as SEQ ID NO:21.

In another embodiment, the isolated nucleic acid molecule comprises a full length Nefh promoter sequence such as that shown as SEQ ID NO:22.

SEQ ID NO: 22

```
TGTGCTGTCAACTGCTTGTCAGACTTCTCACCCCCAAGAAGGGCATGTGC
ATTCTGCAGACAACTGAAGAGACTCGAAGGAACAAGAATCTAATAACAAA
AATCCAAGCAGTATGGGAGATAAATGGGGAAGCCATGTGGGCGTAAGGGG
```

SEQ ID NO: 22

SEQ ID NO: 22

GTAGAGGTCTGCATCCCAGTCCCCTCCCCATGGCATCTGCAGTGCCTCCC
AGCCTTTCTGACCCCTGCAAAGAGCAGCATGACTGGACCTTTAAATTGGG
AAAATGCTTCATCATGTTCTGCTCCATCATGAAAAACTAGAGTCTCCTCC
CCCTCCTCCCTAGTGCACTCTCCTGGCCTGCAGCCAGGGGCTGGGAATGA
GACACAGGACAGGAAAGGATCTCTTTTAGGGAATCTATCAGTTCTCCTC
CTAGGGATCCCTCCAAAAGAGAAAACCACAGCAAACTGGGGTGCAGTGAG
GCTTGAGGTAACTGCCTGGGAGAAGTTCTGATCTGAAGAAGTCTATACTG
GTTTCCAGAGCTTGTCAGTGGGCATTGGAGTGGGGCTCTCTCTGCTCCGG
GAAGAGGTTTGCAGGGAGAAAGAACTTCACAGAGAGCCAGGCACTGGACA
GGACATGCAGGGGTGGGTCACTTACATACAACCGTAGGTCGTTTCGAGCC
CGTCATATGACTCATCCAATCCTCCCCTGTACCGCACAGAGGGACTGCTT
GGAAAAGCTATGGAACCTCCCTACTCCGTTAGGCATAGATTTAACCCTTC
CCATCCGAGGAGCGGCTGCTGTCCGTGGTGCTGAAGCGATAGCGGCACGG
GCGGCTCCGTCCACTAACACCGCTTTTGACCGGAAAACCAAACCAAGAAC
GAGCCGTATAATAAAGCAAGAGCTCCAAGTCTAAGCCCCTCCGCCGTCCC
CGCCCTTTCACCTGAAGCCTCAGTAGGGCTCATGATGGAGGTCGGTGGAC
TTTGGTACTGAAAAACCACTCCACCACTTCCTGGAGCATGAAAGGGGAT
GCTTACGGCAGTACTGGTTCATCTATTCTGGAAAGGAATGAGATGCCAA
GATAAAGCAGAAAAATCGGGCAAGGAAGGGAGAAAGACAAAGTTCTCAGG
TGAGAGGAACTGGTTACTATTCCGACTGGCAATATGTGGGTTCTCCTCCC
CAAAATCAGCCAGACATTTCCCAAGTTCGAACCTCCTAGGGGCACATGGG
AGCTTGGAGCTGCATCTTGTCTCTTGACACACAAGGGAAAACCAAACATAG
GAGAACACAATTTGTACAAGGTCATTCAGCTAGCGAAGCACAGAAGCTAA
CCCCACCCTGTGGCAGAACTTGGCTTCGGTGTTGAGGCTCTTGCTGCCTA
CTGAGGGACCCCCTGTTCTTCGTAGGCAGTTTTCCTTTCCGGGCAAGAGG
AGACTCCACTTTCCAGTCGTGGCCACTGGAATTTTTAGAGAGCACCACGT
TCCTCTCACCCAGCGCTCCCTTTCTCCGTCTGCAGTGTTCTCCTTCTCAG
GGTAGCTTTGCGGTCCTTTCAAACTCCACGCCCACCCCAACCCCAACCCC
GAAGCCAGCTGTACAGTTCCTTAAGCCCCTTTGGGTGGCCCAGGGCCGCT
GTAGTATTCGGGGAACACTGCACCGCCAGCTAGAAGGTCCCCATTTATCA
TCAGTAGCATCCATCGTCAACCCCATACAGAATCCCTTCGTGGGTGACT
GCAGTCTGCACTCCTCATCTCAAGGTCCTCTCTAACTATCAGGGAACCAA
CCCTGTGCTGCTTCTCAAGTGGGGGTGTCCTCTCATAGTAATCACTGCAG
TCTCCCACTGCTTCAACCCGAAGGCGCCCTGACCCATCAGTTCTGCAATC
CTCTCCCTATTTCCAGTGCCCTCTCTTATTCTGAGGGTCTTATTCTGACT
AATAGGGTCTTCCGACATGCACCTGGAGGTCTGCACTTGTCCGCTCCGGA
AGTCCTTTACTCCTTGGTCTGACCTCGGGAGGCTCTACTGACGATGCGTC
GATTCCCCTTCACTCCTGGGTCGTCCCCCCCAGCCCCGCCCCTCTCACTG
CGGAGAAGCCGGTCGGCCCGGGGCCGCGGGGGAGGAGGTGGAGAGGGTGG
GGCCCTCCTCCCCAGCCCCCCACTGCCGAGGGGCCGGACCGGGCCACCGC
GGATATAAAAGAGCCGGAGTCCCAGAGCTGCCGCAGTGCTGCCTGCCCCG
TCCCAGCCCCGCACTCCCGCTCCGCTGGCGGCCGCACCTGCTCCGGCCAT
G

In another embodiment, the isolated nucleic acid molecule comprises a full length rhesus macaque Nefh promoter sequence such as that shown as SEQ ID NO:23.

SEQ ID NO: 23

SEQ ID NO: 23

CAGTCCCTCTTGGAGCCCCCTTTTTACCCCAAATCCCTAGTCCTCTTTGC
TGTCAGCTGCTTGTGAGCCTTCTCACATCCAGAGAATATATCAGCATTCT
GCAGACCGAAAAGACCCAGAGGAACAAGGCTCCAATGGCAAAATTCCAAG
TAGAATGACAAATAAATGGGGAGCCATCTGAGAGCAAGGGAGTCCTGCCC
AACACCCCCTCCCCATGCCTTTCTCAGGGACCTCAGACCAGCCACTCACC
TCCATCCTCCCAGAACCACCTGCAACCAGCCCGTTGCCCCTTGCAAACTG
GAGCATGACTGGATCTTTAGATGGGGAAAAATGCTTCATCATGTTCTGC

SEQ ID NO: 23

SEQ ID NO: 23

TTCTTCATGCAAAACCAGAAACTCCCTCCCCCTCTTCCCTCCTCCCAGCG
CACTCTCCTTCCAGTAAAACATGGTTAAAGGGACAGCGCCATCACTTTCC
CAGCTCTGAGGGTCTGCTTAGAACCAGGGGCCTTGGAAGGAGACAGAGGG
CAAAGAGAAAGGAACTGGCAGAGGTCTTTCCTGGGGGATCTGTCTGTTCT
GTCCTGGGAATCCTGGAGCAGGAAAACTCGGGTAAAGTGGGGGTGTAGTG
GGGGTTGAGATAACCGCCTGGGGGAGATTCAGAGTGCAAGTAGGGAGTCTA
CAAACTCTCAAGGGGGTCTCAGGGCTCCCGGCATCCCCAGGGGTCCTTTC
GCAGGGGTCCCTATGCAGGAGGAGAACAGCCCAGAAAACAGGGAACTAGA
CCCTTGACAGGAAGTCCAAGGAGGGGTCCCTGGCTCACTGTGTGACCCTG
CTGGATCACTCGCCTCCGCTCTCGGGTCCCCTGAGCACTCCGTGCCTCCC
TTCCCTCCCCTAAAGTAAAAGCAGAAGTTAATCGCTTTCCCCTCCCCACG
CCCAACAAAGAGCAGGCCCTGTCCCCGGTGCTGAAGCGCCAGCCGCAGCG
CCTCCCCCACTCCCAAGGCATAAAACATGAGCCAAAACCAATAAAGAACC
AAATGTCACAGCTGTTGCAGGGCCCCCTAAGTCCCGGGGACCCCTTTTTC
TACCTGACATCCTAGTGGGGTGAGGGACTTTTGTACCTGGAAAGCATCCC
ATCACTTCCCTGGAAGCGAGAAGGGATGCCGACTCAGGCGCCTGCTTGTC
TGTTATGGGGGTAGGGGACCAGAGAACAAGTTGAGGCTGAGAAGATGGGG
AGGGGGAGGGAGAAAAGAGGACTTCATAGTGGCGAGAGAACGGCAAGATG
TGGGTTCCCCATCCCCAATTCAGCCAGAGACCCCTCAAAGTGGAACTTCC
TGGGGCAGTCGGGGGTCAGAAGTTGGAGCTTGTCTCTGGGGCAAGACCTC
TTCGTTGTACAGATGGAAAAACAAGGGTGGGAGAATACAGCTCGTCCAAG
GTCATTCGACTAGCAAACTGCTTAGCTGACCCTAGTGTGCAGAACCTGGC
TCGGGTGACACCCATCATTTCCCCCCACCCCACACAGGCGCCAGCTCTCT
CAATTTCATGCTCAAGCCCCGCTACGGTACCCCCACTGTGGGTTATCTGC
CCCTCAAACTCAGCCCAGCTTCCTCCTGCCTATTCGGGGAACCCTCTGCC
CGCTTCGCTGCTGAGGGTCCGTCCCCTTTACTGGGGATGGCAGCAGGGTCTCC
TGTCTCCTCTCTCGGGGGGCCCACTGCCGACTTTTCATAGAACGCTTTGCC
CCCTCCCAACCCCACCCATCCGGGGTTCCCTCTCTCCATCCTCTGCAGCG
TCTCCCATACCCCCATTGAGGGTAGTCTTGGTATTCTCCCCAACTCCAGG
TCCCCCTTCATCTATTCCAGGGCTGGCCGCGGAGTTTCCTGAGCGCTCTC
CAAGTGGGTCCTCTAGATGTTAGGAGAACACTGTACTTCCCCCCGTCAGG
GGTCTCCTGTCTCCGTTCTATGGAGCGTCCATGCTCCCATTCAGGACTGT
CTTGCTCCCTCCTCTATTCCGGGGCTGGCTGCACAGTCTCTGTACCCCCT
ATCCTGAGGGCCTCTCTTAACTATTTGGAAAGCCTCGTGTCCTCTCTCAT
ACGGGGATCCCTTCATCCTAATGACTGCAATCTTCCATTGCTCCATCCCT
AGGGCATCCTGCCCCTATTCCCATCAGGTTTCTCCTTGTCCTCTCCCTGT
TTCAAGTCCCCTTTCTTATTCCGAACACACTCTCAGGCTCTTCCGACGCA
TACCCGGGGGTCCTCACTGGCCCACTCCGGGAGTCCTCTGCCCGCTACCC
CGAACTCGGGGGTCTCCTCTGACGCAGCGTCGATTCCCCTTCCCTCCTCG
GTCCCCTACCCCGCCCCTCTCACTGCGGCTGAGCCGGTCAGCCGGGGGCC
GCAGGGGAGGAGGCGGAGAGGGCGGGGCCCTCCTCCCCACCCCCTCACTG
ACAAGGGGTTGGACCCGGCCGCGGCGGCTATAAAAGGGCCGGCGCCCTGG
TGCTGCCGCAGTGCCTCCAGCCCCGTCCCGGCCCCGCGCACCTGCTCCGG
C

As described above, in certain embodiments of the invention, the isolated nucleic acid molecule need not comprise a full length NEFH promoter sequence but may comprise, for example, only one, two, three, four or five of the Nefh promoter conserved regions A, D, F, B, C and E, or, for example only one, two, three or four of the NEFH promoter conserved regions A, D, F, D1, and K.

In another embodiment, the isolated nucleic acid molecule may comprise, for example, only two of the Nefh promoter conserved regions A, D, F, B, C and E, or, for example only two of the NEFH promoter conserved regions A, D, F, D1 and K separated by a spacer sequence such as a piece of lambda DNA such as that shown as SEQ ID NO:24.

SEQ ID NO: 24

SEQ ID NO: 24

AGGCATTTAT ACTCCGCTGG AAGCGCGTGT GTATTGCTCA CAATAATTGC
ATGAGTTGCC CATCGATATG GGCAACTCTA TCTGCACTGC TCATTAATAT
ACTTCTGGGT TCCTTCCAGT TGTTTTTGCA TAGTGATCAG CCTCTCTCTG
AGGGTGAAAT AATCCCGTTC AGCGGTGTCT GCCAGTCGGG GGGAGGCTGC
ATTATCCACG CCGGAGGCGG TGGTGGCTTC ACGCACTGAC TGACAGACTG
CTTTGATGTG CAACCGACGA CGACCAGCGG CAACATCATC ACGCAGAGCA

SEQ ID NO: 24

SEQ ID NO: 24

```
TCATTTTCAG CTTTAGCATC AGCTAACTCC TTCGTGTATT TTGCATCGAG
CGCAGCAACA TCACGCTGAC GCATCTGCAT GTCAGTAATT GCCGCGTTCG
CCAGCTTCAG TTCTCTGGCA TTTTTGTCGC GCTGGGCTTT GTAGGTAATG
GCGTTATCAC GGTAATGATT AACAGCCCAT GACAGGCAGA CGATGATGCA
GATAACCAGA GCGGAGATAA TCGCGGTGAC TCTGCTCATA CATCAATCTC
TCTGACCGTT CCGCCCGCTT CTTTGAATTT TGCAATCAGG CTGTCAGCCT
TATGCTCGAA CTGACCATAA CCAGCGCCCG GCAGTGAAGC CCAGATATTG
CTGCAACGGT CGATTGCCTG ACGGATATCA CCACGATCAA TCATAGGTAA
AGCGCCACGC TCCTTAATCT GCTGCAATGC CACAGCGTCC TGACTTTTCG
GAGAGAAGTC TTTCAGGCCA AGCTGCTTGC GGTAGGCATC CCACCAACGG
GAAAGAAGCT GGTAGCGTCC GGCGCCTGTT GATTTGAGTT TTGGGTTTAG
CGTGACAAGT TTGCGAGGGT GATCGGAGTA ATCAGTAAAT AGCTCTCCGC
CTACAATGAC GTCATAACCA TGATTTCTGG TTTTCTGACG TCCGTTATCA
GTTCCCTCCG ACCACGCCAG CATATCGAGG AACGCCTTAC GTTGATTATT
GATTTCTACC ATCTTCTACT CCGGCTTTTT TAGCAGCGAA GCGTTTGATA
AGCGAACCAA TCGAGTCAGT ACCGATGTAG CCGATAAACA CGCTCGTTAT
ATAAGCGAGA TTGCTACTTA GTCCGGCGAA GTCGAGAAGG TCACGAATGA
ACCAGGCGAT AATGGCGCAC ATCGTTGCGT CGATTACTGT TTTTGTAAAC
GCACCGCCAT TATATCTGCC GCGAAGGTAC GCCATTGCAA ACGCAAGGAT
TGCCCCGATG CCTTGTTCCT TTGCCGCGAG AATGGCGGCC AACAGGTCAT
GTTTTTCTGG CATCTTCATG TCTTACCCCC AATAAGGGGA TTTGCTCTAT
TTAATTAGGA ATAAGGTCGA TTACTGATAG AACAAATCCA GGCTACTGTG
TTTAGTAATC AGATTTGTTC GTGACCGATA TGCACGGGCA AAACGGCAGG
AGGTTGTTAG CGCGACCTCC TGCCACCCGC TTTCACGAAG GTCATGTGTA
AAAGGCCGCA GCGTAACTAT TACTAATGAA TTCAGGACAG ACAGTGGCTA
CGGCTCAGTT TGGGTTGTGC TGTTGCTGGG CGGCGATGAC GCCTGTACGC
ATTTGGTGAT CCGGTTCTGC TTCCGGTATT CGCTTAATTC AGCACAACGG
AAAGAGCACT GGCTAACCAG GCTCGCCGAC TCTTCACGAT TATCGACTCA
ATGCTCTTAC CTGTTGTGCA GATATAAAAA ATCCCGAAAC CGTTATGCAG
GCTCTAACTA TTACCTGCGA ACTGTTTCGG GATTGCATTT TGCAGACCTC
TCTGCCTGCG ATGGTTGGAG TTCCAGACGA TACGTCAAGG TGACCAACTA
GGCGGAATCG GTAGTA
```

Vectors

As described above the promoter molecule and the expression cassette of the invention can be provided in a vector. In an embodiment, the promoter molecule and the expression cassette can be delivered to a cell using any suitable vector. For example, the vectors which may be used include viral and non-viral vectors, such as AAV serotypes, adenovirus, herpes virus, SV40, HIV, SIV and other lentiviral vectors, RSV and non-viral vectors including naked DNA, plasmid vectors, peptide-guided gene delivery, terplex gene delivery systems, calcium phosphate nanoparticles, magnetic nanoparticles, colloidal microgels and/or the integrase system from bacteriophage phiC31. Viral vectors useful in the invention include, but are not limited to, those listed in Table 1. Non-viral vectors useful in the invention include, but are not limited to, those listed in Table 2. Cationic lipid-based non-viral vectors can include glycerol-based (e.g. DOTMA, DOTAP, DMRIE, DOSPA), non-glycerol-based (e.g. DOGS, DOTIM) and/or cholesterol-based cationic lipids (e.g. BGTC, CTAP; Ju et al., 2015; Karmali and Chaudhuri, 2007; Lee et al., 2016). Viral and non-viral vector delivery may be accompanied by other molecules such as cationic lipids and/or polymers and/or detergents and/or agents to alter pH, such as, for example, polyethelene glycol (PEG), to enhance cellular uptake of vectors and/or to enhance expression from vectors and/or to evade the immune system. For example, polycationic molecules have been generated to facilitate gene delivery including but not exclusive to cationic lipids, poly-amino acids, cationic block co-polymers, cyclodextrins amongst others. Pegylation of vectors with polyethelene glycol (PEG) can shield vectors from, for example, the extracellular environment. Vectors may be used in conjunction with agents to avoid or minimise cellular immune responses such as PEG or as a Polyplex with Poly (L-Lysine) among others. Exosomes may be used to aid vector delivery and or evasion of the immune response (Wassmer et al., 2017). Vectors may be delivered in conjunction with immunomodulatory/immunosuppression regimes to aid transgene expression. Vector delivery may be undertaken using physical methodologies such as electroporation, nucleofection and/or ionotophoresis, either alone or in combination with molecules to enhance delivery. Vectors may be used in conjunction with agents to promote expression of transgenes incorporated into vectors, for example, using histone deacetylase inhibitors (HDAC) and/or DNA methyl transferase inhibitors and/or histone methyl transferase inhibitors to modulate chromatin structures thereby aiding expression. HDAC inhibitors include but are not exclusive to short chain fatty acids such as valproic acid and sodium butyrate, ketones, benzamides, cyclic and non-cyclic hydroxamates such as suberoyl anilide hydroxamic acids (SAHA), trichostatin A (TSA), cyclic peptides or tetrapeptides amongst others (Daly et al., 2016; Liu et al., 2006; Ververis et al., 2013). DNA methyl transferase inhibitors including, for example, 5-AC, decitabine and zebularine can be used to modulate chromatin structures. In addition, histone methyl transferase inhibitors can influence chromatin states, for example, BIX-01294 (diazepin-quinazolin-amine derivative). In addition, to the chemical entities referred to above, nucleic acids-based inhibitors can be used to suppress expression of proteins and/or non-coding RNAs involved in chromatin remodelling. In one embodiment of the invention vectors are optimized to specifically transduce target cell type(s) or target tissue type(s). Viral and/or non-viral vectors may be modified to target specific cell types and/or to prevent targeting of some cell types. For example, the inclusion of the capsid from AAV serotype 5 in an AAV2/5 hybrid virus facilitates transduction of photoreceptor cells or various serotypes including AAV2/2, AAV8BP2, 7m8 and others efficiently transduce RGCs, typically post intravitreal administration (Ramachandran et al., 2016). Similarly, for example, peptides may be included in viral vectors to facilitate targeting. Synthetic non-viral vectors can be modified to include ligands to facilitate targeting of vectors to specific cell and/or tissue types, for example, folate can be conjugated to liposomes to target tumour cells which over express the folate receptor (Hattori and Maitani, 2005; Lu and Low, 2012).

In another embodiment of the invention, vectors are designed to optimize the generation and/or production of vector, for example, to optimise viral titre and/or to optimize the number or type of nucleotides incorporated into vector(s). For example, vector genomes may be modified such that large transgenes may be incorporated into vectors, for example, 'gutless' adenovirus vectors have an increased capacity in terms of size than previous generations of adenovirus vectors. Components of vectors can be modified to optimize generation and production of vectors, for example, genes involved in replication of AAV can be modified to optimize replication and/or self complementary AAV vectors can be used to optimize rates of transgene expression. In an additional embodiment, vectors are designed to enable optimal expression of all components of a therapeutic. For example, where the vector is used to deliver two or more heterologous polynucleotide sequences, additional sequences can be included in the vector to optimize expression of each of the heterologous polynucleotide sequences. For example, vectors can include suppression and or replacement elements and or neurotrophic factor(s), among other nucleic acid components. For example where the vector is used to express two components, additional sequences can be included in the vector to optimize expression of both elements from a given vector. For example, inclusion of nucleotides to separate the ITRs of AAV and the nucleic acid component(s) can result in optimisation of expression of the components. Multiple nucleic acid components can be juxtaposed or separated from each other and/or can be in the same orientation or opposing orientations. Additional sequences, such as, for example, stuffer sequences can be included in vectors to optimize vector design. In addition, multiple nucleic acids components may be used in one vector. In addition vector design can include optimisation of codons to optimise levels of transgene expression, and/or achieve, modification of GC content, and/or removal of potential splice sites and/or other manipulations (Fischer et al., 2017).

TABLE 1

Exemplary Viral Vectors

| Delivery Method | Serotype | Reference |
|---|---|---|
| AAV | All serotypes, including but not limited to 1, 2, 3, 4, 5, 6, 7, 8, 9, 10, 11, 12, | (Flannery et al., 1997; Lebkowski et al., 1988) |
| Lentivirus (for example but not exclusively Feline-FIV, Equine-EIAV, Bovine-BIV and Simian-SIV). | VSV-G Rabies-G Further serotypes** | (Balaggan et al., 2006; Pang et al., 2006; Takahashi, 2004) |
| Adenovirus | Various | (Bennett et al., 1996) |
| Simian papovirus SV40 | Various | (Kimchi-Sarfaty et al., 2002) |
| Semliki Forest Virus | Various | (DiCiommo et al., 2004) |
| Sendai Virus | Various | (Ikeda et al., 2002) |

The list provided is not exhaustive; other viral vectors and derivatives, natural or synthesized could be used in the invention.

TABLE 2

Exemplary Non-Viral Vectors or Delivery Methods

| Delivery Method | Reference |
|---|---|
| Cationic liposomes | (Sakurai et al., 2001) |
| HVJ liposomes | (Hangai et al., 1998) |
| Polyethylenimine | (Liao and Yau, 2007) |
| DNA nanoparticles | (Farjo et al., 2006) |
| Dendrimers | (Marano et al., 2005) |
| Bacterial | (Brown and Giaccia, 1998) |
| Macrophages | (Griffiths et al., 2000) |
| Stem cells | (Hall et al., 2006) |
| Retinal transplant | (Ng et al., 2007) |
| Marrow/Mesenchymal stromal cells | (Chng et al., 2007; Kicic et al., 2003) |
| Implant (e.g., Poly(imide)uncoated or coated) | (Montezuma et al., 2006) |
| Electroporation | (Featherstone, 1993) |
| Targeting peptides (for example but not exclusively Tat) | (Trompeter et al., 2003) |
| Lipid mediated (e.g., DOPE, PEG) | (Zeng et al., 2007) (Amrite et al., 2006; Caplen et al., 1995) (Chalberg et al., 2005) |

The list provided is not exhaustive. Other non-viral vectors and derivatives, natural or synthesized and other delivery methods could be used with the invention.

In an embodiment, the heterologous polynucleotide encodes mammalian Myocilin 7, Opa1, Ndi1, rhodopsin, peripherin or others, such as those associated with diseases listed in Table 3. In another embodiment, the heterologous polynucleotide encodes neurotrophic factors, anti-apoptotic agents and/or antioxidants, such as those listed in Table 4.

TABLE 3

Diseases with known retinal ganglion cell/optic nerve involvement.

| Disease | Ocular symptoms/genes | References |
| --- | --- | --- |
| Glaucoma | Optic nerve excavation, ganglion cell loss | (Weinreb et al., 2014) |
| Multiple Sclerosis | Recurrent optic neuritis | (Chan, 2002) |
| Neuroretinitis | Transient inflammation of the optic nerve head. | (Purvin et al., 2011) |
| Devic's disease | Inflammation and demyelination of optic nerve and spinal cord. | (Weinshenker and Wingerchuk, 2017) |
| Lupus | Optic nerve inflammation, treatable. | (Suri et al., 2016) |
| Sarcoidosis | Optic neuritis, progressive degeneration, optic nerve involvement; can be bilateral. | (Kidd et al., 2016) |
| Wegener's Granulomatosis | Optic nerve lesions. | (Purvin and Kawasaki, 2009; Takazawa et al., 2014) |
| Optic nerve tumours | Decreased visual function, proptosis, optic disc swelling or pallor, and strabismus. Central retinal vein occlusion (CRVO), venous stasis retinopathy, optociliary shunt vessels, or rubeosis iridis with neovascular glaucoma. | (Miller, 2004) |
| Grave's disease | Autoimmune. Optic nerve compression by extraocular muscles, progressive vision loss, treatable with early intervention. | (So et al., 2000) |
| Anterior ischemic optic neuropathy | Ischemia leading to axon degeneration and ganglion cell loss. | (Khalilpour et al., 2017) |
| Toxic optic neuropathy | Optic nerve damage caused by toxic compounds (ethylene glycol, methanol, lead, tobacco and alcohol (tobacco-alcohol syndrome), insecticides, chloramphenicol. | (Grzybowski et al., 2015) |
| Vitamin deficiency (B12, thiamine) | Optic nerve pallor, scotoma, progressive, painless vision loss. | (Chavala et al., 2005) |
| Ethambutol/Isoniazid | Transient optic neuritis, can resolve upon cessation of treatment | (Kass et al., 1957; Tsai and Lee, 1997) |
| Amiodarone/Digitalis | Progressive optic neuropathy | (Passman et al., 2012) |
| Leber's hereditary optic neuropathy | Retinal ganglion cell degeneration; mitochondrial inheritance (for example, mutations in ND1, ND4, ND4L, ND6). | (Yu-Wai-Man et al., 2016) |
| Dominant optic neuropathy | Retinal ganglion cell degeneration; autosomal dominant inheritance (for example, mutations in OPA1, OPA3, OPA4, OPA5, OPA6, OPA8) | (Kerrison et al., 1999; Reynier et al., 2004; Yu-Wai-Man et al., 2016) |
| X-linked or recessive optic neuropathy | Retinal ganglion cell involvement (for example, OPA2, OPA6 and OPA7 | (Katz et al., 2006; Lenaers et al., 2012) |
| Friedreich's ataxia | Optic nerve pallor, retinal nerve fibre layer thinning. Mutations in FXN. | (Fortuna et al., 2009; Noval et al., 2012) |
| Mohr-Tranebjaerg syndrome | Deafness-dystonia-optic neuronopathy (DDON) syndrome. Mutations in DPP/TIMM8 | (Jin et al., 1996) |
| Charcot-Marie-Tooth disease | Autosomal recessive disease, caused primarily by MFN2. Optic atrophy seen as part of disease progression in some cases. | (Bombelli et al., 2014) |
| Tay-Sachs | Sphingolipidosis. Progressive optic atrophy and retinal degeneration; autosomal recessive inheritance (mutations in HEXA). | (Chen et al., 2014) |

TABLE 3-continued

Diseases with known retinal ganglion cell/optic nerve involvement.

| Disease | Ocular symptoms/genes | References |
|---|---|---|
| Niemann-Pick | Sphingolipidosis. Progressive lipid deposits leading to retinal ganglion cell degeneration; autosomal recessive inheritance (mutations in SMPD). | (Chen et al., 2014) |
| Krabbe disease | Sphingoipidosis. Psychosine deposition leading to ganglion cell layer cell loss and thinning; autosomal recessive inheritance (mutations in GALC). | (Chen et al., 2014) |
| Leigh syndrome/NARP | Nerve fibre and ganglion cell layer thinning, optic nerve atrophy; disease can be caused by multiple genes, with strong ocular involvement in MT-ATP6 mutation (mitochondrial). | (Hayashi et al., 2000) |
| Behr syndrome | Optic atrophy, spinocerebellar degeneration. Can present as autosomal recessive or dominant (for example, OPA1, OPA3, C12ORF65). | (Bonneau et al., 2014) |
| Wolfrum Syndrome | Autosomal recessive disorder involving diabetes insipidus, diabetes mellitus, optic atrophy, and deafness (DIDMOAD) (for example, WFS1). Wolfrum Syndrome 2 involving optic atrophy, diabetes mellitus, deafness and decreased lifespan can be caused by mutations in the CISD2 gene. | (Barrett et al., 1997; Hoekel et al., 2014) |

The list provided is not exhaustive.

TABLE 4

Exemplary neurotrophic factors, anti-apoptotic agents and antioxidants, which may be used in conjunction with the promoter described herein. These genes may be delivered at the same time as a therapeutic gene listed in Table 3 or at a different time, using the same vector or a different vector.

| | Reference |
|---|---|
| Neurotrophic factor | |
| NGF | (Carmignoto et al., 1989) |
| b-NGF | (Lipps, 2002) |
| NT-3 | (Lu et al., 2011) |
| NT4 | (Bikbova et al., 2013) |
| BDNF | (Carmignoto et al., 1989; Di Polo et al., 1998) |
| GDNF | (Frasson et al., 1999; Gregory-Evans et al., 2009; Wu et al., 2004) |
| NTN (Neurturin) | (Koeberle and Ball, 2002) |
| aFGF and bFGF | (Akimoto et al., 1999; Faktorovich et al., 1990; Lau et al., 2000; McLaren and Inana, 1997; Uteza et al., 1999) |
| LIF | (Joly et al., 2008; Rhee and Yang, 2010) |
| CNTF | (Li et al., 2011; Sieving et al., 2006) |
| Hepatocyte growth factor | (Tönges et al., 2011) |
| PDGF | (Akiyama et al., 2006) |
| VEGF | (Trujillo et al., 2007) |
| PEDF | (Cayouette et al., 1999) |
| RdCVF | (Léveillard et al., 2004) |
| Chondroitinase ABC | (Liu et al., 2012) |
| Erythropoietin | (Rex et al., 2009; Rong et al., 2011; Sullivan et al., 2011) |
| Suberythropoietc Epo | (Wang et al., 2011) |
| Anti-apoptotic agents | |
| Calpain inhibitor I | (McKernan et al., 2007) |
| Calpain inhibitor II | (McKernan et al., 2007) |
| Calpeptin PARP | (McKernan et al., 2007) |
| Norgestrel | (Doonan et al., 2011) |
| Antioxidant | |
| Vitamin C | www.nei.nih.gov/amd |
| Vitamin E | www.nei.nih.gov/amd |
| Beta-carotene | www.nei.nih.gov/amd |
| SOD2 +/− catalase | (Doonan et al., 2009; Usui et al., 2009) |
| Rosiglitazone | (Doonan et al., 2009) |
| Sestrin-1 | (Budanov et al., 2004) |
| PPAR | (Aoun et al., 2003; Fan et al., 2008; Tomita et al., 2005; Zhao et al., 2006) |
| Lutein | (Li and Lo, 2010) |

The list provided is not exhaustive.

TABLE 5

Exemplary enhancer elements and epigenetic elements

| | Reference |
|---|---|
| Enhancer Element | |
| Chicken ovalbumin upstream promoter transcription factor II | (Eguchi et al., 2007) |
| Mouse dystrophin muscle promoter/enhancer | (Anderson et al., 2006) |
| Tobacco eIF4A-10 promoter elements | (Tian et al., 2005) |

TABLE 5-continued

Exemplary enhancer elements and epigenetic elements

| | Reference |
|---|---|
| Immunoglobulin (Ig) enhancer element HS1,2A | (Frezza et al., 2007) |
| Col9a1 enhancer element | (Genzer and Bridgewater, 2007) |
| Gata2 intronic enhancer | (Khandekar et al., 2007) |
| TH promoter enhancer | (Gao et al., 2007) |
| CMV enhancer | InvivoGen cat# pdrive-cag 05A13-SV |
| Woodchuck hepatitis virus posttranscriptional regulatory element | (Donello et al., 1998; Schambach et al., 2006) |
| IRBP | (Ying et al., 1998) |
| CMV enhancer and chicken β-actin promoter | InvivoGen cat# pdrive-cag 05A13-SV |
| CMV enhancer and chicken β-actin promoter and 5'UTR | InvivoGen cat# pdrive-cag 05A13-SV |
| CpG-island | (Antoniou et al., 2003) |
| Epigenetic elements | |
| Mcp Insulators | (Kyrchanova et al., 2007) |
| CpG-island region of the HNRPA2B1 locus | (Williams et al., 2005) |
| Chicken b-globin 5'hypersensitive site 4 (cHS4) | (Kwaks and Otte, 2006) |
| Ubiquitous chromatin opening elements (UCOEs) | (Kwaks and Otte, 2006) |
| Matrix associated regions (MARs) | (Kwaks and Otte, 2006) |
| Stabilising and antirepressor elements (STAR) | (Kwaks and Otte, 2006) |
| Human growth hormone gene silencer | (Trujillo et al., 2006) |

This list is not exhaustative

In an embodiment of the invention, the invention may be used to direct expression of heterologous polynucleotides to RGCs to provide transgene expression in these cells and/or to alleviate disease pathology. In another embodiment, the invention may be used to drive expression in RGCs, for example, to express a marker gene. The nucleic acid molecules, expression cassettes and vectors of the invention may thus be used in methods to identify a RGC. Kits comprising the isolated nucleic acid molecule according to the first aspect of the invention, the expression cassette according to the second aspect of the invention, or the vector according to the third aspect of the invention. This would enable, by inclusion of a marker gene in the kit, the identification of RGC cells for subsequent sorting or staining or isolation.

Cells

In another aspect, the invention provides cells comprising a promoter sequence of the first aspect of the invention, an expression cassette of the second aspect, or a vector of the third aspect for experimental or therapeutic use. In an embodiment, the cells express a suppressor such as antisense, and or RNAi that can target a gene expressed in RGCs. In another embodiment, the cells express a replacement nucleic acid. In another embodiment, the cells express a nucleic acid to augment expression of an endogenous gene and or to provide expression of a nucleic acid not normally expressed in that cell type. In another embodiment, the cells express a replacement nucleic acid that is not targeted by the suppressor. In an embodiment, the cells express a gene editing component such as CRISPR/Cas that can target a gene expressed in RGCs. In another embodiment, the cells comprise a vector encoding at least one or more suppression and or gene editing component(s). In another embodiment, the cells comprise a vector encoding one or more nucleic acids. In an additional embodiment, the cells comprise one or more vectors encoding suppression and or gene editing component(s) and or replacement nucleic acid(s).

In another aspect, the invention provides a transgenic animal comprising the isolated nucleic acid molecule according to the first aspect of the invention, the expression cassette according to the second aspect of the invention, the vector according to the third aspect of the invention, or the cell according the fourth aspect of the invention and its experimental or therapeutic use. In an embodiment, the transgenic animal is a model for Leber Hereditary Optic Neuropathy (LHON). In another embodiment, the transgenic animal is a model for dominant optic atrophy (DOA). In another embodiment, the transgenic animal is a model for glaucoma.

The isolated nucleic acid molecule according to the first aspect of the invention, the expression cassette according to the second aspect, or the vector of the third aspect of the invention can be administered to cells, tissues, and/or animals. Administration of the isolated nucleic acid molecule, the expression cassette, or the vector may be systemic or local. Administration of the isolated nucleic acid molecule, the expression cassette, or the vector may be used in conjunction with chemical and/or physical agents to aid administration. In a particular embodiment, the isolated nucleic acid molecule, the expression cassette, or the vector is for administration by intraocular (e.g., subretinal and/or intravitreal) injection. In the case of the retina, intravitreal injection can be used to administer a polynucleotide according to the following procedure. For example, mice can be anaesthetised by intraperitoneal injection of Domitor and Ketalar (10 and 50 µg/g of body weight respectively). The pupils can be dilated with phenylephrine and under local analgesia (amethocaine) a small puncture is made in the sclera. A micro-needle attached to a 10 µl syringe (Hamilton Company Europe) is inserted through the puncture to the vitreous and, for example, 1-3 µl of vector can be administered into the vitreous. For example, in the case of AAV 1-3 µl of a $10^{9-14}$ vp/ml AAV vector preparation in PBS is administered. A reverse anaesthetic (antisedan, 50 µg/g of body weight) can be applied by intraperitoneal injection post-delivery. Body temperature during the procedure can be sustained using a homeothermic heating device. In addition newborn mice can be prepared for intravitreal injection according to Matsuda and Cepko or injected in utero according to Dejnenka et al. and Garcia-Frigola et al. (Dejneka et al., 2004; Garcia-Frigola et al., 2007; Matsuda and Cepko, 2004; Patricio et al., 2017).

In one embodiment of the invention administration of the isolated nucleic acid molecule, the expression cassette, and or the vector in combination with one or more factors to facilitate cell survival, cell viability and/or cell functioning is contemplated. In relation to neurons, a range of neurotrophic and/or neuroprotective factors may be used, including brain derived neurotrophic factor (BDNF), glial derived neurotrophic factor (GDNF), neurturin, ciliary derived neurotrophic factor (CNTF), nerve growth factor (NGF), fibroblast growth factors (FGF), insulin-like growth factors (IGF), pigment epithelium-derived factor (PEDG), hepatocyte growth factor (HGF), thyrotrophin releasing hormone (TRH) and rod derived cone viability factor (RDCVF) amongst others (Feng et al., 2017; Igarashi et al., 2016; Kimura et al., 2016; Koeberle and Ball, 2002; Ortin-Martinez et al., 2014; Rathnasamy et al., 2017). There is substantial evidence in the literature that such factors may increase cell viability and/or cell survival for a range of cell types. For example, these factors have been shown to provide beneficial effects to a wide range of neuronal cell types including, for example, RGCs and or photoreceptors, when delivered either in protein or DNA forms (Buch et al., 2006; Cen et al., 2017; Feng et al., 2017). The use of GDNF to augment gene-based therapies for recessive disease has been demonstrated in mice (Buch et al., 2006; Feng et al., 2017). Genes encoding neurotrophic/neuroprotective factors may be expressed from general promoters such as the CBA promoter (Buch et al., 2006) or from tissue specific promoters such as the promoter sequence of the invention or promoter elements from genes detailed in Table 7 (and/or Table 3). Sequences to optimise expression of neurotrophic/neuroprotective factors such as those sequences identified in Table 4, may be included in constructs.

In one embodiment of the isolated nucleic acid molecule, the expression cassette, and or the vector may be administered in combination with one or more factors to facilitate mitochondrial function including but not limited to Ndi1, Opa1, ND1, ND4, ND6, NDUAF6, and or AOX. In another embodiment administration of the isolated nucleic acid molecule, the expression cassette, and or the vector in combination with a corrected or optimised version of one or more of the genes causative of the disorders including but not limited to those listed in Table 3.

Evaluation of Expression of Heterologous or Endogenous Genes Using RNA Assays

Expression of heterologous polypeptides (genes of interest) and/or endogenous genes can be evaluated in cells, tissues and/or animals using RNA assays including real time RT-PCR, northern blotting, RNA in situ hybridisation and or RNAse protection assays. RNA expression levels of heterologous and/or endogenous nucleic acids can be assessed by real time RT-PCR using, for example, a Step-One Real Time PCR System (Applied Biosystems, Foster City, CA, USA) and using, for example, a QuantiTect SYBR Green RT-PCR kit (Qiagen Ltd). RT-PCR assays are undertaken using levels of expression of housekeeping controls such as β-actin or GAPDH, for example, for comparative purposes. Levels of RNA expression can be evaluated using sets of primers targeting the nucleic acids of interest. For example, the following primers can be used for the evaluation of levels of expression of Thy1, gamma-synuclein, Ndi1, GDNF, Brn3a, Nefh, rhodopsin, channelopsins, EGFP, β-actin, GAPDH, melanopsin, among others.

TABLE 6

Examples of PCR Primers for measuring rhodopsin, β-actin, GAPDH, Nefh (two primer pairs given), gamma-synuclein, Brn3a, Thy1 and Melanopsin

| Primer | Sequence | SEQ ID NO |
|---|---|---|
| RHO forward primer | 5' CTTTCCTGATCTGCTGGGTG 3' | SEQ ID NO: 25 |
| RHO reverse primer | 5' GGCAAAGAACGCTGGGATG 3' | SEQ ID NO: 26 |
| EGFP forward primer | 5' TTCAAGAGGACGGCAACATCC 3' | SEQ ID NO: 27 |
| EGFP reverse primer | 5' CACCTTGATGCCGTTCTTTCGC 3' | SEQ ID NO: 28 |
| β-actin forward primer | 5' TCACCCACACTGTGCCCATCTACGA 3' | SEQ ID NO: 29 |
| β-actin reverse primer | 5' CAGCGGAACCGCTCATTGCCAATGG 3' | SEQ ID NO: 30 |
| GAPDH forward primer: | 5'-CAGCCTCAAGATCATCAGCA-3' | SEQ ID NO: 31 |
| GAPDH reverse primer: | 5'-CATGAGTCCTTCCACGATAC-3' | SEQ ID NO: 32 |
| Nefh forward primer 1: | 5'-TGGCCCTGGACATTGAGATT-3' | SEQ ID NO: 33 |
| Nefh reverse primer 1: | 5'-TGCGTGGATATGGAGGGAAT-3' | SEQ ID NO: 34 |
| Nefh forward primer 2: | 5'-ACCGTCATCAGGCAGACATT-3' | SEQ ID NO: 35 |
| Nefh reverse primer 2: | 5'-AATGTCCAGGGCCATCTTGA-3' | SEQ ID NO: 25 |
| Gamma synuclein forward primer: | 5'-TCTCCATTGCCAAGGAAGGT-3' | SEQ ID NO: 26 |
| Gamma synuclein reverse primer: | 5'-CTTGTTGGCCACTGTGTTGA-3' | SEQ ID NO: 27 |
| Brn3a forward primer: | 5'-CGCAGCGTGAGAAAATGAAC-3' | SEQ ID NO: 28 |
| Brn3a reverse primer: | 5'-TGGCAGAGAATTTCATCCGC-3' | SEQ ID NO: 29 |

TABLE 6-continued

Examples of PCR Primers for measuring rhodopsin, β-actin, GAPDH, Neth (two primer pairs given), gamma-synuclein, Brn3a, Thy1 and Melanopsin

| Primer | Sequence | SEQ ID NO |
|---|---|---|
| Thy1 forward primer: | 5'-TGAACCAAAACCTTCGCCTG-3' | SEQ ID NO: 30 |
| Thy1 reverse primer: | 5'-AGCTCACAAAAGTAGTCGCC-3' | SEQ ID NO: 31 |
| Melanopsin forward primer: | 5'-GGGTTCTGAGAGTGAAGTGG-3' | SEQ ID NO: 32 |
| Melanopsin reverse primer: | 5'-AAGAGGCCTTGAGTTCTCC-3' | SEQ ID NO: 33 |

Expression of heterologous or endogenous genes may be confirmed, for example, by Northern blotting or real time RT qPCR. Real time RT PCR may be performed using standard methodologies such as those described in O'Reilly et al., 2007 and using primers such as amongst others those listed in Table 6.

RNA may also be detected by in situ hybridisations using single stranded RNA probes that have been labelled with, for example, DIG. To evaluate levels of expression of heterologous genes or endogenous genes, RNase protections assays can be performed using art known methods, such as that described in the Ambion mirVana™ Probe and Marker kit manual and the Ambion RPAIII™ Ribonuclease protection assay kit manual, as described (Chadderton et al., 2009; O'Reilly et al., 2007). For example, RNA probes approximately 15-25 nucleotides in length specific for transcripts from, for example, a heterologous gene can be synthesized.

Expression of heterologous genes and/or endogenous genes can be undertaken and determined in cells, in tissues and or in animals using, for example, the assays and associated methodologies provided above.

Evaluation of Expression of Heterologous and Endogenous Genes Using Protein Assays Expression of heterologous genes and/or endogenous genes can be evaluated in cells, tissues and/or animals using protein assays including ELISA, western blotting and immunocytochemistry assays. ELISAs can be undertaken to evaluate levels of expression of a target endogenous gene-such proteins assays are well know in the art and methods are provided in, for example Palfi et al. (2006). For example, in the case of retinal genes such as the rhodopsin gene, ELISA is undertaken using a rhodopsin primary antibody which is typically used in a diluted form, for example, using a 1/10-1/10000 dilution (but possibly outside of this range) of an antibody for the target protein. Antibodies including Thy1, Ndi1, including others, can be used to evaluate levels of endogenous and/or heterologous genes expressed in RGCs. In addition, Western Blotting may be undertaken to determine relative quantities of a specific protein, for example GDNF, Ndi1, Thy1 and others. Briefly, protein samples are separated using SDS-PAGE and transferred to a membrane. The membrane is incubated with generic protein (for example milk proteins) to bind to "sticky" places on the membrane. A primary antibody is added to a solution which is able to bind to its specific protein and a secondary antibody-enzyme conjugate, which recognises the primary antibody is added to find locations where the primary antibody bound.

In addition to the protein assays referred to above, assays using antibodies in conjunction with microscopy can be used to evaluate protein levels. For example, in the case of Brn3a, GABA, EGFP, or rhodopsin immunocytochemistry (for example, using a 1/10-1:1000 dilution of a primary antibody) and fluorescent microscopy can be carried out as has been documented, and in FIGS. 4 and 5 below (Chadderton et al., 2012; Kiang et al., 2005). Immunocytochemistry can be undertaken on cells and/or tissues. In the case of the retina, various modes of sectioning can be implemented to evaluate retinal sections. For example, frozen sections, agar embedded sections and/or resin embedded sections can be used. To obtain thin sections, for example of the retina, epon embedding and semi-thin sectioning can be performed using art known methods such as those provided in Chadderton et al. (2012); McNally et al. (2002). Histological analyses can be used to evaluate the histological effect(s) associated with the administration of the nucleic acid components of the invention. In wild type or animal models with a retinal degeneration histological analyses can be used to evaluate administration of heterologous or augmentation of endogenous genes of interest.

Delivery of Heterologous or Endogenous Polynucleotides

Both non-viral and/or viral vectors can be used in the invention to deliver the heterologous and/or endogenous polynucleotides of interest in expression cassettes of the second aspect of the invention. For example, in the case of retina, recombinant adenoassociated virus (AAV) and more specifically AAV2/2 may be used to elicit efficient preferential transduction of RGCs. Other AAV serotypes may also be used to deliver to retina, for example, AAV2/2 elicits efficient delivery to the retinal pigment epithelium (RPE), as does AAV4. AAV vectors can be generated using protocols with and without helper virus. For example, a helper virus free protocol using a triple transfection approach is well documented (Xiao et al., 1998). Expression cassettes can be cloned into plasmids such as pAAV-MCS provided by Stratagene Inc. Transgenes can be cloned between the inverted terminal repeats of AAV2 and transfected into 293 cells (Agilent; ATCC cat no CRL-1573) with two other plasmids, hence the term triple transfection. For example, the pRep2/Cap2 plasmid (Agilent) together with the pHelper plasmid (Agilent), at, for example, a ratio of 1:1:2, can be used to generate AAV2/2 vectors. Virus can be generated using a variety of art known procedures including the method outlined below. For example, to generate virus fifty 150 mm plates of confluent HEK293 cells were transfected (50 µg DNA/plate) with polyethyleminine (Reed et al., 2006). 48 hrs post-transfection crude viral lysates were cleared (Auricchio et al., 2001) and purified by $CsCl_2$ gradient centrifugation (Zolotukhin et al., 1999). The AAV containing fraction was dialysed against PBS. Genomic titres, viral particles (vp/ml), were determined by quantitative real-time PCR using art known methods (Rohr et al., 2002).

Assay for Function

To evaluate if administration of a heterologous and/or augmentation of an endogenous gene using an expression cassette or a vector of the invention modulates the function of a target tissue and/or cell type, one or more assays may be employed that are well described in the prior art. In the case of the retina, functional assays include but are not limited to electrophysiological assays including the full-field electroretinogram (ERG) and the pattern electroretinogram (PERG) and psychophysical assays such as visual field assessment, both kinetic and static, colour vision testing, and pupillometry. Protocols for ERG and PERG recording in humans have been established by the International Society for Clinical Electrophysiology of Vision (ISCEV) and may be adapted for similar recording in animals. The full-field ERG can be performed using, for example, the following procedure or an adapted procedure. Animals are dark-adapted overnight and prepared for ERG under dim red light. Pupils are dilated with 1% cyclopentalate and 2.5% phenylephrine. Animals are anesthetized with ketamine and xylazine (16 and 1.6 µg/10 g body weight respectively) injected intraperitoneally. Standardized flashes of light are presented to the animal, for example a mouse, in a Ganzfeld bowl. ERG responses are recorded simultaneously from both eyes by means of contact lens, gold wire or saline impregnated cotton thread electrodes, amongst others, using 1% amethocaine as topical anaesthesia. Reference and ground electrodes are positioned subcutaneously, approximately one mm from the temporal canthus and anterior to the tail respectively.

Responses are analysed using appropriate recording equipment. Rod-isolated responses are recorded using a dim white flash (−25 dB maximal intensity where maximal flash intensity was 3 candelas/m2/s) presented in the dark-adapted state. Maximal combined rod-cone responses to the maximal intensity flash are then recorded. Following a 10 minute light adaptation to a background illumination of 30 candelas/m2, cone-isolated responses are recorded to the maximal intensity flash presented initially as a single flash and subsequently as 30 Hz flickers in humans or 10 Hz in mice. A-waves are measured from the baseline to the trough and b-waves from the baseline (in the case of rod-isolated responses) or from the a-wave to the trough. The amplitude as well as the timing of the waveforms can provide valuable on both rod and cone photoreceptor function. The photopic electroretinogram negative response (PhNR), a component that follows the b-wave peak of the photopic full-field ERG, is thought to be correlated with inner retinal activity, particularly RGC activity, and is selectively reduced in optic neuropathies. The Visual Evoked Potential (VEP) assesses the transmission of electrical signals, predominantly generated by the macula, to the visual cortex. This response is, in fact, measured by electrodes placed over the occipital visual cortex, the exciting stimulus being either checkerboard pattern stimuli or flash stimuli. The amplitude of the signal correlates with the number of healthy retinal cells contributing to the signal of the signal while the efficiency of transmission along the optic nerve pathway may assays by determination of the latency of the signal, delay indicating pathological disturbance of transmission.

Optokinetics

OKR spatial frequency thresholds are typically measured blind by two independent researchers using a virtual optokinetic system (VOS, OptoMotry, Cerebral Mechanics, Lethbridge, Alberta, Canada) as described (Prusky et al., 2004). OptoMotry measures the threshold of the mouse's optokinetic tracking response to moving gratings. Briefly, a virtual-reality chamber is created with four 17-inch computer monitors facing into a square and the unrestrained mouse placed on a platform in the centre. A video camera, situated above the animal, provides real-time video feedback. The experimenter centres the virtual drum on the mouse's head and judges whether the mouse makes slow tracking movements with its head and neck. The spatial frequency threshold, the point at which the mouse no longer tracks, is obtained by incrementally increasing the spatial frequency of the grating at 100% contrast. A staircase procedure is used in which the step size is halved after each reversal, and terminated when the step size becomes smaller than the hardware resolution (~0.003c/d, 0.2% contrast). One staircase is presented for each direction of rotation to measure each eye separately, with the two staircases being interspersed.

Magnetic Resonance Imaging

Optic nerve integrity in experimental and control mice can be assessed by MEMRI (Bearer et al., 2007; Lin and Koretsky, 1997; Lindsey et al., 2007; Watanabe et al., 2001) using a 7-T Bruker Biospec 70/30 magnet (Bruker Biospin, Etlingen, Germany). MEMRI demarcates active regions of the brain due to the ability of $Mn^{2+}$ ions to enter excitable cells through voltage-gated calcium channels. Thus analysis of $Mn^{2+}$ transport through the optic nerve provides a good measure of its integrity. Two hours before scanning, mice are anaesthetised and intravitreally injected, as described (Chadderton et al., 2012), with 2 ml of 20 mg/ml manganese chloride ($MnCl_2$) in phosphate buffered saline (PBS). Log signal intensities from MRI scans corresponding to the region immediately superior to the optic chiasm can be quantified using the Image J software (Abramoff et al., 2004) (imagej.nih.gov/ij/). Assays that may be used to assess transgene expression and functional effects are not limited to the assays detailed above.

The agents of the invention (e.g. isolated nucleic acids, expression cassettes and/or vectors) may be administered in effective amounts. An effective amount is a dosage of the agent sufficient to provide expression of the transgene and or a medically desirable result. An effective amount means that amount necessary to delay the onset of, inhibit the progression of or halt altogether the onset or progression of the particular condition or disease being treated and/or provide expression of a marker or molecular tool. An effective amount may be an amount that reduces one or more signs or symptoms of the disease. When administered to a subject, effective amounts will depend of course on the particular condition being treated; the severity of the condition; individual patient parameters including age, physical condition, size and weight, concurrent treatment, frequency of treatment, and the mode of administration. These factors are well known to those of ordinary skill in the art and can be addressed with no more than routine experimentation.

Actual dosage levels of active ingredients in the compositions of the invention can be varied to obtain an amount of the agent(s) that is effective to achieve the desired therapeutic response for a particular patient, composition, and mode of administration. The selected dosage level depends upon the activity of the particular agent, the route of administration, the severity of the condition being treated, the condition, and prior medical history of the patient being treated. However, it is within the skill of the art to start doses of the agent(s) at levels lower than required to achieve the desired therapeutic effort and to gradually increase the dosage until the desired effect is achieved.

Practice of the invention will be still more fully understood from the following examples, which are presented herein for illustration only and should not be construed as limiting the invention in any way.

EXEMPLIFICATION

Figure 3:
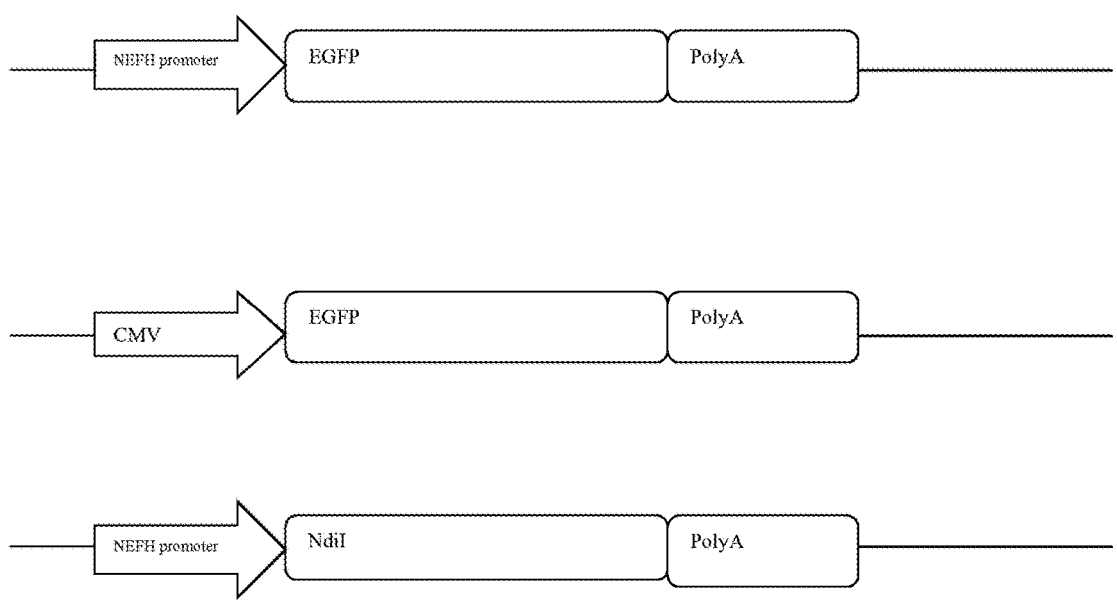
FIG. 3A illustrates diagrammatic representations of constructs used in the examples. EGFP-expressing constructs have been cloned and AAV generated (AAV.Nefh-EGFP and AAV.CMV-EGFP). A third construct expressing an 182VNdi1 gene has been made and AAV generated (AAV.Nefh-182VNdi1).
FIG. 3B Diagrammatic representation of constructs used in the examples. EGFP-expressing constructs have been cloned and AAV generated (AAV. Nefh-EGFP (either human or mouse NEFH promoter sequence) and AAV.A-EGFP and AAV.A+F-EGFP, AAV.A-spacer-F-EGFP.
Figure 3B:
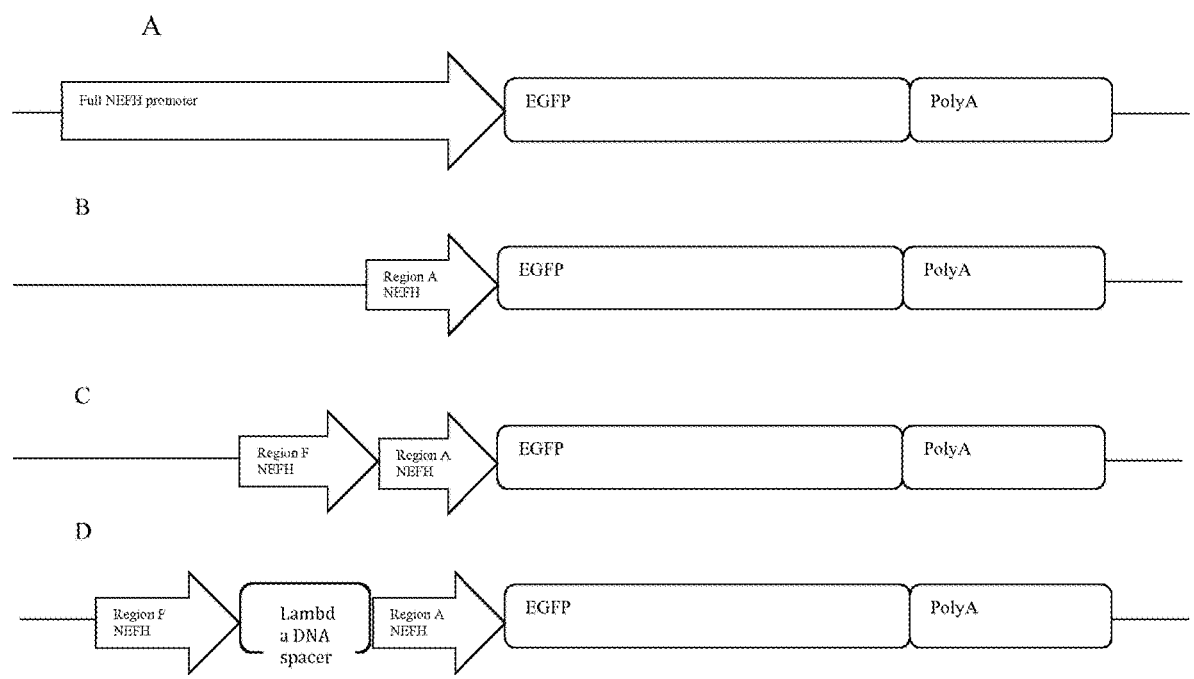

To help illustrate the current invention, five constructs were generated using different conserved regions of murine Nefh or human NEFH upstream sequence to drive EGFP marker gene expression (FIGS. 3B and 3C). From these constructs AAV 2/2 vectors were generated, though other vectors can also be utilised, to test for expression in murine retinas following intravitreal injection. These constructs were termed AAV.NEFH-EGFP (SEQ ID NO: 128), AAV.Nefh-EGFP (SEQ ID NO: 129), AAV.A-EGFP (SEQ ID NO: 124), AAV.A+F-EGFP (SEQ ID NO: 126), and AAV.A-spacer-F-EGFP (SEQ ID NO: 125).~

Example 1

In Silico RGC Promoter Analyses

Figure 2A:
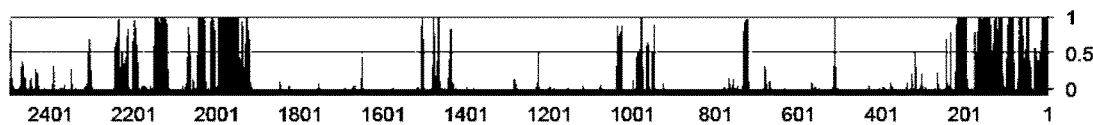
FIG. 2A illustrates analysis of 5' upstream sequence of five candidate promoter sequences. Regions ~2.5 kb upstream of the transcriptional start were analysed. The genes displayed represent the most highly expressed genes of the genes that are enriched >10-fold in RGCs. The y-axis represents conservation across mammals (CS), where 0 equals no significant conservation and 1 equals full conservation across mammalian species in the UCSC genome database.
Figure 2A:
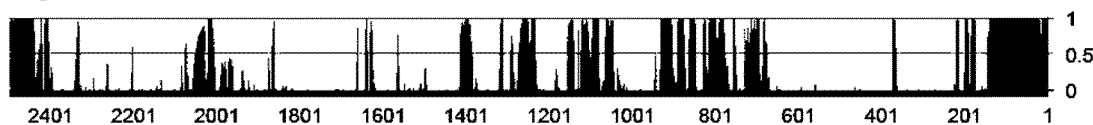
Figure 2A:
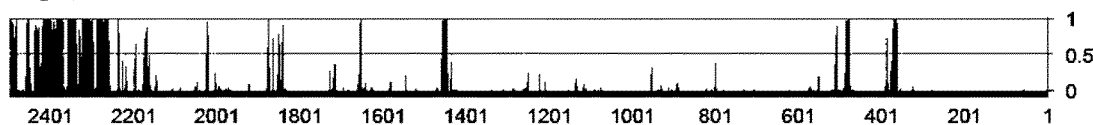
Figure 2A:
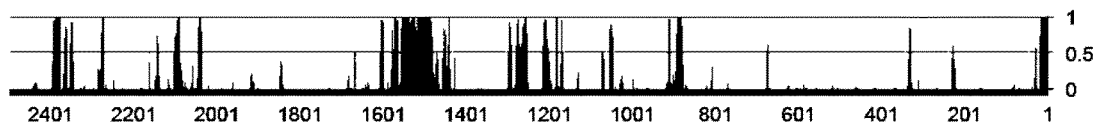
Figure 2A:
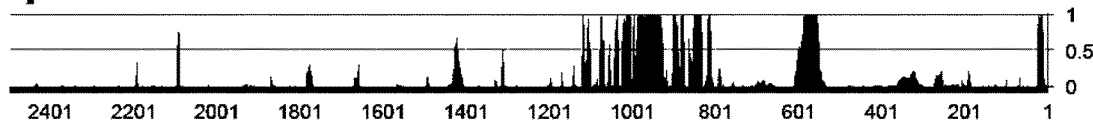

Human genes whose relative expression was enriched in the RGC layer by over 10-fold compared to relative expression in OR were selected (Kim et al., 2006). Genes were assessed based on GCL expression level ($EL_{GCL}$) compared to the OR expression ($EL_{OR}$), termed the enrichment factor ($EF=EL_{GCL}/EL_{OR}$; Kim et al., 2006) and the 15 genes with the highest ELs were selected for further investigation. A gene score ($GS=EL_{GCL} \times EF$) was used to rank genes for suitability as potential promoters. Further analysis was performed on mouse genomic data, as a mouse promoter was the desired output. Data from the UCSC genome browser (mm10 mouse mammalian conservation track; UCSC; Kent et al., 2002) were used to establish conservation upstream of the transcriptional start site of candidate genes; results from analysis of 2.5 kb upstream of the start site are presented (FIGS. 2A and B). An in silico pipeline (Python) was developed to isolate basewise conservation data from UCSC (conservation data ranged from 0 to 1 for a given base, where 0 represents no significant conservation between mammals and 1 indicates complete conservation). The forty mammalian species and their sequence assembly names that make up this conservation data are listed in Table 8. This was plotted in a graph in order to visualise conserved regions. NEFH was chosen as having the highest GS of the genes analysed. Using the parameters defined above, the mouse Nefh upstream region was selected for evaluation in vivo, given the expression profile of the gene and conservation of its 5' upstream sequence.

Cloning and AAV Production pAAV.CMV-EGFP was cloned as described (Palfi et al., 2010). To generate pAAV.Nefh-EGFP, a 2251 bp fragment of mouse Nefh upstream sequence (NM_010904.3) was amplified from genomic DNA and substituted for the CMV promoter in pAAV.CMV-EGFP. To create pAAV.minNefh-EGFP a 838 bp fragment encompassing the six highly conserved regions of Nefh was synthesized by Integrated DNA Technologies (IDT) and substituted for the CMV promoter in pAAV.CMV-EGFP. pAAV.NEFH-EGFP was generated by amplifying ~1.9 kb fragment of human genomic DNA (NM_021076.3) using the following primers: Forward primer: 5' AGAT-CATCTTAAGACGCGTTGCTGTCAGCTGCTTGTGA 3' (SEQ ID NO: 45) and Reverse primer: 5'GAGGTA-CAGTGTTCTCCTAAC 3' (SEQ ID NO: 46). The purified PCR product was cloned into pcDNA3.1+ (Invitrogen) along with a fragment of custom synthesized DNA obtained from GeneWiz in their standard vector (pUC57-Amp; see below). The full length NEFH, 2501 bp, was excised and cloned in place of the CMV promoter in pAAV-CMV-EGFP to create pAAV-NEFH-EGFP (SEQ ID NO: 47).

AGTTTCCTGAGCGCTCTCCAAGTGGGTCCTCTAGATGTTAGGAGAACA

CTGTACCTCCCCCGGTCAGGGGTCTCCTGTCTCCGTTCTATGGAGCGT

CCATGCTCCCATTCAGGACTGCCTTGCTCCCTCCTCTGTTCCGGGGCT

GGCTGCACAGTCTCTGCACCCCCTATCCTGAAAGCCTCTCTTAACTAT

TTGGAAAGCCTCGTGTCCTGTCTCATACAGGGATCCCCTCATCCTAAT

GACTGCAATCTTCCATTGCTCCATCCCGAGGGCATCCTGCCCCTATTC

CCATCAGGTTTCTCCTTGTCCTCTCCCTGTTTCAAGTCCCCTTTCTTA

TTCCGAACACACTCGCAGGCTCTTCCGACGCGCACCCGGGGGTCCTCA

CTGGCCCACTCCGGGAGTCCTCTGCCCGCTTCCCCGACCTCGAGGGTC

TCCTCTGACGCAGCGTCGATTCCCCTTCCCTCCTCGGTCCCCTGCCCC

GCCCCTCTCACTGCGGCGGAGCCGGTCGGCCGGGGGGCCGCAGGGGAG

GAGGCGGAGAGGGCGGGGCCCTCCTCCCCACCCTCTCACTGCCAAGGG

GTTGGACCCGGCCGCGGCGGCTATAAAAGGGCCGGCGCCCTGGTGCTG

CCGCAGTGCCTCCCGCCCCGTCCCGGCC<u>TCGCGCACCTGCTCAGC</u>GAT

ATCCTAGGAATTCAGCTTCTAGA

To create pAAV.A-EGFP, conserved region A was amplified from human genomic DNA using the following primers: Forward: 5'-ATC-GATGACGCGTCTCTGACGCAGCGTCGATT-3' (SEQ ID NO: 48); and Reverse: 5'-AGATCATGATATCGGCCT-GAGCAGGTGCGCGA-3' (SEQ ID NO: 49) and cloned upstream of EGFP in pAAV-MCS-EGFP (Agilent Technologies) was digested with MluI and EcoRV and purified. To generate pAAV.A+F-EGFP, the following sequence was custom synthesized by GeneWiz and cloned into pAAV.CMV-EGFP in place of CMV (SEQ ID NO: 50):

AGAGATCATACGCGTCTAGTCATCTCAGTTGCTGTCAGCTGCTTGTGA

GCCTTCTCACATCCAGAGAATGTATCAGCATTGTGCAGACTGAAAAGA

CCCAGAGGAACAAGGCTCCAATGGCAAAATTCCAAGTAGAATGACAAA

TAAATGGGGAGCCATCTGAGAGCAAGGGAGTCCTGCCCAACACCCGCC

CCATGCCTTTCTCAGGGACCTCAGACCAGCCACTCACCTCCATCCTCC

CAGCACCACCTGCAACCAGCCCCTTGCCCTCTGCAAACTGGAGCACGA

CTGGATCTTTAGATGGGGGAAAAATGCTTCATCATGTTCTGCTGCTTC

ATGCAAAACCAGAAACTCCCTCCCCCTCTTCCCTCCTCCCAGCGCACT

CTCCTTCCAGTAAGTTTAAACTTCCCTCCTCGGTCCCCTGCCCCGCCC

CTCTCACTGCGGCGGAGCCGGTCGGCCGGGGGGCCGCAGGGGAGGAGG

CGGAGAGGGCGGGGCCCTCCTCCCCACCCTCTCACTGCCAAGGGGTTG

GACCCGGCCGCGGCGGCTATAAAAGGGCCGGCGCCCTGGTGCTGCCGC

-continued
AGTGCCTCCCGCCCCGTCCCGGCCTCGCGCACCTGCTCTCACGTGATC

AGAGATATCTCAGACA pAAV.A-spacer-F-EGFP was generated by amplifying a 1866 bp section of lambda DNA using the following primers (Forward primer: 5'-ATCGATGTTTAAACTACTACCGATTCCGCCTAGT-3' (SEQ ID NO: 51) and Reverse primer: 5'-ATGCATGTTTAAACAGGCATTTATACTCCGCTGG-3') (SEQ ID NO: 52) and cloning this between conserved regions A and F in pAAV.A+F-EGFP. All plasmid constructs were verified by Sanger sequencing. Recombinant AAV2/2 viruses, AAV.NEFH-EGFP AAV.Nefh-EGFP, AAV.CMV-EGFP, AAV.minNefh-EGFP, AAV.A-EGFP, AAV.A+F-EGFP and AAV.A-spacer-F-EGFP were generated, and genomic titres determined, as described (O'Reilly et al., 2007).

Animals and Intravitreal Injections

Wild type 129 S2/SvHsd mice (Harlan UK Ltd, Oxfordshire, UK) were maintained in a specific pathogen free (SPF) facility. Intravitreal injections were undertaken in strict compliance with the European Communities Regulations 2002 and 2005 (Cruelty to Animals Act) and the Association for Research in Vision and Ophthalmology (ARVO) statement for the use of animals. Adult mice were anaesthetised and pupils dilated as described (O'Reilly et al., 2007). Using topical anaesthesia (Amethocaine), a small puncture was made in the sclera. A 34-gauge blunt-ended microneedle attached to a 10 µl Hamilton syringe was inserted through the puncture, and 3 µl AAV2/2 was slowly, over a two-minute period, administered into the vitreous. Following intravitreal injection, an anesthetic reversing agent (100 mg/10 g body weight; Atipamezole Hydrochloride) was delivered by intraperitoneal injection. Body temperature was maintained using a homeothermic heating device. Animals were sacrificed by $CO_2$ asphyxiation.

Histology

Histology was performed as described (Chadderton et al., 2012) with some modifications. Briefly, transduced eyes (n=6) were fixed in 4% paraformaldehyde and cryosectioned (12 µm). Sections were co-labeled for EGFP (chicken anti-GFP; Abcam, ab 13970, 1/2000 dilution; Palfi et al., 2012) and either Brn3a (goat anti-Brn3a; Santa Cruz Biotechnology, sc-31984, 1/200 dilution; Nadal-Nicolás et al., 2009; Trost et al., 2015), ChAT (goat anti-choline acetyltransferase; Millipore, AB144P, 1/500 dilution; Zhu et al., 2014) or GABA (rabbit anti-GABA; Sigma, A2052, 1/2000 dilution; Zhu et al., 2014) using immunohistochemistry. EGFP was labeled with FITC-conjugated secondary antibody (1/400 dilution, Jackson ImmunoResearch Laboratories) while Brn3a, ChAT and GABA were labeled with Cy3-conjugated secondary antibody (1/400 dilution, Jackson ImmunoResearch Laboratories). Cell nuclei were counterstained with 4,6-diamidino-2-phenylindole (DAPI). Background labeling was determined using parallel processed sections where the primary antibodies were omitted. Corresponding microscope images were taken using a Zeiss Axiophot fluorescent microscope (Carl Zeiss Ltd., Welwyn Garden City, UK). Immunohistochemical signals obtained with different filters were overlaid using Photoshop v.13 (Adobe Systems Europe, Glasgow, UK). For analysis, levels for each channel were set to predetermined values to help discrimination between signal and background; signal levels above threshold were taken as positive. Additionally, cellular colocalisation of the positive immunohistochemical signals with the nuclear label was a criterion for identification of positive cells. However, it is possible that at the low spectrum identification of either positive or negative cells failed. This would have implicated a small percentage of cells and affected all groups similarly, and therefore should not have any significant effects on the results. Labeled and co-labeled cells were counted manually using the count tool in Photoshop. Two transduced sections (approximately 300 µm apart) from the central part of the retina (~1500 µm span in total) were analysed for each marker (n=4-5). Statistical analysis (one way ANOVA, Tukey's multiple comparison post-hoc test) was performed using Prism 5 (GraphPad); $p<0.05$ was considered statistically significant.

Flow Cytometry Cell Sorting

Retinas were harvested three weeks post-injection and trypsin-dissociated, as previously described (Palfi et al., 2012). To isolate RGCs, cells were labeled with anti-Thy1-PE-Cy5, (CD90.2, Rat Thy-1.2, 53-2.1 1:100; eBioscience Inc., San Diego, CA). DRAQ5™ (BioStatus, Leicestershire, UK). Nucleated, DRAQ5-positive cell populations were initially sorted on the basis of forward and side scatter, and subsequently two stages of singlet selection. Retinal cells expressing both EGFP and Thy-1 were identified (BD FACSAria IIIu high speed cell sorter, BD Bioscience, San Jose, CA). EGFP had been excited by a 488 nm laser and the emission was collected using a 530/30 band pass filter. Thy-1 PECy5 had been measured exciting the probe with a 561 nm laser and collecting the signal with a 690/40 nm band pass. QC of the cell sorter had been done with BD CS&T beads and the drop delay had been adjusted using the BD Accudrop beads (RUO), following manufacture specifications. EGFP-positive cells expressing Thy-1 were represented as a percentage of the total EGFP positive cells. Data was reanalyzed with the FCSExpress 6 Flow software (DeNovo Software). Statistical analysis (Student's t-test) was performed using Microsoft Excel and $p<0.05$ was considered statistically significant.

RT-QPCR of FACS Sorted Thy-1 Positive Cells

Thy 1-positive cells collected from n=12 retinas and non-labelled retinal cells with a similar forward and side scatter from n=9 retinas were collected by flow cytometry cell sorting and total RNA was extracted as described (Millington-Ward et al., 2011). Thy1 mRNA was amplified in triplicate from pooled sorted populations by flow cytometry using the QuantiTect SYBR green RT-PCR kit (Qiagen, Hilden, Germany) using the manufacturer's protocol and the following primers:

```
F
                                  (SEQ ID NO: 30)
5' TGAACCAAAACCTTCGCCTG 3'

R
                                  (SEQ ID NO: 31)
5' AGCTCACAAAAGTAGTCGCC 3'
```

Resulting CT values were standardised to cell number, as standardly used housekeeping genes could be expressed at different levels in different cell populations, making them unreliable for this analysis.

RNA Extraction and PCR Analysis

Adult wild type mice (n=5 or 6 eyes) were intravitrally injected with $6.6 \times 10^8$vp AAV-A-EGFP, AAV-A+F-EGFP, AAVA-spacer-F-EGFP, AAVEGFP or AAV-Nefh-EGFP. Retinas were harvested three or four weeks post-injection and total RNA extracted as described (Millington-Ward et al., 2011). In vivo expression levels of EGFP was determined by reverse transcription PCR (RT-PCR) on a StepOne Real Time PCR System (Applied Biosystems, Foster City, CA, USA) using a QuantiTect SYBR Green RT-PCR kit (Qiagen Ltd., Crawley, UK). The EGFP primers used were: EGFP forward primer 5' TTCAAGAGGACGGCAA-CATCC 3' (SEQ ID NO: 27, Table 6) and EGFP reverse primer: 5' CACCTTGATGCCGTTCTTTCGC 3' (SEQ ID NO: 28, Table 6). RT-PCRs were performed twice in triplicate. Expression levels were normalized using the internal housekeeping gene β-actin. Standard curves of β-actin were generated by serially diluting RNA 5×. Standard curves of EGFP were generated by serially diluting plasmid DNA containing an EGFP gene 10×. A minimum of 4 points were used in all standard curves.

Results

The objective of the current study was the characterisation and in vivo evaluation of an RGC promoter for future use in AAV-mediated gene therapies. A comparative evaluation of genes with highly enriched RGC expression was undertaken in silico and the lead candidate was investigated in vivo (FIG. 1). Whilst gene expression profiles of RGCs are available, the promoters that drive this expression are ill defined. We chose several key criteria to identify candidate promoters using microarray data for RGCs (Choudhury et al., 2016; Kim et al., 2006; Struebing et al., 2016). Conservation data of regions upstream of the most enriched RGC candidate genes were obtained from the UCSC genome browser database (UCSC, mm10). In the study conservation of sequence across mammals (using the mouse genome as a base) was used as a proxy for presumed function in vivo to identify putative promoters. To ensure that any promoter chosen would be suitable for future use in AAV vectors, conservation analysis was limited to the immediate 2.5 kb upstream sequence of genes. Based on the expression level of a gene in the GCL ($EL_{GCL}$) and the enrichment factor of that gene (EF), a gene score was generated to rank genes as candidates (GS=$EL_{GCL}$×EF; Table 7). The basewise species conservation in the selected upstream sequences was plotted (conservation numbered between 0 and 1) and the five genes with the highest GS are presented (FIG. 2).

TABLE 7

List of putative ganglion cell promoters. Human transcriptomic data of 1,000 cell populations from RGCs versus OR (Kim et al. 2006) was used to determine relative expression levels in the outer retina ($EL_{OR}$) and the GCL ($EL_{GCL}$). Enrichment factor (EF) for the GCL was calculated as EF = $EL_{GCL}/EL_{OR}$. A gene score (GS) was calculated as GS = ($EL_{GCL}$ × EF) to provide an overall score. Genes are listed in order of GS.

| Rank | Gene name | $EL_{GCL}$ | $EL_R$ | EF | GS |
|---|---|---|---|---|---|
| 1 | NEFH | 21899.1 | 89.4 | 245 | $5.37 \times 10^6$ |
| 2 | NEFM | 6984.1 | 31.7 | 220.6 | $1.54 \times 10^6$ |
| 3 | NEFL | 7841.1 | 50.5 | 155.3 | $1.22 \times 10^6$ |
| 4 | VSNL1 | 4659.33 | 67.35 | 69.18 | $3.22 \times 10^5$ |
| 5 | SPARCL1 | 5077 | 149.75 | 33.9 | $1.72 \times 10^5$ |
| 6 | SLC17A6 | 1302.9 | 10.3 | 126.8 | $1.65 \times 10^5$ |
| 7 | TMSB10 | 7124.3 | 324.6 | 21.9 | $1.56 \times 10^5$ |
| 8 | ANXA2 | 2221.4 | 37.5 | 59.3 | $1.32 \times 10^5$ |
| 9 | STMN2 | 4139.9 | 147.9 | 28 | $1.16 \times 10^5$ |
| 10 | PRPH1 | 1238.5 | 18.4 | 67.5 | $8.36 \times 10^4$ |
| 11 | CRTAC1 | 4478.6 | 347 | 12.9 | $5.78 \times 10^4$ |
| 12 | RBPMS | 832.5 | 12.6 | 66 | $5.49 \times 10^4$ |
| 13 | RAB13 | 1802.7 | 59.7 | 30.2 | $5.44 \times 10^4$ |
| 14 | ATP1B1 | 3803.3 | 299.2 | 12.7 | $4.83 \times 10^4$ |
| 15 | FABP3 | 1054.6 | 24.9 | 42.4 | $4.47 \times 10^4$ |

Following analysis, Nefh was deemed to be the most highly enriched gene in RGCs with an enrichment factor (EF) of 245-fold, as well as demonstrating an extremely high $EL_{GCL}$ (21899.1; Table 7). Some of the mouse genes analysed showed greater average conservation in their 2.5 kb upstream regions than Nefh (Nefm 0.289, Stmn2 0.292, Crtac1 0.349 vs. Nefh 0.185). However, due to their lower EF and $EL_{GCL}$ scores, Nefh was deemed likely to drive higher levels of RGC-specific expression and hence to be a better candidate promoter (GS: Nefh $5.37 \times 10^6$ vs. Nefm $1.54 \times 10^6$, Stmn2 $1.16 \times 10^6$, Crtac1 $5.78 \times 10^4$). Tmsb10, Nefl, and SparclI had lower scores than Nefh in all categories. Brn3a, a commonly used marker for RGCs (Kim et al., 2006; Nadal-Nicolás et al., 2014), was found to have an extremely high conservation within a 2.5 kb upstream region, and a high EF (0.576, 79.1 respectively). However, its $EL_{GCL}$ was found to be approximately 39 times lower than that of Nefh (719.7), and so was not included as a candidate gene. The hSYN gene showed no significant GCL enrichment or expression in the Kim et al (2006) study.

To explore the strength and specificity of the putative Nefh promoter, 2251 bp of upstream sequence from the mouse homologue was used to drive expression of an EGFP reporter gene in an AAV2/2 vector (AAV-Nefh-EGFP) and expression compared to that mediated by the CMV promoter (AAV-CMV-EGFP; Palfi et al., 2010, Chadderton et al., 2012). The mouse gene was chosen to ensure that function or non-function was not due to species incompatibility. The CMV promoter incorporated into AAV vectors has previously been shown to drive high levels of transgene expression in a wide variety of retinal cell types (Lebherz et al., 2008; Li et al., 2008; Mueller and Flotte, 2008), including RGCs (Chadderton et al., 2012; Tshilenge et al., 2016) and was used as a control vector for transgene expression.

Figure 4:
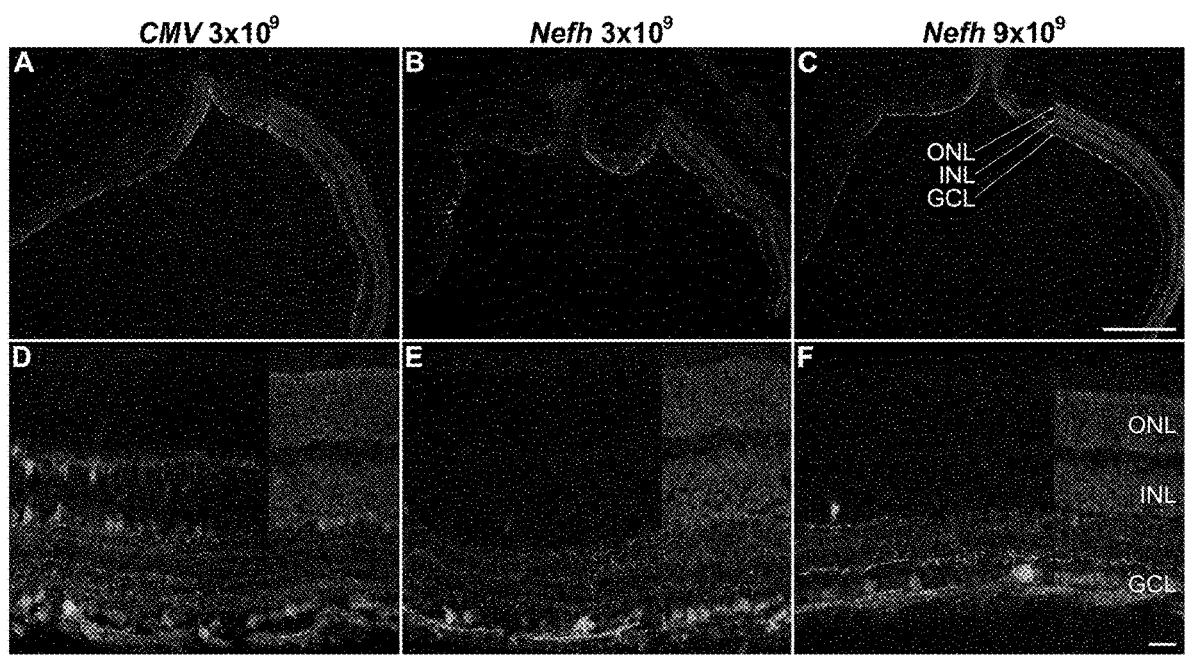
FIG. 4 illustrates analysis of Nefh mediated EGFP expression in vivo. Retinas were injected intravitreally with AAV.CMV-EGFP ($3\times10^9$ vg; A and D) or two different doses of AAV.Nefh-EGFP ($3\times10^9$ vg; B and E; and $9\times10^9$ vg; C and F). Transduced eyes (n=4-5) were fixed and cryosectioned 12 weeks post-delivery. FITC-labeled immunocytochemistry was performed for EGFP. DAPI was used for nuclear counterstaining; DAPI signals are overlaid on the right side of the images. ONL: outer nuclear layer; INL: inner nuclear layer, GCL: ganglion cell layer. Arrowheads: transduced cells in the INL. Scale bars: 500 µm (C) and 25 µm (F).
Figure 6:
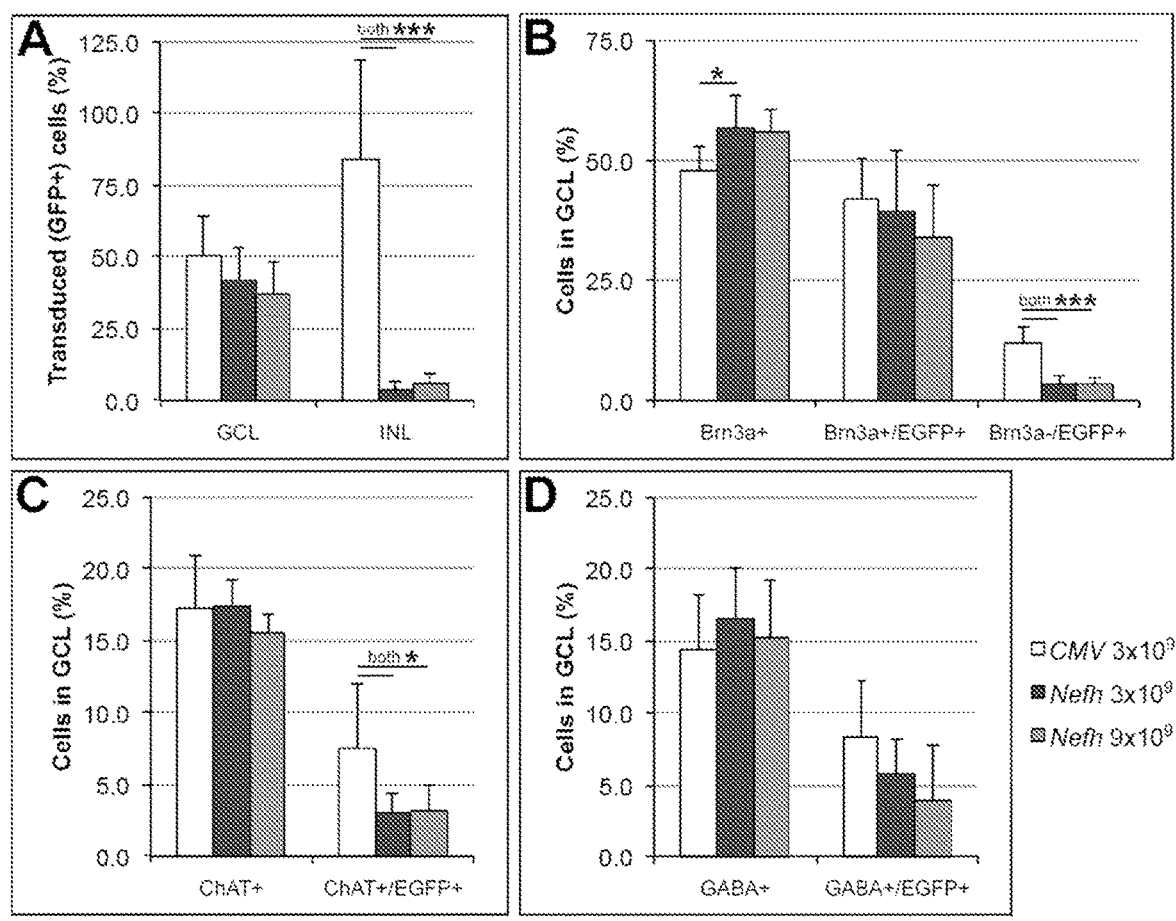
FIG. 6 illustrates barcharts summarising CMV or Nefh mediated EGFP expression in vivo. Retinas were injected intravitreally with AAV.CMV-EGFP ($3\times10^9$ vg; A and D) or two different doses of AAV.Nefh-EGFP ($3\times10^9$ vg; B and E; and $9\times10^9$ vg; C and F). Transduced eyes (n=4-5) were fixed and cryosectioned 12 weeks post-delivery. Immunocytochemistry was performed for Brn3a, ChAT, GABA and EGFP; DAPI was used for nuclear counterstaining. Manual quantification of labeled and co-labeled cells was performed in the immunolabelled retinal sections. A: Distribution of EGFP positive cells was determined in the ganglion cell (GCL) and the inner nuclear layers (INL). Additionally, co-localisation of EGFP with Brn3a (B), ChAT (C) and GABA (D) was determined in the GCL. ***: $p<0.001$; * $p<0.05$ (ANOVA).

Adult mice were injected intravitreally with $3 \times 10^9$ viral genomes (vg)/eye AAV.CMV-EGFP or with either $3 \times 10^9$ vg/eye or $9 \times 10^9$ vg/eye AAV.Nefh-EGFP. Histological analysis 12 weeks post-injection revealed widespread EGFP expression in the retina (FIG. 4). Individual cells exhibited a broad range of EGFP expression levels from low to very high, possibly due to varying viral transduction. However, cellular EGFP labeling (colocalised to DAPI stained nuclei), even for cells expressing low levels of EGFP, was easily distinguishable from uniform background levels. EGFP expression from both promoters was observed in a significant number of cells in the GCL (50.2±14.1% AAV.CMV-EGFP, FIGS. 4A and D; 42±11.2% AAV.Nefh-EGFP, FIGS. 4 B and E; and 37±11.1% high dose AAV.Nefh-EGFP, FIGS. 4C and F and FIG. 6A). However, while the Nefh promoter mediated EGFP expression was predominantly confined to the GCL (FIGS. 4 B, E, C and F), CMV promoter driven expression extended into the INL (FIGS. 4A and D); 84.5±34.2% AAV.CMV-EGFP, 3.6±2.9% AAV.Nefh-EGFP and 5.6±3.8% high dose AAV.Nefh-EGFP (FIG. 6A; EGFP-positive cells in the INL expressed as a percentage of all cells in the GCL). Notably, the increased dose of AAV.Nefh-EGFP did not increase the transduction rate in the INL (FIG. 4 and FIG. 6A). AAV.CMV-EGFP demonstrated significantly greater INL expression compared to AAV.Nefh-EGFP, p<0.001 (FIG. 4 and FIG. 6A).

Figure 5:
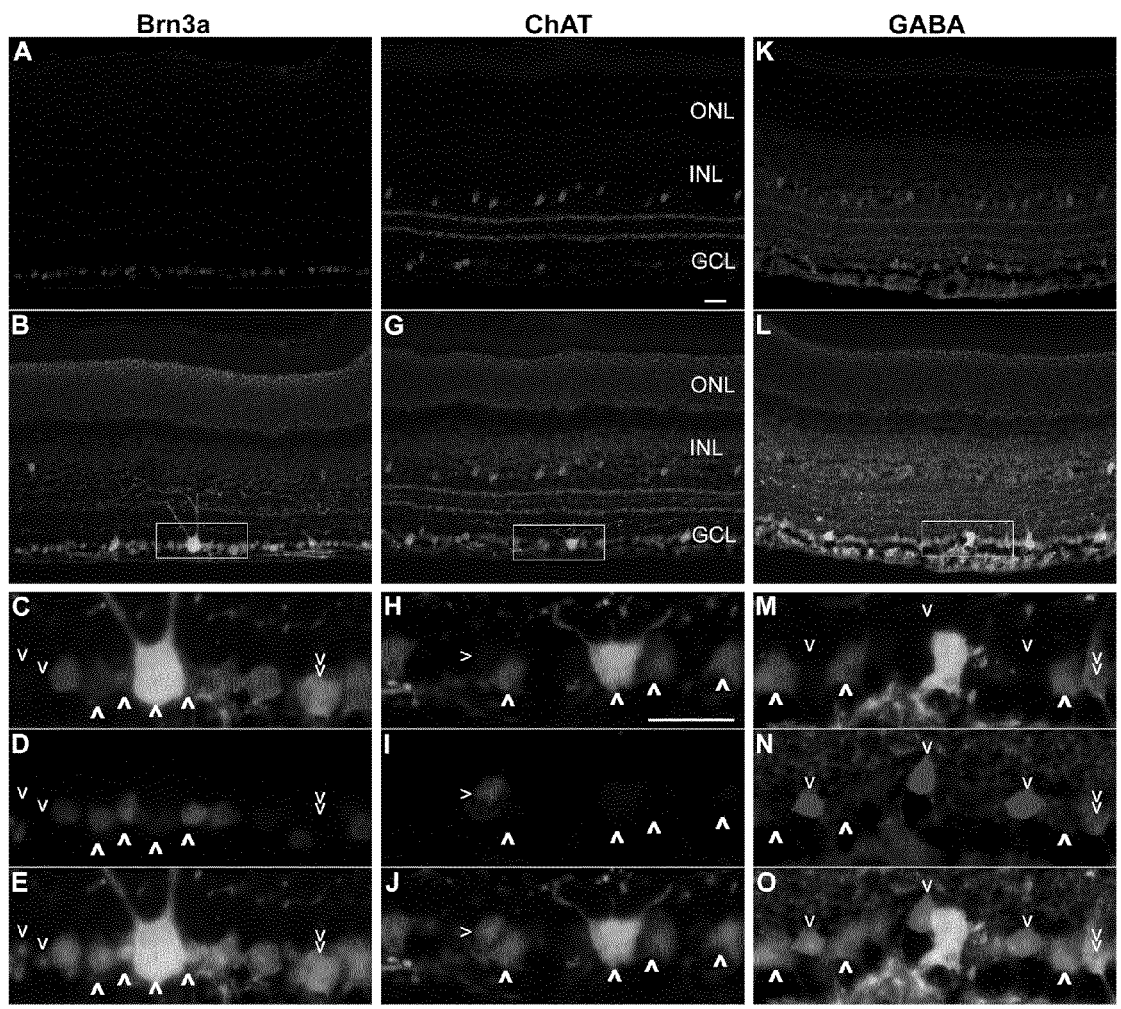
FIG. 5 illustrates the results of immunocytochemistry of AAV.Nefh-EGFP transduced retinas. Eyes were injected intravitreally with AAV.Nefh-EGFP ($3\times10^9$ vg). Transduced eyes (n=5) were fixed and cryosectioned 12 weeks post-delivery. Immunocytochemistry was performed for Brn3a (Cy3; A-E), ChAT (Cy3; F-J) and GABA (Cy3; K-O) in combination with EGFP labeling (FITC). DAPI was used for nuclear counterstaining. Rectangles (in B, G and L) indicate positions of the enlarged areas. A, F and K: Cy3 label; B, G and L: Cy3, FITC and DAPI overlaid. C, H and M: FITC label; D, I and N: Cy3 label; E, J and O: Cy3, FITC and DAPI labels overlaid. C-E: Bold arrowheads: transduced Brn3a-positive cells. Regular arrowheads: un-transduced Brn3a-negative cells. Double arrowhead: a transduced Brn3a-negative cell. H-J: Bold arrowheads: transduced ChAT-negative cells. Regular arrowhead: a transduced ChAT-positive cell. M-O: Bold arrowheads: transduced GABA-negative cells. Regular arrowheads: un-transduced GABA-positive cells. Double arrowhead: an un-transduced GABA-positive cell. ONL: outer nuclear layer; INL: inner nuclear layer, GCL: ganglion cell layer. Scale bars: 25 µm (F and H).

Approximately fifty percent of cells in the GCL are RGCs with the other fifty percent being displaced amacrine cells (Akopian et al., 2016; Jeon et al., 1998; webvision.med.utah.edu). To further delineate the expression profile of the Nefh promoter, EGFP transgene expression was analysed in the GCL using antibodies targeting Brn3a, an RGC marker (Schlamp et al., 2013) and two amacrine cell markers, ChAT and GABA (Jeon et al., 1998; Wässle et al., 1987; webvision.med.utah.edu). Brn3a staining was used to explore the specificity of the Nefh promoter for RGCs; 50%-55% of all cells in the GCL were Brn3a positive in line with previously published data (FIG. 5 and FIG. 6B; Schlamp et al., 2013, Jeon et al., 1998). FIG. 5 displays representative staining of the $3\times10^9$ vg/eye dose of AAV.Nefh-EGFP. While AAV.CMV-EGFP and AAV.Nefh-EGFP expressed in comparable numbers of Brn3a positive cells (41.9±8.5% AAV.CMV-EGFP, 39.5±12.7% AAV.Nefh-EGFP and 33.9±11.2% high dose AAV.Nefh-EGFP; FIG. 5 and FIG. 6B), Nefh promoter-mediated EGFP expression in the GCL was observed in significantly fewer Brn3a negative cells (p<0.001, 12.1±3.3 AAV.CMV-EGFP, 3.5±1.7 AAV.Nefh-EGFP and 3.4±1.2 high dose AAV.Nefh-EGFP; FIG. 5 and FIG. 6B). ChAT and GABA markers were used to identify subpopulations of amacrine cells; identifying 17% and approximately 15% of cells in the GCL, respectively, in the mouse retina (FIG. 5, FIGS. 6C and 6D). EGFP expressing cells were significantly more likely to be ChAT positive amacrine cells when EGFP expression was driven by the CMV promoter, compared to the Nefh promoter (p<0.05, 7.5±4.6% AAV.CMV-EGFP, 3.1±1.4% AAV.Nefh-EGFP and 3.2±1.9% high dose AAV.Nefh-EGFP; FIG. 5 and FIG. 6C). Additionally a greater number of CMV promoter driven EGFP positive cells were also co-labeled with GABA, however this represented a trend rather than reaching significance (8.3±4.0% AAV.CMV-EGFP, 5.8±2.4% AAV.Nefh-EGFP and 4.0±3.7% high dose AAV.Nefh-EGFP; FIG. 5 and FIG. 6D).

Figure 7:
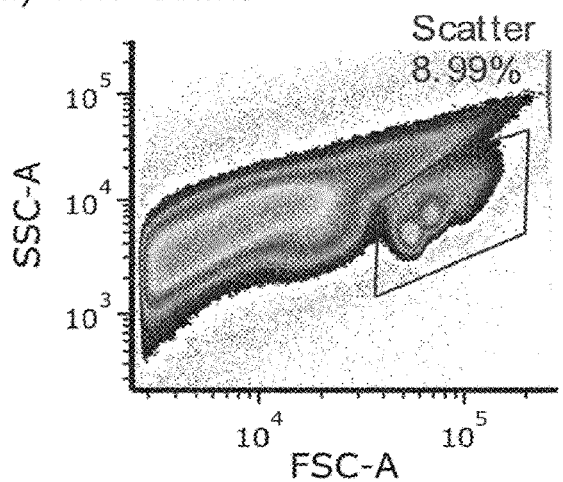
FIG. 7 illustrates flow cytometry analysis of Nefh mediated EGFP expression in vivo. Eyes were injected intravitreally with either AAV.CMV-EGFP ($3\times10^9$) or AAV.Nefh-EGFP ($9\times10^9$vg). Three weeks post-injection, retinas were dissociated and processed for flow cytometry analysis, using a Thy1 antibody conjugated to PE-Cy5. Nucleated cell populations were identified on the basis of DRAQ5 positive labelling (data not shown) and forward (FSC) and side (SSC) scatter (a), and singlets identified (b, c). Thy1 (x-axis) and EGFP (y-axis) gates were created based on wildtype retinas that had not been treated with Thy1 antibody and wildtype retinas that had been treated with Thy1 antibody, representing Thy 1-negative (d) and Thy1-positive (e) control samples. Using these pre-defined gates transduced retinal samples (n=6 per group) were sorted against EGFP and PE-Cy5 (Thy1; f, g). Percentages of cells in each quadrant are indicated. Enrichment values were generated by dividing the percentage of Thy1 and EGFP double positive cells by the percentage of EGFP-positive Thy1-negative cells. Thy1 positive cells (from n=12 retinal samples) and non-labeled singlets with a similar FFC/SSC profile (from n=9 retinal samples) were collected and pooled and Thy1 mRNA levels were established by RT-QPCR (h). Thy1 mRNA enrichment in Thy1 antibody positive cells was calculated from the ΔCt value divided by the ratio of Thy1-positive cells to whole retinal cells.
Figure 7:
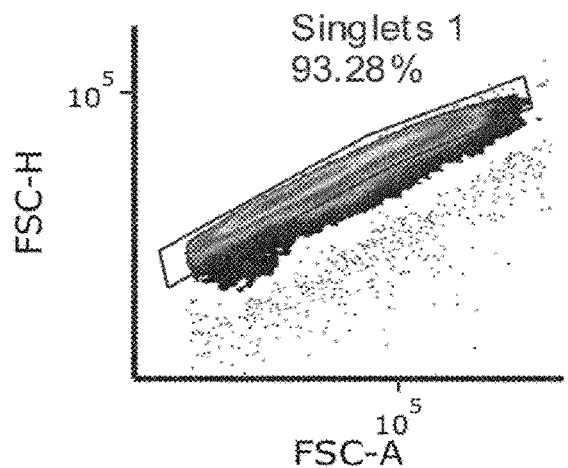
Figure 7:
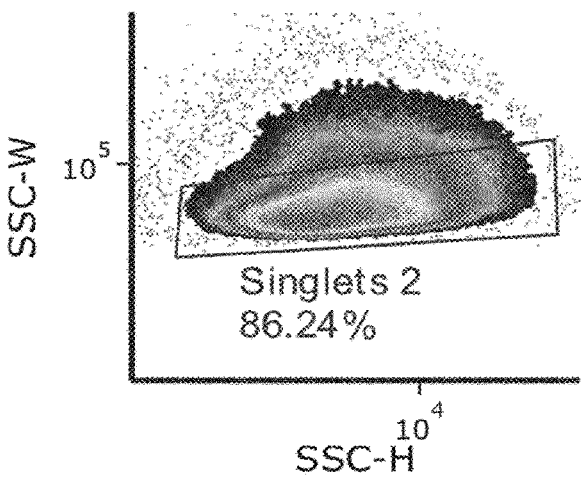
Figure 7:
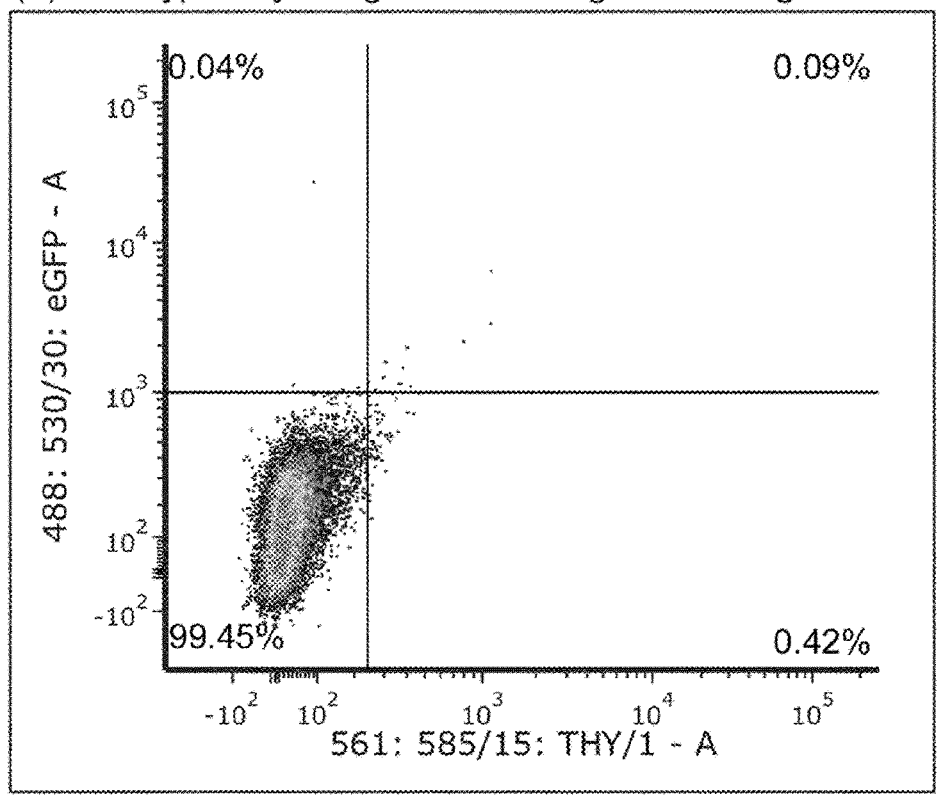
Figure 7:
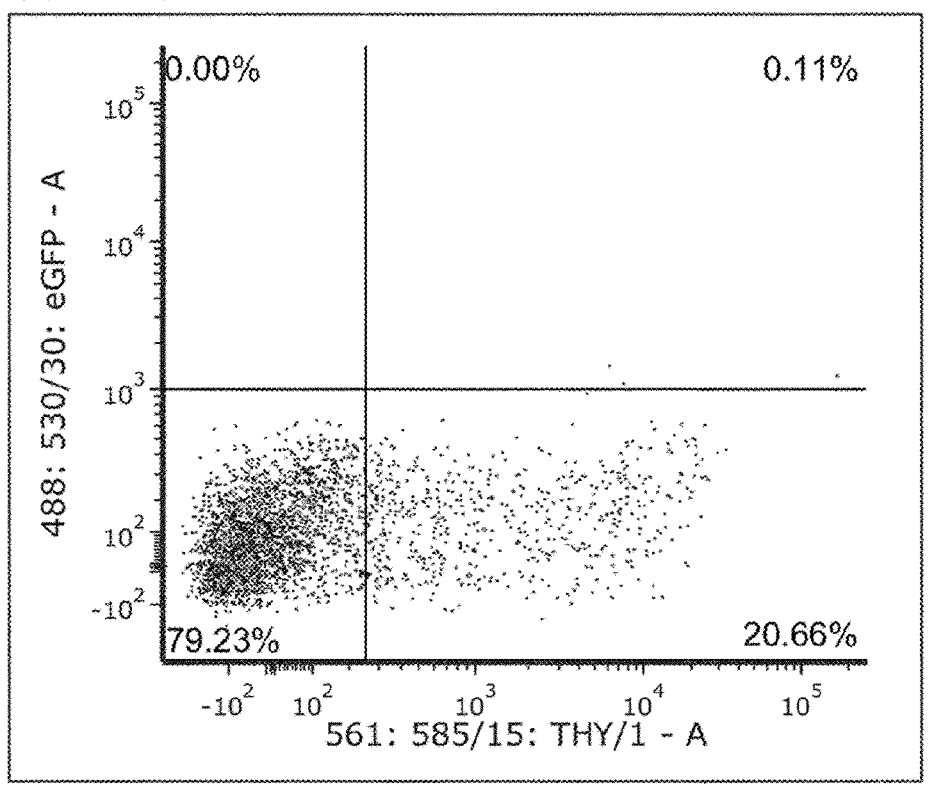
Figure 7:
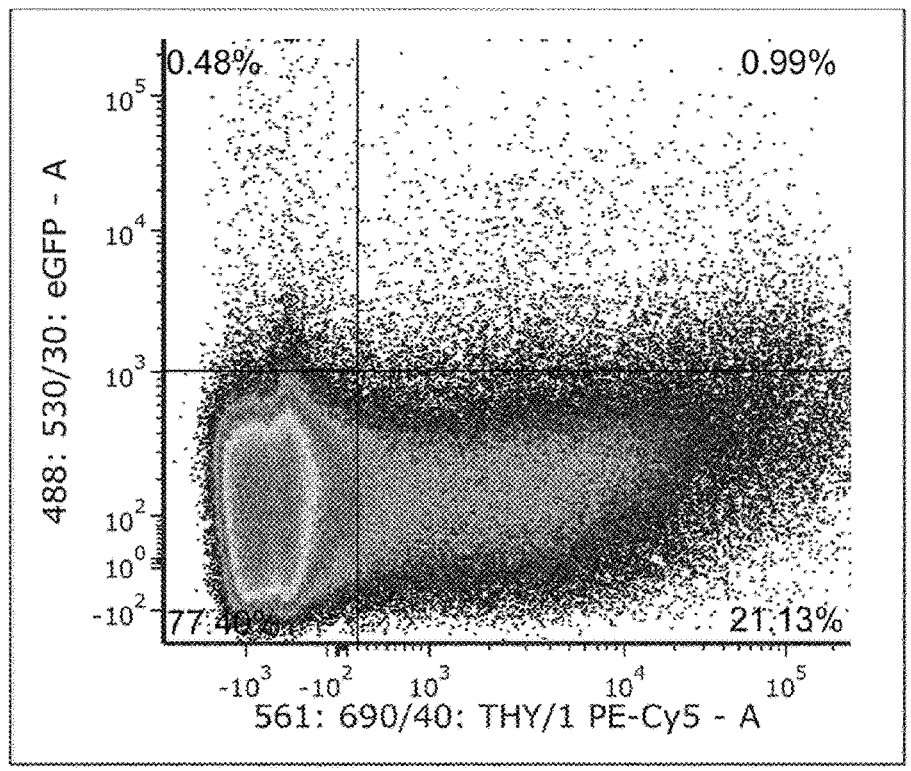
Figure 7:
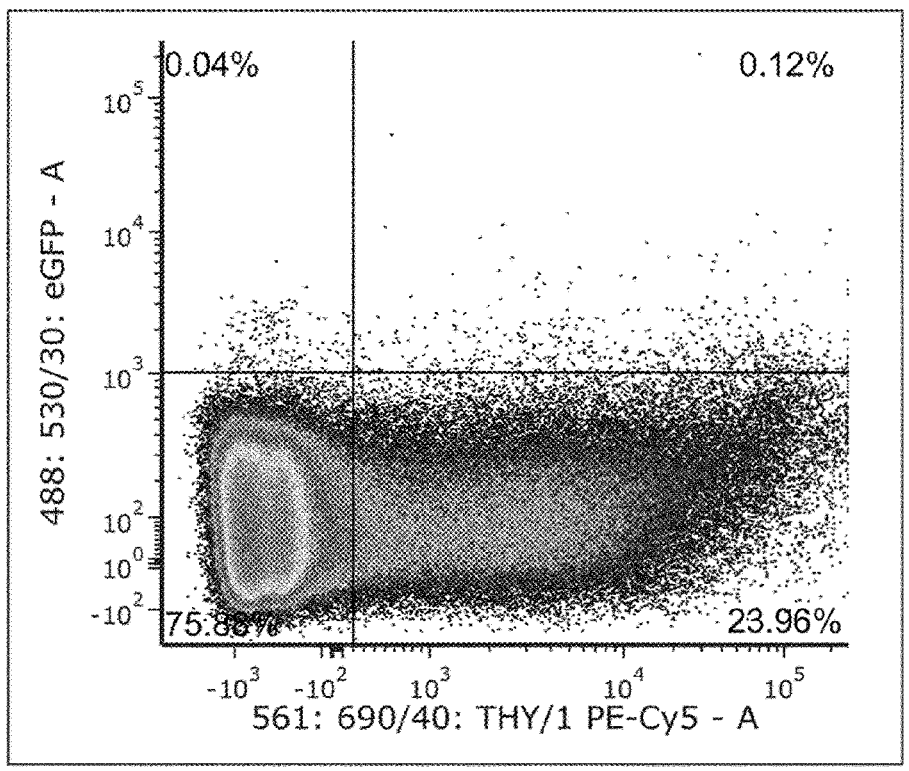

As a second method of assessing preferential gene expression in RGCs from the Nefh promoter, adult wildtype mice were intravitreally injected with $9\times10^9$ vg/eye AAV.Nefh-EGFP or $3\times10^9$ vg/eye AAV.CMV-EGFP. Three weeks post injection, retinas were taken, cells dissociated and analysed by FACS and EGFP-positive cells assessed for Thy1 expression. Interestingly levels of Thy1 enrichment in these populations were significantly higher in AAV.Nefh-EGFP versus AAV.CMV-EGFP transduced retinal samples (5.4-fold, n=12 versus only 1.6-fold, n=9 respectively; p<0.005). These data support the immunohistochemical observations above. Notably, Thy1 mRNA levels were found to be 3.23-fold higher in Thy1-positive cells than in non-antibody labeled retinal cells with a similar forward and sideways scatter (CT values of 32.618 and 33.477 respectively), indicating that the Thy1 antibody enriches for RGCs (FIG. 7).

Figure 8:
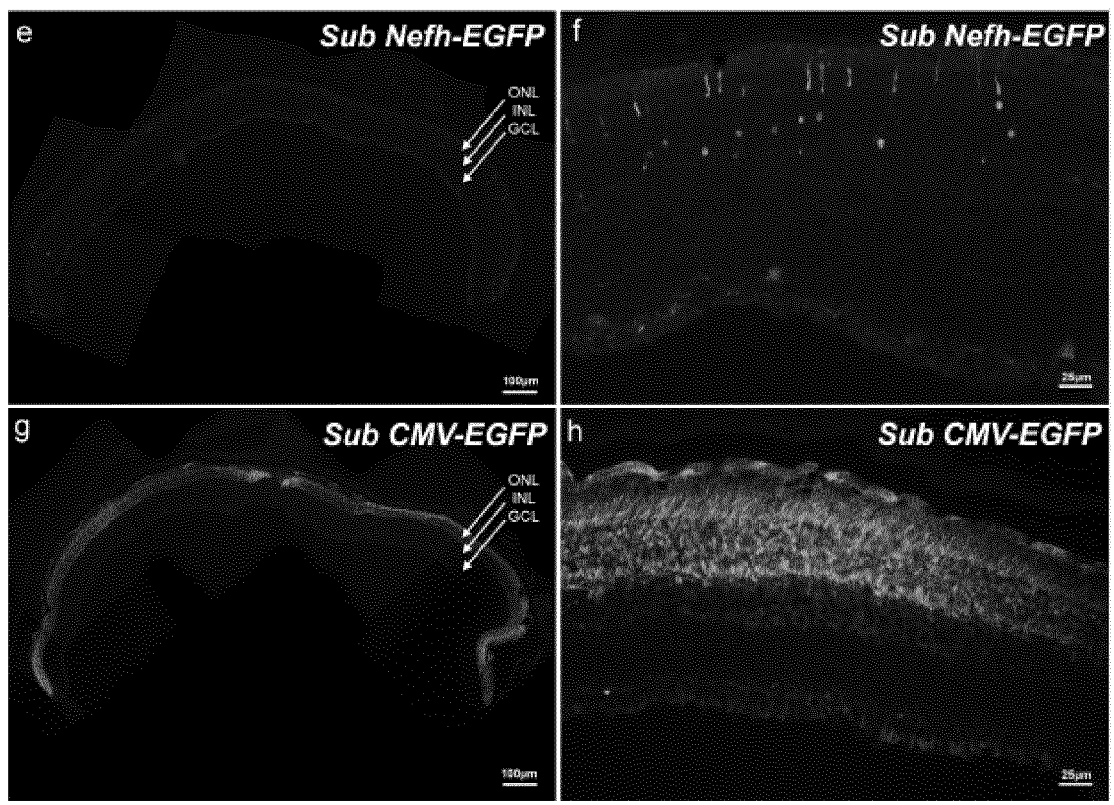
FIG. 8 illustrates analysis of Nefh specificity in vivo. Retinas injected subretinally (e-h) with AAV-Nefh-EGFP were sectioned and imaged using a Zeiss Axioplan fluorescent microscope. The left column displays the whole retinal section, while the right shows higher magnification examples. Abbreviations: ONL, outer nuclear layer. INL, inner nuclear layer. GCL, ganglion cell layer.

To further explore the preferential gene expression in RGCs from the Nefh promoter, adult wildtype mice were subretinally injected with $3\times10^9$ vg/eye AAV.Nefh-EGFP or AAV.CMV-EGFP and EGFP expression evaluated. The AAV2 serotype efficiently transduces RGCs; however, prior studies have shown that it will not transduce photoreceptors when injected intravitreally. As such, it was necessary to confirm an absence of transgene expression in photoreceptors when AAV.Nefh-EGFP was administered subretinally (FIG. 8). Subretinal AAV.CMV-EGFP shows wide expression, with near total transfection of the photoreceptor layer. Comparatively, AAV.Nefh-EGFP shows almost no expression when administered subretinally.

Figure 9A:
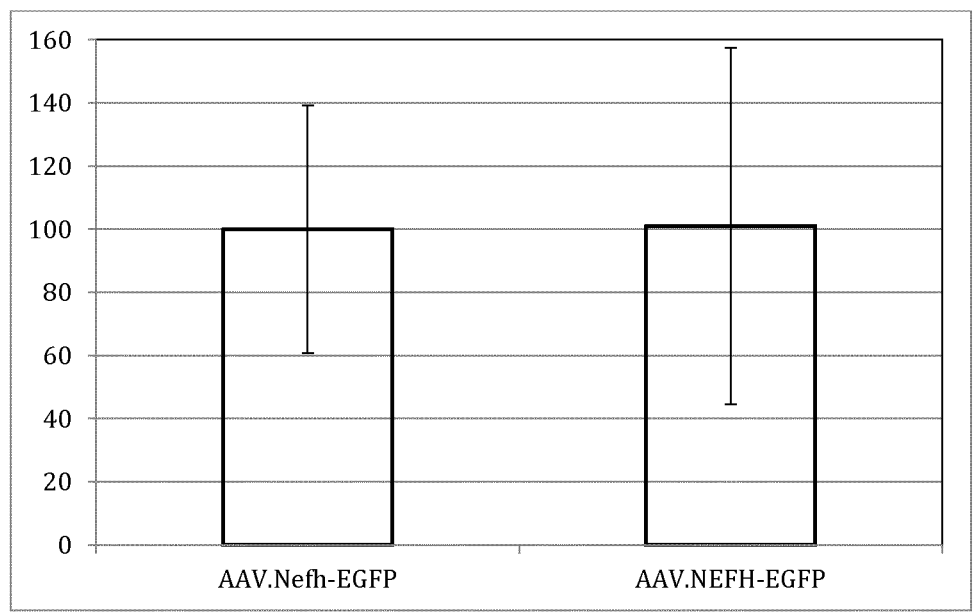
FIG. 9. illustrates the results of mRNA analysis and immunocytochemistry of Nefh mediated EGFP expression in vivo. Retinas were injected intravitreally with $6.6 \times 10^8$ vg of AAV.NEFH-EGFP (SEQ ID NO: 128) and AAV.Nefh-EGFP (SEQ ID NO: 129) and EGFP expression analysed three weeks post injection. A. [N1] RT-qPCR (n=5-6) B-Actin was used as an internal control. Relative expression levels are given as a percentage of EGFP expression from AAV.Nefh-EGFP. Expression levels from AAV.Nefh-EGFP and AAV.NEFH-EGFP were 100%=39.2% and 101%+56.4%. EGFP expression levels were not significantly different. . . . B Three weeks post-injection of AAV vectors eyes were harvested and fixed in 4% pfa in PBS o/n. 12 μm retinal cryosections were immunostained for EGFP using Cy5 conjugated secondary antibody; DAPI was used for nuclear counterstain. A and C: NEFH; B and D: Nefh. Scale bar in D indicates 50 μm.
Figure 9B:
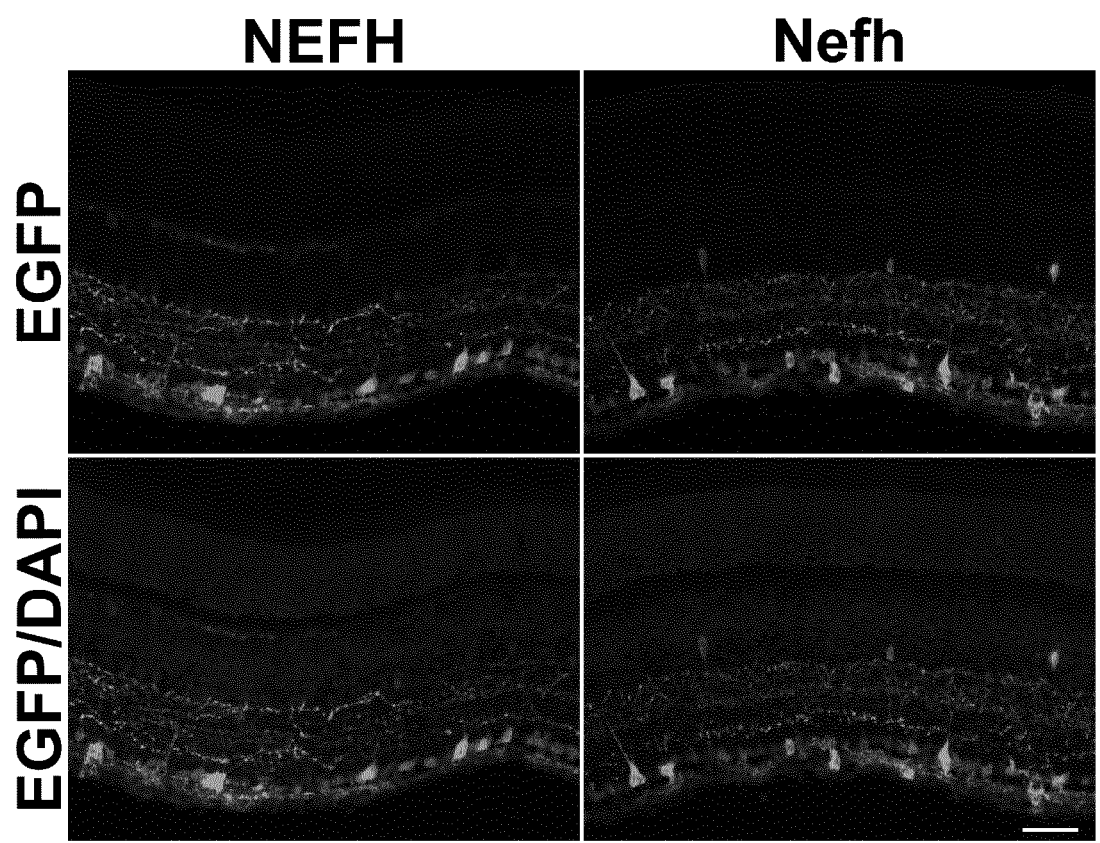

Given the potential demonstrated by 2251 bp of upstream sequence of the Nefh gene to preferentially transduce RGCs in the murine experiments above, it was important to evaluate the putative promoter region from NEFH. 2501 bp of upstream sequence from the human gene was used to drive expression of an EGFP reporter gene in an AAV2/2 vector (AAV-NEFH-EGFP) and expression compared to that mediated by the murine Nefh promoter (AAV-Nefh-EGFP; FIG. 9). Adult mice were injected intravitreally with $6.6\times10^8$ viral genomes (vg)/eye AAV.NEFH-EGFP or $6.6\times10^8$ vg/eye AAV.Nefh-EGFP. Histological analysis three weeks post-injection revealed AAV-NEFH-EGFP mediated EGFP expression to be predominantly confined to the GCL in the retina (FIG. 9B) in a similar manner to AAV-Nefh-EGFP. Native EGFP fluorescence was present in both AAV.NEFH-EGFP and AAV-Nefh-EGFP transduced retinas; Cy5-labeled immunostaining enhanced detection of EGFP. Both native and immunostained EGFP signals were similar in AAV.NEFH-EGFP and AAV-Nefh-EGFP transduced retinas. Cells in the GCL, as well as, dendrites in the IPL were detected. A few cells were also labeled in the INL mostly at the INL/IPL boundary; minimal label was present in the OPL. Individual cells exhibited a broad range of EGFP expression levels from low to very high, possibly due to varying viral transduction. However, cellular EGFP labeling (colocalised to DAPI stained nuclei), even for cells expressing low levels of EGFP, was easily distinguishable from uniform background levels. EGFP expression from NEFH was observed in a similarly significant number of RGCs as Nefh.

Similarly EGFP RNA expression levels from AAV-Nefh-EGFP and AAV-NEFH-EGFP were compared in wild type mice. Mice were injected intravitreally with $6.6\times10^8$ vp of either vectors and retinas taken 3 weeks post-injection. EGFP RNA levels expressed from both vectors did not differ significantly and in this in vivo study were shown to be functionally equivalent (FIG. 9A).

Figure 2B:
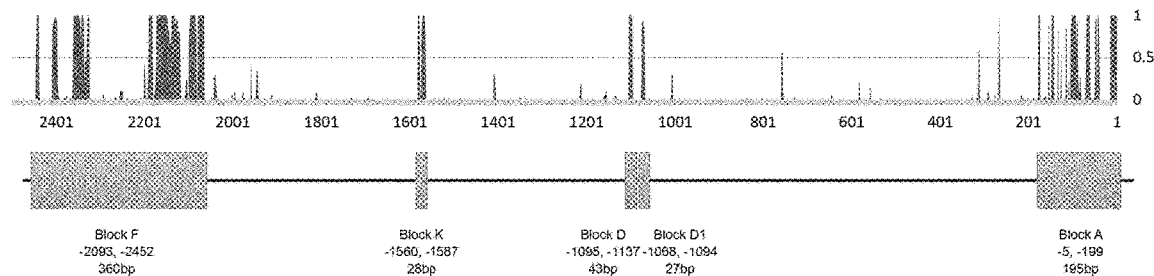
FIG. 2B is a schematic illustration of regions of significant sequence conservation in the putative Nefh promoter region in both human and mouse. Sequence conservation within the 2.5 kb region directly upstream of the Nefh transcriptional start site, the putative Nefh promoter region. Units of conservation have been defined as blocks (A-F, D1 and K).
Figure 2B:
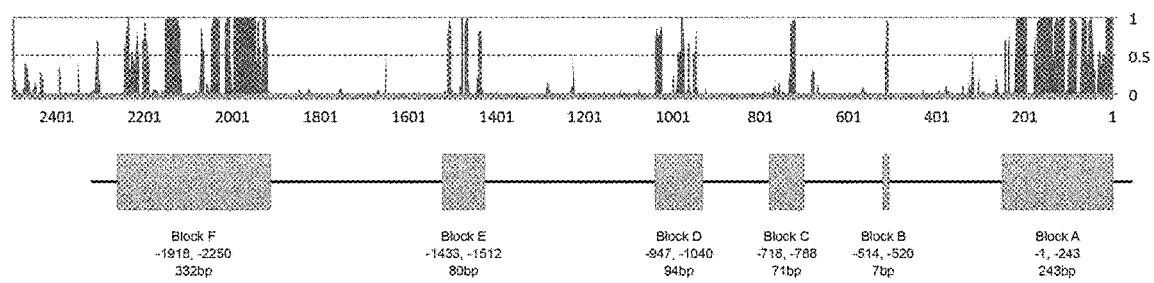

To further explore the individually defined elements of the putative NEFH promoter a series of constructs were generated (FIG. 2B). AAV-A-EGFP contains a single conserved upstream region (SEQ ID NO: 1) to drive expression of an EGFP reporter gene. AAV-A+F-EGFP utilises A (defined above) plus F (SEQ ID NO: 3) to drive expression of an EGFP reporter gene. AAV.A-spacer-F-EGFP utilises A and F (as defined) separated by spacer DNA (SEQ ID NO: 24), in this instance, to drive expression of an EGFP reporter gene. The inclusion of the spacer mimics the natural spacing of the two elements (A and F) within the NEFH upstream region. Adult mice were injected intravitreally with $6.6\times10^8$ viral genomes (vg)/eye of either construct or with $6.6\times10^8$ vg/eye AAV.Nefh-EGFP. Histological and EGFP RNA expression analyses 4 weeks post-injection were performed (FIG. 10).

Figure 10A:
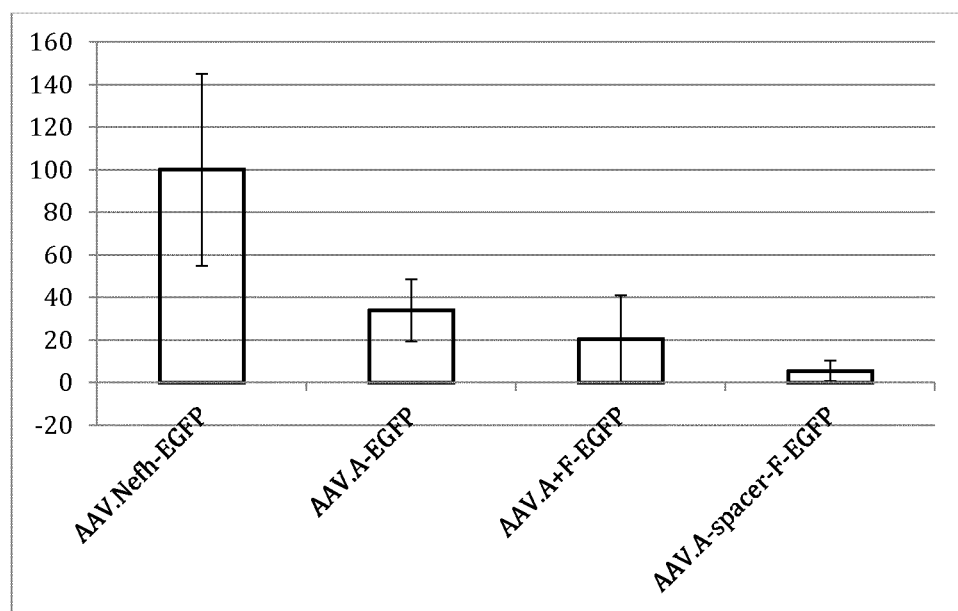
FIG. 10 illustrates the results of mRNA analysis and immunocytochemistry of EGFP expression from AAV.Nefh-EGFP, AAV.A-EGFP, AAV.A+F-EGFP and AAV.A-spacer-F-EGFP (SEQ ID NOs 129, 124, 126, 125). A, Relative levels were compared to levels expressed from AAV.Nefh-EGFP where EGFP was driven from a 2.2 kb murine Nefh promoter. $6.6 \times 10^8$ vg of AAV.Nefh-EGFP (n=5) and AAV.A-EGFP (n=6) and AAV.A+F-EGFP (n=6) and AAV.A-spacer-F-EGFP (n=6) vector were injected intravitreally into wild type 129 mice. 4 weeks post-injection total RNA was isolated from whole retinas taken from injected mice. Levels of EGFP RNA expression were determined by RT QPCR standardised to housekeeping gene β-actin. Y-axis represents relative percentage EGFP expression. Levels of EGFP RNA expression from AAV.Nefh-EGFP was considered to be 100%. Relative levels of EGFP RNA expression from AAV.Nefh-EGFP, AAV.A-EGFP, AAV.A+F-EGFP and AAV.A-spacer-F-EGFP were 100%+45.1%, 33.8%+14.6%, 20.4%=20.5% and 5.4%±4.80% respectively. EGFP expression levels from AAV.Nefh-EGFP was significantly higher than from any of the other constructs (p≤0.05). In addition, levels of EGFP RNA expression from AAV.A-EGFP were significantly higher than from AAV.A-spacer-F-EGFP (p≤0.05). B. Four weeks post-injection of AAV vectors eyes were harvested and fixed in 4% pfa in PBS o/n. 12 μm retinal cryosections were immunostained for EGFP using Cy5 conjugated secondary antibody; DAPI was used four nuclear counterstain. A, E, I: Nefh-EGFP B, F, J: A–EGFP; C, G, K: A+F-EGFP; D, H, L: A-spacer-F-EGFP. The part images in the rectangles in E, F, G and H are enlarged in I, J, K and L respectively. Cy5 exposure times were 3× longer for A+F (C, G and K) and A-spacer-F (D, H and L). Scale bars in H and L indicate 50 μm.
Figure 10B:
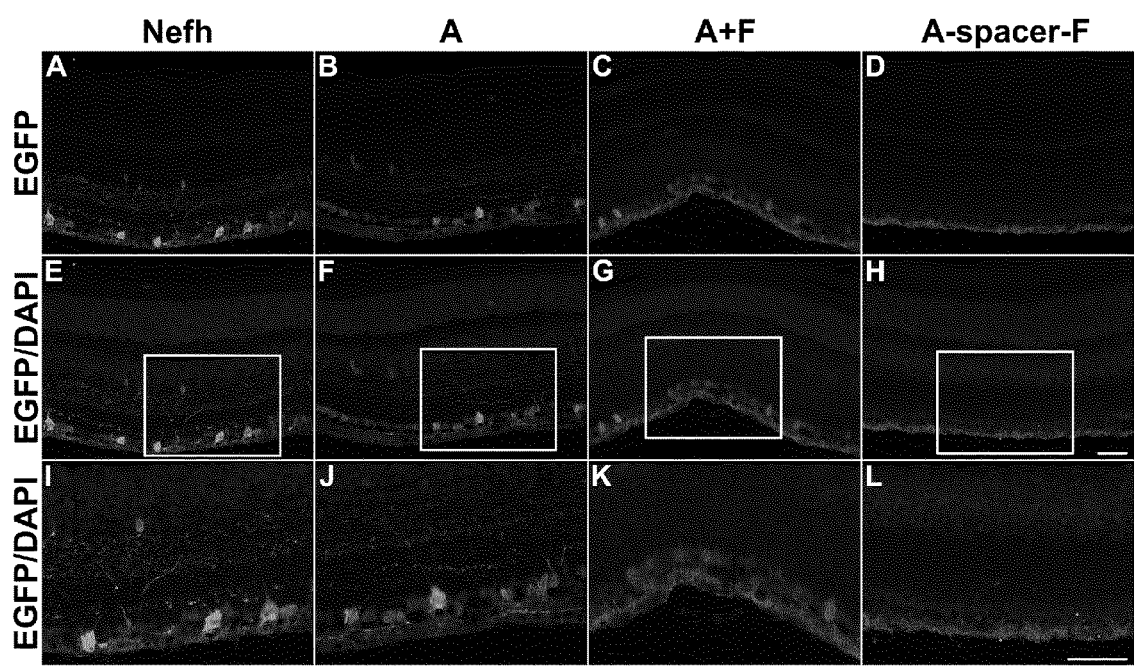

The constructs evaluated expressed EGFP at varying levels, with AAV.Nefh-EGFP expressing significantly more highly than any of the other constructs (p<0.05; FIG. 10A). EGFP expression in transduced retinas was analysed four weeks post-injection (n=4). Native EGFP fluorescence was present in AAV.Nefh-EGFP, and AAV.A-EGFP transduced retinas; very faint label was detected in AAV.A+F-EGFP transduced retinas, while no specific label was present in AAV.A-spacer-F-EGFP transduced retinas (FIG. 10B; native EGFP fluorescence not shown in figure). Cy5-labeled immunostaining enhanced detection of EGFP (there was no immunolabel in AAV.A-spacer-F-EGFP transduced retinas). Cells in the GCL were labeled as well as dendrites in the IPL in AAV.Nefh-EGFP and AAV.A-EGFP treated retinas. A few cells were also labeled in the INL, mostly at the INL/IPL boundary. Only cell bodies without dendrites were detected in AAV.A+F-EGFP treated retinas. EGFP expression was strongest in AAV.Nefh-EGFP, followed by AAV.A-EGFP and AAV.A+F-EGFP, respectively.

Discussion

AAV has become one of the commonly used vectors for gene therapy, with many clinical trials ongoing or completed and a number of gene therapies approved or seeking approval (clinicaltrials.gov). AAV is the dominant vector for use in ocular gene therapies (Bainbridge et al., 2015; Bennett et al., 2016; Feuer et al., 2016; Ghazi et al., 2016; Hauswirth et al., 2008; MacLaren et al., 2014; clinicaltrials.gov), and research in recent years has focused on improving the efficiency of AAV transduction and expression in the retina. The development of AAV vectors such as AAV7m8 and AAV8BP2 has improved levels of transduction in a wide variety of retinal cell types, and enabled consideration of intravitreal administration as a potential route of access for many retinal cells including photoreceptors (Cronin et al., 2014; Dalkara et al., 2013; Ramachandran et al., 2016). Various tyrosine capsid mutations in AAV have the potential to increase transgene expression levels by modulating capsid phosphorylation and ubiquitin proteasome-based degradation of viral particles during intracellular trafficking (Mao et al., 2016; Mowat et al., 2014; Petrs-Silva et al., 2009). Recent approaches to intravitreal delivery, including vitrectomy and sub-inner limiting membrane (sub-ILM) blebbing, have the potential to improve expression levels further (Boye et al., 2010; Tshilenge et al., 2016). However, a consequence of more efficient and broad transduction profiles may be greater potential for off-target effects. Confining expression of a gene therapy to only those cells affected by a disease represents a rational strategy; the potential reduction in immune responses may be an advantageous safety feature, as well as a means of aiding long-term expression.

In the current study, we have developed an approach to identify putative RGC promoters by analysing retinal transcriptomic data and referencing it against mammalian sequence conservation datasets to infer potential function. The expression levels of retinal genes were analysed, with high GCL enrichment and high absolute expression levels prioritised. Gene expression data in RGCs from the gene expression omnibus (GEO; ncbi.nlm.nih.gov/geo) was analysed in detail. Studies on expression from pre-natal or immature retina were omitted. In addition, samples where photoreceptor cell-specific gene expression was found to be high in RGCs were excluded as this indicated sample impurity. In contrast to the data from Kim et al. (2006), and taking the above into account, no studies in the database suitably provided data on RGC gene expression enrichment in adult retina.

Conservation of the upstream sequence of these genes was evaluated in this context in order to establish lead candidate promoter sequences. Using this approach, we identified a number of potential promoters for use in RGCs. We proceeded to evaluate in vivo one of these, Nefh, a putative promoter sequence that showed significant conservation between species, high retina expression and RGC enrichment and that was of a suitable size for use in AAV-mediated gene delivery vectors. We established that the Nefh upstream sequence efficiently drives expression in RGCs following intravitreal injection of AAV.Nefh-EGFP.

Following intravitreal delivery of either AAV.Nefh-EGFP or AAV.CMV-EGFP, EGFP expression patterns were compared by histology. Serotype AAV2/2 was chosen both for its efficient transduction of mouse RGCs, as well as its use and tolerance in the human eye, as has been observed in several clinical trials (Bennett et al., 2016; Busskamp et al., 2010; Ghazi et al., 2016; Koilkonda et al., 2014; MacLaren et al., 2014; Sengupta et al., 2016; Yang et al., 2016; Zhang et al., 2009). Both the Nefh and CMV promoters drove effective expression of EGFP in the GCL (FIG. 4). Of note, the AAV.CMV-EGFP vector also resulted in expression in the INL, while AAV.Nefh-EGFP expression was predominantly confined to the GCL, with few EGFP positive cells observed in the INL (FIG. 4 and FIG. 6*a*). Furthermore, when an increased dose of the AAV.Nefh-EGFP vector was administered, the levels of EGFP expression in the INL did not increase, highlighting the relative specificity of the Nefh promoter compared to CMV.

Fifty percent of the GCL is composed of amacrine cells (Akopian et al., 2016; Jeon et al., 1998; webvision.med.utah.edu). Analysis of EGFP expression in Brn3a-negative cells, as well as in GABA-positive or ChAT-positive amacrine cells, two major types of amacrine cells in the mouse GCL, demonstrated that AAV.Nefh-EGFP resulted in transgene expression in significantly fewer amacrine cells compared to AAV.CMV-EGFP. While expression from the Nefh promoter was significantly restricted to ChAT-positive amacrine cells in the GCL compared to the CMV promoter, expression from both promoters were similar for GABA expressing amacrine cells in the GCL. This further highlights the relative specificity of the Nefh promoter sequence in targeting RGCs, and underlines its potential use for gene delivery to RGCs and its value for future gene therapies directed towards the retinal GCL. Of note, no significant difference was found between the numbers of transduced RGCs between the two doses of AAV.Nefh-EGFP. Previous studies have shown that only 40-60% of cells in the GCL are actually RGCs (Schlamp et al., 2013; Xiang et al., 1996); it may be that saturation of RGC transduction is being reached even at the lower AAV.Nefh-EGFP dose.

RGCs represent a heterogeneous population thought to comprise in the region of 30 discrete types, which together represent just approximately 1% of cells in the retina (Baden et al. 2016). This has made isolation of pure populations of RGCs highly challenging within the field. Methods that have traditionally been used to enrich for RGC, commonly using the Thy1 antibody, have included immunopanning (Barres et al., 1988; Welsbie et al., 2017), density gradient centrifugation (Kornguth et al., 1981), and magnetic cell separation (Shoge et al., 1999). More recently flow cytometry based methods with the Thy 1.2 antibody have been used for RGC enrichment (Chintalapudi et al., 2016). These studies have highlighted that while the Thy 1 antibody does indeed enrich for RGCs it does not exclusively label these cells, indicating that RGC-isolation methodologies still require optimisation. In the current study we used Thy 1.2-based flow cytometry to support the data from immunohistochemistry. Similar to other studies, we found that the antibody did not exclusively isolate RGCs, based on the percentage of Thy 1-positive cells. However, in addition we confirmed at the RNA level that Thy1 was enriched in our cell-sorted population. We found the enrichment of Thy 1-positive cells within the EGFP-positive cell population to be greater in AAV.Nefh-EGFP versus AAV.CMV-EGFP treated retinal cell samples confirming the histological data, indicating preferential gene expression in RGCs with the Nefh promoter.

To expand the potential of the identified Nefh promoter to future human studies we also tested 2501 bp of the putative promoter region upstream of NEFH and demonstrated comparable levels of both expression and specificity in the mouse retina (FIG. 9). Furthermore, when a series of constructs containing one or more of the conserved regions were evaluated in vivo we found that conserved region A alone (SEQ ID NO: 1) resulted in strong EGFP expression preferentially within RGCs (FIG. 10). When conserved region A was combined with conserved region F the level of EGFP expression was reduced. Notably, EGFP expression was reduced when the natural spacing of the two conserved regions was mimicked with a stuffer fragment. Given the size limitations of AAV, the identification of a small region that drives strong and preferential expression in RGCs is highly important to the field of retinal gene therapy and others fields requiring RGC expression.

The purpose of this study was two-fold, involving identification of candidate RGC promoters for potential use in AAV-mediated gene therapies, and moreover the validation of the utilised methodology for characterisation of putative promoter sequences (FIG. 1, FIG. 2A). As sequencing costs continue to decrease and techniques such as RNAseq become more widely adopted, access to transcriptomic datasets from a wide variety of cell types will become more readily available. The availability of such large datasets will be a powerful resource, which, in a similar fashion to the present work, could be exploited to identify, characterise and validate promoter sequences. The current study utilised an AAV2/2 vector to facilitate the transduction of mouse RGCs. However, it has been previously observed that, while AAV2/2 is well tolerated in the human eye when administered subretinally, its transduction efficiency in primate RGCs is inferior to that of mice (Ivanova et al., 2010; Tshilenge et al., 2016; Yin et al., 2011). The development of new capsid serotypes such as AAV8BP2 (Ramachandran et al., 2016) amongst others, or new methods of administering AAV2/2 (as in the sub-ILM delivery of Boye et al., 2016) should aid in addressing this.

Intravitreal injection represents a route of vector administration that enables efficient transduction of RGCs. RGCs are the primary target cell population for gene therapies for many disorders including Leber Hereditary Optic Neuropathy (LHON), dominant optic atrophy (DOA), glaucoma and the retinal endophenotypes that are a feature of many neurodegenerative disorders, such as multiple sclerosis (Farrar et al., 2013). While intravitreal administration provides access to RGCs, it may more readily result in stimulating immune response(s) to vectors such as AAV compared to subretinal administration (Li et al., 2008). It would therefore be valuable to minimise the therapeutic vector dose, and to confine transgene expression to the target cells of interest, thereby limiting undesired side effects.

Furthermore, observations regarding patterns of cellular loss in end stage photoreceptor degenerations have highlighted the retention of certain retinal layers. While frequently the photoreceptor layer degenerates, many other retinal cells remain relatively intact, including bipolar, amacrine, horizontal and RGCs. These observations have been elegantly juxtaposed with the identification of light sensitive molecules from organisms such as algae and archaebacteria. Optogenetics is the expression of these molecules, provided as a gene therapy or protein, in non-light sensitive neurons thereby introducing a capacity for light detection. RGCs represent one key target cell population for optogenetics (Farrar et al., 2014; Gaub et al., 2014), and hence the NEFH promoter characterised in the current study, in principle, may also be of value in the design of future optogenetic-based gene therapies for IRDs. The above highlights the potential utility of the NEFH promoter sequence identified in the current study providing preferential transgene expression in RGCs in the design of future gene therapies for many disorders involving RGCs.

TABLE 8

List of animal sequences used for conservation alignment. A placental mammal species alignment (phastConsElements60wayEuarchontoGlires) was used for the conservation alignment seen in FIG. 2. Species are grouped as Glires, Primates, and other placental mammals, with species names, sequence assembly dates, and assembly details listed.

| Animal | Species | Assembly Date | Assembly Name/details |
|---|---|---|---|
| Mouse | Mus musculus | December 2011 | GRCm38/mm10 reference |
| Guinea pig | Cavia porcellus | February 2008 | Broad/cavPor3 Syntenic net |
| Kangaroo rat | Dipodomys ordii | July 2008 | Broad/dipOrd1 Reciprocal best |
| Naked mole-rat | Heterocephalus glaber | January 2012 | Broad HetGla_female_1.0/hetGla2 Syntenic net |
| Pika | Ochotona princeps | July 2008 | Broad/ochPri2 Reciprocal best |
| Rabbit | Oryctolagus cuniculus | April 2009 | Broad/oryCun2 Syntenic net |
| Rat | Rattus norvegicus princeps | March 2012 | RGSC 5.0/m5 Syntenic net |
| Squirrel | Spermophilus tridecemlineatus | November 2011 | Broad/speTri2 Syntenic net |
| Tree shrew | Tupaia belangeri | December 2006 | Broad/tupBel1 Reciprocal best |
| Marmoset | Callithrix jacchus | March 2009 | WUGSC 3.2/calJac3 Syntenic net |
| Gorilla | Gorilla gorilla | May 2011 | gorGor3 Syntenic net |
| Human | Homo sapiens | February 2009 | GRCh37/hg19 Syntenic net |
| Mouse lemur | Microcebus murinus | June 2003 | Broad/micMur1 Reciprocal best |
| Gibbon | Nomascus leucogenys | June 2011 | GGSC Nleu1.1/nomLeu2 Syntenic net |
| Bushbaby | Otolemur garnettii | March 2011 | Broad/otoGar3 Syntenic net |
| Chimp | Pan troglodytes | February 2011 | Pan_troglodytes-2.1.4/panTro4 Syntenic net |
| Baboon | Papio hamadryas | November 2008 | Baylor 1.0/papHam1 Reciprocal best |
| Orangutan | Pongo pygmaeus abelii | July 2007 | WUGSC 2.0.2/ponAbe2 Syntenic net |
| Chinese rhesus | Macaca mulatta | October 2010 | BGI CR_1.0/rheMac3 Syntenic net |
| Squirrel monkey | Saimiri boliviensis | October 2011 | saiBol1 Syntenic net |
| Tarsier | Tarsius syrichta | August 2008 | Broad/tarSyr1 Reciprocal best |
| Panda | Ailuropoda melanoleuca | December 2009 | BGI-Shenzhen 1.0/ailMel1 Syntenic Net |
| Cow | Bos taurus | October 2011 | Baylor Btau_4.6.1/bosTau7 Syntenic Net |
| Dog | Canis lupus familiaris | September 2011 | Broad/canFam3 Syntenic net |
| Sloth | Choloepus hoffmanni | July 2008 | Broad//choHof1 Reciprocal best |
| Armadillo | Dasypus novemcinctus | December 2011 | Armadillo/dasNov3 Reciprocal best |
| Tenrec | Echinops telfairi | July 2005 | Broad/echTel1 Reciprocal best |
| Horse | Equus caballus | September 2007 | Broad/equCab2 Syntenic net |
| Hedgehog | Erinaceus europaeus | June 2006 | Broad/eriEur1 Reciprocal best |
| Cat | Felis catus | September 2011 | ISGSC Felis_catus 6.2/felCat5 Reciprocal best |
| Elephant | Loxodonta africana | July 2009 | Broad/loxAfr3 Syntenic net |
| Microbat | Myotis lucifugus | July 2010 | Broad/myoLuc2 Reciprocal best |
| Sheep | Ovis aries | February 2010 | ISGC/oviAri1 Reciprocal best |
| Rock hyrax | Procavia capensis | July 2008 | Broad/proCap1 Reciprocal best |
| Megabat | Pteropus vampyrus | July 2008 | Broad/pteVam1 Reciprocal best |

TABLE 8-continued

List of animal sequences used for conservation alignment. A placental mammal species alignment (phastConsElements60wayEuarchontoGlires) was used for the conservation alignment seen in FIG. 2. Species are grouped as Glires, Primates, and other placental mammals, with species names, sequence assembly dates, and assembly details listed.

| Animal | Species | Assembly Date | Assembly Name/details |
|---|---|---|---|
| Shrew | Sorex araneus | June 2006 | Broad/sorAra1 Reciprocal best |
| Pig | Sus scrofa | August 2011 | SGSC Sscrofa10.2/susScr3 Syntenic net |
| Manatee | Trichechus manatus latirostris | October 2011 | Broad v1.0/triMan1 Syntenic net |
| Dolphin | Tursiops truncatus | October 2011 | Baylor Ttru_1.4/turTru2 Reciprocal best |
| Alpaca | Vicugna pacos | July 2008 | Broad/vicPac1 Reciprocal best |

All documents referred to in this specification are herein incorporated by reference. Various modifications and variations to the described embodiments of the inventions will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the art are intended to be covered by the present invention.

REFERENCES

Abramoff, M. D. et al. (2004). *J. Biophotonics Int.* 11, 36-41. doi:10.1117/1.3589100.
Akimoto, M. et al. (1999). *Investig. Ophthalmol. Vis. Sci.* 40, 273-279.
Akiyama, H. et al. (2006). *J. Cell. Physiol.* 207, 407-412. doi:10.1002/jcp.20583.
Akopian, A. et al. (2016). *J. Comp. Neurol.* doi:10.1002/cne.24074.
Aliç, I. et al. (2016). *Neurosci. Lett.* 634, 32-41. doi:10.1016/j.neulet.2016.10.001.
Amrite, A. C. et al. (2006). *Investig. Ophthalmol. Vis. Sci.* 47, 1149-1160. doi:10.1167/iovs.05-0531.
Anderson, C. L. et al. (2006). *Mol. Ther.* 14, 724-734. doi:10.1016/j.ymthe.2006.04.013.
Antoniou, M. et al. (2003). *Genomics* 82, 269-279. doi:10.1016/S0888-7543 (03) 00107-1.
Aoun, P. et al. (2003). *Investig. Ophthalmol. Vis. Sci.* 44, 2999-3004. doi:10.1167/iovs.02-1060.
Auricchio, A. et al. (2001). *Mol. Ther.* 4, 372-374. doi:10.1006/mthe.2001.0462.
Baden, T. et al. (2016). *Nature* 529, 345-350. doi:10.1038/nature16468.
Bainbridge, J. W. B. et al. (2015). *N. Engl. J. Med.* 372, 1887-97. doi:10.1056/NEJMoa1414221.
Bainbridge, J. W. B. et al. (2008). *N. Engl. J. Med.* 358, 2231-39. doi:10.1056/NEJMoa0802268.
Balaggan, K. S. et al. (2006). *J. Gene Med.* 8, 275-285. doi:10.1002/jgm.845.
Barres, B. A. et al. (1988). *Neuron* 1, 791-803. doi:10.1016/0896-6273 (88) 90127-4.
Barrett, T. G. et al. (1997). *Eye* 11, 882-888. doi:10.1038/eye.1997.226.
Bearer, E. L. et al. (2007). *Neuroimage* 37. doi:10.1016/j.neuroimage.2007.04.053.
Bennett, J. et al. (1996). *Nat. Med.* 2, 649-654.
Bennett, J. et al. (2016). *Lancet* 388, 661-672. doi:10.1016/S0140-6736 (16) 30371-3.
Bennett, J. et al. (1998). *Gene Ther.* 5, 1156-64. doi:10.1038/sj.gt.3300733.
Bessant, D. A. R. et al. (2001). *Curr. Opin. Genet. Dev.* 11, 307-316. doi:10.1016/S0959-437X(00)00195-7.
Bikbova, G. et al. (2013). *Brain Res.* 1534, 33-45. doi:10.1016/j.brainres.2013.08.027.
Bombelli, F. et al. (2014). *JAMA Neurol.* 71, 1036-42. doi:10.1001/jamaneurol.2014.629.
Bonneau, D. et al. (2014). *Brain* 137. doi:10.1093/brain/awu184.
Boye, S. E. et al. (2016). *Hum. Gene Ther.* 27, 580-597. doi:10.1089/hum.2016.085.
Boye, S. E. et al. (2010). *PLOS One* 5. doi:10.1371/journal.pone.0011306.
Brown, J. M. et al. (1998). *Cancer Res.* 58, 1408-1416. doi:9537241.
Buch, P. K. et al. (2006). *Mol. Ther.* 14, 700-709. doi:10.1016/j.ymthe.2006.05.019.
Budanov, A. V et al. (2004). *Science* 304, 596-600. doi:10.1126/science.1095569.
Busskamp, V. et al. (2010). *Science (80-.).* 329, 413-417. doi:10.1126/science.1190897.
Callaway, E. M. (2005). *J. Physiol.* 566, 13-9. doi:10.1113/jphysiol.2005.088047.
Caplen, N. et al. (1995). *Gene Ther.* 29, 603-13.
Carmignoto, G. et al. (1989). *J Neurosci* 9, 1263-1272.
Cayouette, M. et al. (1999). *Neurobiol. Dis.* 6, 523-32. doi:10.1006/nbdi. 1999.0263.
Cen, L. P. et al. (2017). *Neuroscience* 343, 472-482. doi:10.1016/j.neuroscience.2016.12.027.
Chadderton, N. et al. (2009). *Mol. Ther.* 17, 593-599. doi:10.1038/mt.2008.301.
Chadderton, N. et al. (2012). *Eur. J. Hum. Genet.,* 62-68. doi:10.1038/ejhg.2012.112.
Chalberg, T. W. et al. (2005). *Investig. Ophthalmol. Vis. Sci.* 46, 2140-2146. doi:10.1167/iovs.04-1252.
Chan, J. W. (2002). *Ocul. Immunol. Inflamm.* 10, 161-186. doi:10.1076/ocii.10.3.161.15603.
Chavala, S. H. et al. (2005). *Eur. J. Intern. Med.* 16, 447-448. doi:10.1016/j.ejim.2005.01.021.
Chen, H. et al. (2014). *Surv. Ophthalmol.* 59, 64-76. doi:10.1016/j.survophthal.2013.02.005.
Chintalapudi, S. R. et al. (2016). *Front. Aging Neurosci.* 8. doi:10.3389/fnagi.2016.00093.
Chng, K. et al. (2007). *J. Gene Med.* 9, 22-32. doi:10.1002/jgm.990.
Choi, V. W. et al. (2015). *Mol. Ther. Methods Clin. Dev.* 2, 15022. doi:10.1038/mtm.2015.22.
Choudhury, S. et al. (2016). *Front. Neurosci.* 10, 551. doi:10.3389/fnins.2016.00551.
Cronin, T. et al. (2014). *EMBO Mol. Med.* 6, 1-16. doi:10.15252/emmm.201404077.
Dalkara, D. et al. (2013). *Sci. Transl. Med.* 5, 189ra76. doi:10.1126/scitranslmed.3005708.
Daly, C. et al. (2016). *Histone deacetylase: Therapeutic targets in retinal degeneration.* doi:10.1007/978-3-319-17121-0_61.
Dejneka, N. S. et al. (2004). *Mol. Ther.* 9, 182-188. doi:10.1016/j.ymthe.2003.11.013.
Di Polo, A. et al. (1998). *Proc. Natl. Acad. Sci. U.S.A* 95, 3978-83. doi:10.1073/pnas.95.7.3978.

DiCiommo, D. P. et al. (2004). *Investig. Ophthalmol. Vis. Sci.* 45, 3320-3329. doi:10.1167/iovs.04-0140.
Diester, I. et al. (2011). *Nat. Neurosci.* 14, 387-397. doi: 10.1038/nn.2749.
Donello, J. E. et al. (1998). *J. Virol.* 72, 5085-92.
Dong, J. Y. et al. (1996). *Hum. Gene Ther.* 7, 2101-2112. doi:10.1089/hum. 1996.7.17-2101.
Doonan, F. et al. (2011). *J. Neurochem.* 118, 915-927. doi:10.1111/j. 1471-4159.2011.07354.x.
Doonan, F. et al. (2009). *J. Neurochem.* 109, 631-643. doi:10.1111/j.1471-4159.2009.05995.x.
Eguchi, T. et al. (2007). *Biochimie* 89, 278-288. doi: 10.1016/j.biochi.2006.12.006.
Faktorovich, E. G. et al. (1990). *Nature* 347, 83-6. doi: 10.1038/347083a0.
Fan, Y. et al. (2008). *Arterioscler. Thromb. Vasc. Biol.* 28, 315-21. doi:10.1161/ATVBAHA.107.149815.
Farjo, R. et al. (2006). *PLOS One* 1. doi:10.1371/journal.pone.0000038.
Farrar, G. J. et al. (2013). *Trends Genet.* 29, 488-497. doi:10.1016/j.tig.2013.05.005.
Farrar, G. J. et al. (2014). *Vis. Neurosci.* 31, 289-307. doi:10.1017/S0952523814000133.
Featherstone, C. (1993). *Am Biotechnol Lab* 11.
Feng, L. et al. (2017). *eNeuro* 4. doi:10.1523/ENEURO.0331-16.2016.
Feuer, W. J. et al. (2015). *Ophthalmology*, 1-13. doi:10.1016/j.ophtha.2015.10.025.
Fischer, M. D. et al. (2017). *Mol. Ther.* doi:10.1016/j.ymthe.2017.05.005.
Flannery, J. G. et al. (1997). *Proc. Natl. Acad. Sci. U.S.A* 94, 6916-6921. doi:10.1073/pnas.94.13.6916.
Fortuna, F. et al. (2009). *Brain* 132, 116-123. doi:10.1093/brain/awn269.
Frasson, M. et al. (1999). *Investig. Ophthalmol. Vis. Sci.* 40, 2724-2734.
Frezza, D. et al. (2007). *Ann . . .* 66, 1210-5. doi:10.1136/ard.2006.066597.
Gao, Q. et al. (2007). *Brain Res.* 1130, 1-16. doi:10.1016/j.brainres.2006.10.018.
Garcia-Frigola, C. et al. (2007). *BMC Dev. Biol.* 7, 103. doi:10.1186/1471-213X-7-103.
Gaub, B. M. et al. (2014). *Proc. Natl. Acad. Sci. U.S.A* 111, E5574-83. doi:10.1073/pnas. 1414162111.
Genzer, M. A. et al. (2007). *Nucleic Acids Res.* 35, 1178-1186. doi:10.1093/nar/gkm014.
Ghazi, N. G. et al. (2016). *Hum. Genet.* 135, 327-343. doi:10.1007/s00439-016-1637-y.
Gregory-Evans, K. et al. (2009). *Mol. Vis.* 15, 962-973.
Grieger, J. C. et al. (2005). *J. Virol.* 79, 9933-44. doi: 10.1128/JVI.79.15.9933-9944.2005.
Griffiths, L. et al. (2000). *Gene Ther.* 7, 255-62. doi:10.1038/sj.gt.3301058.
Grzybowski, A. et al. (2015). *Acta Ophthalmol.* 93, 402-410. doi:10.1111/aos.12515.
Hall, K. M. et al. (2006). *Exp. Hematol.* 34, 433-442. doi:10.1016/j.exphem.2005.12.014.
Hangai, M. et al. (1998). *Arch. Ophthalmol.* 116, 342-8.
Hattori, Y. et al. (2005). *Curr. Drug Deliv.* 2, 243-252. doi:10.2174/1567201054368002.
Hauswirth, W. W. et al. (2008). *Hum. Gene Ther.* 19, 979-90. doi:10.1089/hum.2008.107.
Hayashi, N. et al. (2000). *Ophthalmology* 107, 1397-1402. doi:10.1016/S0161-6420(00)00110-X.
Hoekel, J. et al. (2014). *J. AAPOS* 18, 461-465.e1. doi: 10.1016/j.jaapos.2014.07.162.
Igarashi, T. et al. (2016). *Mol. Vis.* 22, 816-26.
Ikeda, Y. et al. (2002). *Exp. Eye Res.* 75, 39-48. doi:10.1006/exer.2002.1177.
Ivanova, E. et al. (2010). *Investig. Ophthalmol. Vis. Sci.* 51, 5288-5296. doi:10.1167/iovs.10-5389.
Jeon, C. J. et al. (1998). *J Neurosci* 18, 8936-8946.
Jin, H. et al. (1996). *Nat Genet.* 14, 353-6. doi:10.1038/ng0496-417.
Joly, S. et al. (2008). *J. Neurosci.* 28, 13765-13774. doi: 10.1523/JNEUROSCI.5114-08.2008.
Ju, J. et al. (2015). *Int. J. Mol. Sci.* 16, 5666-5681. doi: 10.3390/ijms16035666.
Karmali, P. P. et al. (2007). *Med. Res. Rev.* 27, 696-722. doi:10.1002/med.20090.
Kass, I. et al. (1957). *JAMA,* 1740-1743.
Katz, B. J. et al. (2006). *Am. J. Med. Genet. Part A* 140, 2207-2211. doi:10.1002/ajmg.a.31455.
Kay, C. N. et al. (2013). *PLOS One* 8. doi:10.1371/journal.pone.0062097.
Kent, W. J. et al. (2002). *Genome Res.* 12, 996-1006. doi:10.1101/gr.229102.
Kerrison, J. B. et al. (1999). *Arch Ophthalmol* 117, 805-810.
Khalilpour, S. et al. (2017). *J. Neurol. Sci.* 375, 430-441. doi:10.1016/j.jns.2016.12.044.
Khandekar, M. et al. (2007). *Development* 134, 1703-1712. doi:10.1242/dev.001297.
Khani, S. C. et al. (2007). *Investig. Ophthalmol. Vis. Sci.* 48, 3954-3961. doi:10.1167/iovs.07-0257.
Kiang, A. S. et al. (2005). *Mol. Ther.* 12, 555-561. doi: 10.1016/j.ymthe.2005.03.028.
Kicic, A., et al. (2003). *J. Neurosci.* 23, 7742-7749. doi:23/21/7742 [pii].
Kidd, D. P. (2016). Neurol. Neuroimmunol. neuroinflammation 3, e270. doi:10.1212/NXI.0000000000000270.
Kim, C. Y. (2006). *Mol. Vis.* 12, 1640-8.
Kimchi-Sarfaty, C. et al. (2002). *Hum. Gene Ther.* 13, 299-310. doi:10.1089/10430340252769815.
Kimura, A. et al. (2016). *Int. J. Mol. Sci.* 17. doi:10.3390/ijms17091584.
Koeberle, P. D. et al. (2002). *Neuroscience* 110, 555-567. doi: S0306452201005577 [pii].
Koilkonda, R. D. et al. (2010). *Arch. Ophthalmol.* (Chicago, Ill. 1960) 128, 876-83. doi:10.1001/archophthalmol.2010.135.
Koilkonda, R. D. et al. (2014). *JAMA Ophthalmol.* 33136, 409-420. doi:10.1001/jamaophthalmol.2013.7630.
Kornguth, S. et al. (1981). *Neurosci. Lett.* 27, 151-157. doi:10.1016/0304-3940 (81) 90260-3.
Kügler, S. et al. (2003a). *Gene Ther.* 10, 337-347. doi: 10.1038/sj.gt.3301905.
Kügler, S. et al. (2003b). *Virology* 311, 89-95. doi:10.1016/S0042-6822 (03) 00162-4.
Kwaks, T. H. J. et al. (2006). *Trends Biotechnol.* 24, 137-142. doi:10.1016/j.tibtech.2006.01.007.
Kyrchanova, O. et al. (2007). *Mol. Cell. Biol.* 27, 3035-43. doi:10.1128/MCB.02203-06.
Lau, D. et al. (2000). *Investig. Ophthalmol. Vis. Sci.* 41, 3622-3633.
Lebherz, C. et al. (2008). *J. Gene Med.* 10, 375-382. doi:10.1002/jgm.1126.
Lebkowski, J. S. et al. (1988). *Mol. Cell. Biol.* 8, 3988-3996. doi:10.1128/MCB.8.10.3988.
Lee, J. et al. (2016). *Theranostics* 6, 192-203. doi:10.7150/thno.13657.
Lenaers, G. et al. (2012). *Orphanet J. Rare Dis.* 7, 46. doi:10.1186/1750-1172-7-46.
Léveillard, T. et al. (2004). *Nat. Genet.* 36, 755-9. doi: 10.1038/ng1386.

Li, Q., Miller et al. (2008). *Mol. Vis.* 14, 1760-9.
Li, R. et al. (2011). *PLOS One* 6. doi:10.1371/journal.pone.0023148.
Li, S. Y. et al. (2010). *Int. J. Mol. Sci.* 11, 2109-2117. doi:10.3390/ijms11052109.
Liao, H. W. et al. (2007). *Biotechniques* 76, 211-220. doi:10.1007/s11103-011-9767-z. Plastid.
Lin, Y.-J. et al. (1997). *Magn. Reson. Med.* 38, 378-388. doi:10.1002/mrm.1910380305.
Lindsey, J. D. et al. (2007). *Neuroimage* 34, 1619-1626. doi:10.1016/j.neuroimage.2006.07.048.
Lipps, B. V (2002). *J. Nat. Toxins* 11, 57-62.
Liu, T., et al. (2006). *Cancer Treat Rev* 32, 157-165. doi:10.1016/j.ctrv.2005.12.006.
Liu, T. et al. (2012). *J. Biomed. Mater. Res.-Part A* 100 A, 236-242. doi:10.1002/jbm.a.33271.
Lopez, A. J. et al. (2016). *J. Neurosci.* 36, 3588-3599. doi:10.1523/JNEUROSCI.3682-15.2016.
Lu, H.-X. et al. (2011). *Med. Sci. Monit.* 17, BR305-311.
Lu, Y. et al. (2012). *Adv. Drug Deliv. Rev.* 64, 342-352. doi:10.1016/j.addr.2012.09.020.
MacLaren, R. E. et al. (2014). *Lancet* 383, 1129-1137. doi:10.1016/S0140-6736 (13) 62117-0.
Mao, Y. et al. (2016). *BMC Biotechnol.* 16, 1. doi:10.1186/s12896-015-0230-0.
Marano, R. J. et al. (2005). *Gene Ther.* 12, 1544-50. doi:10.1038/sj.gt.3302579.
Masland, R. H. (2012). *Neuron* 76, 266-280. doi:10.1016/j.neuron.2012.10.002.
Matsuda, T., et al. (2004). *Proc. Natl. Acad. Sci. U.S.A* 101, 16-22. doi:10.1073/pnas.2235688100.
McKernan, D. P. et al. (2007). *Invest. Ophthalmol. Vis. Sci.* 48, 5420-5430. doi:10.1167/iovs.07-0287.
McLaren, M. J. et al. (1997). *FEBS Lett.* 412, 21-29. doi:10.1016/S0014-5793 (97) 00566-8.
McNally, N. et al. (2002). *Hum. Mol. Genet.* 11, 1005-16. doi:10.1093/hmg/11.9.1005.
Miller, N. R. (2004). *Eye (Lond).* 18, 1026-37. doi:10.1038/sj.eye.6701592.
Millington-Ward, S. et al. (2011). *Mol. Ther.* 19, 642-649. doi:10.1038/mt.2010.293.
Molday, L. L. et al. (2013). *Hum. Mol. Genet.* 22, 3894-3905. doi:10.1093/hmg/ddt244.
Montezuma, S. R. et al. (2006). *Investig. Ophthalmol. Vis. Sci.* 47, 3514-3522. doi:10.1167/iovs.06-0106.
Mowat, F. M. et al. (2014). *Gene Ther.* 21, 96-105. doi:10.1038/gt.2013.64.
Mueller, C. et al. (2008). *Gene Ther.* 15, 858-63. doi:10.1038/gt.2008.68.
Nadal-Nicolás, F. M. et al. (2009). *Investig. Ophthalmol. Vis. Sci.* 50, 3860-3868. doi:10.1167/iovs.08-3267.
Nadal-Nicolás, F. M. et al. (2014). *Front. Neuroanat.* 8, 99. doi:10.3389/fnana.2014.00099.
Ng, T. F. et al. (2007). *Chem. Immunol. Allergy* 92, 300-316. doi:10.1159/000099280.
Noval, S. et al. (2012). *Eye* 26, 315-320. doi:10.1038/eye.2011.291.
O'Reilly, M. et al. (2007). *Am. J. Hum. Genet.* 81, 127-135. doi:10.1086/519025.
Ortin-Martinez, A. et al. (2014). *PLOS One* 9. doi:10.1371/journal.pone.0113798.
Palfi, A. et al. (2006). *Hum. Mutat.* 27, 260-268. doi:10.1002/humu.20287.
Palfi, A. et al. (2012). *Hum. Gene Ther.* 23, 847-858. doi:10.1089/hum.2011.142.
Palfi, A. et al. (2015). *Mol. Ther. Methods Clin. Dev.* 2, 15016. doi:10.1038/mtm.2015.16.
Palfi, A. et al. (2010). *Hum. Gene Ther.* 21, 311-323. doi:10.1089/hum.2009.119.
Pang, C. P. et al. (2006). *Mol. Vis.* 12, 85-92. doi: v12/a9 [pii].
Passman, R. S. et al. (2012). *Am. J. Med.* 125, 447-453. doi:10.1016/j.amjmed.2011.09.020.
Patricio, M. I. et al. (2017).*Mol. Ther.-Nucleic Acids* 6, 198-208. doi:10.1016/j.omtn.2016.12.006.
Petrs-Silva, H. et al. (2009). *Mol. Ther.* 17, 463-471. doi:10.1038/mt.2008.269.
Prusky, G. T. et al. (2004). *Investig. Ophthalmol. Vis. Sci.* 45, 4611-4616. doi:10.1167/iovs.04-0541.
Purvin, V., et al. (2009). *Clin. Exp. Ophthalmol.* 37, 712-717. doi:10.1111/j.1442-9071.2009.02122.x.
Purvin, V. et al. (2011). *J. Neuro-Ophthalmology* 31, 58-68. doi:10.1097/WNO.0b013e31820cf78a.
Ramachandran, P. et al. (2016). *Hum. Gene Ther.,* hum.2016.111. doi:10.1089/hum.2016.111.
Rathnasamy, G. et al. (2017). *Mol. Neurobiol.* 54, 3453-3464. doi:10.1007/s12035-016-9905-3.
Reed, S. E. et al. (2006). *J. Virol. Methods* 138, 85-98. doi:10.1016/j.jviromet.2006.07.024.
Rex, T. S. et al. (2009). *Exp. Eye Res.* 89, 735-740. doi:10.1016/j.exer.2009.06.017.
Reynier, P. et al. (2004). *J. Med. Genet.* 41, e110. doi:10.1136/jmg.2003.016576.
Rhee, K. Do et al. (2010). *Advances in Experimental Medicine and Biology,* 647-654. doi:10.1007/978-1-4419-1399-9 74.
Rohr, U.-P. et al. (2002). *J. Virol. Methods* 106, 81-8. doi:10.1016/S0166-0934 (02) 00138-6.
Rong, X. et al. (2011). *Eur. J. Pharm. Sci.* 43, 334-42. doi:10.1016/j.ejps.2011.05.011.
Russell, S. et al. (2017). *Lancet* 6736, 1-12. doi:10.1016/S0140-6736 (17) 31868-8.
Sakurai, F. et al. (2001). *Gene Ther.* 8, 677-86. doi:10.1038/sj.gt.3301460.
Schambach, A. et al. (2006). *Gene Ther.* 13, 641-645. doi:10.1038/sj.gt.3302698.
Schlamp, C. L. et al. (2013). *Mol. Vis.* 19, 1387-96.
Sengupta, A. et al. (2016). *EMBO Mol. Med.* 8, 1248-1264. doi:10.15252/emmm.201505699.
Shoge, K. et al. (1999). *Neurosci. Lett.* 259, 111-114.
Sieving, P. A. et al. (2006). *Proc. Natl. Acad. Sci. U.S.A* 103, 3896-901. doi:10.1073/pnas.0600236103.
So, N. M. et al. (2000). *Acta Radiol.* 41, 559-61.
Spanopoulou, E. et al. (1991). *Mol. Cell. Biol.* 11, 2216-28. doi:10.1128/MCB.11.4.2216.Updated.
Struebing, F. L. et al. (2016). *Front. Genet.* 7, 1-14. doi:10.3389/fgene.2016.00169.
Sullivan, T. A. et al. (2011). *Hum. Gene Ther.* 22, 1191-1200. doi:10.1089/hum.2011.052.
Sun, X., et al. (2010). *Gene Ther.* 17, 117-31. doi:10.1038/gt.2009.104.
Suri, D. et al. (2016). *Lupus* 25, 93-96. doi:10.1177/0961203315603142.
Takahashi, M. (2004). *Methods Mol Biol* 246, 439-449.
Takazawa, T. et al. (2014). *Orbit* 33, 13-6. doi:10.3109/01676830.2013.841716.
Tian, L. et al. (2005). *J. Plant Physiol.* 162, 1355-1366. doi:10.1016/j.jplph.2005.03.011.
Tomita, H. et al. (2005). *Cardiovasc. Res.* 67, 134-41. doi:10.1016/j.cardiores.2005.02.022.
Tonges, L. et al. (2011). *J. Neurochem.* 117, 892-903. doi:10.1111/j.1471-4159.2011.07257.x.
Trompeter, H.-I. I. et al. (2003). *J. Immunol. Methods* 274, 245-256. doi:10.1016/S0022-1759 (02) 00431-3.

Trost, A. et al. (2015). *Exp. Eye Res.* 136, 59-71. doi: 10.1016/j.exer.2015.05.010.
Trujillo, C. A. et al. (2007). *Clin. Ophthalmol.* 1, 393-402.
Trujillo, M. A. et al. (2006). *Mol. Endocrinol.* 20, 2559-75. doi:10.1210/me.2006-0147.
TSAI, R. et al. (1997). *J. Ocul. Pharmacol. Ther.* 13, 473-477. a
Tshilenge, K.-T. et al. (2016). *Hum. Gene Ther. Methods* 27, 122-134. doi:10.1089/hgtb.2016.034.
Usui, S. et al. (2009). *Mol. Ther.* 17, 778-86. doi:10.1038/mt.2009.47.
Uteza, Y. et al. (1999). *Proc. Natl. Acad. Sci. U.S.A* 96, 3126-3131. doi:10.1073/pnas.96.6.3126.
Ververis, K., et al. (2013). *Biol. Targets Ther.* 7, 47-60. doi:10.2147/BTT.S29965.
Wang, Q. et al. (2011). *Cell. Physiol. Biochem.* 27, 769-782. doi:10.1159/000330085.
Wässle, H. *J. Comp. Neurol.* 265, 391-408. doi:10.1002/cne.902650308.
Wassmer, S. J. et al. (2017). *Sci. Rep.* 7, 45329. doi:10.1038/srep45329.
Watanabe, T. et al. (2001). *Magn. Reson. Med.* 46, 424-429. doi:10.1002/mrm. 1209.
Weinreb, R. N. et al. (2014). *JAMA* 311, 1901-11. doi: 10.1001/jama.2014.3192.
Weinshenker, B. G. et al. (2017). *Mayo Clin. Proc.* 92, 663-679. doi:10.1016/j.mayocp.2016.12.014.
Welsbie, D. S. et al. (2017). *Neuron* 94, 1142-1154.e6. doi:10.1016/j.neuron.2017.06.008.
Wert, K. J. et al. (2013). *Hum. Mol. Genet.* 22, 558-567. doi:10.1093/hmg/dds466.
Williams, S. et al. (2005). *BMC Biotechnol.* 5, 17. doi: 10.1186/1472-6750-5-17.
Wu, W.-C. et al. (2004). *Mol. Vis.* 10, 93-102. doi: v10/a13 [pii].
Xiang, M. et al. (1996). *Proc Natl Acad Sci USA* 93, 596-601.
Xiao, X. et al. (1998). *J. Virol.* 72, 2224-32. doi:10.1073/pnas. 1201800109.
Yang, S. et al. (2016). *EBioMedicine* 10, 258-268. doi: 10.1016/j.ebiom.2016.07.002.
Yin, L. et al. (2011). *Investig. Ophthalmol. Vis. Sci.* 52, 2775-2783. doi:10.1167/iovs.10-6250.
Ying, S. et al. (1998). *Curr. Eye Res.,* 777-782. doi:10.1076/ceyr.17.8.777.5158.
Yu-Wai-Man, P. et al. (2016). *Acta Neuropathol.* 132, 789-806. doi:10.1007/s00401-016-1625-2.
Zeng, Y. et al. (2007). *J. Virol.* 81, 2401-2417. doi:10.1128/JVI.02024-06.
Zhang, Y. et al. (2009). *J. Neurosci.* 29, 9186-9196. doi: 10.1523/JNEUROSCI.0184-09.2009.
Zhao, X. et al. (2006). *Brain Res.* 1073-1074, 460-469. doi:10.1016/j.brainres.2005.12.061.
Zhu, Y. et al (2014). *J. Neurosci.* 34, 7845-61. doi:10.1523/JNEUROSCI.2960-13.2014.
Zolotukhin, S. et al. (1999). *Gene Ther.* 6, 973-985. doi: 10.1038/sj.gt.3300938.

The invention claimed is:

1. An isolated nucleic acid molecule having promoter activity,
   wherein said nucleic acid molecule comprises the nucleotide sequence of nucleotide positions 162 to 752 of SEQ ID NO:126, but does not comprise any of Neurofilament heavy gene promoter conserved regions D, D1, K, B, C and E;
   wherein; Neurofilament heavy gene promoter conserved region D is a nucleotide sequence having the nucleotide sequence of SEQ ID NO: 2, or a functional variant thereof; Neurofilament heavy gene promoter conserved region D1 is a nucleotide sequence having the nucleotide sequence of SEQ ID NO: 4, or a functional variant thereof; Neurofilament heavy gene promoter conserved region K is a nucleotide sequence having the nucleotide sequence of SEQ ID NO: 5, or a functional variant thereof; Neurofilament heavy gene promoter conserved region B is a nucleotide sequence having the nucleotide sequence of SEQ ID NO: 6, or a functional variant thereof; Neurofilament heavy gene promoter conserved region C is a nucleotide sequence having the nucleotide sequence of SEQ ID NO: 7, or a functional variant thereof; and Neurofilament heavy gene promoter conserved region E is a nucleotide sequence having the nucleotide sequence of SEQ ID NO: 8, or a functional variant thereof.

2. The isolated nucleic acid molecule according to claim 1, wherein said nucleic acid molecule having promoter activity provides preferential expression of one or more heterologous polynucleotide sequences to which it is operably linked in the ganglion cell layer of the eye.

3. A vector comprising the isolated nucleic acid according to claim 1.

4. A therapeutic composition comprising the isolated nucleic acid molecule according to claim 1.

5. An isolated nucleic acid molecule having promoter activity, wherein said nucleic acid molecule comprises the nucleotide sequence of nucleotide positions 162 to 752 of SEQ ID NO:126, but does not comprise any of Neurofilament heavy gene promoter conserved regions D, D1, K, B, C and E;
   wherein; Neurofilament heavy gene promoter conserved region D is a nucleotide sequence having the nucleotide sequence of SEQ ID NO: 2, SEQ ID NO: 12, SEQ ID NO: 13 or SEQ ID NO: 14; Neurofilament heavy gene promoter conserved region D1 is a nucleotide sequence having the nucleotide sequence of SEQ ID NO: 4; Neurofilament heavy gene promoter conserved region K is a nucleotide sequence having the nucleotide sequence of SEQ ID NO: 5; Neurofilament heavy gene promoter conserved region B is a nucleotide sequence having the nucleotide sequence of SEQ ID NO: 6 or SEQ ID NO: 18; Neurofilament heavy gene promoter conserved region C is a nucleotide sequence having the nucleotide sequence of SEQ ID NO: 7 or SEQ ID NO: 19; and Neurofilament heavy gene promoter conserved region E is a nucleotide sequence having the nucleotide sequence of SEQ ID NO: 8 or SEQ ID NO: 20.

* * * * *